(12) United States Patent
Miyachi et al.

(10) Patent No.: US 7,639,332 B2
(45) Date of Patent: Dec. 29, 2009

(54) DISPLAY ELEMENT AND DISPLAY DEVICE, DRIVING METHOD OF DISPLAY ELEMENT, AND PROGRAM

(75) Inventors: Koichi Miyachi, Soraku-gun (JP); Seiji Shibahara, Tenri (JP); Iichiro Inoue, Tenri (JP); Shoichi Ishihara, Katano (JP); Takako Koide, Kashihara (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 740 days.

(21) Appl. No.: 11/015,771

(22) Filed: Dec. 20, 2004

(65) Prior Publication Data
US 2005/0168663 A1 Aug. 4, 2005

(30) Foreign Application Priority Data

| Dec. 18, 2003 | (JP) | ............................. 2003-421002 |
| Dec. 19, 2003 | (JP) | ............................. 2003-423358 |
| Dec. 19, 2003 | (JP) | ............................. 2003-423420 |
| Dec. 15, 2004 | (JP) | ............................. 2004-363590 |
| Dec. 17, 2004 | (JP) | ............................. 2004-366576 |

(51) Int. Cl.
*G02F 1/1337* (2006.01)
(52) U.S. Cl. ........................ 349/129; 349/168; 349/141; 349/145
(58) Field of Classification Search ........................ None
See application file for complete search history.

(56) References Cited

U.S. PATENT DOCUMENTS

| 4,506,957 | A | | 3/1985 | Harrison et al. |
| 4,767,194 | A | * | 8/1988 | Heppke et al. ............... 349/167 |
| 4,869,847 | A | | 9/1989 | Leslie et al. |
| 5,677,747 | A | * | 10/1997 | Ishikawa et al. ............... 349/76 |
| 5,886,762 | A | | 3/1999 | Lee et al. |
| 6,266,109 | B1 | * | 7/2001 | Yamaguchi et al. ........... 349/86 |

(Continued)

FOREIGN PATENT DOCUMENTS

JP 63-253334 A 10/1988

(Continued)

OTHER PUBLICATIONS

Demus et al, Handbook of Liquid Crystals, vol. 1: Fundamentals, 1998, pp. 484-485 & 530.

(Continued)

*Primary Examiner*—David Nelms
*Assistant Examiner*—Lucy P Chien
(74) *Attorney, Agent, or Firm*—Nixon & Vanderhye, P.C.

(57) ABSTRACT

A display element includes a dielectric material layer 3, provided between a pair of substrates (substrates 1 and 2), which is made of a medium showing optical isotropy when no electric field is applied and showing optical anisotropy when an electric field is applied. Further, comb-shaped electrodes 4 and 5 are provided face to face on the substrate 1 so as to be positioned in a surface which faces the substrate 2. Furthermore, polarizing plates 6 and 7 are respectively provided on rear surfaces with respect to the counter surfaces of the substrates 1 and 2.

Thus, it is possible to realize the display element which has a wide driving temperature range, a wide viewing angle property, and a high-speed response property.

49 Claims, 38 Drawing Sheets

NO VOLTAGE
APPLICATION STATE
(OFF STATE)

VOLTAGE
APPLICATION STATE
(ON STATE)

U.S. PATENT DOCUMENTS

| | | | |
|---|---|---|---|
| 6,339,460 B1 * | 1/2002 | Saitoh | 349/117 |
| 2002/0024481 A1 * | 2/2002 | Kawabe et al. | 345/87 |
| 2003/0081163 A1 | 5/2003 | Suzuki et al. | |
| 2003/0133068 A1 | 7/2003 | Suzuki et al. | |
| 2004/0239854 A1 * | 12/2004 | Monobe et al. | 349/127 |
| 2005/0151912 A1 | 7/2005 | Miyachi et al. | |
| 2005/0162607 A1 | 7/2005 | Miyachi et al. | |
| 2005/0185125 A1 | 8/2005 | Miyachi et al. | |
| 2005/0264743 A1 | 12/2005 | Suzuki et al. | |

FOREIGN PATENT DOCUMENTS

| | | |
|---|---|---|
| JP | 5-107563 A | 4/1993 |
| JP | 10-307295 A | 11/1998 |
| JP | 11-183937 A | 7/1999 |
| JP | 2001-249363 A | 9/2001 |
| JP | 2001-337303 A | 12/2001 |
| JP | 4027939 B2 | 12/2007 |
| JP | 4027940 B2 | 12/2007 |
| KR | 2001-0029224 B1 | 4/2001 |
| WO | 01/93652 A2 | 12/2001 |

OTHER PUBLICATIONS

Grelet et al, "Structural Investigations on Smectic Blue Phases", Physical Review Letters, vol. 86, No. 17, pp. 3791-3794.

Nakata et al, "Blue Phases Induced by Doping Chiral Nematic Liquid Crystals with Nonchiral Molecules", Physical Review E 68, 041710, 2003.

Diele et al, "Chapter XIII Thermotropic Cubic Phases", Handbook of Liquid Crystals, Demus et al, WILEY-VCH, vvol. 2B, 1998, pp. 887-900.

Matsumoto et al, Fine Droplets of Liquid Crystals in a Transparent Polymer and Their Response, Appl. Phys. Lett., 69, 1996, pp. 1044-1046.

Mizoshita et al, "Fast and High-Contrast Electro-Optical Switching of Liquid-Crystalline Physical Gels" Formation of Oriented Microphase-Separated Structures, Adv. Funct. Mater., vol. 13, No. 4, Apr. 2003, pp. 313-317.

Kikuchi et al, "Polymer-Stabilized Liquid Crystal Blue Phases", Nature Materials, vol. 1, Sep. 2002 pp. 64-68.

Saito et al, "Thermodynamics of a Unique Thermo-Tropic Liquid Crystal Having Optical Isotropy", Ekisho, Vo. 5, No. 1, 2001, pp. 20-27 w/partial English Translation.

Yamamoto, "Liquid Crystal Micro Emulsion", Ekisho, vol. 4, No. 3, 2000, pp. 248-254 (partial English Translation).

Shiraishi et al, "Kobunshi Ronbunshu", vol. 59, No. 12, Dec. 2002, pp. 753-759 (partial English Translation).

Yoneya, "Examining Nano-Structured Liquid Crystal Phase by Molecule Simulator", Ekisho, vol. 7, No. 3, 2003, pp. 238-245 (partial English Translation).

Yamamoto, "First Lecture of Liquid Crystal Science Experiment: Identification of Liquid Crystal Phase", Lyotropic Liquid Crystal, Ekisho, vol. 6, No. 1, 2002, pp. 72-83 (partial English Translation).

Yamamoto et al, "Organic Electrooptic Materials", National Technical Report, vol. 22, No. 6, Dec. 1976, pp. 826-834 (partial English Translation).

Office Action mailed Dec. 21, 2007 in corresponding U.S. Appl. No. 11/017,235.

* cited by examiner

NO VOLTAGE
APPLICATION STATE
(OFF STATE)

VOLTAGE
APPLICATION STATE
(ON STATE)

FIG. 3 (a) NO VOLTAGE APPLICATION STATE
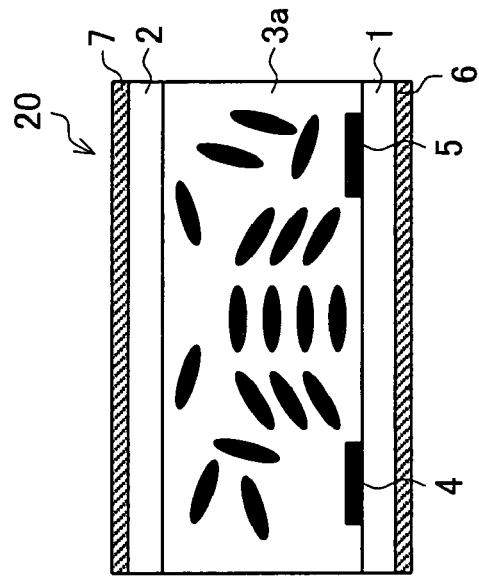
FIG. 3 (b) VOLTAGE APPLICATION STATE
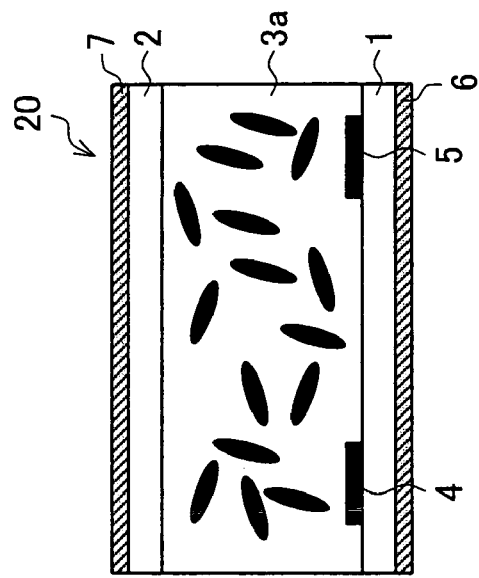
FIG. 3 (c)
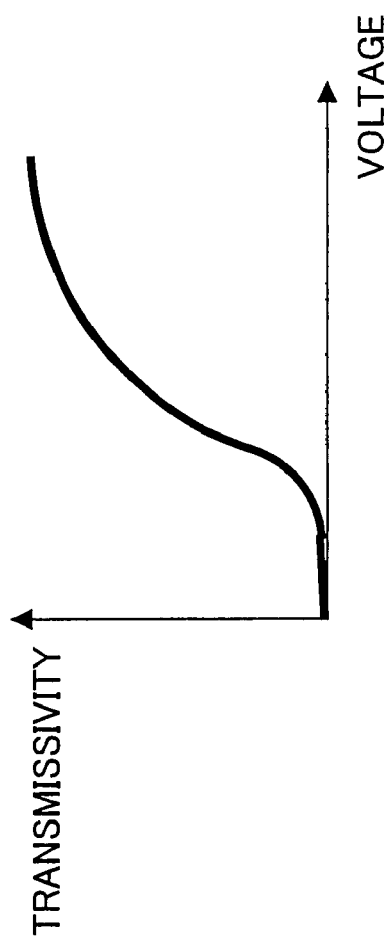

FIG. 4

| | AVERAGE REFRACTIVE INDEX ELLIPSOID OF MEDIUM WHEN NO VOLTAGE IS APPLIED | AVERAGE REFRACTIVE INDEX ELLIPSOID OF MEDIUM WHEN VOLTAGE IS APPLIED | |
|---|---|---|---|
| TN MODE | 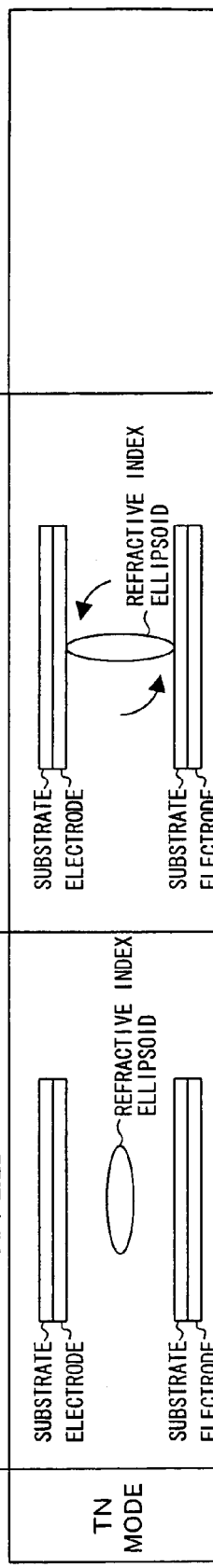 | 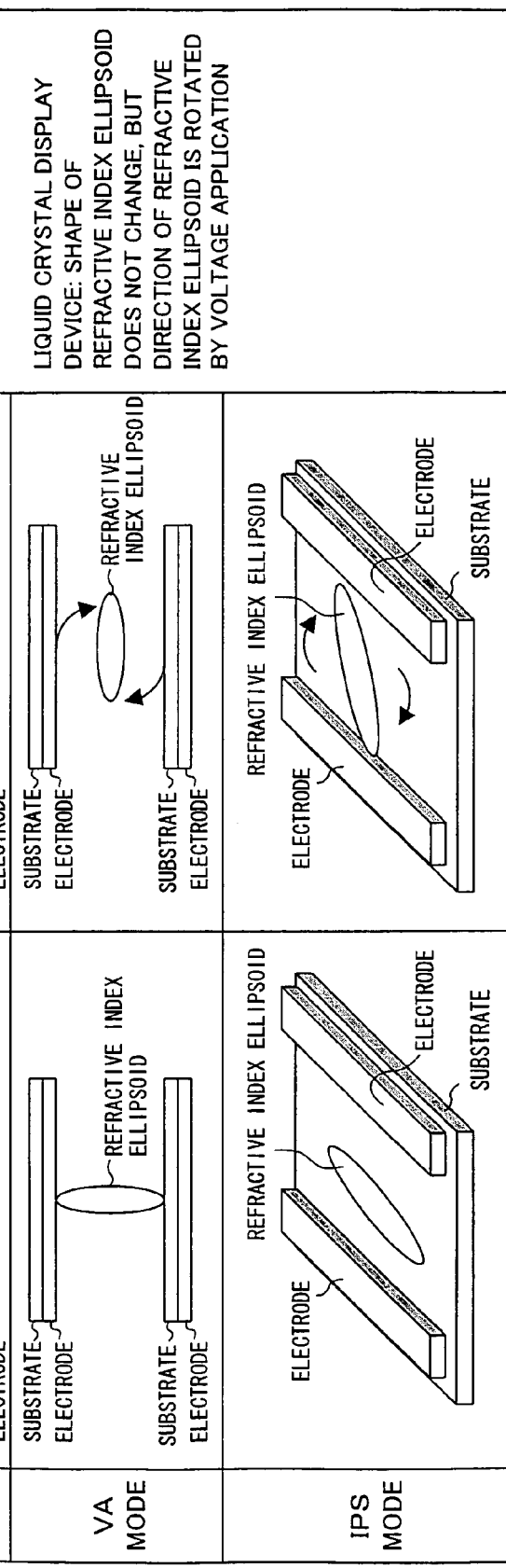 | LIQUID CRYSTAL DISPLAY DEVICE: SHAPE OF REFRACTIVE INDEX ELLIPSOID DOES NOT CHANGE, BUT DIRECTION OF REFRACTIVE INDEX ELLIPSOID IS ROTATED BY VOLTAGE APPLICATION |
| VA MODE | 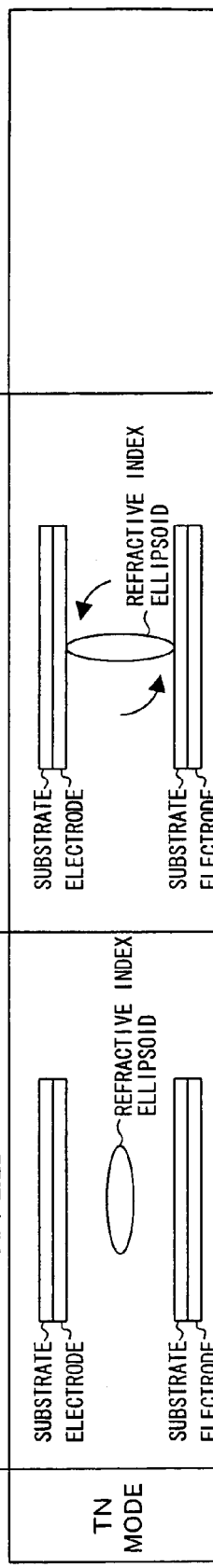 | 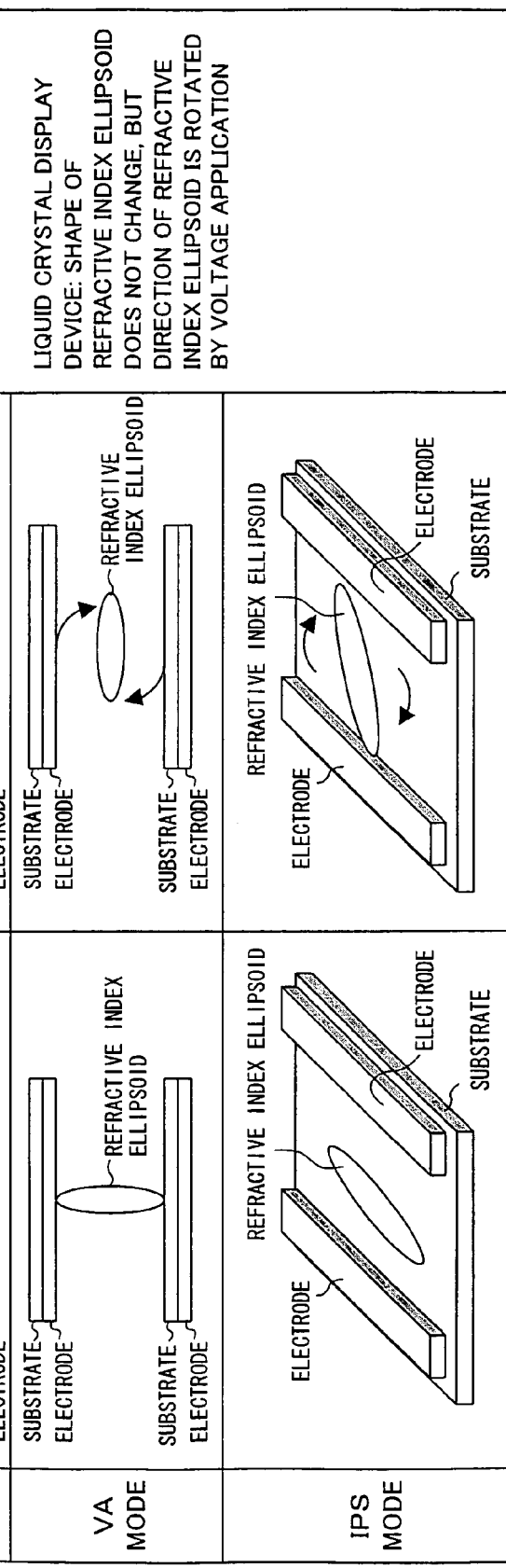 | |
| IPS MODE | 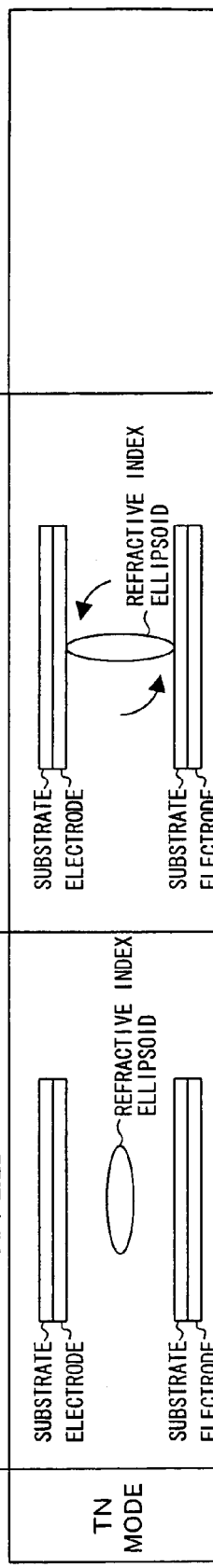 | 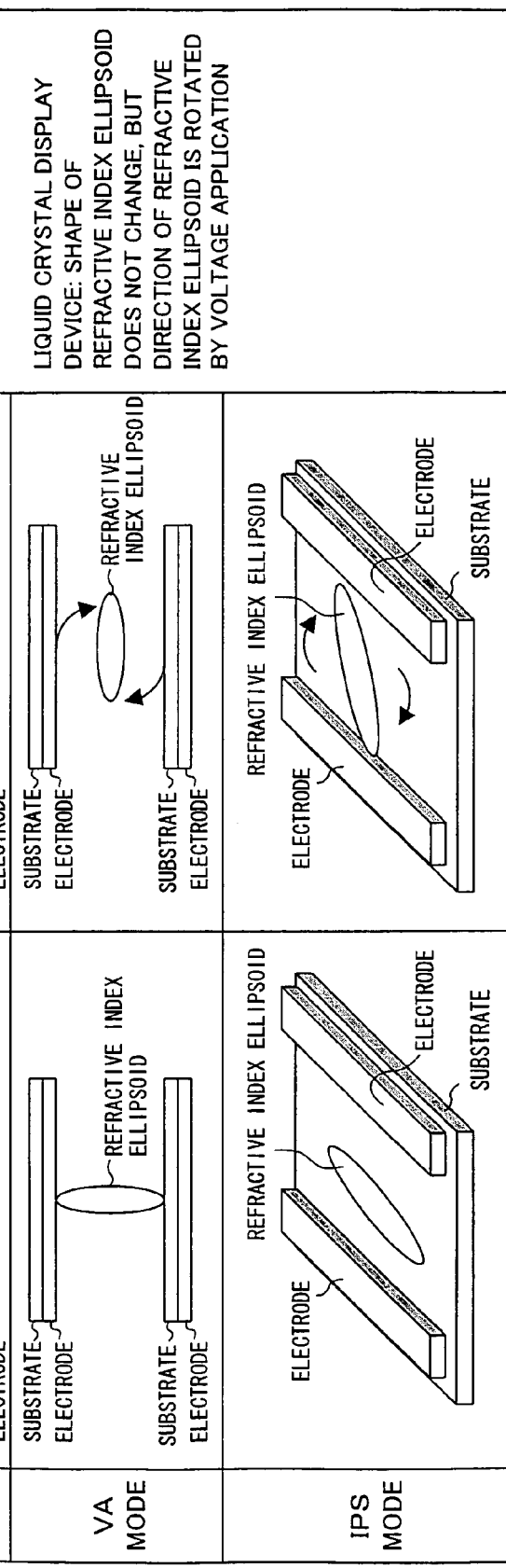 | |
| PRESENT DISPLAY DEVICE | 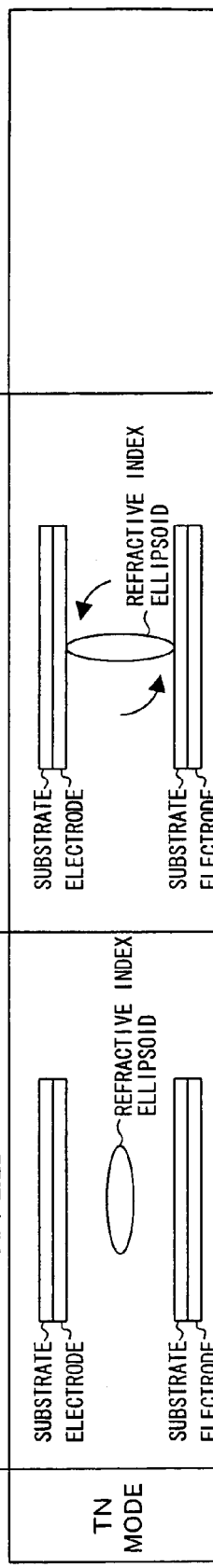 | 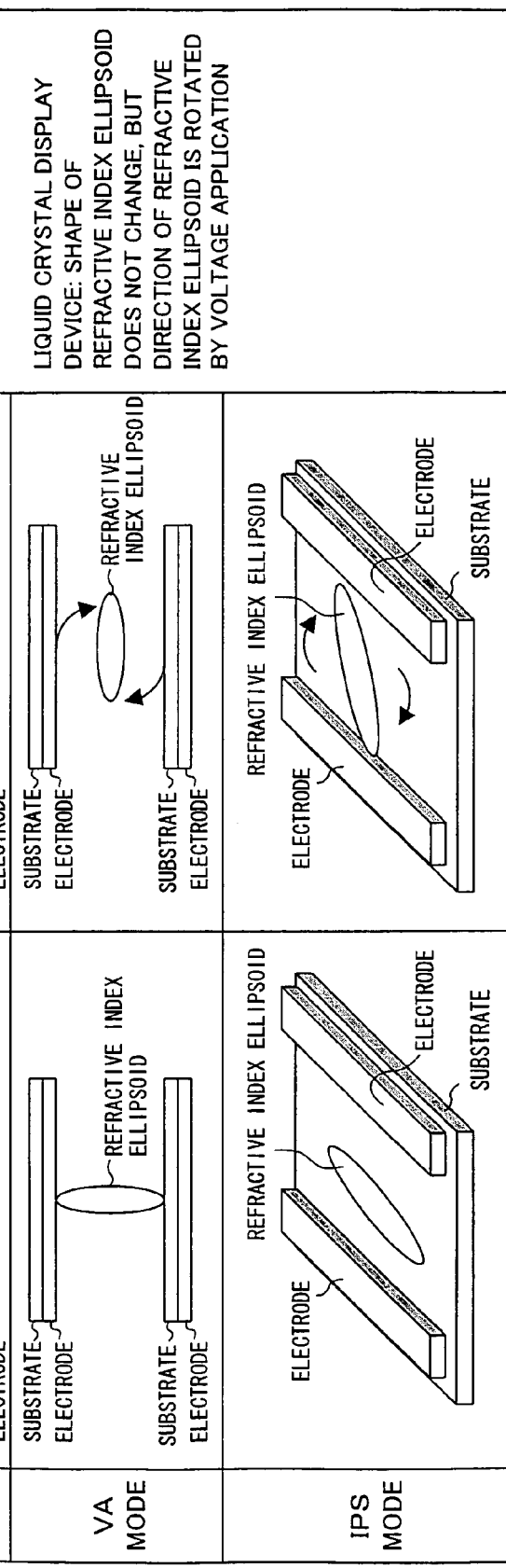 | ISOTROPIC ($nx=ny=nz$) WHEN NO VOLTAGE IS APPLIED, BUT ANISOTROPIC ($nx>ny$) WHEN VOLTAGE IS APPLIED |

NO VOLTAGE APPLICATION STATE (OFF STATE)

VOLTAGE APPLICATION STATE (ON STATE)

DISPLAY ELEMENT AND DISPLAY DEVICE, DRIVING METHOD OF DISPLAY ELEMENT, AND PROGRAM

This Nonprovisional application claims priority under 35 U.S.C. § 119(a) on Patent Application No. 2004/366576 filed in Japan on Dec. 17, 2004, Patent Application No. 2004/363590 filed in Japan on Dec. 15, 2004, Patent Application No. 2003/421002 filed in Japan on Dec. 18, 2003, Patent Application No. 2003/423420 filed in Japan on Dec. 19, 2003, and Patent Application No. 2003/423358 filed in Japan on Dec. 19, 2003, and the entire contents of which are hereby incorporated by reference.

FIELD OF THE INVENTION

The present invention relates to a display element, capable of being driven at a wide range of temperature, which has a wide viewing angle property and a high-speed response property, and utilizes a medium whose magnitude of optical anisotropy varies by application of an electric field.

RELATED ART AND OTHER CONSIDERATIONS

A liquid crystal display element has advantages over other display element in terms of thinness, lightness in weight, and small power consumption, and is therefore widely used for image display devices such as a television and a monitor, and image display devices provided on: OA (Office Automation) equipments such as a word processor, and a personal computer; and information terminals such as a video camera, a digital camera, and a mobile phone.

There are conventionally well-known liquid crystal display modes for the liquid crystal display element, such as the TN (twisted nematic) mode using nematic liquid crystal, the display mode using FLC (ferroelectric liquid crystal) or AFLC (anti-ferroelectric liquid crystal), and the polymer dispersed liquid crystal display mode.

Among the liquid crystal display modes, for example, the TN mode using nematic liquid crystal is adopted in the conventional liquid crystal display element, and the liquid crystal display element is in the practical use. However, the liquid crystal display adopting the TN mode has drawbacks in slow response and a narrow viewing angle. Those disadvantages are large hindrances for the TN mode to take over CRT (Cathode Ray Tube).

The mode using the FLC or AFLC allows high-speed response and wide viewing angle, but has drawbacks in shock resistance and temperature characteristics. This prevents wide and practical application of the mode using the FLC or AFLC.

The polymer dispersed liquid crystal display mode using light scattering does not need a polarizing plate, and allows high-luminance display. However, in the polymer dispersed liquid crystal display mode, it is intrinsically impossible to control the viewing angle with the use of a phase plate. Further, the polymer dispersed liquid crystal display mode has a problem in its response property. Therefore, the polymer dispersed liquid crystal display mode has only a few advantages over the TN mode.

In each of these display modes, liquid crystal molecules are aligned in a certain direction, and visibility depends on an angle with respect to the liquid crystal molecules. That is, in the display mode, there is restriction in the viewing angle. Further, each of the display modes uses that rotation of the liquid crystal molecules which is caused by electric field application. Because the liquid crystal molecules rotate in the alignment all together, a response speed is slow. Although the mode using the FLC or AFLC has advantages in its response speed and its viewing angle, the mode has a problem of irreversible alignment breakdown due to external force.

Apart from the display elements using the molecule rotation due to the application of the electric field voltage, an electronic polarization display mode using the Kerr electro-optic effect is proposed.

The term "electro-optic effect" indicates such a phenomenon that reflective index of a substance varies according to an outer electric field, and there are two types in the electro-optic effect: (i) the Pockel's effect that is proportional to the electric field, and (ii) the Kerr's effect that is proportional to square of the electric field. Especially, the Kerr effect, that is the Kerr electro-optic effect, has been applied to a high-speed optical shutter since early days, and is into practical use in a special measuring instrument.

The Kerr effect was found by J. Kerr in 1875. Well-know materials showing the Kerr effect are organic liquid materials such as nitrobenzene, carbon disulfide, and the like. These materials are used for, for example, the aforementioned optical shutter, an optical modulating device, an optical polarizing device, or high electric field strength measurement of an electric cable or the like.

Later on, researches on basic technology have been conducted to utilize a large Kerr constant of the liquid crystal materials for use in light modulation devices, light deflection devices, and further optical integrated circuit. It was reported that a liquid crystal compound has a Kerr constant more than 200 times higher than that of nitrobenzene.

Under such a circumstance, application of the Kerr effect to a display device has come to be studied. Because the Kerr effect is proportional to the square of the electric field, it is expected that the Kerr effect allows the display device to be driven at a lower voltage than that of the Pockel's effect. Further, the Kerr effect shows a response property of several µ seconds to several m seconds, as its basic nature, so that it is expected that the utilization of the Kerr effect realizes a display device whose response speed is higher than that of the Pockel's effect.

Under the circumstance, for example, in Japanese Laid-Open Patent Application Tokukai 2001-249363 (published on Sep. 14, 2001), Japanese Laid-Open Patent Application Tokukaihei 11-183937/1999 (published on Jul. 9, 1999), and Shiro Matsumoto, et al, "Fine droplets of liquid crystals in a transparent polymer and their response to an electric field", Appl. Phys. Lett., 1996, vol. 69, pp. 1044-1046, there is proposed application of the Kerr effect to a display element by making arrangement as follows. That is, a medium made of a liquid crystal material is injected and sealed in a space between a pair of substrates, and a voltage perpendicular or parallel to the substrates is applied so as to induce the Kerr effect. For example, disclosed by Tokukai 2001-249363 is a display device, as a display device using the Kerr effect, which includes: (i) a pair of substrates, at least one substrate of the substrates being transparent; (ii) a medium that is provided between the substrates, and that contains polar molecules in an isotropic phase state; (iii) a polarizing plate provided on an outer side of the at least one substrate; and (iv) electric field applying means for applying an electric field to the medium.

However, because a temperature range allowing the display device of the Tokukai 2001-249363 to be driven is limited to a vicinity of a nematic phase/isotropic phase transition point, very precise temperature control is required. This makes it difficult for the display device to be implemented. In other words, the big problem for the implementation of the display device is temperature dependency of the Kerr effect, that is, temperature dependency of Kerr constant of the liquid crystal material.

Specifically, in case where the liquid crystal material is used, the Kerr effect, observed in the isotropic phase state, is utmost in a vicinity of a liquid crystal phase/isotropic phase transition temperature. As the temperature (T) increases, the Kerr effect decreases in accordance with a function proportional to: $1/(T-Tni)$, where Tni indicates the phase transition temperature.

Tokukai 2001-249363 attempts to solve the problem by adding a particular non liquid crystal material into a liquid crystal material so as to obtain a large Kerr effect within a practical temperature range by lowering an isotropic phase transition temperature of the liquid crystal material, but not by reducing temperature dependency of the Kerr effect. However, this does not significantly solve the temperature dependency of the Kerr effect.

Such a display element is so arranged that polarizing plates having absorption axes orthogonal to each other are disposed at respective sides of the substrates. With this arrangement, the medium is optically isotropic when no electric field is applied, thereby realizing a black display. When an electric field is applied, double refraction occurs and causes a change in transmittance, thereby carrying out a grayscale display. This allows a very high contrast value in a normal direction of the substrates.

However, an in-depth examination performed by the present inventors shows that the contrast becomes low when obliquely viewing—particularly, viewing at an oblique viewing angle of 45° with respect to the absorption axis of the polarizing plate—the liquid crystal element having the conventional structure. This means that a viewing angle provided by the display element is so narrow that, for example, a television and a personal computer monitor that adopt the display element have a practical problem.

Further, the display element using the material whose optical anisotropy varies according to electric field application has the following problem. That is, in case of driving the display element provided with a switching element for an ordinary liquid crystal display element, the display element carries out image displaying in slow response to a signal voltage applied by the switching element. Note that the term "signal voltage" indicates a voltage written in the display element by the switching element so that the display element is driven.

Specifically, as shown in FIG. 44, the display element 200 is provided with: a switching element 201 that is a FET (field effect transistor); and a voltage waveform generator 202. In the arrangement, when the switching element 201 is in a conductive state, a voltage outputted by the voltage waveform generator 202 is applied to the display element 200, thereby charging the display element 200. When the switching element 201 becomes non-conductive, the electric charge in the display element 200 is kept.

Ideally, as shown in FIG. 45, in cases where the switching element 201 becomes in the conductive state while the voltage waveform generator 202 generates a voltage, the display element 200 starts to be charged, and the electric charge in the display element 200 will be constantly kept even after the switching element 201 is brought into the non-conductive state.

However, it was found that: when the signal voltage is constantly kept in the display element as shown in FIG. 46(*a*), an actual response waveform of the transmittance in the display element 200 has a stair-like shape as shown in FIG. 46(*b*). Accordingly, the display response time of the display element to the signal voltage corresponds to one frame or longer. When it is assumed that a frame frequency is 60 Hz, a typical display response time corresponds to 16.7 ms or longer. This causes deterioration in display quality, such as appearance of noticeable afterimage while displaying a video image.

BRIEF SUMMARY

The present technology was made in light of the foregoing problem, and its object is to provide a display element and a display device, which have a wide driving temperature range, a wide viewing angle property, and a high-speed response property.

In order to solve the foregoing problem, a display element of an example embodiment includes a medium provided between a pair of substrates, at least one of the substrates being transparent, an electric field being applied to the medium in order to carry out a display, wherein the medium varies in terms of magnitude of optical anisotropy in response to application of the electric field.

According to the arrangement, it is possible to vary a magnitude of optical anisotropy of the medium when an electric field is applied, from the magnitude thereof when no electric field is applied. Here, the change in the magnitude of the optical anisotropy means a change in a shape of an refractive index ellipsoid (optical indicatrix). That is, in the display element of an example embodiment, it is possible to realize one display state when an electric field is applied and realize another display state when no electric field is applied, so as to differentiate these display states from each other, by using the change in the shape of the refractive index ellipsoid.

On the contrary, in the conventional liquid crystal display element, the shape of the refractive index ellipsoid stays elliptic irrespective of the electric field application, but a direction of a longitudinal side of the refractive index ellipsoid is changed (rotates). In other words, the conventional liquid crystal display element realizes one display state when an electric field is applied and realizes another display state when no an electric field is applied, so as to differentiate these display states from each other, by using the change (rotation) of the longitudinal side of the refractive index ellipsoid.

Note that, because the conventional liquid crystal display element uses a change in an alignment direction of liquid crystal molecules, the response speed of the conventional liquid crystal display element is greatly influenced by intrinsic viscosity of liquid crystal. On the contrary, the aforementioned arrangement uses the change in the magnitude of the optical anisotropy in the medium so as to carry out displaying. For this reason, the response speed is not greatly influenced by the intrinsic viscosity of the liquid crystal unlike the conventional display element. Therefore, the arrangement allows realization of high-speed response. Further, the high-speed responsiveness of the present display element can be used for a field sequential color display device.

Moreover, the conventional liquid crystal display element using the electro-optic effect raises such a problem that: the driving temperature range is limited to a vicinity of a phase transition point of the liquid crystal, and therefore requires very precise temperature control. On the contrary, the arrangement allows an easy temperature control by only keeping the medium at such a temperature that the magnitude of the optical anisotropy can be varied according to electric field application.

Further, because the arrangement uses the change in the magnitude of the optical anisotropy of the medium so as to carry out displaying, it is possible to realize a viewing angle property wider than that of the conventional liquid crystal display element that carries out displaying by changing the alignment direction of the liquid crystal molecules.

Further, an object of an example embodiment is to provide a display element arranged so as to have a good viewing angle property by improving contrast at an oblique viewing angle.

In order to solve the foregoing problem, a display element includes: a pair of substrates at least one of which is transparent; a medium, sandwiched by the substrates, whose magnitude of optical anisotropy varies in response to application of a voltage; and a polarizing plate which is disposed on at least one of the substrates so as to be positioned in a rear surface with respect to a counter surface facing the medium, wherein: a phase retardation plate having biaxial optical anisotropy is provided between at least one of the substrates and the polarizing plate, and the phase retardation plate is disposed so that, in case where main refractive indices in an in-plane direction of the phase retardation plate are nx1 and ny1 and a main refractive index in a normal direction is nz1, a direction of ny1 is parallel to or orthogonal to an absorption axis of the polarizing plate disposed via the phase retardation plate in a back side with respect to the substrate.

In the display element, the retardation plate having biaxial optical anisotropy is provided between (i) said at least one substrate of the substrates and (ii) the polarizing plate so that the main reflective index of the retardation plate and the absorption axis of the polarizing plate satisfy the aforementioned relation. This allows improvement of contrast at an oblique viewing angle as compared with the conventional display element. Therefore, with this arrangement, it is possible to provide the display element having a viewing angle property superior to that of the conventional display element.

Further, an object of an example embodiment is to provide (i) a display element which allows a high-speed response during a driving of the display element including a switching element per pixel, (ii) a driving method thereof, and (iii) a program.

In order to solve the foregoing problem, a method of an example embodiment for driving a display element including a medium, whose magnitude of optical anisotropy varies in response to application of an electric field, which is sealed into a gap between substrates, at least one of the substrates being transparent, and the method includes the step of setting a signal voltage, to be inputted to the medium, in accordance with a previous video signal and a present video signal.

In order to solve the foregoing problem, a display element of the an example embodiment includes a medium, whose magnitude of optical anisotropy varies in response to application of an electric field, which is sealed into a gap between substrates, at least one of the substrates being transparent, the display element comprising video signal correction processing section for outputting a corrected video signal so as to set the signal voltage inputted to the medium.

Because each of the conventional liquid crystal display elements uses a change in the alignment direction of liquid crystal molecules so as to carry out displaying, the response speed of the conventional liquid crystal display element is greatly influenced by intrinsic viscosity of liquid crystal. On the contrary, the display element of the arrangement uses a change in the magnitude of optical anisotropy of the medium. Therefore, response speed of the display element of the arrangement is not greatly influenced by the intrinsic viscosity of liquid crystal, unlike the conventional liquid crystal display element. In other words, the display element of the arrangement intrinsically has a high-speed response displaying property.

Further, according to the arrangement, it is possible to determine, in accordance with the present video signal and the previous video signal, a signal voltage which is calculated so that a desired voltage to be applied in response to an input of the present video signal is applied to the medium as soon as possible.

Therefore, according to the arrangement, it is possible to apply a signal voltage which prevents the display element having a higher response property than that of the conventional liquid crystal display element from deteriorating the high response property. This allows realization of more accurate high-speed response of the display element which carries out displaying by using the change in the magnitude of the optical anisotropy of the medium.

Further, in order to solve the foregoing problem, a method of an example embodiment for driving a display element including a medium, whose magnitude of optical anisotropy varies in response to application of an electric field, which is sealed into a gap between substrates, at least one of the substrates being transparent, the method includes the step of setting a signal voltage, to be inputted to the medium, in accordance with (i) achievement estimate data indicative of an estimated voltage which will be indicated by the display element in response to input of a previous video signal and (ii) a present video signal. The achievement estimate data is, for example, data showing a voltage applied to the display element, or data showing a grayscale level of displaying by the display element.

Because the conventional liquid crystal display element uses a change in the alignment direction of liquid crystal molecules so as to carry out displaying, its response speed is greatly influenced by the intrinsic viscosity of liquid crystal. On the contrary, the display element of the arrangement uses the change of optical anisotropy of the medium. Therefore, the response speed of the display element of the arrangement is not greatly influenced by the intrinsic viscosity of the liquid crystal, unlike the conventional liquid crystal display element. In other words, the display element of the arrangement intrinsically has a high-speed response displaying property.

Further, according to the arrangement, it is possible to determine, in accordance with the present video signal and the achievement estimate data, the signal voltage which is determined so that a desired voltage to be applied in response to an input of the present video signal is applied to the medium as soon as possible.

Therefore, according to the arrangement, it is possible to apply a signal voltage which prevents the display element having a higher response property than that of the conventional liquid crystal display element from deteriorating the response property. This realizes more accurate high-speed response of the display element that carries out displaying by using the change in the optical anisotropy of the medium.

Particularly, the use of the achievement estimate data allows secure determination of the signal voltage even in the case where the achievement estimate data is different from actual data that the display element shows. Thus, it is possible to surely realize the high speed response of the display element.

In order to solve the foregoing problem, a display device of an example embodiment includes the display element having any one of the foregoing arrangements.

The arrangement allows realization of the display device having a wide driving temperature range, a wide viewing angle property, and a high-speed response property.

A program causes a computer to execute the method of driving the display element. Therefore, when the program is executed by the computer, it is possible to drive the display element in accordance with the driving method. This ensures realization of the high-speed response property of the display element, as in the driving method of the present invention.

For a fuller understanding of the nature and advantages of the invention, reference should be made to the ensuing detailed description taken in conjunction with the accompanying drawings.

BRIEF DESCRIPTION OF THE DRAWINGS

FIG. 3(a) is a cross sectional view of a conventional liquid crystal display element when no electric field is applied. FIG. 3(b) is a cross sectional view of the conventional liquid crystal display element when an electric field is applied. FIG. 3(c) is a graph illustrating a voltage-transmittance curve.

FIG. 4 is an explanatory view illustrating difference between a display principle of the present display element and that of the conventional display element.

FIG. 19(a) is a cross sectional view illustrating the display element according to the present embodiment when no electric field is applied. FIG. 19(b) is a cross sectional view illustrating the display element according to the present embodiment when an electric field is applied. FIG. 19(c) is a cross sectional view illustrating a display element adopting the TN mode when no electric field is applied. FIG. 19(d) is a cross sectional view illustrating the display element adopting the TN mode when an electric field is applied. FIG. 19(e) is a cross sectional view illustrating a display element adopting the VA mode when no electric field is applied. FIG. 19(f) is a cross sectional view illustrating the display element adopting the VA mode when an electric field is applied. FIG. 19(g) is a cross sectional view illustrating a display element adopting the IPS mode when no electric field is applied. FIG. 19(h) is a cross sectional view illustrating the display element adopting the TN mode when an electric field is applied.

DESCRIPTION OF THE EMBODIMENTS

Embodiment 1

The following description explains an example embodiment with reference to the figures.

FIGS. 1(a) and 1(b) are cross-sectional views each of which schematically illustrates an arrangement of a display element (present display element) of the present embodiment. The present display element is provided, in an display device, with a driving circuit, a signal line (data signal line), a gate line (gate signal line), a switching element, and the like.

Figure 13:
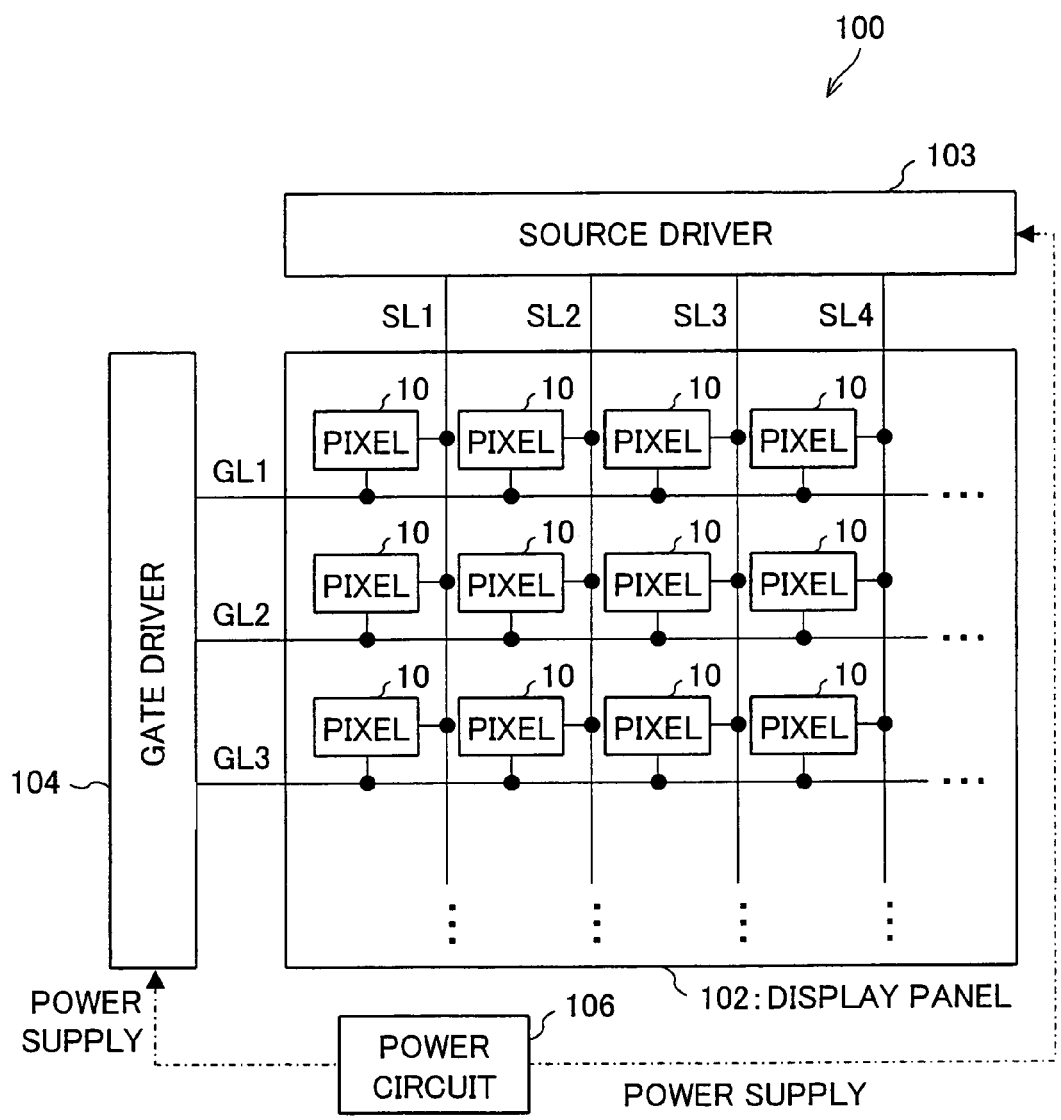
FIG. 13 is a block diagram schematically illustrating structures of important members of a display device using the display element according to one example embodiment.
Figure 14:
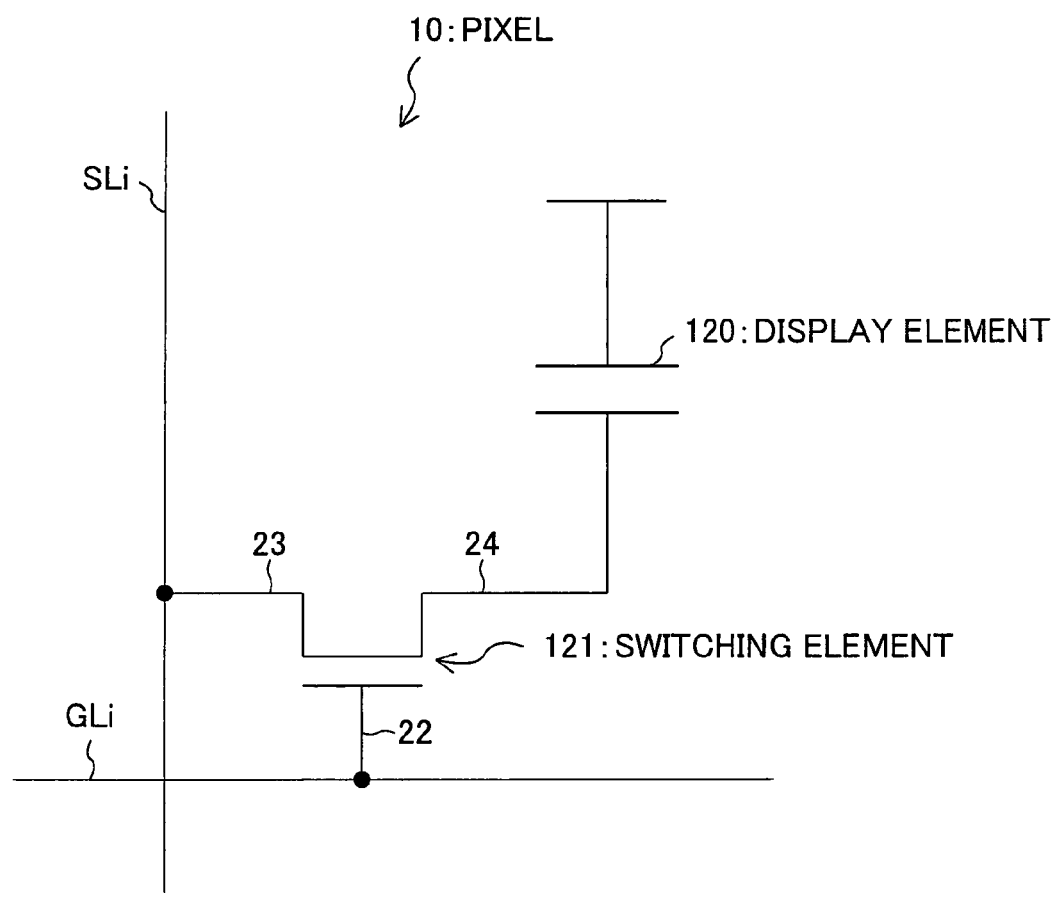
FIG. 14 is a schematic view illustrating a periphery of the display element used for the display device shown in FIG. 13.

FIG. 13 is a block diagram schematically illustrating structures of important members of the display device using the present display element. FIG. 14 is a schematic diagram illustrating a periphery of the present display element (display element 20) used for the display device shown in FIG. 13.

As shown in FIG. 13, the display device 100 according to the present embodiment includes: (i) a display panel 102 in which pixels 10 are provided in a matrix manner; (ii) a source driver 103 and a gate driver 104 each serving as the driving circuit; (iii) a power circuit 106, and the like.

In each of the pixels 10, the present display element (display element 120) and a switching element 121 are provided as shown in FIG. 14.

The display panel 102 includes: a plurality of the data signal lines SL1 through SLn (n is an arbitrary integer not less than 2); and a plurality of the gate signal lines GL1 through GLm (m is an arbitrary integer not less than 2) which intersect with the data signal lines SL1 through SLn, respectively. In each of the intersections of the data signal lines and the gate signal lines, a pixel 10 is provided.

The power circuit 106 supplies, to the source driver 103 and the gate driver 104, a voltage for displaying an image on the display panel 102. This allows the source driver 103 to drive data lines SL1 through SLn of the display panel 102, and allows the gate driver 104 to drive gate lines GL1 through GLm of the display panel 102.

The switching element 121 is, for example, an FET (field effect transistor) or a TFT (thin film transistor) arranged so that: its gate electrode 22 is connected to the gate signal line GLi, and its drain electrode 23 is connected to the data signal line Sli, and its source electrode 24 is connected to the display element 120. The other end of the display element 120 is connected to a common electrode line (not shown) shared by all of the pixels 10. In each of the pixels 10, when the gate signal line Gli (i is an arbitrary integer not less than 1) is selected, the switching element 121 becomes electrically continuous, thereby applying, to the display element 120 by the source driver 103 via the data line SLi (i is an arbitrary integer not less than 1), a signal voltage determined according to a display data signal sent from a controller (not shown). During a period that the switching element 121 is OFF after the selection period of the gate signal line GLi, it is ideal that the display element 11 keeps a voltage corresponding to the voltage at the moment of the disconnection of the switching element 121.

The present display element is structured such that a dielectric material layer 3 (optical modulation layer) is sandwiched between two substrates (substrates 1 and 2) which are provided face to face. Moreover, comb-shaped electrodes (comb-teeth shaped electrodes) 4 and 5 are provided face to face on the substrate 1 so as to be positioned in a surface which faces the substrate 2. The comb-shaped electrodes are provided as electric field application means in order to apply an electric field to the dielectric material layer 3. Furthermore, polarizing plates 6 and 7 are respectively provided on rear surfaces with respect to the counter surfaces of the substrates 1 and 2.

FIG. 1(a) illustrates a state in which no voltage (electric field) is applied between the comb-shaped electrodes 4 and 5 (no voltage (electric field) application state (OFF state)). FIG. 1(b) illustrates a state in which a voltage (electric field) is applied between the comb-shaped electrodes 4 and 5 (voltage (electric field) application state (ON state)).

The substrates 1 and 2 are glass substrates. Materials of the substrates 1 and 2 are not limited to this as long as at least one of the substrates 1 and 2 is transparent. An interval between the substrates in the present display element, that is, a thickness of the dielectric material layer 3 is 10 μm. However, the interval between the substrates is not limited to this, but may be determined arbitrarily.

Figure 2:
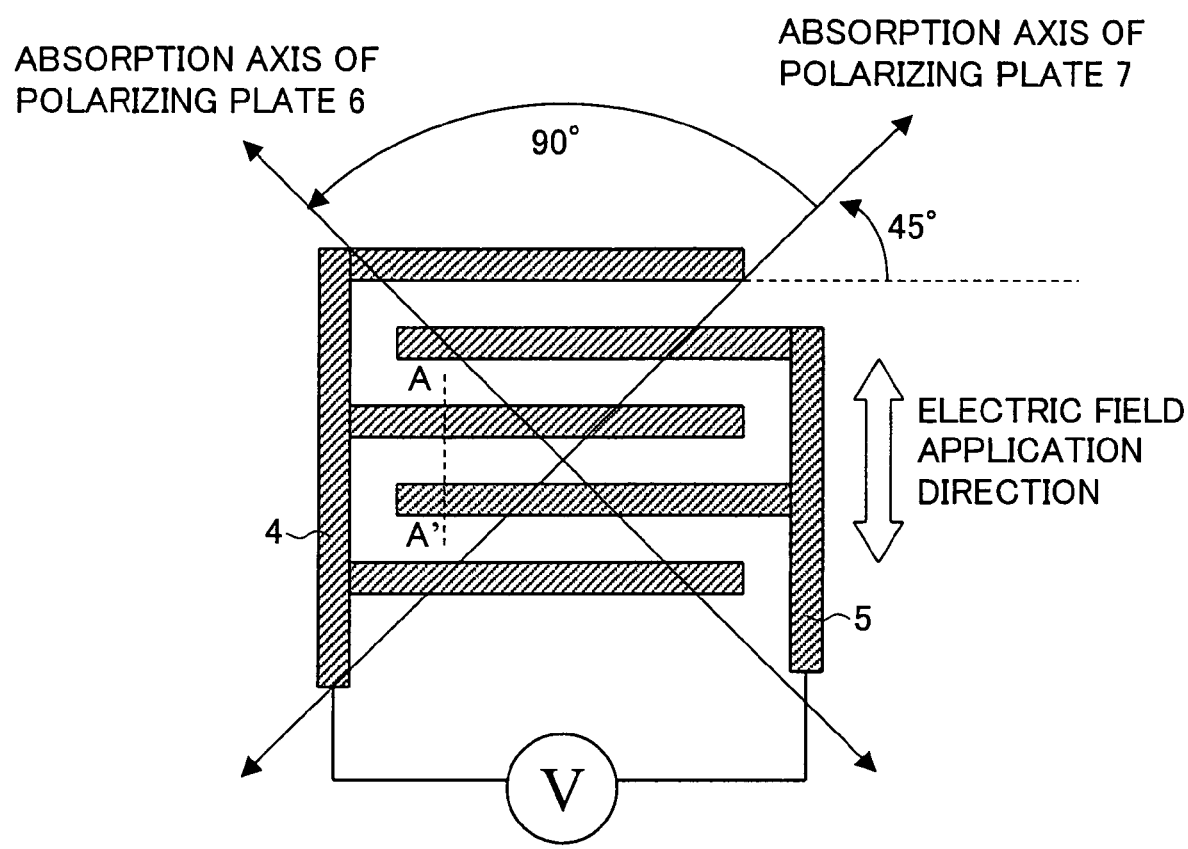
FIG. 2 is an explanatory diagram illustrating respective arrangements of comb-shaped electrodes and polarizing plates.

FIG. 2 is an explanatory view illustrating positions of the comb-shaped electrodes 4 and 5 and directions of absorption axes of the polarizing plates 6 and 7. As illustrated in FIG. 2, the comb-shaped electrodes, which are formed like comb-teeth, are provided face to face. Each of the comb-shaped electrodes 4 and 5 has a line width of 5 μm, and a distance between the electrodes (electrode interval) is 5 μm. However, the present invention is not limited to this. For example, it is possible to set these values arbitrarily according to a gap between the substrate 1 and the substrate 2. Moreover, as materials of the comb-shaped electrodes 4 and 5, it is possible to use various materials which are conventionally well-known, such as transparent electrode materials (ITO (indium tin oxide), etc), metal electrode materials (aluminum, etc), or the like.

Moreover, as illustrated in FIG. 2, the polarizing plates 6 and 7 respectively provided on the substrates 1 and 2 are arranged such that respective absorption axes are orthogonal with each other, and absorption axes of the polarizing plates are at an angle of about 45° with respect to directions to which comb-teeth portions of the comb-shaped electrodes 4 and 5 extend. On this account, the absorption axis of each of the polarizing plates is at an angle of about 45° with respect to an electric field application direction.

The dielectric material layer 3 is made of BABH8 described in Non-patent Documents 5 and 6. BABH8 is represented by the following structural formula (1).

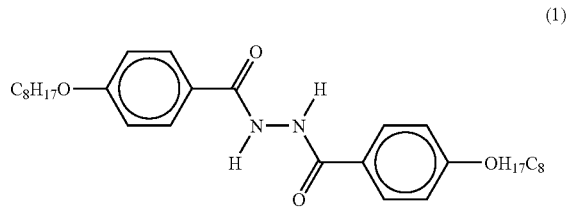

(1)

If necessary, alignment films subjected to a rubbing treatment may be respectively formed on the counter surfaces of the substrates 1 and 2. In this case, the alignment film formed on the substrate 1 may be formed so as to cover the comb-shaped electrodes 4 and 5.

The following description explains a display principle of the present device.

Figure 5:
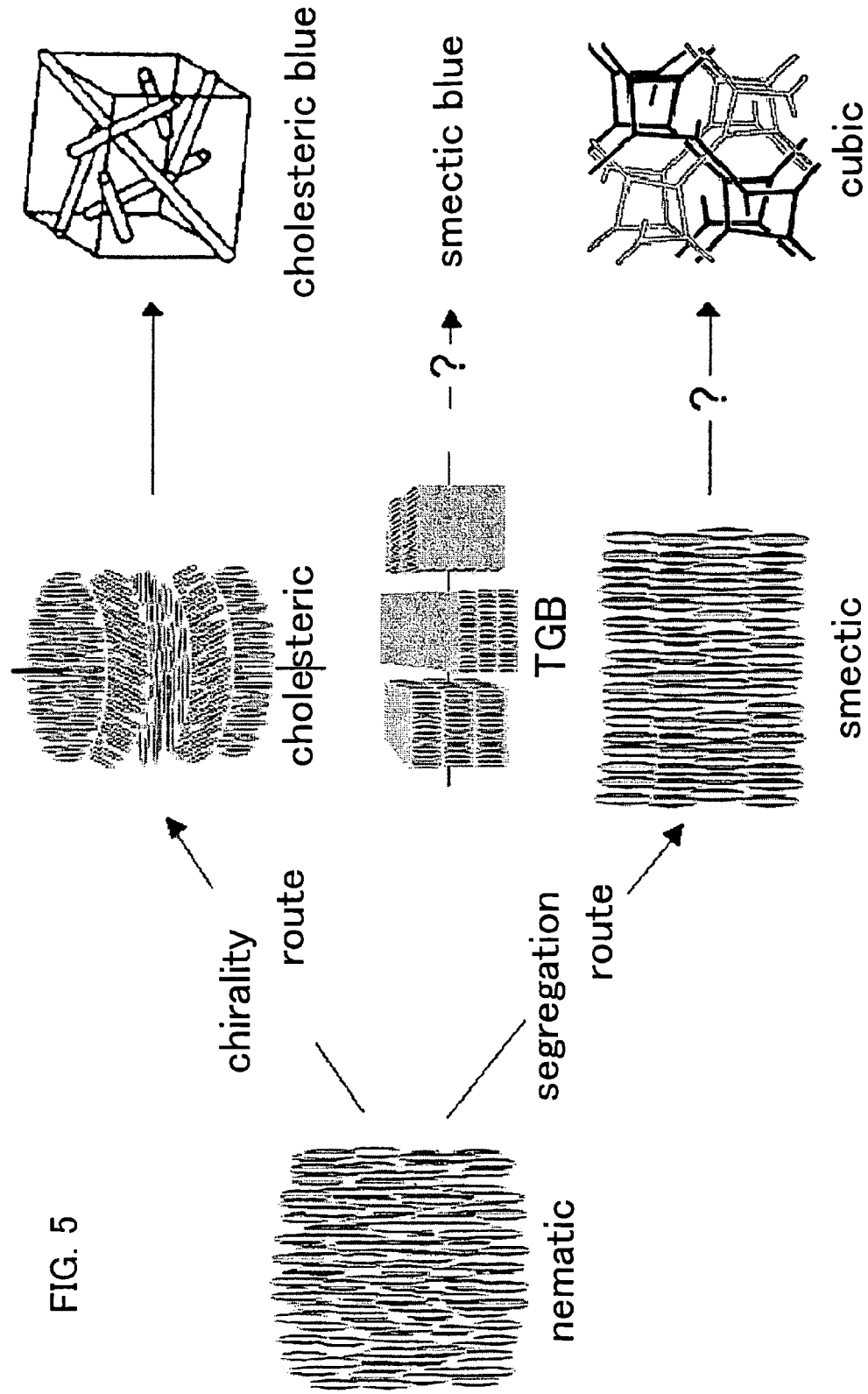
FIG. 5 illustrates structure models of various liquid crystal phases.
Figure 6:
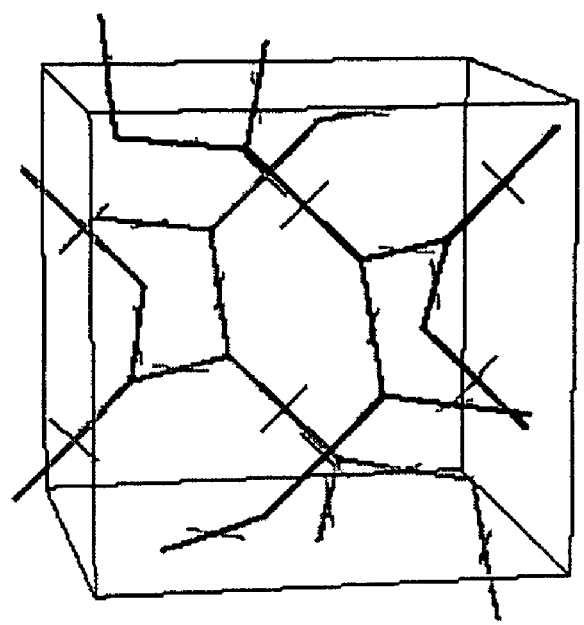
FIG. 6 illustrates a structure model (rod network model) of a cubic phase.
Figure 7:
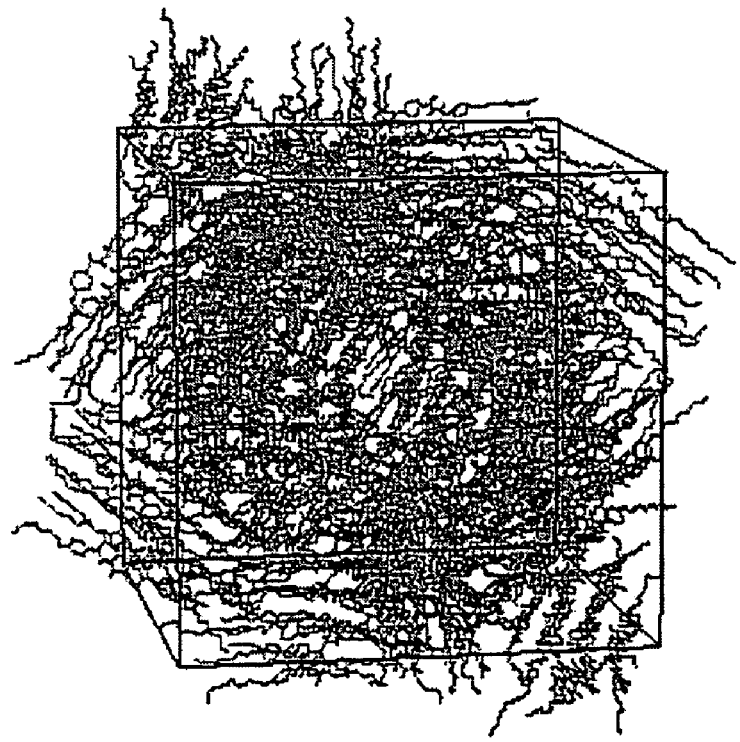
FIG. 7 illustrates a structure model (rod network model) of a cubic phase.

In the present display element arranged as above, a temperature of the dielectric material layer 3 is controlled by an outer heating device (not illustrated) to be in a temperature range from 136.7° C. to 161° C. In the above temperature range, a grating constant of BABH8 is about 6 nm, which is not more than one tenth of the optical wavelength. Moreover, BABH8 is in a cubic phase (cubic crystal phase), having an orderly structure having a cubic (cubic crystal) symmetric property (having an assembly of molecules orderly aligned in a cubic-symmetry (cubic-crystal-symmetry) manner), whose scale is smaller than the optical wavelength (smaller than a visible optical wavelength). Structural models of the cubic phase illustrated in FIGS. 5 to 7 are shown in Non-patent Document 5.

As described above, BABH8 has an orderly structure smaller than optical wavelength, so that BABH8 is transparent. That is, in the above temperature range, the dielectric material layer 3 is optically isotropic (isotropic in a broad view) when no electric field is applied. Therefore, the present display element can carry out a satisfactory black display under crossed nicols.

Meanwhile, an electric field is applied between the comb-shaped electrodes 4 and 5 while controlling the temperature of the dielectric material layer 3 to be in a temperature range from 136.7° C. to 161° C. Then, the structure (assembly) having the cubic symmetry is distorted, and the optical anisotropy is expressed. That is, in the above temperature range, BABH8 is optically isotropic when no electric field is applied, and is optically anisotropic when an electric field is applied.

Thus, in the present display element, the structure (assembly) having the cubic symmetry is distorted by applying an electric field, and a double refraction is generated. Therefore, it is possible to carry out a satisfactory white display. The double refraction is generated in a fixed direction, and its size changes according to electric field application. A voltage transmissivity curve shows a relationship between (i) the voltage applied between the comb-shaped electrodes 4 and 5 and (ii) transmissivity. The voltage transmissivity curve draws a stable curve in such a wide temperature range as described above.

As described above, in the present display element, it is possible to obtain a stable voltage transmissivity curve in a temperature range from 136.7° C. to 161° C. (about 20K). Therefore, it is extremely easy to control the temperature of the present display element.

Because the present display element does not use the isotropic phase (so-called liquid phase), the present technology is different from the conventional liquid crystal display elements which use the electro-optic effect. Here, the isotropic phase is a phase in which alignment directions of molecules are isotropic. That is, the dielectric material layer 3 of the present display element is a thermally stable phase. Moreover, the dielectric material layer 3 does not drastically express temperature dependency unlike the conventional liquid crystal display elements using the isotropic phase (so-called liquid phase). Therefore, it is extremely easy to control the temperature. Differences between the present display element and the conventional liquid crystal display elements will be explained in more detail later.

Moreover, the present display element carries out the display by using distortion of the structure having a cubic symmetric property, that is, by using change in the magnitude of the optical anisotropy in the medium. Therefore, it is possible to realize a wider viewing-angle property than that of the conventional liquid crystal display elements which carry out the display by changing the alignment directions of the liquid crystal molecules. Furthermore, in the present display element, the double refraction is generated in a fixed direction, and an optical axis direction does not change. Therefore, it is possible to realize the wider viewing-angle property.

Moreover, the present display element carries out the display by using the anisotropy expressed by distortion of a structure of minute regions (crystal-like grating). According to the display principle of the conventional liquid crystal display elements, a liquid-crystal-specific viscosity greatly affects a responsive speed. However, this does not occur in the present display element. Therefore, it is possible to realize high-speed response of about 1 ms. That is, because the change of the alignment direction of the liquid crystal molecules is used according to the display principle of the conventional liquid crystal display elements, the liquid-crystal-specific viscosity greatly affects the responsive speed. However, the distortion of the structure of the minute regions is used according to the present display element, so that the liquid-crystal-specific viscosity does not affect so much. Therefore, it is possible to realize the high-speed response. As a result, it is possible to apply the present display element to, for example, a field sequential color mode display device by utilizing its high-speed response.

The following description explains the differences between the present display element and the conventional display elements in detail. FIGS. 3(a) and 3(b) are explanatory views each of which schematically illustrates a liquid crystal display element 20 as one example of the conventional liquid crystal devices using the electro-optic effect.

As illustrated in FIGS. 3(a) and 3(b), the liquid crystal display element 20 is arranged in the same way as the present display element except that a material of the dielectric material layer 3a is different from that of the dielectric material layer 3 of the present display element. That is, in the dielectric material layer 3a of the liquid crystal display element 20, a compound shown by the following structural formula (2) is injected and sealed. Note that, the compound is in a nematic phase at a temperature below 33.3° C., and in the isotropic phase at a temperature of 33.3° C. or higher.

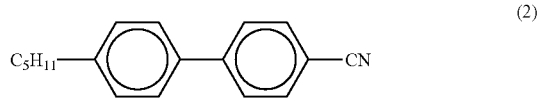

(2)

The liquid crystal display element 20 is kept at a temperature which is just above the nematic phase/isotropic phase transition temperature (a little higher than the phase transition temperature) by an outer heating device. When an electric field is applied to the liquid crystal display element 20, the transmissivity can be changed.

Note that, FIG. 3(a) is an explanatory view illustrating an alignment state of the liquid crystal molecules in the liquid crystal display element 20 at a temperature which is just above the nematic phase/isotropic phase transition temperature under such condition that no electric field is applied to the liquid crystal display element 20. FIG. 3(b) is an explanatory view illustrating an alignment state of the liquid crystal molecules in the liquid crystal display element 20 at a temperature which is just above the nematic phase/isotropic phase transition temperature under such condition that an electric field is applied to the liquid crystal display element 20.

As illustrated in FIG. 3(a), when no electric field is applied, the dielectric material layer 3a made of the aforementioned compound is in the isotropic phase, and is optically isotropic. Therefore, a display state of the liquid crystal display element 20 is a black display. Meanwhile, as illustrated in FIG. 3(b), when an electric field is applied, in a region where an electric field is applied, long-axis directions of the aforementioned compound molecules are aligned in an electric field direction, and the double refraction is expressed. Therefore, it is possible to modulate the transmissivity.

FIG. 3(c) illustrates a voltage transmissivity curve obtained in case where: the liquid crystal display element 20 is kept at a temperature which is just above the nematic phase/isotropic phase transition temperature, and an applied voltage is varied. As illustrated in FIG. 3(c), the transmissivity of the liquid crystal display element 20 changes according to the applied voltage.

According to "Handbook of Liquid Crystal", Vol. 1 p.484-485, Wiley-VCH, 1998, the double refraction generated by an electric field application can be represented as follows.

$$\Delta n = \lambda B E^2$$

Note that, $\lambda$ is a optical wavelength, and B is Kerr constant, and E is an applied electric field intensity.

Kerr constant B is proportional to $$B \propto (T - T_{ni})^{-1}$$

Therefore, even though it is possible to drive the liquid crystal display element 20 with a low electric field intensity when the temperature is around the transition point (Tni), high electric intensity drastically increases with a rise in temperature (T). On this account, at a temperature which is just above the phase transition temperature, it is possible to adequately modulate the transmissivity with a voltage of about 100V or lower. However, at a temperature which is very far from the phase transition temperature (a temperature which is enough higher than the transition temperature), a high voltage is necessary in order to modulate the transmissivity. Therefore, an operating temperature range of the liquid crystal display element 20 is limited to a vicinity of the nematic phase/isotropic phase transition temperature, and it is necessary to carry out an extremely high-precision temperature control (typically in a range of about 0.1K).

The above description explained the liquid crystal display element 20 in which an electric field is applied to a direction parallel to a substrate surface. However, it is necessary to carry out the extremely high-precision temperature control in the other liquid crystal display elements. For example, although an electric field is applied to a normal direction of the substrate surface in the liquid crystal display element 30 illustrated in FIGS. 8(a) and 8(b), the high-precision temperature control is necessary.

In the liquid crystal display element 30, instead of the comb-shaped electrodes 4 and 5 of the liquid crystal display element 20, transparent electrodes 4a and 5a are respectively provided on counter surfaces of the substrates 1 and 2. That is, like the liquid crystal display element 20, the liquid crystal display element 30 is one example of the liquid crystal display elements using the electro-optic effect.

The liquid crystal display element 30 is kept at a temperature which is just above the phase transition temperature of the medium injected and sealed in the dielectric material layer 3a. When no electric field is applied, the dielectric material layer 3a is in the isotropic phase as illustrated in FIG. 8(a). When an electric field is applied, the long-axis directions of the liquid crystal molecules are aligned in a direction perpendicular to an electric field as illustrated in FIG. 8(b).

At a temperature which is enough higher than the phase transition temperature, the liquid crystal display element 30 arranged as above requires a high voltage in order to modulate the transmissivity, like the liquid crystal display element 20 does. Therefore, it is necessary to carry out the extremely high-precision temperature control for the liquid crystal display element 30.

In contrast, as mentioned earlier, the present display element carries out the display by using the anisotropy expressed by the distortion of the structure of the minute regions (crystal-like grating). Moreover, BABH8 is in the cubic phase in a wide temperature range from 136.7° C. to 1610° C., and the stable voltage transmissivity curve can be obtained in the wide temperature range (about 24K). Therefore, it is extremely easy to carry out the temperature control. That is, the present display element just to keep BABH8 at such a temperature that BABH8 is in the cubic phase, which is a state where a magnitude of the optical anisotropy is changed by applying an electric field. Therefore, it is easy to carry out the temperature control.

Next, differences of the display principle between the present display element and the conventional display elements are explained in more detail.

FIG. 4 is a chart for explaining the differences of the display principle between the present display element and the conventional display elements, and FIG. 4 schematically illustrates the shape of the refractive index ellipsoid and the direction of the refractive index ellipsoid in case where an electric field is applied and in case where no electric field is applied. FIG. 4 shows the display principles of the conventional liquid crystal display elements such as a TN mode liquid crystal display element, a VA (Vertical Alignment) mode liquid crystal display element, and an IPS (In Plane Switching) mode liquid crystal display element.

As illustrated in FIG. 4, the TN mode liquid crystal display element is structured such that a liquid crystal layer is sandwiched between two substrates which are provided face to face, and transparent electrodes (electrodes) are respectively provided on the substrates. When no electric field is applied, liquid crystal molecules of the liquid crystal layer are aligned such that the liquid crystal molecules are helically twisted in a long-axis direction. When an electric field is applied, the liquid crystal molecules are aligned such that the long-axis direction of each of the liquid crystal molecules is along an electric field direction. As illustrated in FIG. 4, an average refractive index ellipsoid in this case is such that its long-axis direction is parallel to the substrate surface when no electric field is applied, and its long-axis direction turns to the normal direction of the substrate surface when an electric field is applied. That is, the shape of the refractive index ellipsoid is ellipse when no electric field is applied and when an electric field is applied. However, when an electric field is applied, the long-axis direction of the refractive index ellipsoid changes (a direction of the refractive index ellipsoid). That is, the refractive index ellipsoid rotates. The shape of the refractive index ellipsoid when no electric field is applied is substantially the same as the shape of the refractive index ellipsoid when an electric field is applied.

Like the TN mode liquid crystal display element, the VA mode liquid crystal display element is structured such that a liquid crystal layer is sandwiched between two substrates which are provided face to face, and transparent electrodes (electrodes) are respectively provided on the substrates. However, in the VA mode liquid crystal display element, when no electric field is applied, liquid crystal molecules of the liquid crystal layer are aligned such that the long-axis direction of each of the liquid crystal molecules turns substantially perpendicular to the substrate surface. When an electric field is applied, the liquid crystal molecules are aligned such that the long-axis direction of each of the liquid crystal molecules turns perpendicular to an electric field. As illustrated in FIG. 4, an average refractive index ellipsoid in this case is aligned such that the long-axis direction turns to the normal direction of the substrate surface when no electric field is applied, and the long-axis direction is parallel to the substrate surface when an electric field is applied. That is, the shape of the refractive index ellipsoid is ellipse when no electric field is applied and when an electric field is applied. However, the long-axis direction of the refractive index ellipsoid changes (the refractive index ellipsoid rotates). Note that, the shape of the refractive index ellipsoid when no electric field is applied is substantially the same as the shape of the refractive index ellipsoid when an electric field is applied.

Next, the IPS mode liquid crystal display element is structured such that a pair of electrodes are provided face to face on a substrate, and a liquid crystal layer is formed in a region between the electrodes. When an electric field is applied, alignment directions of liquid crystal molecules of the liquid crystal layer are changed, so that it is possible to realize different display states depending on whether or not an electric field is applied. Thus, also in the IPS mode liquid crystal display element, as illustrated in FIG. 4, the shape of the refractive index ellipsoid is ellipse when no electric field is applied and when an electric field is applied. However, the long-axis direction of the refractive index ellipsoid changes (the refractive index ellipsoid rotates). The shape of the refractive index ellipsoid when no electric field is applied is substantially the same as the shape of the refractive index ellipsoid when an electric field is applied.

Thus, according to the conventional liquid crystal display elements, the liquid crystal molecules are aligned in a certain direction when no electric field is applied. When an electric field is applied, alignment directions of the liquid crystal display molecules are changed so as to carry out the display (modulation of transmissivity). That is, the long-axis direction of the refractive index ellipsoid is rotated (changed) by applying an electric field, so that the display is carried out. The shape of the refractive index ellipsoid when no electric field is applied is substantially the same as the shape of the refractive index ellipsoid when an electric field is applied. That is, according to the conventional liquid crystal display elements, an orientational order parameter which influences visible light is substantially constant, and the display is carried out by changing the alignment directions.

Meanwhile, as illustrated in FIG. 4, according to the present display element, in case where BABH8 is used as a medium injected and sealed in the dielectric material layer 3 (in case where a medium, which is optically isotropic when no electric field is applied and is optically anisotropic when an electric field is applied, is used), the refractive index ellipsoid when no electric field is applied is globular unlike a case of the conventional liquid crystal display element. That is, the refractive index ellipsoid is optically isotropic (an orientational order parameter is nearly equal to 0 at a scale not less than visible light) when no electric field is applied (the refractive index ellipsoid shows the optical isotropy).

Moreover, the refractive index ellipsoid is optically anisotropic (an orientational order parameter >0 at a scale not less than visible light) when an electric field is applied, and the refractive index ellipsoid becomes ellipse (the refractive index ellipsoid shows the optical anisotropy). That is, according to the present display element, the shape of the refractive index ellipsoid is isotropic ($nx=ny=nz$) when no electric field is applied, and the shape of the refractive index ellipsoid is anisotropic ($nx>ny$) when an electric field is applied. Thus, nx is a refractive index with respect to a direction parallel to the substrate surface and parallel to a counter direction of the electrodes, and ny is a refractive index with respect to a direction parallel to the substrate surface and perpendicular to a counter direction of the electrodes, and nz is a refractive index with respect to a direction perpendicular to the substrate surface.

"The orientational order parameter is nearly equal to 0 at a scale not less than visible light (there is little orientational order parameter)" means that: in view of a scale smaller than visible light, a ratio at which liquid crystal molecules and the like are aligned in a certain direction is high (in an orientational order), but in view of a scale larger than visible light, the alignment directions are averaged and there is no orientational order. For example, in the cubic phase illustrated in FIG. 7, liquid crystal molecules are aligned in each position in view of a scale smaller than visible light, but the alignment directions are averaged in view of a scale larger than the whole cubic illustrated in FIG. 7. Thus, the cubic phase illustrated in FIG. 7 substantially does not have any orientational order in view of a scale not less than visible light.

That is, in the example embodiment, "the orientational order parameter is nearly equal to 0 at a scale not less than visible light wavelength" means that: the orientational order parameter is so small that neither a visible light wavelength range nor a light whose wavelength is larger than the visible light wavelength are influenced. For example, this means a state in which black display is realized under cross nicol polarizers. Meanwhile, in the example embodiment, "the orientational order parameter >0 at a scale not less than the visible light wavelength" means that: the orientational order parameter at a scale not less than the visible light wavelength is higher than a value near zero. For example, this means a state in which white display is realized under crossed nicols. (In this case, also gray which is gradation display is included).

Moreover, the long-axis direction of the refractive index ellipsoid when an electric field is applied is parallel (when using a medium having a positive dielectric anisotropy) or perpendicular (when using a medium having a negative dielectric anisotropy) to an electric field direction.

Meanwhile, in the conventional liquid crystal display element, the long-axis direction of the refractive index ellipsoid is rotated by an electric field application, so that the display is carried out. Therefore, the long-axis direction of the refractive index ellipsoid is not necessarily parallel or perpendicular to the electric field direction.

Thus, according to the present display element, the alignment directions of the molecules are fixed (electric field application direction do not vary), and the display is carried out by modulating the orientational order parameter which influences visible light. That is, in the present display element, the magnitude of the optical anisotropy (or, the orientational order which influences visible light) of the medium itself changes. Therefore, the present display element is totally different from the conventional display elements in terms of the display principle.

In the present display element, BABH8 is used as the medium injected and sealed in the dielectric material layer 3. However, the present invention is not limited to this. Any medium may be used as the medium injected and sealed in the dielectric material layer 3 as long as the medium is not liquid in view of a physical property and the alignment order magnitude changes when an electric field is applied to the medium, that is, the magnitude of the optical anisotropy changes by applying an electric field.

For example, it is possible to use a medium which is optically isotropic when no voltage is applied and is optically anisotropic when a voltage is applied. That is, it is possible to use a medium which (i) has an orientational order (orderly structure) smaller than the optical wavelength when no electric field is applied, (ii) is transparent in a optical wavelength region, and (iii) changes its orientational order and becomes optically anisotropic when an electric field is applied.

Alternatively, it is possible to use the medium which (i) is optically anisotropic when no electric field is applied, and (ii) loses the optical anisotropy by the electric field application, so that the orientational order (orderly structure) becomes smaller than the optical wavelength, thereby expressing the optical anisotropy.

Therefore, for example, it is possible to use the medium which is made of molecules in the cubic phase other than BABH8, or the medium having an orientational order (orderly structure) unlike the cubic phase. Moreover, for example, it is possible to use the medium which is made of copolymer, amphiphilic molecule, dendrimer molecule, liquid crystal, etc. The following description explains some examples of the mediums which can be used for the dielectric material layer 3 of the present display element.

EXAMPLE 1

Smectic D Phase (SmD)

As the medium injected and sealed in the dielectric material layer 3 of the present display element (for example, display element illustrated in FIGS. 1(a), 1(b), and 2), it is possible to apply a medium which is made of molecules in the smectic D phase which is one of the liquid crystal phases.

One example of liquid crystal materials in the smectic D phase is ANBC16. Note that, ANBC16 is mentioned in Kazuya Saito, and Michio Sorai, "Thermodynamics of a unique thermo-tropic liquid crystal having optical isotropy", Liquid Crystal, 2001, Vol. 5, No. 1 (p.21, FIG. 1, Structure 1 (n=16)) and "Handbook of Liquid Crystals", Wiley-VCH, 1998, vol. 2B (p.888, Table 1, Compound No. 1, Compound 1a, Compound 1a-1). The example includes ANBC etc. represented by the following structural formulas (3) and (4).

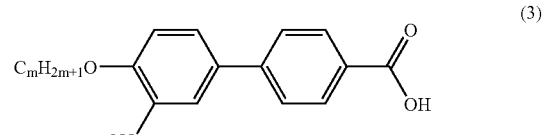

(3)

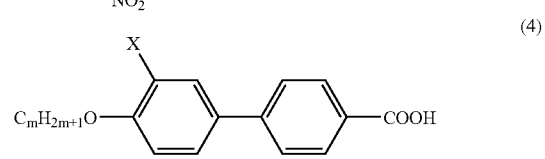

(4)

Note that, in the structural formulas (3) and (4), m is an arbitrary integer, specifically, m=16 in the formula (3) and m=15 and X represents —NO$_2$ group in the formula (4).

The liquid crystal material (ANBC16, n=16 in the structural formula (3)) is in the smectic D phase in a temperature range from 171.0° C. to 197.2° C. In the smectic D phase, a plurality of molecules form a three-dimensional grating like a jungle gym®, and its grating constant is several dozen nm or less, that is, smaller than the optical wavelength. That is, the smectic D phase has a cubic symmetry and has the orientational order (orderly structure) which smaller than the optical wavelength. Note that, ANBC16 of the present embodiment is about 6 nm.

Moreover, when an electric field is applied to the dielectric material layer 3 made of ANBC16 in the above temperature range in which ANBC16 shows the smectic D phase, molecules tend to change their directions to the direction of the electric field because the molecules have dielectric anisotropy. As a result, the grating structure is distorted. That is, the dielectric material layer 3 expresses the optical anisotropy.

Therefore, it is possible to apply ANBC16 as the medium injected and sealed in the dielectric material layer 3 of the present display element. Note that, not only ANBC16 but also materials showing the smectic D phase are applicable as the medium injected and sealed in the dielectric material layer 3 of the present display element, because the magnitude of the optical anisotropy is changed depending on whether or not an electric field is applied.

EXAMPLE 2

Liquid Crystal Microemulsion

It is possible to apply a liquid crystal microemulsion as the medium injected and sealed in the dielectric material layer 3 of the present display element (for example, display element illustrated in FIGS. 1(a), 1(b), and 2). The liquid crystal microemulsion is a generic term (named by Yamamoto, et al.) for a system (mixture system) in which oil molecules of O/W type microemulsion (a system in which droplet-shape water is dissolved in oil (continuous phase) by surfactant) are replaced with thermotropic liquid crystal molecules (see Jun Yamamoto, "Liquid crystal micro emulsion", Liquid crystal, 2000, Vol. 4, No. 3, pp.248-254).

Figure 9:
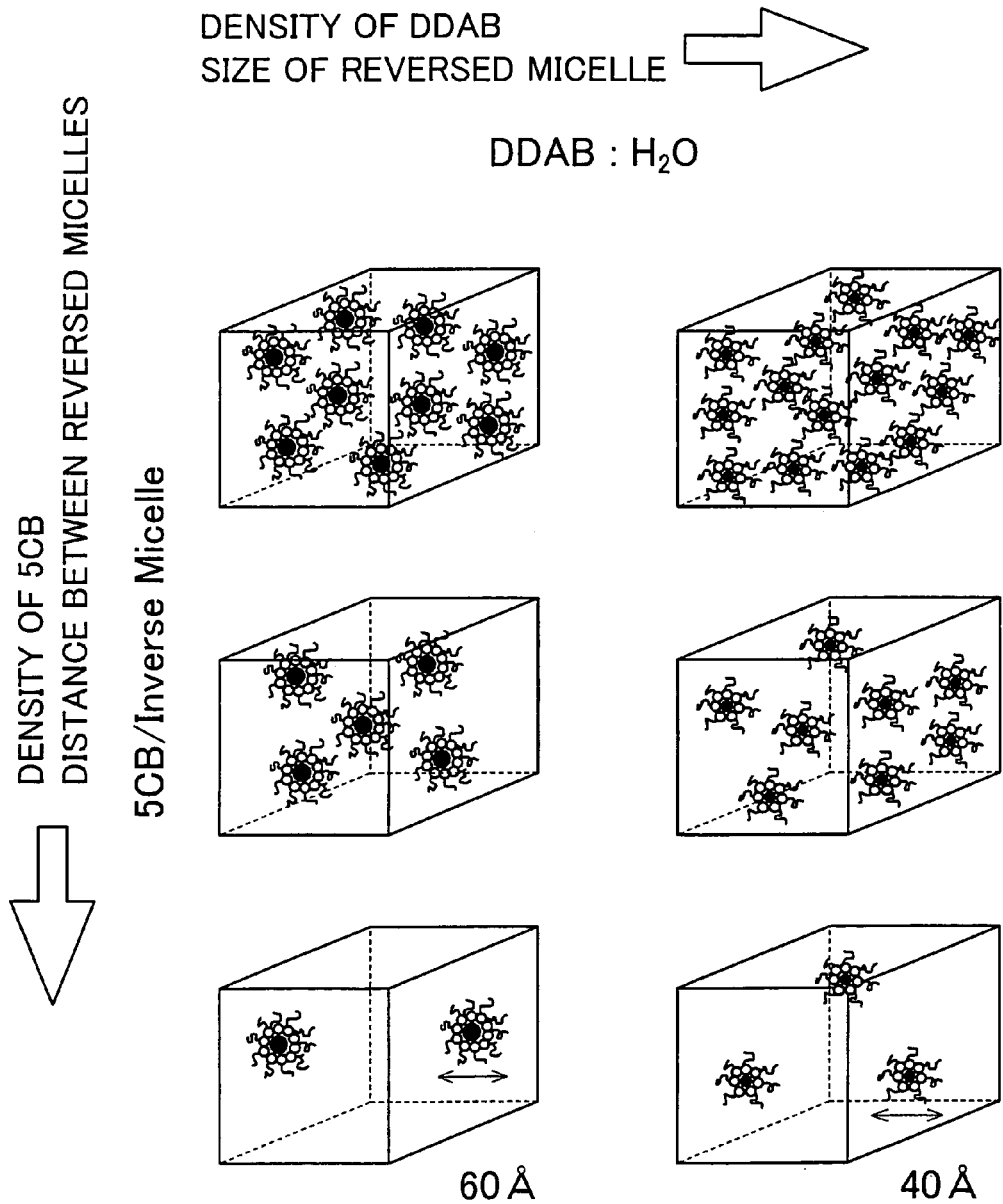
FIG. 9 is a schematic view illustrating a structure of a liquid crystal micro emulsion.
Figure 10:
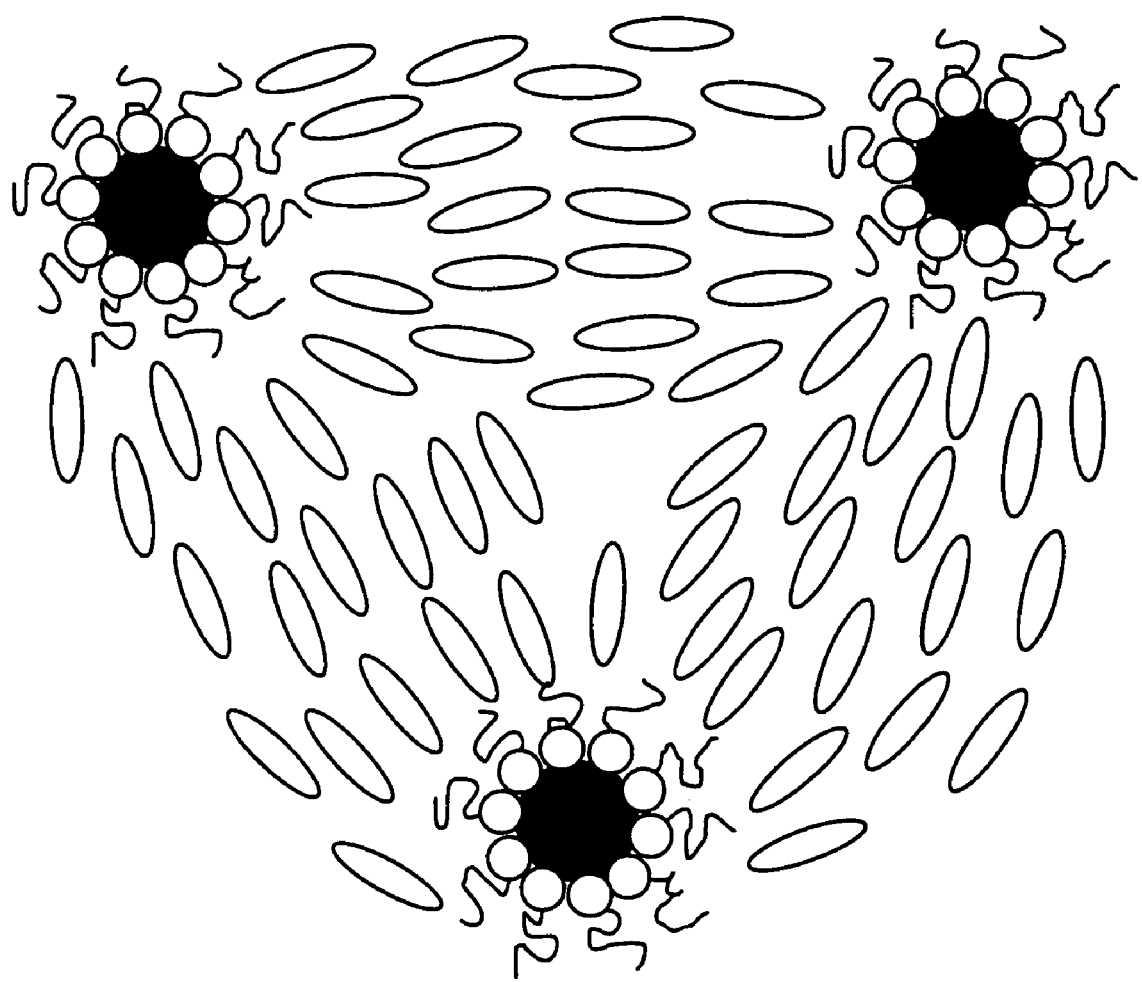
FIG. 10 is a schematic view illustrating a structure of a liquid crystal micro emulsion.

A concrete example of the liquid crystal microemulsion is a mixture system of pentylcyanobiphenyl (5CB) mentioned in Non-patent Document 2 and didodecyl ammonium bromide (DDAB) solution. Pentylcyanobiphenyl (5CB) is a thermotropic liquid crystal (temperature transition type liquid crystal) showing a nematic liquid crystal phase, and didodecyl ammonium bromide (DDAB) is a lyotropic liquid crystal (concentration transition type liquid crystal) showing a reversed micelle phase. This mixture system has a structure illustrated by schematic views of FIGS. 9 and 10.

According to the above mixture system, a diameter of a reversed micelle is about 50 Å, and a distance between reversed micelles is about 200 Å. Each of these scales is approximately one tenth of the optical wavelength. That is, the above mixture system (liquid microemulsion) has the orientational order (orderly structure) which is smaller than the optical wavelength. The reversed micelles randomly exist in a three-dimensional space, and 5CBs are aligned in a radial pattern centering on each reversed micelle. Therefore, the above mixture system is optically isotropic.

When an electric field is applied to a medium made of the above mixture system, its molecules tend to change their directions to the direction of the electric field because 5CB has dielectric anisotropy. That is, although a system is optically isotropic because 5CBs are aligned in a radial pattern centering on the reversed micelle, alignment anisotropy is expressed, so that the optical anisotropy is expressed. Therefore, it is possible to apply the above mixture system as the medium injected and sealed in the dielectric material layer 3 of the present display element. Note that, the medium is not limited to the above mixture system. As long as the magnitude of the optical anisotropy of the liquid crystal microemulsion is changed depending on whether or not an electric field is applied, it is possible to apply the liquid crystal microemulsion as the medium injected and sealed in the dielectric material layer 3 of the present display element.

EXAMPLE 3

Lyotropic Liquid Crystal Phase

Figure 11:
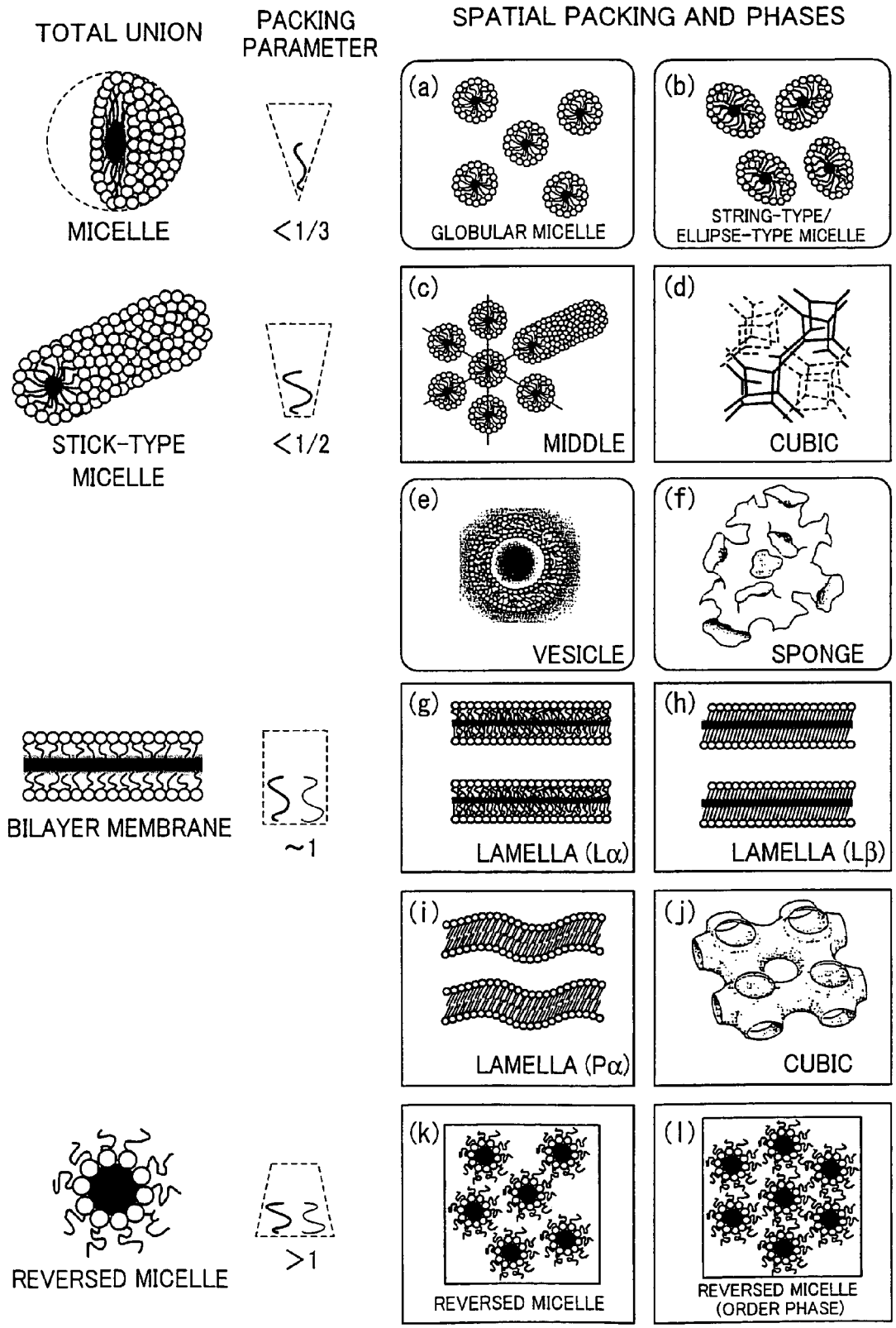
FIG. 11 is classification diagram of a lyotropic liquid crystal phase.

As the medium injected and sealed in the dielectric material layer 3 of the present display element (for example, display element illustrated in FIGS. 1(a), 1(b), and 2), it is possible to apply the lyotropic liquid crystal in a specific phase. The lyotropic liquid crystal is generally a multicomponent system liquid crystal in which main molecules constituting a liquid crystal are dissolved in a solvent (water, organic solvent, or the like) having different properties. Moreover, the above specific phase is a phase in which the magnitude of the optical anisotropy is changed depending on whether or not an electric field is applied. Examples of such specific phases are micelle phase, sponge phase, cubic phase, and reversed micelle phase, which are described in Jun Yamamoto "First lecture of liquid crystal science experiment: Identification of liquid crystal phase: (4) Lyotropic liquid crystal", Liquid crystal, 2002, Vol. 6, No. 1, pp.72-82. FIG. 11 illustrates classification of the lyotropic liquid crystal phases.

Some of surfactants, which are amphiphilic materials, express the micelle phase. For example, an aqueous solution of sodium dodecyl sulfate and an aqueous solution of potassium palmitin acid, which are ionic surfactants, constitute globular micelles. In mixture liquid obtained by mixing polyoxyethylene nonylphenyl ether, which is a non-ionic surfactant, with water, a nonylphenyl group functions as a hydrophobic group and oxyethylene chain functions as a hydrophilic group, so that micelles are formed. An aqueous solution of styrene-ethyleneoxideblock copolymer also constitutes micelles.

For example, the globular micelle becomes globular by packing molecules in all spatial directions (by forming a molecular assembly). The size of the globular micelle is smaller than the optical wavelength, so that the globular micelle seems not anisotropic but isotropic in the optical wavelength region. That is, the globular micelle has the orientational order (orderly structure) which is smaller than the optical wavelength. However, when an electric field is applied to such globular micelle, the globular micelle is distorted, so that anisotropy is expressed. Therefore, it is possible to apply the lyotropic liquid crystal in the globular micelle phase as the medium injected and sealed in the dielectric material layer 3 of the present display element. Note that, not only the lyotropic liquid crystal in the globular micelle phase but also the lyotropic liquid crystal in other types of micelle phases such as string-type micelle phase, ellipse-type micelle phase, stick-type micelle phase can be used as the medium injected and sealed in the dielectric material layer 3 in order to obtain substantially the same effects.

Moreover, it is well-known that the reversed micelle in which the hydrophilic group and the hydrophobic group are replaced with each other is formed depending on conditions of concentration, temperature, and surfactant. Such reversed micelle optically shows the same effects as the micelle. Therefore, when the lyotropic liquid crystal in the reversed micelle phase is applied as the medium injected and sealed in the dielectric material layer 3, it is possible to obtain effects equivalent to effects obtained in a case where the lyotropic liquid crystal in the micelle phase is used. Note that, the liquid crystal microemulsion explained in Example 2 is one example of the lyotropic liquic crystals having the reversed micelle phase (reversed micelle structure).

Moreover, in a certain concentration and a temperature range, an aqueous solution of pentaethyleneglycol-dodecylether (C12E5), which is a non-ionic surfactant, shows the sponge phase or the cubic phase illustrated in FIG. 11. Such sponge phase and cubic phase have an order (orientational order; order structure) which is smaller than the optical wavelength, so that the materials are transparent in the optical wavelength region. That is, the medium having these phases is optically isotropic. When an electric field is applied to the medium having these phases, the orientational order (order structure) is distorted and the optical anisotropy is expressed. Therefore, the lyotropic liquid crystal in the sponge phase or in the cubic phase can be applied as the medium injected and sealed in the dielectric material layer 3 of the present display element.

EXAMPLE 4

Liquid Crystal Fine Particle Dispersal System

Figure 1:
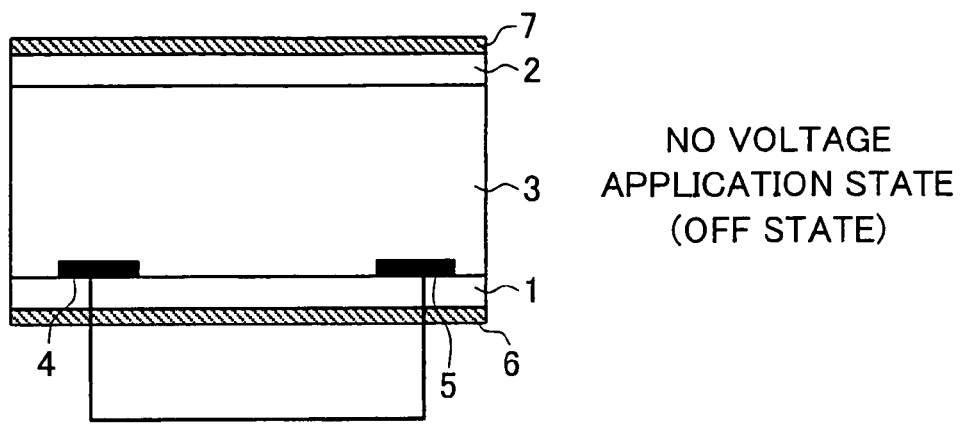
FIG. 1(a) is a cross sectional view of a display element of an example embodiment when no electric field is applied.
FIG. 1(b) is a cross sectional view of the display element of the example embodiment when an electric field is applied.
Figure 1:
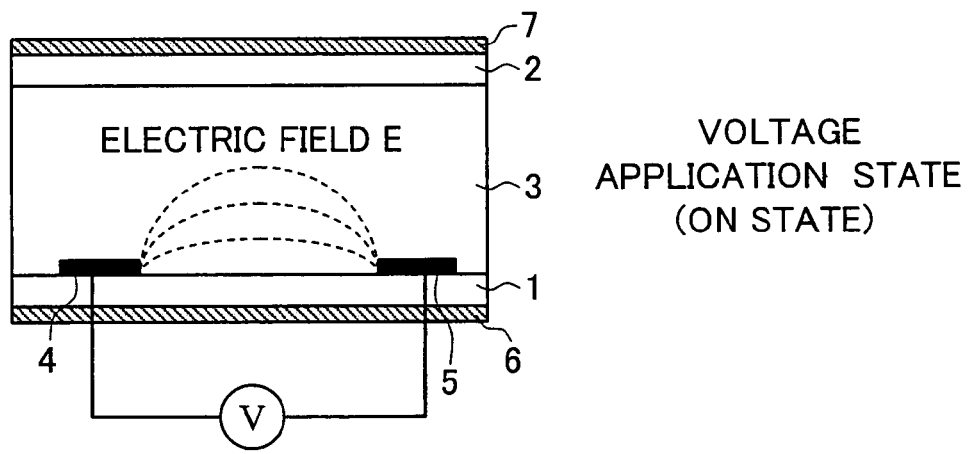

For example, as the medium injected and sealed in the dielectric material layer 3 of the present display element (for example, display element illustrated in FIGS. 1(*a*), 1(*b*), and 2), it is possible to apply a liquid crystal fine particle dispersal system showing a phase (such as the micelle phase, the sponge phase, the cubic phase, and the reversed micelle phase) in which the magnitude of the optical anisotropy is changed depending on whether or not an electric field is applied. Here, the liquid crystal fine particle dispersal system is a mixture system in which fine particles are mixed in a solvent (liquid crystal).

An example of the liquid crystal fine particle dispersal system is a liquid crystal fine particle dispersal system in which an aqueous solution of pentaethyleneglycol-dodecylether (C12E5), which is a non-ionic surfactant, is mixed with latex particles, having surfaces modified by a sulfuric acid group, each of which has a diameter of about 100 Å. The liquid crystal fine particle dispersal system expresses the sponge phase. Moreover, the orientational order (order structure) of the sponge phase is smaller than the optical wavelength. Therefore, as in Example 3, it is possible to apply the liquid crystal fine particle dispersal system as the medium injected and sealed in the dielectric material layer 3 of the present display element.

Note that, instead of using the latex particles, DDAB can be used to obtain the same alignment structure as the structure of the liquid crystal microemulsion described in Example 2.

It is preferable that one kind of the fine particles or two or more kinds of the fine particles be dispersed in a solvent.

It is preferable that the fine particles have an average particle diameter of 0.2 μm or less. When the fine particles having an average particle diameter of 0.2 μm or less are used, dispersibility in the dielectric material layer 3 is stable. Therefore, even after a long time, the fine particles do not aggregate, and the phase does not split. Thus, it is possible to sufficiently suppress such condition that: the fine particles are precipitated and become locally uneven, so that the display element becomes uneven.

It is preferable that a distance between the particles be 200 nm or less. It is more preferable that the distance between the particles be 190 nm or less.

When a beam of light is incident on particles dispersed three-dimensionally, a diffraction ray is generated in a certain wavelength. When the diffraction ray is suppressed, the optical isotropy is improved and the contrast of the display element is also improved.

The wavelength λ of light to be diffracted can be obtained by a formula "$\lambda=2d$", although the wavelength A may change according to an incident angle of the beam of light. Here, d is the distance between the particles.

When the wavelength of the diffraction ray is 400 nm or less, it is almost impossible to recognize the diffraction ray with human eyes. Therefore, it is preferable that $\lambda \leq 40$ nm. In this case, the distance d between the particles may be 200 nm or less.

According to CIE (Commission Internationale de l'Eclairage), the wavelength of 380 nm or less can not be recognized by human eyes. Therefore, it is more preferable that $\lambda \leq 380$ nm. In this case, the distance d between the particles may be 190 nm or less.

In addition, when the distance between the particles is wide, the particles do not sufficiently interact with each other, so that it is difficult to express the phase such as the micelle phase, the sponge phase, the cubic phase, the reversed micelle phase, or the like. Therefore, it is preferable that the distance between the particles be 200 nm or less. It is more preferable that the distance between the particles be 190 nm.

Moreover, it is preferable that the concentration (content) of the fine particles in the dielectric material layer 3 be from 0.05 wt % to 20 wt % with respect to the total weight of the medium injected and sealed in the dielectric material layer 3 and the fine particles. The concentration of the fine particle in the dielectric material layer 3 is adjusted to be from 0.05 wt % to 20 wt %, so that it is possible to suppress the aggregation of the fine particles.

The fine particles injected and sealed in the dielectric material layer 3 are not especially limited, and may be transparent or opaque. Moreover, the fine particle may be an organic fine particle such as polymer, or may be an inorganic fine particle or a metal fine particle.

When using the organic fine particle, it is preferable to use the fine particle in the form of polymer beads such as polystyrene beads, polymethylmethacrylate beads, polyhydroxy acrylate beads, and divinylbenzene beads. In this case, the beads may be cross-linked, or may not be cross-linked. When using the inorganic fine particle, it is preferable to use the fine particle such as glass beads and silica beads.

When using the metal fine particle, it is preferable to use alkali metal, alkali earth metal, transition metal, and rare earth metal. For example, titania, alumina, palladium, silver, gold, and copper are preferable. That is, it is preferable to use fine particles of titania, alumina, palladium, silver, gold, or copper, or it is preferable to use fine particles of oxides of titania, alumina, palladium, silver, gold, or copper. The above metal fine particle may be formed by using only one kind of the metal, or may be formed by using two or more kinds of the metals by alloying or mixing them with each other. For example, it is possible to cover a silver particle with titania or palladium. When the metal fine particle is made of only the silver particle, the property of the display element may change due to oxidization of the silver. However, by covering the surface of the silver with palladium or the like, it is possible to prevent the silver from oxidizing. Moreover, beads-shaped metal fine particle can be used without any modification. In addition, it is possible to use the beads-shaped fine particles which are thermally treated, or which are formed by applying an organic matter to the surfaces of the beads. As the organic matter to be applied, it is preferable to use a matter showing liquid crystallinity. For example, it is preferable to use a compound shown by the following structural formula (5).

(5)

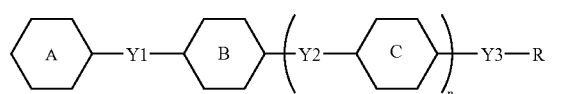

where n is an integer from 0 to 2.

Moreover, it is preferable that 6 membered ring A be any one of the following functional groups.

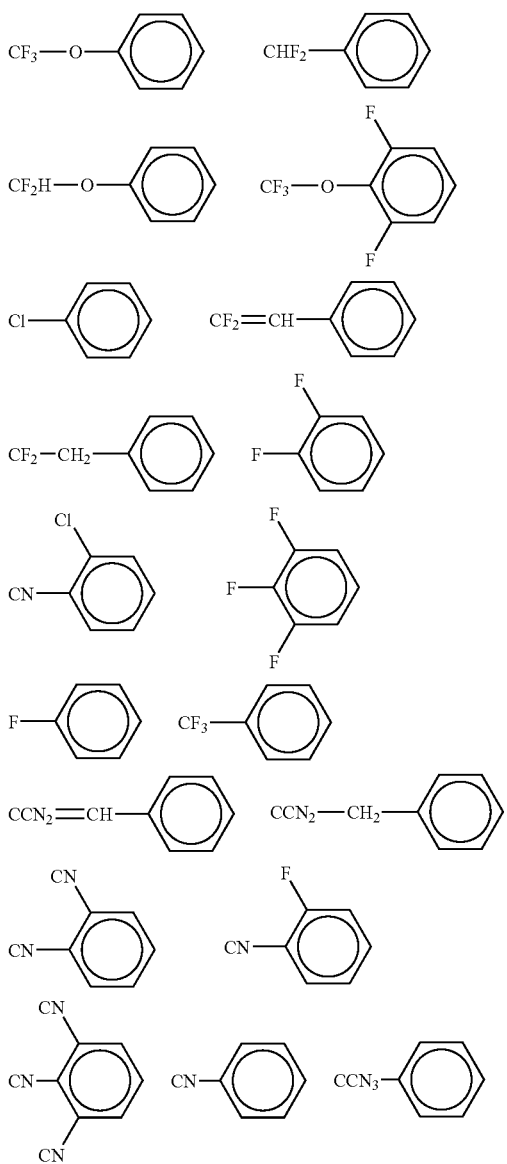

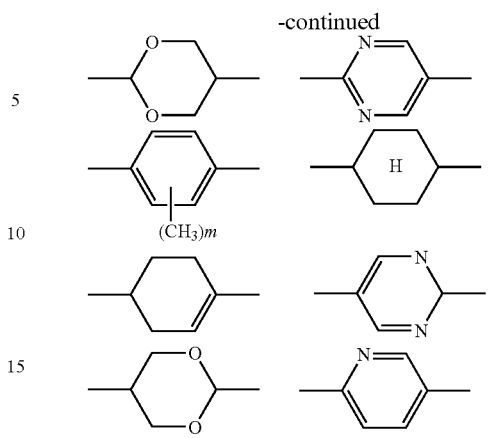

In addition, 6 membered rings B and C show substituents each having 6 membered ring structure, such as 1,4-phenylene group or 1,4-transcyclohexyl group. Note that, 6 membered rings B and C are not limited to the above substituents, but may have any one of the substituent having the following structures. Moreover, 6 membered rings B and C my be the same, or may not be the same. Note that, m is an integer from 1 to 4.

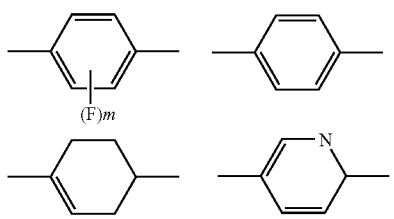

Moreover, Y1, Y2, and Y3 in the structural formula (5) are an alkyl group or an alkenyl group which may be in the form of a straight chain or in the form of a branched chain, and have 10 or less carbon atoms. One CH2 group in the group or two CH2 groups which are not adjacent to each other in the group may be replaced with —O—, —S—, —CO—O—, and/or —O—CO—, and may contain a single bond, —CH2CH2—, —CH2O—, —OCH2—, —OCO—, —COO—, —CH=CH—, —C≡C—, —CF=CF—, —(CH2)4—, —CH2CH2CH2O—, —OCH2CH2CH2—, —CH=CHCH2CH2O—, —CH2CH2CH=CH—. Chiral carbon may be contained, or may not be contained. Moreover, as long as Y1, Y2, and Y3 have any one of the above structures, Y1, Y2, and Y3 may be the same, or may not be the same.

Moreover, R in the structural formula (5) shows a hydrogen atom, a halogen atom, a cyano group, an alkyl group having 1 to 20 carbon atoms, an alkenyl group, and an alkoxyl group.

It is preferable that the organic matters applied to the surfaces of the metal fine particles are from 1 mol to 50 mol with respect to the metal of 1 mol.

The metal fine particle to which the above organic matter is applied is obtained, for example, by (i) dissolving or dispersing metal ions in a solvent, (ii) mixing the solvent with the above organic matter, and (iii) reducing the mixture. As the solvent, it is possible to use water, alcohol, or ether.

Moreover, fine particles to be dispersed may be made of fullerene and/or carbon nanotube. As the fullerene, it is preferable to use such fullerene that carbon atoms are provided in the form of a spherical shell. For example, it is preferable to use such a stable fullerene that the number n of carbon atoms are from 24 to 96. An example of fullerene is C60 globular closed-shell carbon molecule group which is made of 60 carbon atoms. Moreover, as carbon nanotube, cylinder-shaped nanotube is preferable. Cylinder-shaped nanotube is made by rolling up a graphitoid carbon atom plane which has a thickness of several atomic layers.

Moreover, the form of the fine particle is not especially limited, but may be a globe, ellipsoid, block, column, or cone. In addition, the form of the fine particle may be a globe, ellipsoid, block, column, or cone, each of which has a projection. Furthermore, the form of the fine particle may be a globe, ellipsoid, block, column, or cone, each of which has an aperture. Moreover, the surface of the fine particle is not especially limited, but may be flat and smooth, or may have a concavity and a convexity, an aperture, or a groove.

EXAMPLE 5

Dendrimer

As the medium injected and sealed in the dielectric material layer 3 of the present display element (for example, display element illustrated in FIGS. 1(*a*), 1(*b*), and 2), it is possible to apply a dendrimer (a dendrimer molecule). Here, the dendrimer is a three-dimensional highly-branched polymer which has a branch per monomer unit.

The dendrimer has a lot of branches. Therefore, when the molecular weight exceeds a certain level, the dendrimer becomes a globular structure. The globular structure has an order (orientational order, order structure) which is smaller than the optical wavelength, so that the material is transparent in the optical wavelength region. When an electric field is applied, the magnitude of the alignment order is changed and the optical anisotropy is expressed (the magnitude of the optical anisotropy changes). Therefore, it is possible to apply the dendrimer as the medium injected and sealed in the dielectric material layer 3 of the present display element.

Moreover, in the liquid crystal microemulsion described in Example 2, instead of using DDAB, the dendrimer can be used to obtain the same alignment structure as the structure of the liquid crystal microemulsion. It is possible to apply the dendrimer as the medium injected and sealed in the dielectric material layer 3 of the present display element.

EXAMPLE 6

Cholesteric Blue Phase

As the medium injected and sealed in the dielectric material layer 3 of the present display element (for example, display element illustrated in FIGS. 1(*a*), 1(*b*), and 2), it is possible to apply a medium made of molecules in a cholesteric blue phase. Note that, FIG. 11 schematically illustrates a structure of the cholesteric blue phase.

As illustrated in FIG. 11, the structure of the cholesteric blue phase is highly symmetric. The cholesteric blue phase has an order (orientational order, orderly structure) which is smaller than the optical wavelength, so that the material is almost transparent in the optical wavelength region. When an electric field is applied, the magnitude of the alignment order is changed and the optical anisotropy is expressed (the magnitude of the optical anisotropy changes). That is, the cholestric blue phase is optically almost isotropic. When an electric field is applied to the cholestric blue phase, its liquid crystal molecules tend to change their directions to the direction of the electric field, so that the grating is distorted and the anisotropy is expressed. Therefore, it is possible to apply a medium made of molecules in the cholesteric blue phase as the medium injected and sealed in the dielectric material layer 3 of the present display element.

Note that, as an example of a material in the cholesteric blue phase, it is possible to use a material which is formed by mixing 48.2 mol % of JC1041 (mixture liquid crystal produced by CHISSO), 47.4 mol % of 5CB (4-cyano-4'-pentyl biphenyl, nematic liquid crystal), and 4.4 mol % of ZLI-4572 (chiral dopant produced by MERCK). The material shows the cholesteric blue phase in a temperature range from 330.7K to 331.8K.

Moreover, as another example of a material in the cholesteric blue phase, it is possible to use a material obtained by mixing 67.1 wt % of ZLI-2293 (mixture liquid crystal produced by MERCK), 15 wt % of P8PIMB (1,3-phenylene bis[4-(4-8-alkylphenyliminomethyl-benzoate, banana-shaped-molecule (bent-molecule) liquid crystal: see the following structural formula (7)), and 17.9 wt % of MLC-6248 (chiral dopant produced by MERCK). The material shows the cholesteric blue phase in a temperature range from 77.2° C. to 82.1° C.

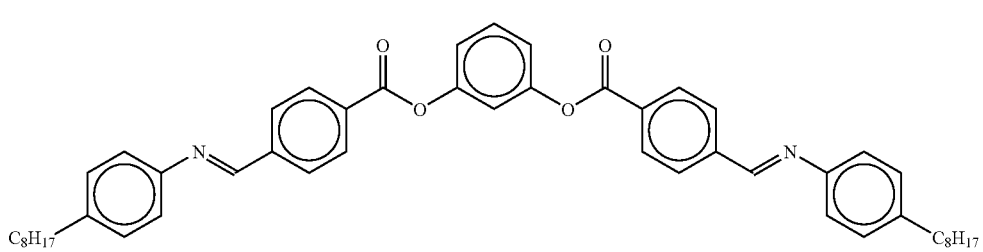

(7)

Moreover, it is possible to freely change a mixture ratio of each material mentioned above. For example, a material obtained by mixing 69.7 wt % of ZLI-2293, 15 wt % of P8PIMB, and 15.3 wt % of MLC-6248 (chiral dopant) shows the cholesteric blue phase in a temperature range from 80.8° C. to 81.6° C.

As still another example of a material in the cholesteric blue phase, it is possible to use a material obtained by mixing 67.1 wt % of ZLI-2293 (mixture liquid crystal produced by MERCK), 15 wt % of MHPOBC (4-(1-methylheptyloxycarbonyl)phenyl-1-4'-octylcarboxybiphenyl-4-carboxylate, linear-molecule liquid crystal: see the following structural formula (8)), and 17.9 wt % of MLC-6248 (chiral dopant produced by MERCK). The material shows the cholesteric blue phase in a temperature range from 83.6° C. to 87.9° C.

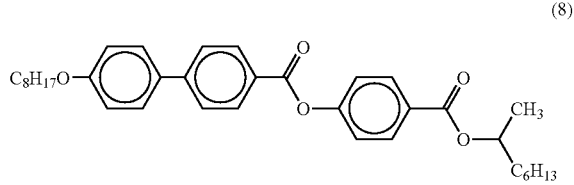

(8)

Moreover, it is possible to freely change a mixture ratio of each material mentioned above. For example, a material obtained by mixing 69.7 wt % of ZLI-2293, 15 wt % of MHPOBC, and 15.3 wt % of MLC-6248 (chiral dopant) shows the cholesteric blue phase in a temperature range from 87.8° C. to 88.4° C.

Note that, it is impossible to express the cholesteric blue phase by merely mixing ZLI-2293 and MLC-6248. However, the cholesteric blue phase is expressed by adding banana-shaped-molecule (bent-molecule) liquid crystal P8PIMB or linear-molecule liquid crystal MHPOBC.

In the above example, a racemic body is used as the linear-molecule liquid crystal. However, the present invention is not limited to this, but a chiral body may be used. Moreover, one or plural chiral carbons may be included. When using the linear-molecule liquid crystal, it is preferable to use the linear-molecule liquid crystal having an anticlinic structure (layers respectively face in different directions) such as the linear-molecule liquid crystal MHPOBC.

Moreover, the linear-molecule liquid crystal is a generic term for expressing a liquid crystal molecule which is long from side to side and is almost straight in a chemical structural formula. Needless to say, the actual configuration is not necessarily in a single plane as in the chemical structural formula, but may be bent.

Moreover, the banana-shaped-molecule (bent-molecule) liquid crystal is a generic term for expressing a liquid crystal molecule having a bent portion in the chemical structural formula. The banana-shaped-molecule (bent-molecule) liquid crystal is not limited to P8PIMB. Not only the banana-shaped-molecule (bent-molecule) liquid crystal whose bent portion is a benzene ring (phenylene group, etc) but also the banana-shaped-molecule (bent-molecule) liquid crystal whose bent portion is combined by a naphthalene ring or a methylene chain may be used. For example, compounds shown by the following structural formulas (9) to (12) are preferable.

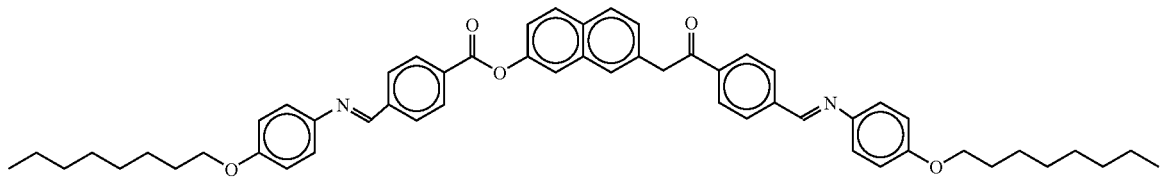

(9)

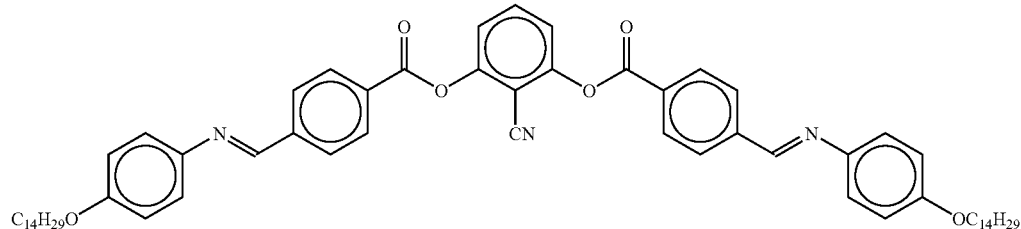

(10)

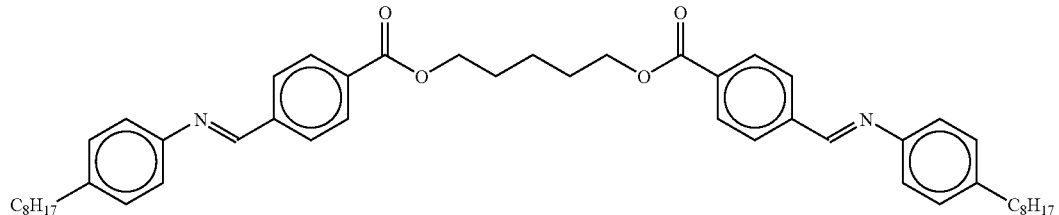

(11)

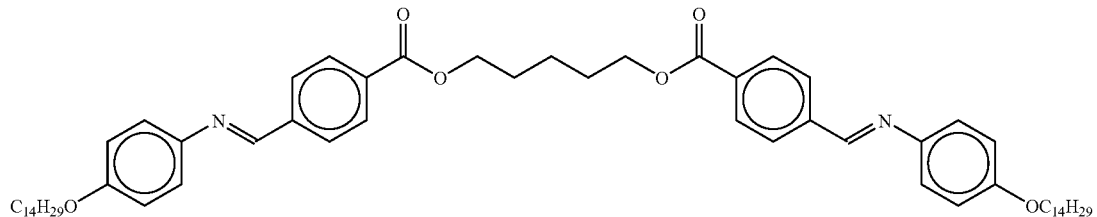

(12)

Moreover, it is possible to use the banana-shaped-molecule (bent-molecule) liquid crystal which includes an azo group. A compound shown by the following structural formula (13) is an example of such banana-shaped-molecule (bent molecule) liquid crystal.

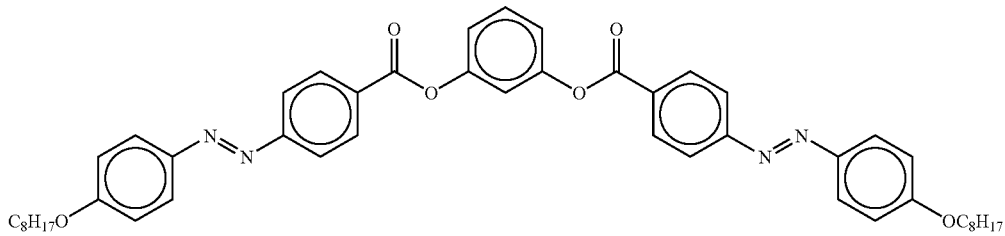

(13)

The above banana-shaped-molecule (bent-molecule) liquid crystal has the chemical structure which is symmetrical about a combined portion (bent portion). However, the chemical structure may be asymmetrical about the combined portion. A compound shown by the following structural formula (14) is an example of such banana-shaped-molecule (bent molecule) liquid crystal.

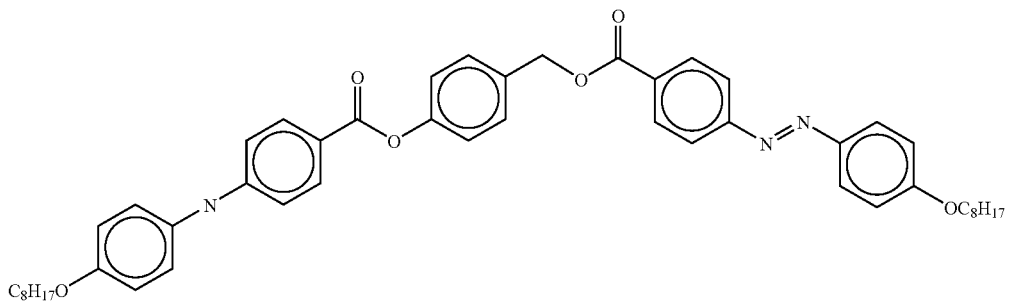

(14)

Moreover, each of the above banana-shaped-molecule (bent-molecule) liquid crystals does not contain a chiral carbon. However, the present invention is not limited to this, but the above banana-shaped-molecule (bent-molecule) liquid crystal may include one chiral carbon or plural chiral carbons. A compound shown by the following structural formula (15) is an example such banana-shaped-molecule (bent molecule) liquid crystal.

cally isotropic" means the following condition: the cholesteric blue phase shows the optical isotropy except for a coloring by a helical pitch. Note that, the cholesteric blue phase shows a color reflecting a helical pitch of the liquid crystal. A phenomenon of selectively reflecting light having the wavelength reflecting the helical pitch is called a selective reflection. When the wavelength band of the selective reflection is not in the visible range, the color is not shown (the color is not recognized by human eyes). When the wavelength band of the selective reflection is in the visible range, the color corresponding to the wavelength is shown.

When the wavelength band of the selective reflection or the helical pitch is 400 nm or more, the cholesteric blue phase

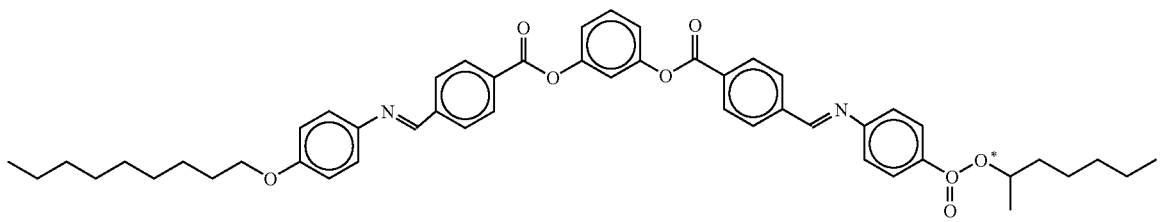

(15)

As described above, the cholesteric blue phase applicable to the present technology has a defective assembly of orderly aligned molecules which has a diameter smaller than the optical wavelength, so that the material is substantially transparent in the optical wavelength region, and is substantially optically isotropic. Here, "the material is substantially optishows a color which reflects the helical pitch of the liquid crystal. That is, visible light is reflected, so that a color shown by the visible light is recognized by human eyes. Therefore, in case where the display element of the present technology is applied to TVs with a full-color display, it is not preferable that its reflection peak be in the visible range.

The wavelength of the selective reflection depends on an incident angle of light onto the screw axis of the medium. On this account, when the structure of the medium is not in one dimension, that is, when the structure of the medium is a three dimensional structure (for example, the cholesteric blue phase), the incident angle of light onto the screw axis distributes. Therefore, the width of the wavelength of the selective reflection also distributes.

On this account, it is preferable that the wavelength band of the selective reflection of the blue phase or the helical pitch of the blue phase be in the visible range or less, that is, 400 nm or less. When the wavelength band of the selective reflection of the blue phase or the helical pitch of the blue phase is 400 nm or less, it is almost impossible to recognize the above color by human eyes.

According to CIE (Commission Internationale de l'Eclairage), the wavelength of 380 nm or less can not be recognized by human eyes. Therefore, it is more preferable that the wavelength band of the selective reflection or the helical pitch be 380 nm or less. In this case, it is possible to surely prevent the above color from being recognized by human eyes.

Moreover, the above color relates not only to the helical pitch and the incident angle but also to the average refractive index of the dielectric material. In this case, the light of the color is a color having a wavelength width $\Delta\lambda=P\Delta n$ and centering on the wavelength $\lambda=nP$. Here, n is the average refractive index, and P is the helical pitch. Moreover, $\Delta n$ is the anisotropy of the refractive index.

$\Delta n$ differs according to the dielectric material. For example, when using the liquid crystal material as a material injected and sealed in the dielectric material layer 3, the average refractive index of the liquid crystal material is about 1.5, and $\Delta n$ is about 0.1. In this case, the color to be shown is not in the visible range. Therefore, when $\lambda=400$ nm, the helical pitch $P=400/1.5=267$ nm. Moreover, $\lambda=0.1\times 267=26.7$. Therefore, in order that the color to be shown is not recognized by human eyes, the helical pitch of the medium may be 253 nm or less, which is obtained by subtracting 13.4 nm (about half of 26.7 nm) from 267 nm. That is, in order to prevent the above color, it is preferable that the helical pitch of the medium be 253 nm or less.

Moreover, in the above explanation, when $\lambda=nP$, $\lambda$ is 400 nm. When $\lambda$ is 380 nm which is the wavelength which cannot be recognized by human eyes according to CIE (Commission Internationale de l'Eclairage), the helical pitch is 240 nm or less, so that the color to be shown is not in the visible range. That is, the helical pitch of the medium is 240 nm, so that it is possible to surely prevent the color from being shown.

For example, there is a material prepared by mixing 50.0 wt % of JC1041 (mixture liquid crystal, produced by CHISSO), 38.5 wt % of 5CB (4-cyano-4'-pentyl biphenyl, nematic liquid crystal), and 11.5 wt % of ZLI-4572 (chiral dopant, produced by MERCK). At a temperature of about 53° C. or lower, this mixture transits its phase from a liquid isotropic phase to an optical isotropic phase. However, the color is not shown because the helical pitch is about 220 nm and is below the visible range.

As described above, the cholesteric blue phase applicable to the present technology has a defective structure (assembly of orderly aligned molecules) which is smaller than the optical wavelength. The defective structure results from the fact that adjacent molecules are greatly twisted. Therefore, it is necessary that a dielectric medium showing the cholesteric blue phase shows chirality in order to express a greatly-twisted structure. In order to express a greatly-twisted structure, it is preferable that the chiral dopant be added to the dielectric medium.

Although the concentration of the chiral dopant depends on a twisting force of the chiral dopant, it is preferable that the concentration of the chiral dopant be 8 wt %, or 4 mol % or more. When a ratio of the chiral dopant is 8 wt %, or 4 mol % or more, the temperature range of the cholesteric blue phase is about 1° C. or more. When a ratio of the chiral dopant is 8 wt %, or less than 4 mol %, the temperature range of the cholesteric blue phase becomes narrower.

It is further preferable that the concentration of the chiral dopant be 11.5 wt % or more. When the concentration of the chiral dopant is 11.5 wt % or more, the helical pitch is about 220 nm, so that the color is not shown.

Furthermore, it is preferable that the concentration of the chiral dopant be 15 wt % or more. In case of expressing the cholesteric blue phase by adding the banana-shaped-molecule (bent-molecule) liquid crystal or the linear-molecule liquid crystal having the anticlinic structure, when the concentration of the chiral dopant is 15 wt % or more, the temperature range of the cholesteric blue phase is about 1° C. Moreover, by increasing the concentration of the chiral dopant to 17.9 wt %, the temperature range of the cholesteric blue phase becomes further wider.

Thus, when the concentration of the chiral dopant is high, it becomes easy to express the cholesteric blue phase, and the helical pitch of the cholesteric blue phase becomes short. Therefore, it is preferable that the concentration of the chiral dopant be high.

When the chiral dopant is added too much, the liquid crystallinity of the entire dielectric material layer 3 drops. The lack of the liquid crystallinity leads to the decrease of the magnitude of the optical anisotropy generated when an electric field is applied. As a result, the function of the display element is lowered . Moreover, the decrease of the liquid crystallinity leads to the decrease of the stability of the cholesteric blue phase. As a result, it becomes difficult to expand the temperature range of the cholesteric blue phase. On this account, the upper limit of the concentration of the chiral dopant is determined. According to the analysis of the present applicants, the upper limit is 80 wt %. That is, it is preferable that the concentration of the chiral dopant be 80 wt % or less.

In the present embodiment, ZLI-4572 and MLC-6248 are used as the chiral dopant. However, the present invention is not limited to them. It is possible to use commercial products such as S811 (produced by E. MERCK). Moreover, it is possible to use an axial-asymmetry chiral dopant. As the axial-asymmetry chiral dopant, it is possible to use the axial-asymmetry binaphthyl derivative (see the following compound (16)).

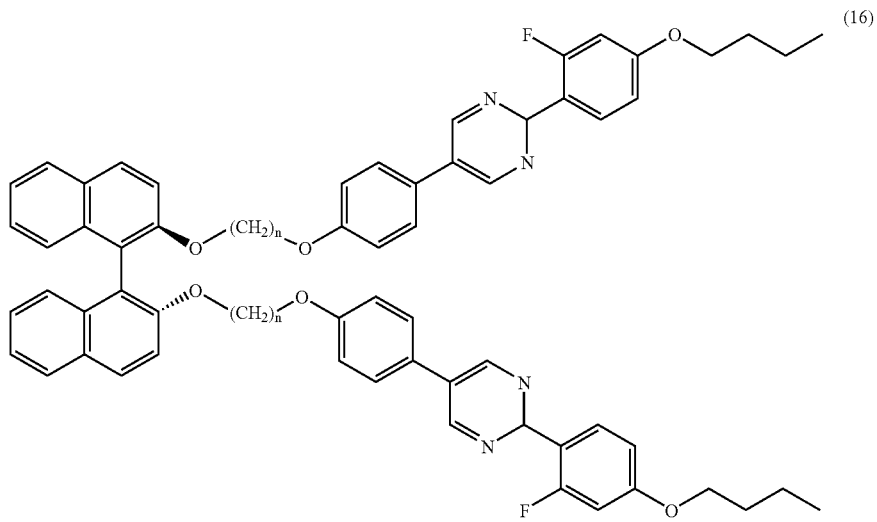

(16)

where n is an integer from 4 to 14.

When n is an odd number, the compound (16) sometimes shows the blue phase by itself. For example, when n=7, the compound (16) shows the blue phase in a temperature range from about 103° C. to about 94° C. Therefore, when the compound (16) shows the blue phase by itself (when the compound (16) has the liquid crystallinity), it is possible to use the compound (16) by itself as the medium injected and sealed in the dielectric material layer 3. Moreover, it is possible to use the compound (16) as the chiral dopant.

The above description explained the effects of the chiral dopant which is added to a material in the cholesteric blue phase. However, the effects obtained by adding the chiral dopant is not limited to the cholesteric blue phase. It is possible to obtain substantially the same effect in the dielectric medium in the liquid crystal phase such as the smectic blue phase and the nematic phase.

EXAMPLE 7

Smectic Blue (BPsm) Phase

As the medium injected and sealed in the dielectric material layer 3 of the present display element (for example, display element illustrated in FIGS. 1(*a*), 1(*b*), and 2), it is possible to apply a medium made of molecules in a smectic blue (BPsm) phase. Note that, FIG. 11 schematically illustrates a structure of the smectic blue phase.

As illustrated in FIG. 11, like the cholesteric blue phase, the structure of the smectic blue phase is highly symmetric. The smectic blue phase has an order (orientational order, orderly structure) which is smaller than the optical wavelength, so that the material is almost transparent in the optical wavelength region. When an electric field is applied, the magnitude of the alignment order is changed and the optical anisotropy is expressed (the magnitude of the optical anisotropy changes). That is, the smectic blue phase is optically almost isotropic. When an electric field is applied to the smectic blue phase, its liquid crystal molecules tend to change their directions to the direction of the electric field, so that the grating is distorted and the anisotropy is expressed. Therefore, it is possible to apply a medium made of molecules in the smectic blue phase as the medium injected and sealed in the dielectric material layer 3 of the present display element.

An example of a material in the smectic blue phase is FH/FH/HH-14BTMHC described in Non-patent Document 8. The material shows a BPsm 3 phase in a temperature range from 74.4° C. to 73.2° C., a BPsm 2 phase in a temperature range from 73.2° C. to 72.3° C., a BPsm 1 phase in a temperature range from 72.3° C. to 72.1° C.

As explained in Makoto Yoneya, "Examining nano-structured liquid crystal phase by molecule simulator", Liquid crystal, 2003, Vol. 7, No. 3, pp. 238-245, the BPsm phase has a highly symmetric structure, so that this is substantially optically anisotropic.

Moreover, as in a case where the medium in the cholesteric blue phase is used, it is preferable that the wavelength band of the selective reflection of the blue phase or the helical pitch of the blue phase be 400 nm or less when using a medium in the smectic blue phase. It is more preferable that the wavelength band of the selective reflection of the blue phase or the helical pitch of the blue phase be 380 nm or less. Furthermore, it is preferable that the helical pitch be 253 nm or less. It is more preferable that the helical pitch be 240 nm or less.

As the medium injected and sealed in the dielectric material layer 3 of the present display element, it is preferable that the medium have an order (orientational order, orderly structure) which is smaller than the optical wavelength, and the magnitude of the optical anisotropy of the medium changes by applying an electric field. It is possible to use the material which is in a phase similar to the smectic blue phase or the cholesteric blue phase.

As the material in the phase similar to the smectic blue phase or the cholesteric blue phase, mixtures of the following compounds (17) and (18) are examples thereof.

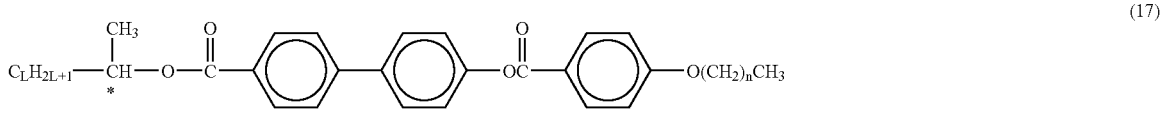

(17)

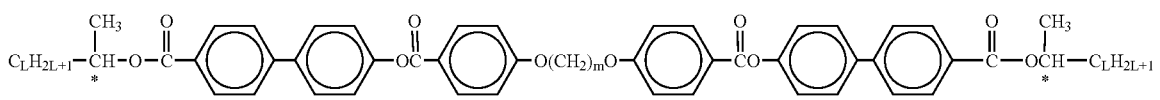

(18)

where L shows an integer from 2 to 10, and m is an integer from 2 to 14, and n is an integer from 0 to 6. Note that, when mixing the compounds (17) and (18), it is preferable that the compounds (17) and (18) are mixed so that 2×(n+1)=m is satisfied. Moreover, the mixture ratio of the compounds (17) and (18) is freely set. For example, when L=6, m=6, and n=2, and the compounds (17) and (18) which are equal in quantity are mixed with each other, the mixture shows a phase (a phase having the orientational order (orderly structure) which is smaller than the optical wavelength) similar to the smectic blue phase in a temperature range from about 143° C. to about 130° C. Moreover, when L=6, m=6, n=2, and when mixing the compounds (17) and (18) at a ratio of 30% to 70%, the mixture shows a phase having an orientational structure (orderly structure) which is smaller than the optical wavelength in a temperature range from about 132° C. to about 120° C. Note that, it is possible to freely change the mixture ratio of the compounds.

When Δn is the refractive index anisotropy in the nematic phase state of the dielectric material at 550 nm, and αε is a dielectric constant anisotropy at 1 kHZ, it is preferable that Δn×Δε be 2.9 or more.

The refractive index anisotropy (Δn) is Δn=ne−no (ne: refractive index (extraordinary light refractive index) in a long-axis direction (that is, a direction of a component of polarized light of light wave) of an ellipse (refractive index ellipsoid) when an electric field is applied, no: refractive index (ordinary light refractive index) in a direction perpendicular to a main direction of the ellipse). That is, in the present technology, the refractive index anisotropy (Δε) shows the double refraction change shown by Δn=ne−no (ne: extraordinary light refractive index, no: ordinary light refractive index).

Moreover, the dielectric constant anisotropy (dielectric constant change) (Δε) shows the anisotropy of the dielectric constant. When the dielectric constant in a long-axis direction of a liquid crystal molecule is εe, and the dielectric constant in a short-axis direction of the liquid crystal molecule is εo, the dielectric constant anisotropy (Δε) (dielectric constant variation) is shown by a value of Δε=εe−εo.

The following description explains results of the measurement of a driving voltage. The measurement is carried out with respect to the present display element in which the liquid crystal fine particle dispersal system described in Example 4 is injected and sealed in the dielectric material layer 3.

The compound (2) is used as a solvent. Δn×Δε of the dielectric material (the liquid crystal fine particle dispersal system) is about 2.2. The dielectric material layer 3 has a thickness of 10 μm, and the distance between the comb-shaped electrodes 4 and 5 is 3.3 μm. Note that, the refractive index anisotropy Δn is measured by using Abbe refractometer (4T (product name), produced by ATAGO), and the wavelength is 550 nm. Moreover, the dielectric constant anisotropy Δε is measured by using Impedance analyzer (SI1260 (product name), produced by TOYO TECH), and the frequency is 1 kHz.

Figure 12:
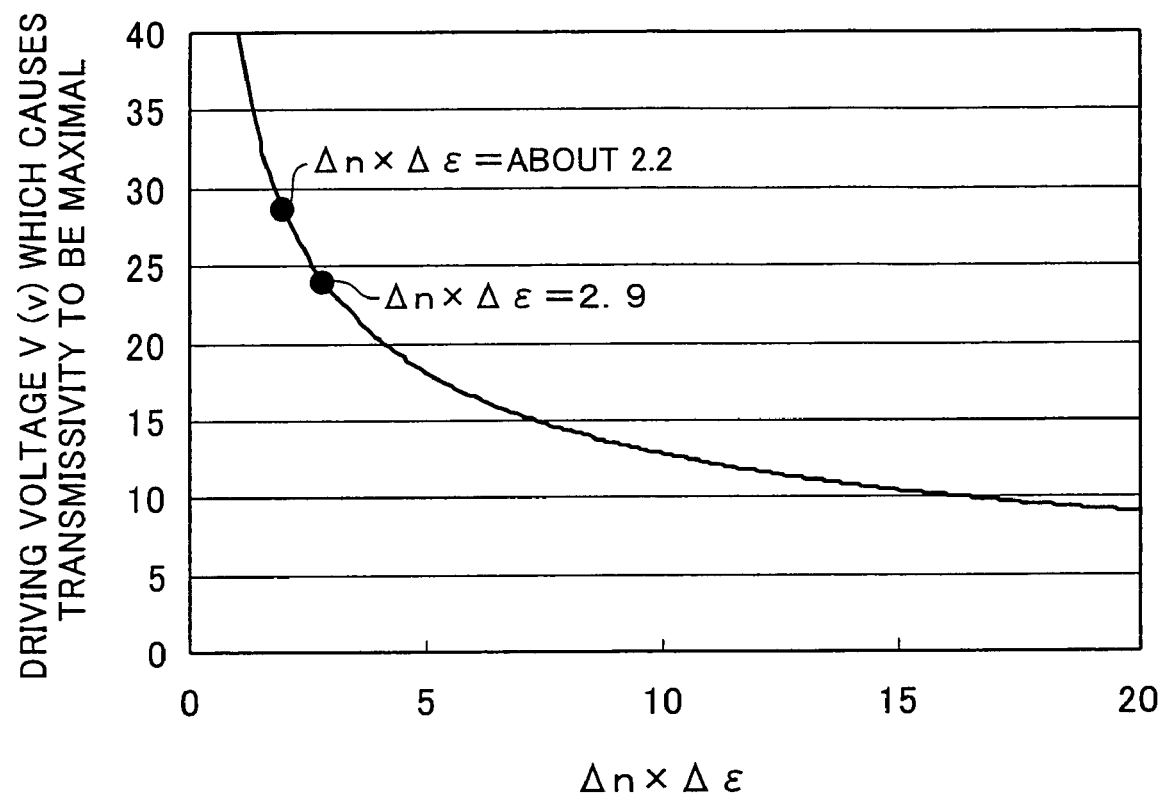
FIG. 12 is a graph illustrating a relation between (i) a voltage value at which transmittance is utmost, and which is estimated from a measured voltage-transmittance property of the display element according to one example embodiment, and (ii) product ($\Delta n \times \Delta \epsilon$) of refractive index anisotropy $\Delta n$ and dielectric constant $\Delta \epsilon$.

When a driving voltage is about 28V, the transmissivity of the present display element becomes maximal (see FIG. 12).

According to Non-patent Document 4, the double refraction Δn(E) generated by an electric field application is as follows.

$$\Delta n(E)=\lambda BE^2$$

Note that, λ is an optical wavelength, and B is Kerr constant, and E is an applied electric field intensity.

When the double refraction changes, the transmissivity T also changes as follows.

$$T=\sin^2(\pi\times\Delta n(E)\times d/\lambda)=\sin^2(\pi BE^2 d)$$

where d is a thickness of the dielectric material layer 3.

The transmissivity becomes maximal when $$\pi BE^2 d=\pi/2.$$

According to the above formula, $$\Delta B=\Delta n(E)/\lambda E^2=\Delta n Q(E)/\lambda E^2$$

where Q(E) is an orientational order parameter.

Moreover, according to Non-patent Document 4, $$Q \propto \Delta\varepsilon \times E2.$$

Therefore, the driving voltage V which causes the transmissivity to be maximal is $$V=ES=S\times sqrt(\tfrac{1}{2}Bd)\propto S\times sqrt(1/(\Delta n\times\Delta\varepsilon)\times d)$$

where S is the distance between the comb-shaped electrodes 4 and 5.

Based on the above results, FIG. 12 shows a relationship between the voltage value (V(V)) which causes the transmissivity to be maximal and Δn×ΔFε. The relationship is estimated according to a voltage-transmissivity property and a relational formula of Δn×Δε. The voltage-transmissivity property is measured after injecting and sealing the above dielectric material in the display element.

According to FIG. 12, the driving voltage which causes the transmissivity to be maximal becomes 24V in cases of using a dielectric constant material whose refractive index anisotropy Δn multiplied by the dielectric constant anisotropy Δε is not less than 2.9 (Δn×Δε) and in case where the dielectric material layer 3 has a thickness of about 10 μm and the distance between the comb-shaped electrodes 4 and 5 is 3.3 μm.

When the display element is applied to the active matrix display device, a switching device (TFT device) is used for switching ON/OFF of a voltage to be applied to the comb-shaped electrodes 4 and 5. When a thickness and quality of a gate electrode of the switching device (TFT device) is optimized, a withstand voltage (voltage) applicable to the gate electrode is 63V at the maximum. Therefore, when an electrical potential of the gate electrode is High (that is, the gate electrode is ON), the voltage is 10V. When the electrical potential of the gate electrode is Low (that is, the gate electrode is OFF), the voltage is −5V: The voltage of 10V and the voltage of 5V are subtracted from the withstand voltage, so as to obtain the maximal value of the voltage applicable to the dielectric material layer 3, and the maximal value is 48 Vpp (63−10−5=48 Vpp (peak-to-peak)). The voltage value is ±24 in rms (root-mean-square).

Therefore, when the dielectric material layer 3 has a thickness of 10 μm, and the distance between the comb-shaped electrodes 4 and 5 is 3.3 μm, the dielectric constant material in which the value obtained by multiplying the refractive index anisotropy Δn by the dielectric constant anisotropy Δε is not less than 2.9 is used. As a result, it is possible to maximize the transmissivity within a range of the withstand voltage of the switching element.

Note that, an example of the dielectric constant material in which Δn×Δε is not less than 2.9 is the following compound (19).

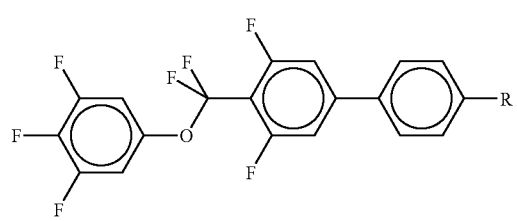

(19)

where R is an alkyl group. In the compound (19), when Δε is about 25 and Δn is about 0.15, Δn×Δε=3.75.

Moreover, in order to further lower the driving voltage of the present display element, one idea is to narrow down the interval between the comb-shaped electrodes. However, an accuracy, a process margin, process cost, and the like in manufacturing are limited, so that it is difficult to further narrow down the interval between the comb-shaped electrodes.

Furthermore, in order to further lower the driving voltage of the present display element, another idea is to make the dielectric material layer 3 further thicker. However, even when the dielectric material layer 3 is merely made thicker, the thickness to which the electric field is applied does not necessarily increase corresponding to an increment of the thickness of the dielectric material layer. Therefore, in lowering the driving voltage, it is not effective to further increase the thickness of the dielectric material layer 3 (10 μm).

Further, the present embodiment mainly explained the application of the electric field as an example of means for varying the medium in terms of magnitude of optical anisotropy, but the present technology not limited to this. It may be so arranged that: an external field other than the electric field is applied to the medium, so that the magnitude of the optical anisotropy varies when the external field is applied and when no external field is applied. This is applicable to embodiments described later.

For example, the display element according to the present technology may be arranged so as to include a medium provided between a pair of substrates, at least one of the substrates being transparent, an external field being applied to the medium in order to carry out a display, wherein the medium varies in terms of magnitude of optical anisotropy in response to application of the external field.

In this case, magnetic anisotropy of the medium is used, so that the medium varies in terms of optical anisotropy when a magnetic field is applied and when no magnetic field is applied. Thus, it is preferable to use a medium whose anisotropy of magnetic susceptibility is high.

In case of organic molecules, the magnetic susceptibility is contributed mainly by a diamagnetic susceptibility. Thus, in case where magnetic field variation allows n electrons to circularly move in molecules, an absolute value thereof becomes large. Thus, in case where there is an aromatic ring in molecules for example, an absolute value of the magnetic susceptibility becomes large when the aromatic ring faces perpendicularly to a direction of the magnetic field. In this case, an absolute value of the aromatic ring in a horizontal direction is smaller than an absolute value of the aromatic ring in a vertical direction, so that the anisotropy of the magnetic susceptibility becomes large. Thus, it is preferable to use a medium having a ring structure having 6 membered ring in the molecules.

Further, it is preferable to align electron spins whose radicals are N, O, or NO in the molecules. By introducing the electron spins whose radicals are N, O, or NO into the molecules, the molecules can have stable spins. In order to align the spins parallel to each other, for example, flat conjugated molecules may be accumulated. For example, it is preferable to use discotic liquid crystal whose central core portion constitutes an accumulation column.

Further, it is possible to use light as an external field for varying the medium in terms of magnitude of optical anisotropy. In this case, a wavelength of light used as the external field is not particularly limited. For example, by causing Nd:YAG laser to emit light of 532 nm while oscillating it, it is possible to vary the medium in terms of magnitude of optical anisotropy.

The medium used in this case is not particularly limited, and any medium can be used as long as the medium varies in terms of magnitude of optical anisotropy in response to light emission. For example, it is possible to use the same medium as that used in case of applying the electric field. Further, it is possible to use pentyl-cyano-biphenyl (5CB represented by the foregoing structural formula (2)).

Further, in case of using light as the external field, it is preferable that a dye is slightly contained in the medium. By adding the dye slightly, magnitude of optical anisotropy more greatly varies than a case where no dye is added. Note that, it is preferable that an amount of the dye contained in the medium is not less than 0.01 wt % and less than 5%. When the amount is less than 0.01, this is so small that the dye hardly contributes to variation in magnitude of optical anisotropy. When the amount exceeds 5%, excited color is absorbed by the dye.

For example, pentyl-cyano-biphenyl (5CB) may be used as the medium without any modification, but a material obtained by adding the dye to the pentyl-cyano-biphenyl (5CB) may be used. The added dye is not particularly limited, but it is preferable to use a dye whose absorption band includes a wavelength of excited light. For example, it is possible to add 1AAQ (1-amino-anthroquinone (product of Aldrich) represented by the following chemical structural formula (20)).

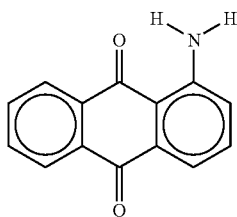

(20)

By adding 0.03% of 1AAQ to pentyl-cyano-biphenyl (5CB), variation that the excited light causes with respect to magnitude of optical anisotropy is about 10 times as large as that in case where 1AAQ is not added.

As in such an arrangement that the medium varies in terms of magnitude of optical anisotropy by applying an electric field to the medium, also in such an arrangement that the medium varies in terms of magnitude of optical anisotropy by applying an external field other than the electric field to the medium, it is preferable that a selective reflection wavelength band or a helical pitch of molecules, contained in the medium, which are aligned in a helical manner, is not more than 400 nm.

In order to generate the optical anisotropies in the display element, use of electric field, magnetic field, light or the like may be adopted, for example. Among them, the use of the electric field is preferable for the sake of easy designing and driving control of the display element.

Therefore, the display element may be provided with, for example, electric field applying means (such as an electrode or the like), magnetic field applying means (such as an electromagnet or the like), or the like as means for applying a force. For the sake of easy designing and driving control of the display element, the electric field applying means is preferable.

The present technology is not particularly limited in terms of the means for applying the force, provided that the means for applying the force is capable of changing the magnitude of the optical anisotropy of the medium depending on whether or not the force is applied (and by and according to the force applied thereby). Besides the electric field applying means (such as an electrode or the like) and magnetic field applying means (such as an electromagnet or the like), a laser device, light radiating means (excitation light generating means) such as the above-mentioned Nd:YAG laser and the like are applicable as the means for applying the force.

Therefore, the present technology may be arranged such that the present element may comprise the means for applying the force, or such that the means for applying the force is provided in addition to the display element. That is, a display device according to the example embodiment may be so arranged as to comprise the display element including the means for applying the force, or to comprise the display element and the means for applying the force.

Further, in the display element of the present technology, as the medium whose magnitude of optical anisotropy varies, it is possible to use a material whose orderly structure varies (for example, the orderly structure is distorted) by applying an electric field (external field) so that its magnitude of optical anisotropy varies. For example, it is possible to use a medium, having an orderly structure smaller than the optical wavelength when an electric field (external field) is applied or when no electric field (external field) is applied, whose orderly structure varies by applying the electric field so that its magnitude of optical anisotropy varies. Alternatively, it is possible to use a medium, having an orderly structure showing optical anisotropy when no electric field (external field) is applied, whose orderly structure varies by applying the electric field so that its magnitude of optical anisotropy varies.

In the present technology, to change in the magnitude of the optical anisotropy of the medium by and according to electric field applied on the medium indicates that, as described above, is to change the refractive index ellipsoid by and according to the electric field applied on the medium. In the aforementioned arrangement in which the medium is optically isotropic when no electric field is applied and the magnitude of its optical anisotropy is changeable by and according to the electric field applied thereon, that is, in the arrangement in which the optical anisotropy of the medium is generated when the electric field is applied, the shape of the refractive index ellipsoid is changed from the spherical shape to the ellipsoidal shape by and according to the electric field applied thereon. On the other hand, in the arrangement in which the medium is optically isotropic when no electric field is applied thereon, but becomes optically isotropic when the electric field is applied, the shape of the refractive index ellipsoid is changed from the ellipsoidal shape to the spherical shape by and according to the electric field applied thereon. Moreover, in the arrangement in which the medium is optical anisotropic when no electric field is applied and the magnitude of its optical anisotropy becomes higher or lower by and according to the electric field application, compared with the magnitude of its optical anisotropy attained when no electric field is applied, a major axial length or a minor axial length of the refractive index ellipsoid is changed (extended or shortened) whereby a ratio between the major axial length and the minor axial length of the refractive index ellipsoid is changed between before and after the electric field application (as a result, or example, curvature is changed). For example, in case where the magnitude of the optical anisotropy becomes higher when the electric field is applied, the electric field application causes the ellipsoid to have a larger ratio of its major axial length over its minor axial direction compared with the ratio attained when no electric field is applied. In case where the magnitude of the optical anisotropy becomes lower when the electric field is applied, the electric field application causes the ellipsoid to have a smaller ratio of its major axial length over its minor axial direction compared with the ratio attained when no electric field is applied (that is, the ratio gets closer to 1; the ratio in this case may be such a ratio with which the ellipsoid becomes substantially spherical).

In this case, unlike the conventional liquid crystal display element using the change in an alignment direction of liquid crystal molecules, viscosity peculiar to liquid crystal does not greatly influence the response speed, so that it is possible to realize higher response speed than that of the conventional liquid crystal display element.

Further, in this case, the medium has only to be kept at such a temperature that the medium shows a predetermined orderly structure when an external field is applied or when no external field is applied (a state in which the application of the external field distorts the orderly structure so that its optical anisotropy varies), so that it is easy to control the temperature. That is, according to the display device like Tokukai 2001-249363 which is based on a conventional electric optical effect using electron deviation in polar molecules which is caused by the electric field application, its driving temperature range is limited to a vicinity of a liquid crystal phase transition point (for example, a temperature range of approximately 0.1K), so that very precise temperature control is required. In contrast, according to the foregoing arrangement, the medium has only to be kept at such a temperature that the medium shows a predetermined orderly structure when an external field is applied or when no external field is applied, so that it is easy to control the temperature.

For example, when BABH8 is used as the medium, in 24.3K temperature range (136.7° C. to 161° C.), the medium can be kept in such a state that its magnitude of optical anisotropy varies by applying an electric field (external field). Further, when ANBC16 is used as the medium, in 26.2K temperature range (171.0° C. to 197.2° C.), the medium can be kept in such a state that its magnitude of optical anisotropy varies by applying an electric field (external field). Note that, there is no particular upper limit of the temperature range which causes the medium to show a predetermined orderly structure when an external field is applied or when no external field is applied, and it is possible to use a medium showing a predetermined orderly structure in a temperature range wider than that of the aforementioned mediums. Moreover, an lower limit of the temperature range which causes the medium to show a predetermined orderly structure when an external field is applied or when no external field is applied is preferably 0.1K or higher, more preferably 1K or higher.

Further, as the medium used in the display element of the present technology, any medium can be used as long as it is a medium whose magnitude of optical anisotropy varies by applying an electric field (external field), and such medium is not necessarily a medium showing Kerr effect, i.e., a medium whose refractive index varies in proportion to square of the electric field.

Embodiment 2

4'-n-alkoxy-3'-nitrobiphenyl-4-carboxylic acids (ANBC-22: transparent dielectric material) is used as a material injected and sealed in the dielectric material layer 3 of the present display element. The chemical structure of ANBC-22 is the compound (3) (n=22).

Note that, the substrates 1 and 2 are glass substrates. Moreover, beads are scattered in advance, so that the interval between the substrates is adjusted to be 4 µm. That is, the dielectric material layer 3 has a thickness of about 4 µm.

The comb-shaped electrodes 4 and 5 are transparent electrodes made of ITO. Moreover, alignment films are respectively formed onto the inner sides (counter surfaces) of the substrates. The alignment film is made of polyimide, and a rubbing treatment is carried out onto the alignment films. It is preferable that the rubbing directions be such directions that a bright state is realized in the smectic C phase. Typically, it is preferable that the rubbing directions be at an angle of about 45° with respect to the polarizing plate axis direction. Note that, the alignment film formed on the substrate 1 is formed such that the comb-shaped electrodes 4 and 5 are covered.

As illustrated in FIG. 2, the polarizing plates 6 and 7 are respectively provided to the outer surfaces (opposite the counter surfaces) of the substrates 1 and 2. The absorption axis of the polarizing plate 6 is orthogonal to the absorptions axis of the polarizing plate 7. Moreover, the absorption axis of the polarizing plate 6 is at an angle of about 45° with respect to a direction in which the comb-teeth portion of the comb-shaped electrode 4 extends, and the absorption axis of the polarizing plate 7 is at an angle of about 45° with respect to a direction in which the comb-teeth portion of the comb-shaped electrode 5 extends.

The display element thus obtained is in the smectic C phase at a temperature lower than the smectic C phase/cubic phase transition temperature. Note that, the smectic C phase is optically anisotropic when no electric field is applied.

The display element is kept at about the smectic C phase/cubic phase transition temperature (up to about 10K lower than the phase transition temperature) by using an outer heating device. When an electric field (alternating current electric field whose voltage is about 50V (frequency is greater than 0 up to several hundreds kHz) is applied to the display element, the transmissivity can be changed. That is, in case where an electric field is applied to the display element in smectic C phase (bright state) which is optically anisotropic when no electric field is applied, the smectic C phase is changed into a cubic phase (dark state) which is isotropic. That is, the display element shows the optical anisotropy when no electric field is applied and shows the optical isotropy when an electric field is applied. Note that, in this case, the refractive index ellipsoid changes from an elliptic shape (when no electric field is applied) to a globular shape (when an electric field is applied).

Note that, in order to carry out the display, the angle between the absorption axis of each of the polarizing plates and each comb-shaped electrode is not limited to 45°, but may be any angle ranging from 0° C. to 90°. Because the bright state is realized when no electric field is applied, it is possible to carry out the display merely by the relationship between the rubbing direction and a polarizing plate absorption axis direction. Moreover, because the dark state is realized by an electric field inducing phase transition in which a medium becomes optically isotropic by applying an electric field, the absorption axes of the polarizing plates just have to be orthogonal to each other, so that the comb-shaped electrode direction does not matter.

Therefore, the alignment treatment is not indispensable, and it is possible to carry out the display in an amorphous alignment state (random alignment state).

Moreover, substantially the same result can be obtained even in a case where electrodes are provided on the substrates 1 and 2, and an electric field in a normal direction of the substrate surface is generated. That is, substantially the same result can be obtained not only in a case where an electric field direction is a substrate surface horizontal direction but also in a case where an electric field direction is the normal direction of the substrate surface.

Thus, the medium injected and sealed in the dielectric material layer 3 of the present display element may be a medium which is optically anisotropic when no voltage is applied, and the medium in which the optical anisotropy is disappeared by applying a voltage and the optical isotropy is expressed.

Moreover, the medium used for the dielectric material layer 3 of the present display element may have positive dielectric anisotropy, or may have negative dielectric anisotropy. When using a medium having the positive dielectric anisotropy, it is necessary to drive the display element by the electric field substantially parallel to the substrates. When using a medium having the negative dielectric anisotropy, the present invention is not limited to the above.

For example, it is possible to drive the display element by the electric field which is oblique with respect to the substrates. It is also possible to drive the display element by the electric field perpendicular to the substrates. In these cases, electrodes are provided on a pair of substrates (substrates 1 and 2) which are provided face to face, and an electric field is applied between the electrodes which are provided on both of the substrates. In this way, the electric field is applied to the dielectric material layer 3.

Moreover, the shape of the electrode, the material, the number of the electrodes, and arrangement position may be freely changed even in a case where an electric field is applied in a direction parallel to the substrate surface, or even in a case where an electric field is applied in a direction perpendicular to the substrate surface or a direction which is oblique with respect to the substrate surface. Note that, when an electric field perpendicular to the substrates surface is applied by using a transparent electrode, there is an advantage in terms of open area ratio.

Embodiment 3

The following description explains another example embodiment with reference to attached drawings.

Figure 15:
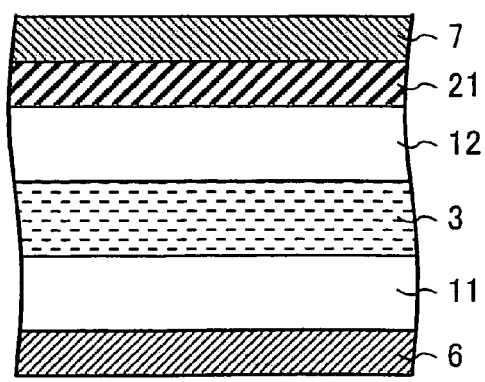
FIG. 15 is a cross sectional view schematically illustrating important members of a display element according to the present embodiment.
Figure 16:
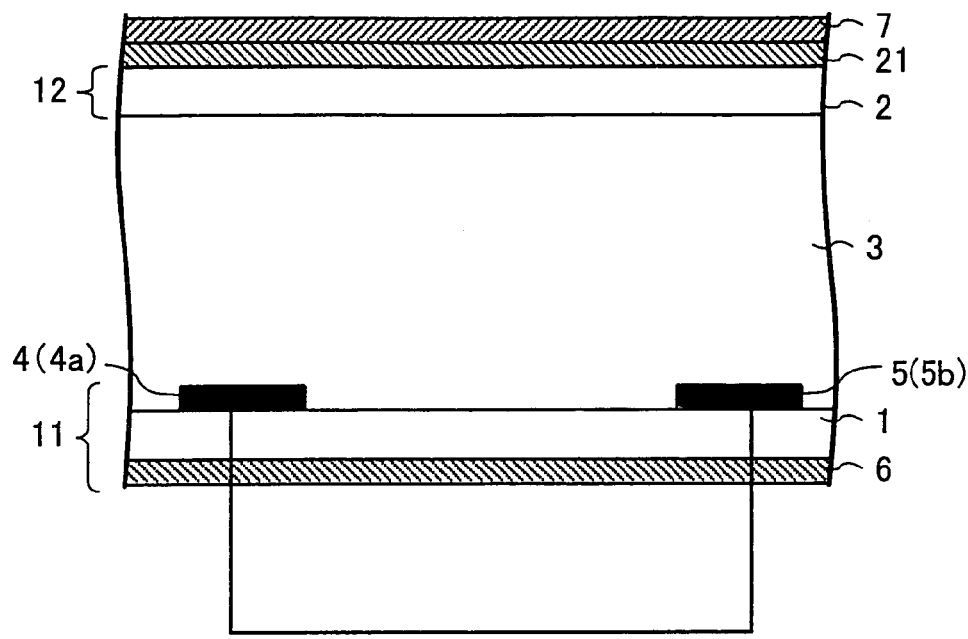
FIG. 16(a) is a cross sectional view schematically illustrating structures of the important members of the display element when no electric field is applied.
FIG. 16(b) is a cross sectional view illustrating the structures of the important members of the display element when an electric field is applied.
Figure 16:
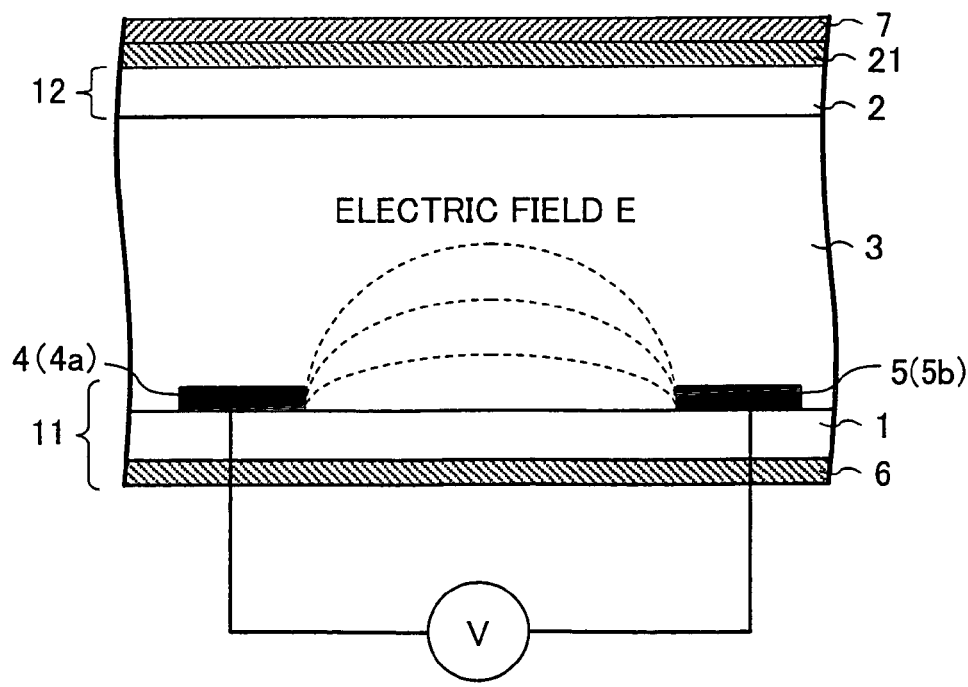

FIG. 15 is a cross-sectional view schematically illustrating an arrangement of important parts of the display element (display element 120) according to the present embodiment. FIG. 16(a) is a cross-sectional view schematically illustrating an arrangement of important parts of the display element of the present embodiment, when no electric field is applied to the display element (OFF state). FIG. 16(b) is a cross-sectional view schematically illustrating an arrangement of important parts of the display element of the present embodiment, when an electric field is applied to the display element (ON state). As in the display element 120 according to the Embodiment 1, the display element according to the present embodiment is provided, in an display device, with a driving circuit, a signal line (data signal line), a gate line (gate signal line), a switching element, and the like.

As illustrated in FIG. 15, FIGS. 16(a), and 16(b), the display element of the present embodiment is structured such that (i) a pair of substrates (hereinafter referred to as pixel substrate 11 and counter substrate 12), which are provided face to face, and at least one of which is transparent, are provided and (ii) between these substrates, a medium layer (dielectric material layer) 3 is provided as an optical modulation layer. The medium layer 3 is made of medium (hereinafter referred to as medium A) which is optically modulated by applying an electric field. Moreover, polarizing plates 6 and 7 are respectively provided on outer surfaces of the substrates, that is, the polarizing plates 6 and 7 are respectively provided on rear surfaces with respect to counter surfaces of the pixel substrate 11 and the counter substrate 12. Furthermore, between the counter substrate 12 and the polarizing plate 7 which is provided above the outer surface of the counter substrate 12, a phase retardation plate 21 having biaxial optical anisotropy is provided.

Figure 20:
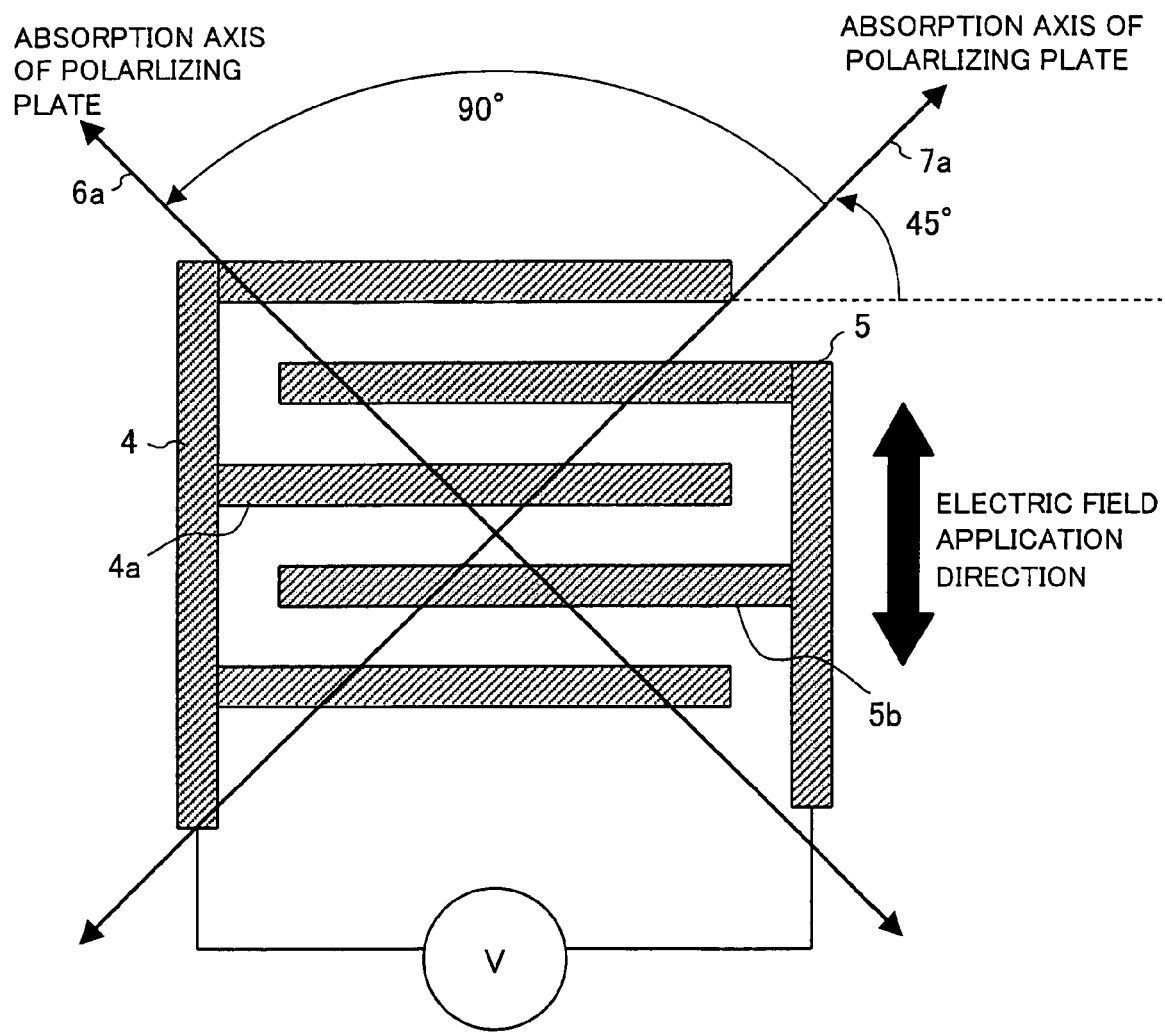
FIG. 20 is an explanatory diagram illustrating a relation in the display element between each arrangement of electrodes and each absorption axis of polarizing plates.
Figure 21:
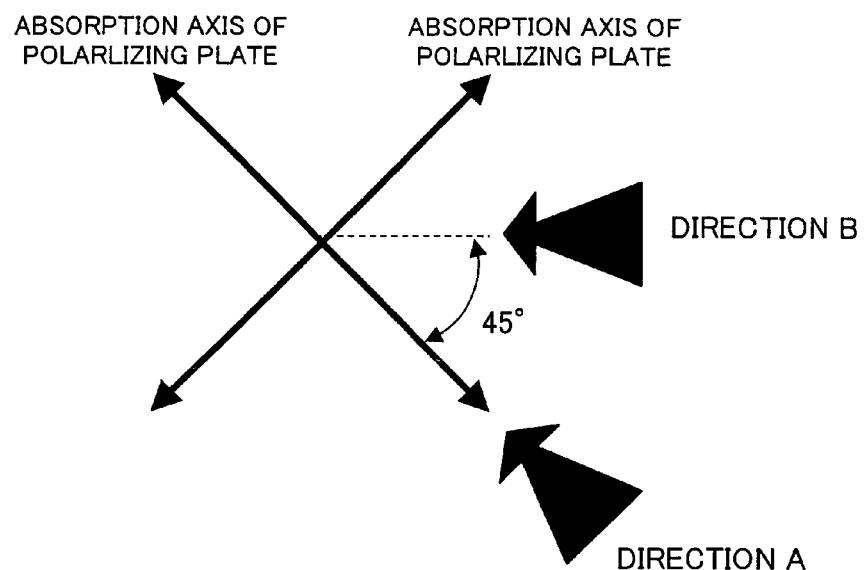
FIG. 21 is an explanatory diagram illustrating a relation between each of different directions and each of the absorption axes.

As illustrated in FIGS. 16(a) and 16(b), the pixel substrate 11 and the counter substrate 12 respectively include transparent substrates 1 and 2 each of which is made of glass for example. As illustrated in FIG. 16(b), comb-shaped electrodes 4 and 5 are provided on a surface of the substrate 1 of the pixel substrate 11, the surface facing the substrate 2, that is, the surface facing the counter substrate 12. The comb-shaped electrodes 4 and 5 are means for applying the electric field (horizontal electric field) to the medium layer 3, the electric field being substantially parallel to the substrate 1. As illustrated in FIG. 20, comb-teeth portions 4a and 5a of the comb-shaped electrodes 4 and 5 are provided face to face so that the comb-teeth portions 4a and 5a can mesh with each other.

The comb-shaped electrodes 4 and 5 are made of transparent electrode materials such as ITO (indium tin oxide). In the present embodiment, the comb-shaped electrodes 4 and 5 have a line width of 5 μm, and the distance between the electrodes (electrode interval) is 5 μm. Note that, the above-described line width and distance between the electrodes are just one example, and are not limited to this.

The display element is formed such that (i) the substrate 1 having the comb-shaped electrodes 4 and 5 and the substrate 2 are made to adhere to each other with a sealing agent (not illustrated), if necessary, via a spacer (not illustrated) such as plastic beads, glass fiber spacer, or the like, and (ii) the medium A is injected and sealed in an air gap between the substrates.

The medium A used in the present embodiment changes its optical anisotropy by applying the electric field. When an electric field Ej is applied to a material from outside, an electric displacement $Dij = \epsilon ij \cdot Ej$ is generated, and a dielectric constant ($\epsilon ij$) slightly changes. Because a refractive index (n) multiplied by itself is equivalent to the dielectric constant in frequency of light, the medium A may be a material which changes its refractive index by applying the electric field. Note that, it does not matter if the medium A is liquid, gas, or solid.

Thus, the display element of the present embodiment carries out display by using a phenomenon (electro-optic effect) that a refractive index of a material is changed by an outer electric field. Unlike a liquid crystal display element using a phenomenon that molecules (alignment directions of molecules) are rotated all together by applying the electric field, a direction of the optical anisotropy is almost unchanged, and the display is carried out by changing the magnitude of the optical anisotropy (mainly, an electronic polarization and an alignment polarization).

The medium A (i) may be a material which shows Pockel's effect or Kerr effect, that is, may be a material which is optically isotropic (isotropic in broad view) when no electric field is applied, and expresses the optical anisotropy when the electric field is applied, or (ii) may be a material which has the optical anisotropy when no electric field is applied, and loses the anisotropy and express the optical isotropy (isotropy in broad view) when the electric field is applied. A typical example of the medium is optically isotropic (isotropic in broad view) when no electric field is applied, and expresses an optical modulation when an electric field is applied (it is especially preferable that a double refraction rise when an electric field is applied).

Pockel's effect and Kerr effect (which can be seen in an isotropic phase state) are the electro-optic effects which are respectively in proportion to the electric field and the square of the electric field. When no electric field is applied, a material is in an isotropic phase so that the material is optically isotropic. When an electric field is applied, in a region where an electric field is applied, long-axis directions of compound molecules are aligned in an electric field direction so that the double refraction is expressed. Thus, it is possible to modulate transmissivity. For example, in case of a display mode using a material which shows Kerr effect, deviation of electrons in a single molecule is controlled by applying the electric field, so that each of the molecules randomly arranged rotates in order to change its direction. Therefore, responsive speed is very quick. Moreover, because the molecules are arranged randomly, a viewing angle is not limited, which is an advantage. Thus, the high-speed responsiveness of the present display element can be used for a field sequential color display device. Note that, in the medium A, materials which are roughly in proportion to the electric field or the square of the electric field can be treated as materials showing Pockel's effect or Kerr effect.

An example of the material showing Pockel's effect is an organic solid material (e.g. hexamine), and the like, but it is not limited to this. Various organic and inorganic materials showing Pockel's effect can be used as the medium A.

Examples of the material showing Kerr effect are PLZT (Lead Zirconium Titanate, doped with a little lanthanum; La-modified lead zirconate titanate), liquid crystal materials shown by the following structural formulas (20) to (23), and the like. However, the examples are not limited to them.

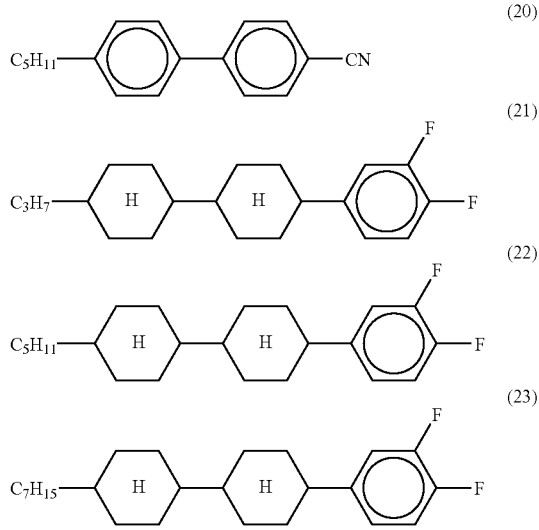

Kerr effect is observed in a medium which is transparent with respect to incoming light. Therefore, the material showing Kerr effect is used as a transparent medium. With an increase in temperature, the phase of the liquid crystal material normally transits from a liquid crystal phase having a short-distance order to the isotropic phase having randomly aligned molecules. That is, Kerr effect of the liquid crystal material can be seen in a liquid in the isotropic phase state at a temperature more than a liquid crystal phase/isotropic phase transition temperature, not in a nematic phase. The liquid crystal material is used as transparent dielectric liquid.

When the dielectric liquid such as the liquid crystal material is in a high operating environmental temperature (heat temperature), the phase of the dielectric liquid becomes the isotropic phase state. Therefore, when using the dielectric liquid such as the liquid crystal material as the medium, in order to use the dielectric liquid which is in a liquid state and transparent, that is, transparent with respect to visible light, for example, (1) it is possible to heat the dielectric liquid by heating means such as heater (not illustrated) provided around the medium layer 3, so that the dielectric liquid is heated more than its clearing point, or (2) it is possible to heat the dielectric liquid by heat radiation from a back light, heat conduction from the back light and/or peripheral driving circuits (in this case, the back light and the peripheral driving circuit function as heating means), or the like, so that the dielectric liquid is heated to more than its clearing point, or (3) it is possible to heat the dielectric liquid by a sheet heater (heating means) attached as a heater to at least one of the substrates 1 and 2, so that the dielectric liquid is heated up to a predetermined temperature. In addition, in order to use the dielectric liquid in a transparent state, it is possible to use a material having the clearing point which is lower than a lower limit of an operating temperature range of the display element.

It is preferable that the medium A include the liquid crystal material. When using the liquid crystal material as the medium A, the liquid crystal material is, in broad view, a transparent liquid in the isotropic phase. In narrow view, it is preferable that the liquid crystal material include a cluster which is an assembly of molecules arranged in a certain direction and having the short-distance order. Note that, because the liquid crystal material is used in a transparent state with respect to visible light, the cluster is used also in a transparent (optically isotropic) state with respect to visible light.

On this account, as described above, temperature control of the display element may be carried out by using heating means such as heater. As described in Japanese Laid-Open Patent Application Tokukaihei 11-183937/1999 (published on Jul. 9, 1999), a polymeric material which is divided into small regions, or the like may be used for the medium layer 3. Moreover, for example, diameter of the liquid crystal material is made to be 0.1 μm or less. That is, the liquid crystal material is made to be minute droplets each having smaller diameter than light wavelength. In this way, light scattering is suppressed and the liquid crystal material is in a transparent state. Furthermore, it may be possible to use a liquid crystal compound which is transparent and is in the isotropic phase at operating environmental temperatures (room temperatures). It is possible to ignore the light scattering when the diameter of the liquid crystal material is 0.1 μm or less, or when axis (major axis) of the cluster is 0.1 μm or less, that is, when the diameter of the liquid crystal material and the axis (major axis) of the cluster are smaller than the light wavelength (incoming light wavelength). On this account, when the axis of the cluster is 0.1 μm or less, the cluster is also transparent with respect to visible light.

As described above, the medium A is not limited to materials which show Pockel's effect or Kerr effect. As to molecular arrangement, the medium A may have an orderly structure in cubic symmetry which is smaller than the light wavelength (for example, nano-scale), and may show a cubic phase which is optically isotropic (see documents such as: Kazuya Saito, et al, "Thermodynamics of a unique thermo-tropic liquid crystal having optical isotropy", Liquid Crystal, 2001, Vol. 5, No. 1; Hirotsugu Kikuchi, et al, "Polymer-stabilized liquid crystal blue phases", pp. 64-68, [online], Sep. 2, 2002, Nature Materials, [Accessed on July 10], URL: http://www.nature.com/naturematerials; Makoto Yoneya, "Examining nano-structured liquid crystal phase by molecule simulator", Liquid crystal, 2003, Vol. 7, No. 3, pp. 238-245; and D. Demus, et al, "Handbook of Liquid Crystals Low molecular Weight Liquid Crystal", Wiley-VCH, 1998, vol. 2B, pp. 887-900). The cubic phase is one of liquid crystal phases of the liquid crystal material which can be used as the medium A. An example of the liquid crystal material showing the cubic phase is, for example, BABH8 which is shown by the structural formula (1) of the Embodiment 1. When an electric field is applied to such a liquid crystal material, its fine structure is distorted, so that it becomes possible to induce the optical modulation.

In a temperature range from 136.7° C. to 161° C., the grating constant is about 6 nm which is less than one tenth of the optical wavelength, so that BABH8 is in such cubic phase that the orderly structure in the cubic symmetry is smaller than the light wavelength. BABH8 has the orderly structure which is smaller than the light wavelength, and shows the optical isotropy in the above-mentioned temperature range when no electric field is applied. Therefore, satisfactory black display can be carried out under crossed nicols.

While, the temperature of BABH8 is controlled by the above-mentioned heating means to be between 136.7° C. and 161° C., and an electric field is applied between the comb-shaped electrodes 4 and 5. This causes a structure (orderly structure) having the cubic symmetry to be distorted. That is, in the above-mentioned temperature range, BABH8 is isotropic when no electric field is applied, and expresses the anisotropy when an electric field is applied (magnitude of the optical anisotropy varies).

Therefore, the double refraction is generated in the medium layer 3, so that the display element can carry out satisfactory white display. Note that, the double refraction is generated in a fixed direction, and its size changes according to electric field application. A voltage transmissivity curve shows a relationship between a voltage and transmissivity, the voltage being applied between the comb-shaped electrodes 4 and 5. The voltage transmissivity curve draws a stable curve in a temperature range from 136.7° C. to 161° C., that is, in a wide temperature range (about 20K). On this account, when BABH8 is used as the medium A, it is extremely easy to control the temperature. That is, the medium layer 3 made of BABH8 is thermally in a stable phase, so that sudden temperature dependency does not occur, and it is extremely easy to control the temperature.

Moreover, as the medium A, it is possible to realize a system which is filled with assemblies each of which is constituted of liquid crystal molecules aligned in a radical pattern and has a size smaller than the light wavelength, and the system which is optically isotropic. To realize this, it is possible to use a technique of liquid crystal microemulsion described in Jun Yamamoto, "Liquid crystal micro emulsion", Liquid crystal, 2000, Vol. 4, No. 3, pp.248-254, or a technique of liquid crystal/fine particle dispersal system described in Yukihide Shiraishi, et al, "Palladium nano particle protected by liquid crystal molecule—Preparation and application to guest-host mode liquid crystal display element", Collected papers on polymer, December, 2002, Vol. 59, No. 12, pp.753-759 (which recites a mixture system in which fine particles are mixed in a solvent (liquid crystal), hereinafter referred to as liquid crystal fine particle dispersal system). When an electric field is applied to them, the assemblies each having a radial pattern are distorted, and it is possible to induce the optical modulation.

These liquid crystal materials may be (i) a liquid crystal material which is made of a single material showing liquid crystallinity, (ii) a liquid crystal material in which a plurality of materials are mixed so as to show liquid crystallinity, (iii) a liquid crystal material in which other non-liquid crystal material is mixed in the plurality of materials. Moreover, it is possible to apply polymer/liquid crystal dispersal system materials described in Shiro Matsumoto, et al, "Fine droplets of liquid crystals in a transparent polymer and their response to an electric field", Appl. Phys, Lett., 1996, vol. 69, pp. 1044-1046. Furthermore, it is possible to add a gelling agent described in Takeshi Kato, et al, "Fast and High-Contrast Electro-optical Switching of Liquid-Crystalline Physical Gels: Formation of Oriented Microphase-Separated Structures", Adv. Funct. Mater., April, 2003, Vol. 13, No. 4, pp. 313-317.

It is preferable that the medium A contain polar molecules. For example, nitrobenzene is preferable as the medium A. Note that, nitrobenzene is one of the mediums which show Kerr effect.

Further, the materials recited as the medium sealed into the dielectric material layer 3 of the Embodiments 1 and 2 can be used as the medium A. Examples thereof are a smectic D phase (SmD), liquid crystal micro emersion, lyotropic liquid crystal, liquid crystal fine particle dispersal system, dendrimer, cholesteric blue phase, cholesteric blue phase, smectic blue phase, and the like.

As described above, as long as the optical anisotropy (refractive index, orientational order parameter) of a material is changed by applying an electric field, the material used as the medium A of the display element of the present embodiment may be (i) a material which shows Pockel's effect or Kerr effect, (ii) a material made of molecules in the cubic phase, the smectic phase, cholesteric blue phase, or the smectic blue phase, (iii) the lyotropic liquid crystal in the micelle phase, the reversed micelle phase, the sponge phase, or the cubic phase, or (iv) the liquid crystal fine particle dispersal system in the micelle phase, the reversed micelle phase, the sponge phase, or the cubic phase. In addition, the medium A may be the liquid crystal microemulsion, the dendrimer (dendrimer molecule), amphiphilic molecule, copolymer, or other polar molecules than those above.

Moreover, the medium is not limited to the liquid crystal material, and it is preferable that the medium have the orderly structure (orientational order) which is smaller than the light wavelength when an electric field is applied or when no electric field is applied. When the orderly structure is smaller than the light wavelength, the medium is optically isotropic. Therefore, by using the medium in which an assembly of orderly aligned molecules (orientational order) has a size smaller than the light wavelength when an electric field is applied or when no electric field is applied, a display state when an electric field is applied and a display state when no electric field is applied are surely varied.

In the following present embodiment, pentyl-cyano-biphenyl (5CB) shown by the constitutional formula (1) is used as the medium A, but the medium A is not limited to this. Instead of 5CB, it is possible to apply various materials described above.

According to the present embodiment, ITO is used as the comb-shaped electrodes 4 and 5 which have a line width of 5 μm, and the distance between which is 5 μm. The thickness of the medium layer 3 (that is, a distance between the substrates 1 and 2) is 10 μm. 5CB is used as the medium A. 5CB is heated by the outer heating means (heating means) so as to keep the temperature which is just above a nematic phase/isotropic phase transition temperature (a little higher temperature than the phase transition temperature, for example +0.1K). When an electric field is applied, the tranmissivity can be changed. Note that, 5CB is in the nematic phase at a temperature below 33.3° C., and in the isotropic phase at a temperature of 33.3° C. or higher.

In the present embodiment, as required, a dielectric thin film (alignment film, not illustrated) to which a rubbing treatment is carried out may be formed onto each of counter surfaces of the substrates 1 and 2. By forming the dielectric thin film on an inner side of at least one of the substrates 1 and 2, it is possible to improve the orientational order parameter, and possible to obtain better electro-optic effect such as Kerr effect.

The dielectric thin film may be an organic film or an inorganic film. Moreover, the dielectric thin film is not especially limited as long as the above-mentioned alignment effect can be obtained. However, when the dielectric thin film is constituted of the organic thin film, a satisfactory alignment effect can be obtained. Therefore, it is preferable that the organic thin film be used for the dielectric thin film. In the organic thin film, polyimide has high stability and high reliability, and shows extremely excellent alignment effect. Therefore, by using polyimide as the dielectric thin film material, it is possible to provide the display element having satisfactory display performance.

The dielectric thin film may be formed on the inner side of at least one of the substrates 1 and 2, for example, formed on the substrate 1 such that the dielectric thin film covers the comb-shaped electrodes 4 and 5. A thickness of the dielectric thin film is not especially limited. Moreover, the rubbing treatment is carried out with respect to the dielectric thin film formed on the substrate 1 and with respect to the dielectric thin film formed on the substrate 2, for example, in a reverse direction along the comb-teeth portions 4*a* and 5*a* of the comb-shaped electrodes 4 and 5.

Figure 17:
FIG. 17(a) is a cross sectional view schematically illustrates a medium of the display element when no electric field is applied.
FIG. 17(b) is a cross sectional view schematically illustrates the medium of the display element when an electric field is applied.
Figure 17:
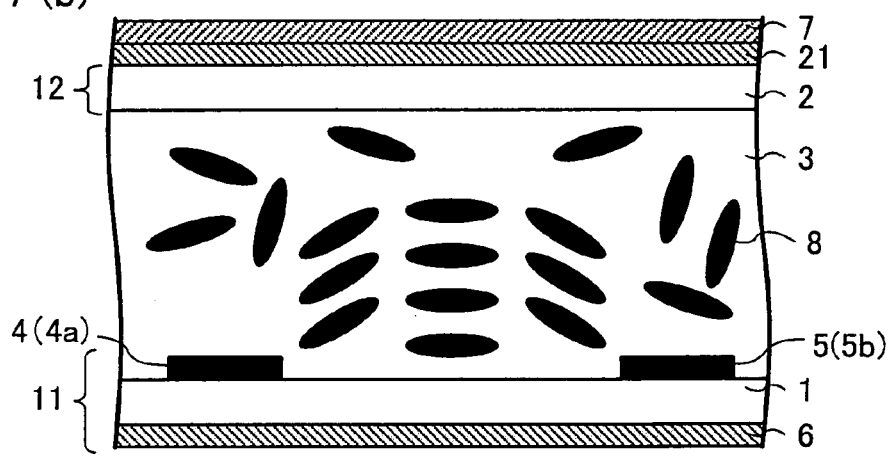
Figure 19:
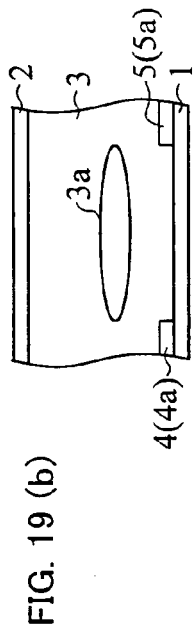
FIGS. 19(a) to 19(h) are cross sectional views schematically illustrating (i) shapes and main axis directions of average optical indicatrixes of the medium when no electric field is applied and when an electric field is applied.
Figure 19:
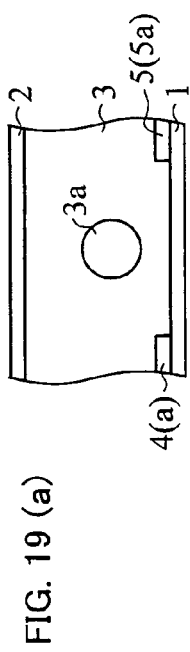
Figure 19:
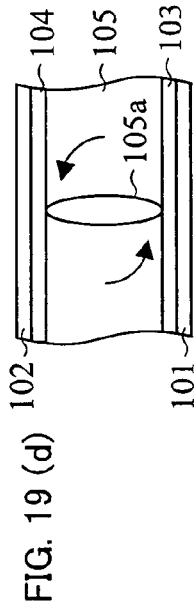
Figure 19:
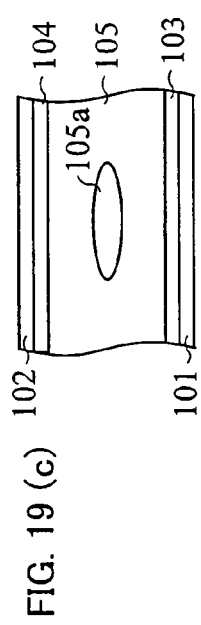
Figure 19:
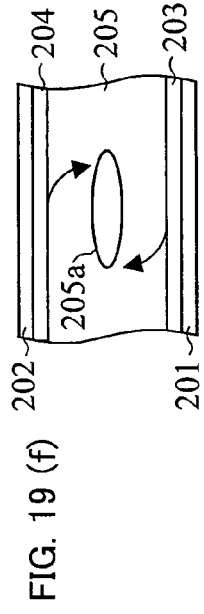
Figure 19:
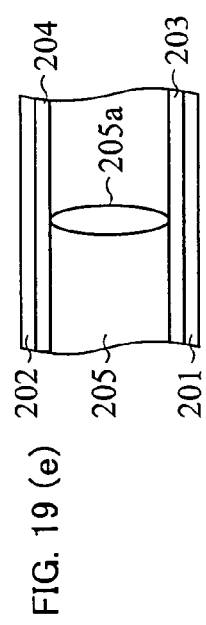
Figure 19:
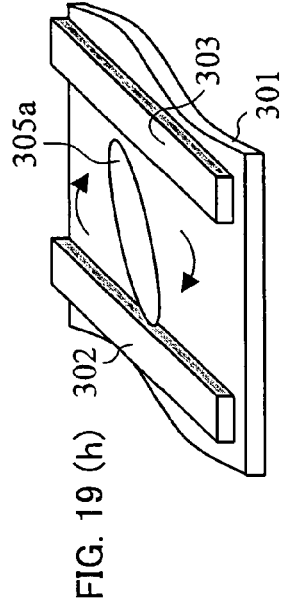
Figure 19:
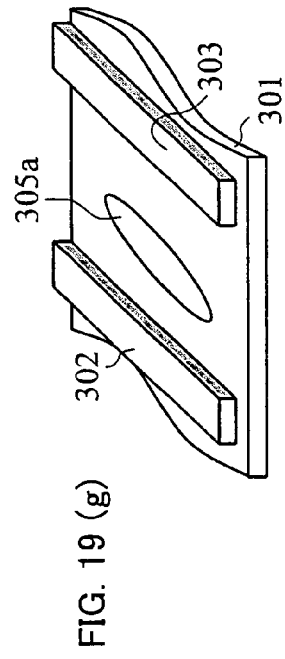

The following description explains a display principle of the display element of the present embodiment with reference to FIGS. 17(*a*), 17(*b*), 18, and FIGS. 19(*a*) to 19(*h*).

In the following description, a transmission-type display element is used as the display element. The transmission-type display element is optically almost isotropic, preferably isotropic when no electric field is applied, and is optically anisotropic when an electric field is applied. However, the present invention is not limited to this.

Figure 18:
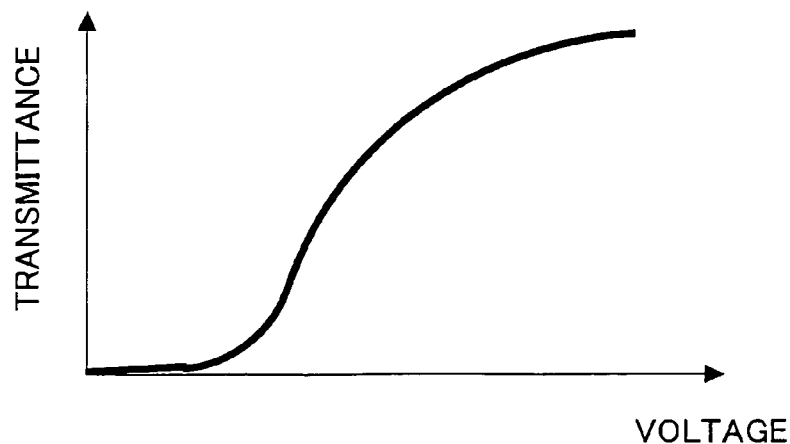
FIG. 18 is a graph illustrating a relation in the display element between an applied voltage and transmittance.

FIG. 17(*a*) is a cross-sectional view schematically illustrating the medium of the display element when no electric field is applied (OFF state). FIG. 17(*b*) is a view schematically illustrating a cross section of the display element when an electric field is applied (ON state). FIG. 18 is a graph showing a relationship between an applied voltage and transmissivity in the display element. FIGS. 19(*a*) to 19(*h*) are cross-sectional views schematically illustrating differences of the display principle between the display element of the present embodiment and the conventional liquid crystal display element. The differences are shown by average shapes of refractive index ellipsoids of the medium (shapes of cut surfaces of refractive index ellipsoids) and their main axis directions, when no electric field is applied (OFF state) and when an electric field is applied (ON state). That is, FIG. 19(*a*) is a cross-sectional view illustrating the display element of the present embodiment when no electric field is applied (OFF state). FIG. 19(*b*) is a cross-sectional view illustrating the display element of the present embodiment when an electric field is applied (ON state). FIG. 19(*c*) is a cross-sectional view illustrating a TN (Twisted Nematic) mode liquid crystal display element when no electric field is applied. FIG. 19(*d*) is a cross-sectional view illustrating the TN mode liquid crystal display element when an electric field is applied. FIG. 19(*e*) is a cross-sectional view illustrating a VA (Vertical Alignment) mode liquid crystal display element when no electric field is applied. FIG. 19(*f*) is a cross-sectional view illustrating the VA mode liquid crystal display element when an electric field is applied. FIG. 19(*g*) is a cross-sectional view illustrating an IPS (In Plane Switching) mode liquid crystal display element when no electric field is applied. FIG. 19(*h*) is a cross-sectional view illustrating the IPS mode liquid crystal display element when an electric field is applied.

Generally, the refractive index of a material is not isotropic but varies in different directions. Here, a direction parallel to a substrate surface (in-plane direction of the substrate) and opposite to the comb-shaped electrodes 4 and 5 is x, and a direction perpendicular to the substrate surface (normal direction of the substrate) is y, and a direction parallel to the substrate surface (in-plane direction of the substrate) and perpendicular to the direction opposite to the comb-shaped electrodes 4 and 5 is z. Then, anisotropy of the refractive index is shown by an ellipsoid (refractive index ellipsoid) shown by the following equation (1) using an arbitrary orthogonal coordinate system ($X_1$, $X_2$, $X_3$) (for example, see Ryoichi Yamamoto, et al, "Organic electro-optic material", National Technical Report, December, 1976, Vol. 22, No. 6, pp.826-834).

$$\sum_{ij}\left(\frac{1}{n_{ij}^2}\right)X_i X_j = 1 \tag{1}$$

($nji=nij, i, j=1, 2, 3$)

When the equation (1) is rewritten by using a coordinate system ($Y_1, Y_2, Y_3$) of the main axis direction of the ellipsoid, the following equation is obtained.

$$\frac{Y_1^2}{n_1^2} + \frac{Y_2^2}{n_2^2} + \frac{Y_3^3}{n_3^3} = 1 \tag{2}$$

$n_1$, $n_2$, and $n_3$ (hereinafter referred to as nx, ny, and nz) are called main refractive indices, and correspond to half in length of three main axes in the ellipsoid. In case of a light wave which proceeds from an origin in a direction perpendicular to a surface of $Y_3=0$, the light wave has polarization components in $Y_1$ direction and $Y_2$ direction. The refractive indices of the components in $Y_1$ direction and $Y_2$ are respectively nx and ny. Generally, a light proceeding in an arbitrary direction goes through the origin, and a surface perpendicular to a direction in which the light wave proceeds is a cut surface of the refractive index ellipsoid. Directions of main axes of this ellipse are polarization component directions of the light wave. Half of length of the main axis corresponds to the refractive index.

The following description explains the differences of the display principle between the display element of the present embodiment and the conventional liquid crystal display element. TN mode, VA mode, and IPS mode are used as examples of the modes of the conventional liquid crystal display element.

As illustrated in FIGS. 19(*c*) and 19(*d*), the TN mode liquid crystal display element is structured such that a liquid crystal layer 105 is sandwiched between a pair of substrates 101 and 102 which are provided face to face, and transparent electrodes 103 and 104 (electrode) are respectively provided on the substrates 101 and 102. When no electric field is applied, liquid crystal molecules of the liquid crystal layer 105 are aligned such that the liquid crystal molecules are helically twisted in a long-axis direction. When an electric field is applied, the liquid crystal molecules are aligned such that the long-axis direction of each of the liquid crystal molecules is along an electric field direction. As illustrated in FIG. 19(*c*), an average refractive index ellipsoid 105*a* is such that its main axis direction (long-axis direction) is parallel to the substrate surface (in-plane direction of the substrate) when no electric field is applied. As illustrated in FIG. 19(*d*), the average refractive index ellipsoid 105*a* is such that its main axis direction turns to the normal direction of the substrate when an electric field is applied. That is, the main axis direction changes (the refractive index ellipsoid 105*a* rotates) depending on whether or not an electric field is applied, and the shape of the refractive index ellipsoid 105*a* does not change regardless of whether an electric field is applied or not.

As illustrated in FIGS. 19(*e*) and 19(*f*), the VA mode liquid crystal display element is structured such that a liquid crystal layer 205 is sandwiched between a pair of substrates 201 and 202 which are provided face to face, and transparent electrodes 203 and 204 (electrode) are respectively provided on the substrates 201 and 202. When no electric field is applied, liquid crystal molecules of the liquid crystal layer 205 are aligned such that the long-axis direction of each of the liquid crystal molecules is substantially perpendicular to the substrate surface. When an electric field is applied, the liquid crystal molecules are aligned such that the long axis direction of each of the liquid crystal molecules turns perpendicular to an electric field. As illustrated in FIG. 19(e), an average refractive index ellipsoid 205a is disposed such that the main axis direction (long-axis direction) turns to the normal direction of the substrate when no electric field is applied. As illustrated in FIG. 19(f), the average refractive index ellipsoid 205a is disposed such that the main axis direction is parallel to the substrate surface (in-plane direction of the substrate) when an electric field is applied. That is, in case of the VA mode liquid crystal display element, just like the TN mode liquid crystal display element, the shape of the refractive index ellipsoid 205a is elliptic when an electric field is applied and when no electric field is applied, and the main axis direction changes (the refractive index ellipsoid 205a rotates) depending on whether or not an electric field is applied, and the shape of the refractive index ellipsoid 205a does not change regardless of whether or not an electric field is applied.

As illustrated in FIGS. 19(f) and 19(g), the IPS mode liquid crystal display element is structured such that a pair of electrodes 302 and 303 are provided face to face on a substrate 301. When an electric field is applied from the electrodes 302 and 303 to a liquid crystal layer sandwiched between the substrate 301 and a counter substrate (not illustrated), liquid crystal molecules of the liquid crystal layer change their alignment directions (main axis direction (long-axis direction) of the refractive index ellipsoid 305a). Therefore, it is possible to realize different display states depending on whether or not an electric field is applied. That is, in case of the IPS mode liquid crystal display element, just like the TN mode liquid crystal display element and the VA mode liquid crystal display element, the shape of the refractive index ellipsoid 305a is elliptic when an electric field is applied as illustrated in FIG. 19(f) and when no electric field is applied as illustrated in FIG. 19(g), and the main axis direction changes (the refractive index ellipsoid 305a rotates) depending on whether or not an electric field is applied, and the shape of the refractive index ellipsoid 305a does not change.

Thus, according to the conventional liquid crystal display elements, the liquid crystal molecules are aligned in a certain direction when no electric field is applied. When an electric field is applied, the liquid crystal display molecules change their alignment directions so as to carry out the display (modulation of transmissivity). That is, although the shape of the refractive index ellipsoid does not change, the main axis direction of the refractive index ellipsoid is rotated (changed) by applying an electric field, so that the display is carried out. Further, the shape of the refractive index ellipsoid substantially does not change when no electric field is applied and when an electric field is applied. That is, according to the conventional liquid crystal display elements, the orientational order parameter of the liquid crystal molecules is substantially constant, and the display (modulation of transmissivity) is carried out by changing the alignment directions.

Meanwhile, as illustrated in FIGS. 19(a) and 19(b), according to the display element of the present embodiment, the refractive index ellipsoid is globular when no electric field is applied, that is, the refractive index ellipsoid is optically isotropic when no voltage is applied ($nx=ny=nz$, that is, orientational order parameter is nearly equal to 0 in view of a scale not less than visible light).

Moreover, the refractive index ellipsoid is optically anisotropic when an electric field is applied ($nx>ny$, orientational order parameter >0 at a scale not less than visible light). Note that, nx is a main refractive index of a direction parallel to the substrate surface (in-plane direction of the substrate) and opposite to the comb-shaped electrodes 4 and 5, and ny is a main refractive index of a direction perpendicular to the substrate surface (normal direction of the substrate), and nz is a main refractive index of a direction parallel to the substrate surface (in-plane direction of the substrate) and perpendicular to the direction opposite to the comb-shaped electrodes 4 and 5.

Further, a long-axis direction of the refractive index ellipsoid when an electric field is applied is parallel to a direction of the electric field (in case of a medium whose dielectric anisotropy is positive), or perpendicular to the direction of the electric field (in case of a medium whose dielectric anisotropy is negative).

Meanwhile, in the conventional liquid crystal display element, the long-axis direction of the refractive index ellipsoid is rotated by an electric field application, so that the display is carried out. Therefore, the long-axis direction of the refractive index ellipsoid is not necessarily parallel or perpendicular to the electric field direction.

Thus, according to the display element of the present embodiment, the direction of the optical anisotropy is fixed (electric field application direction do not change), and the display is carried out by, for example, modulating the orientational order parameter. That is, in the display element according to the present embodiment, the magnitude in the optical anisotropy of the medium itself (or its orientational order parameter smaller than the wavelength of the visible light) varies. Therefore, the display element of the present embodiment is totally different from the conventional display elements in terms of the display principle.

As illustrated in FIG. 17(a), according to the display element of the present embodiment, the medium A injected and sealed in a space between the substrates 1 and 2 is in the isotropic phase when no electric field is applied to the comb-shaped electrodes 4 and 5, and the medium is optically isotropic. On this account, the black display is carried out.

Meanwhile, as illustrated in FIG. 17(b), when an electric field is applied to the comb-shaped electrodes 4 and 5, each of the molecules 8 in the medium A is aligned such that the long-axis direction of the molecule 8 is along the electric field formed between the comb-shaped electrodes 4 and 5. Therefore, the double refractive phenomenon is expressed. As illustrated in FIG. 18, thanks to the double refractive phenomenon, it is possible to modulate transmissivity of the display element according to the electric field between the comb-shaped electrodes 4 and 5.

At a temperature which is very far from a phase transition temperature (transition point), a high voltage is required in modulating the transmissivity of the display element. However, at a temperature which is just above the transition point, it is possible to adequately modulate the transmissivity of the display element with a voltage between 0V and 100V.

For example, according to (i) Demus, et al, "Handbook of Liquid Crystals Low molecular Weight Liquid Crystal", Wiley-VCH, 1998, vol. 1, pp. 484-485 and (ii) Ryoichi Yamamoto, et al, "Organic electro-optic material", National Technical Report, December, 1976, Vol. 22, No. 6, pp.826-834, the refractive index of the electric field direction and the refractive index of the direction perpendicular to the electric field direction are defined as $n//$ and $n^\perp$, respectively. A relationship between double refractive change ($Rtac=n//-n^\perp$) and the outer electric field, i.e., the electric field E (V/m) is shown by $Rtac=\lambda \cdot Bk \cdot E^2$. Note that, $\lambda$ is a wavelength of the incoming light in a vacuum, and Bk is Kerr constant (m/V$^2$), and E is an applied electric field intensity (V/m).

It is well-known that, with a rise in temperature (T), Kerr constant B decreases according to a function proportional to 1/(T−Tni). Even though it is possible to drive the molecules with low electric field intensity when the temperature is around the transition point (Tni), high electric intensity is steeply required with a rise in temperature (T). On this account, at a temperature which is very far from the transition temperature (a temperature which is enough higher than the transition temperature), a high voltage is required in modulating the transmissivity of the display element. However, at a temperature which is just above the phase transition point, it is possible to adequately modulate the transmissivity of the display element with a voltage of about 100V or less.

The medium layer 3 can function as a shutter-type display element in which the optical anisotropy is expressed (the magnitude of the optical anisotropy varies) with a rise in the orientational order parameter in the electric field application direction and its transmissivity changes. Therefore, the maximal transmissivity is realized when the anisotropy direction is at an angle of 45° with respect to polarizing plate absorption axes which are orthogonal with each other. Note that, when a direction in which the optical anisotropy of the medium A is expressed is at an angle of ±θ (° C.) with respect to the polarizing plate absorption axes, the transmissivity (P) is estimated by P(%)=Sin 2(2θ). For example, when an angle θ is 45°, the transmissivity is 100%. Because humans feel that the transmissivity of 90% or more is the maximal brightness, and humans feel that the brightness is maximum when θ is 35°<θ<55°.

As illustrated in FIG. 20, in the present embodiment, the polarizing plates 6 and 7 which are respectively provided on the substrates 1 and 2 are formed such that the absorption axis 6a of the polarizing plate 6 and the absorption axis 7a of the polarizing plate 7 be formed so as to be orthogonal with each other, that is, the polarizing plate absorption axis directions be orthogonal with each other. The absorption axes 6a of the polarizing plate 6 is at an angle of 45° with respect to a direction in which the comb-teeth portions 4a of the comb-shaped electrode 4 extends. The absorption axes 7a of the polarizing plates 7 is at an angle of 45° with respect to a direction in which the comb-teeth portion 5a of the comb-shaped electrode 5 extends. On this account, the absorption axes 6a of the polarizing plate 6 is at an angle of 45° with respect to the electric field application direction of the comb-shaped electrode 4 and, the absorption axes 7a of the polarizing plate 7 is at an angle of 45° with respect to the electric field application direction of the comb-shaped electrode 5.

The phase retardation plate 21 is provided between the substrate 2 and the polarizing plate 7, and has the biaxial optical anisotropy. When the main refractive indices in the in-plane direction of the phase retardation plate 21 are nx1 and ny1, and when the main refractive index of the normal direction is nz1, the phase retardation plate 21 is provided such that a direction of ny1 is parallel to or orthogonal to the absorption axis 7a of the polarizing plate 7 formed on a surface of the phase retardation plate 21 on which surface the substrate 2 is not provided. That is, when the main refractive indices of the phase retardation plate 21 in the refractive index ellipsoid are nx1, ny1, and nz1, an nx1 direction and an ny1 direction are directions parallel to the in-plane direction of the substrate 2 and the in-plane direction of the phase retardation plate 21. Moreover, an nz1 direction is a normal direction of the substrate 2 surface and a normal direction of the phase retardation plate 21 surface. Furthermore, the ny1 direction is parallel to or orthogonal to the absorption axis 7a of the adjacent polarizing plate 7.

Figure 8:
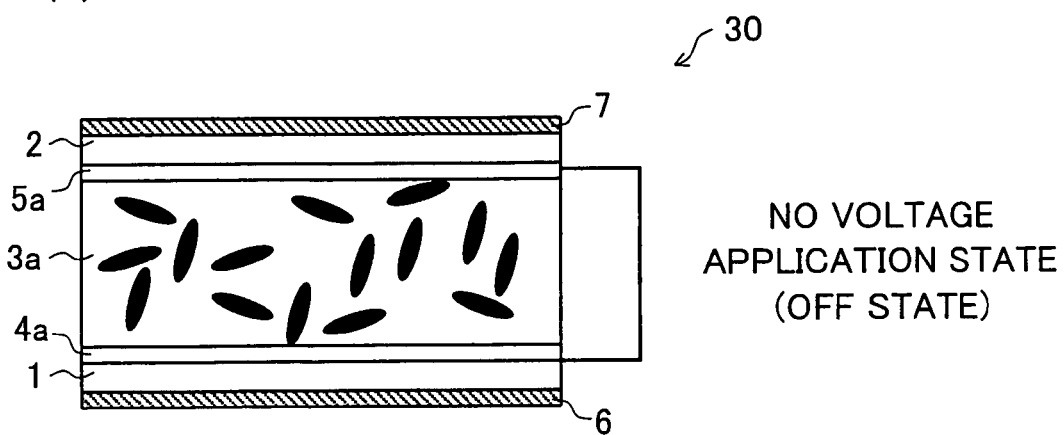
FIG. 8(a) is a cross sectional view illustrating the conventional display element when no electric field is applied.
FIG. 8(b) is a cross sectional view illustrating the conventional display element when an electric field is applied.
Figure 8:
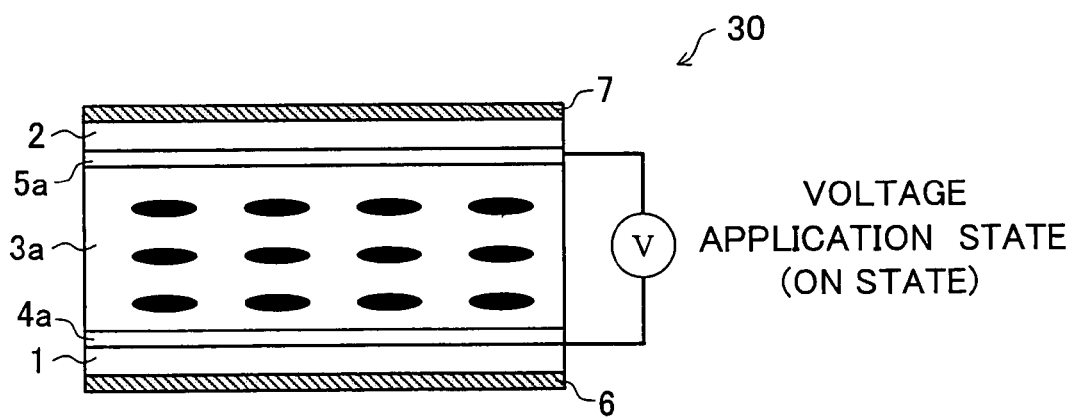

For the sake of comparison, by using the display element which have the above-mentioned arrangement but do not have the phase retardation plate 21, the contrast is measured at a polar angle between 0° C. and 85° C. with respect to a polarizing plate absorption axis direction (direction A) and with respect to a direction (direction B) which slants from the polarizing plate absorption axis at an angle of 45°. FIG. 8 shows the measurement results. Note that, the contrast is measured by using "EZ Contrast" produced by ELDIM (France).

Figure 22:
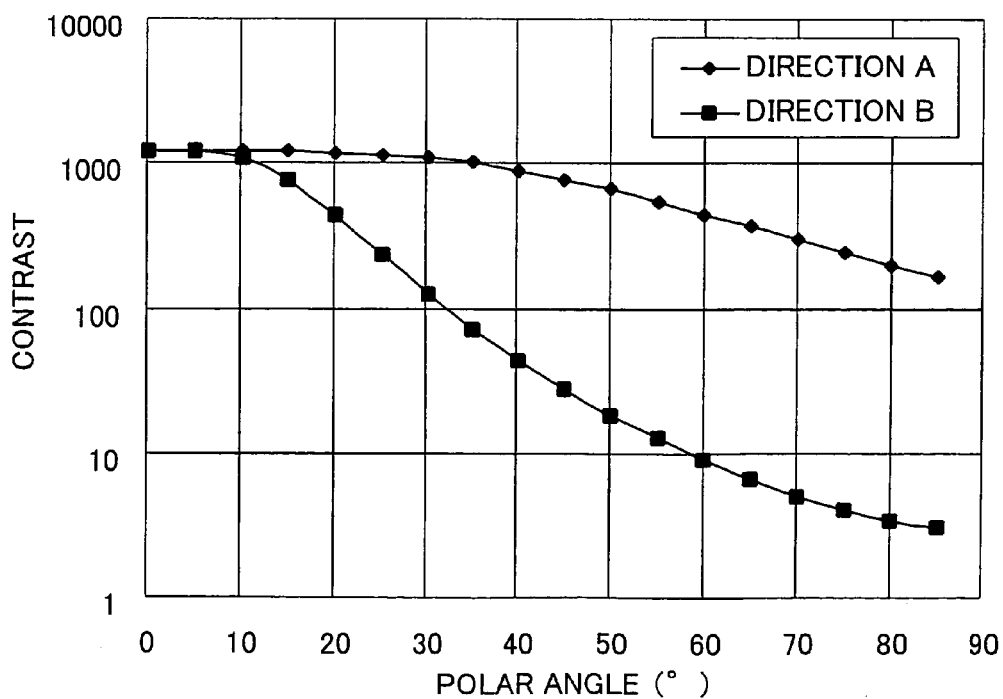
FIG. 22 is a graph illustrating a relation, in the display element that does not include a retardation plate, between a polar angle and contrast.

According to the results shown in FIG. 22, when the phase retardation plate 21 is not provided, the contrast in the direction A is high, while the contrast in the direction B steeply decreases with an increase in the polar angle. It is practically difficult for such display elements to be applied to display devices such as TVs and PC monitors. In order to use the display element without causing any practical problems, it is preferable that the contrast be 10 or more.

By using various phase retardation plates 21 which respectively have different retardation values (Rxz, Ryz), the contrast is measured from the direction B at a polar angle of 60° C. Note that, the values of Rxz and Ryz are shown as follows.

$Rxz(\text{nm})=d1\times(nx1-nz1)$ $Ryx(\text{nm})=d1\times(ny1-nz1)$

Figure 23:
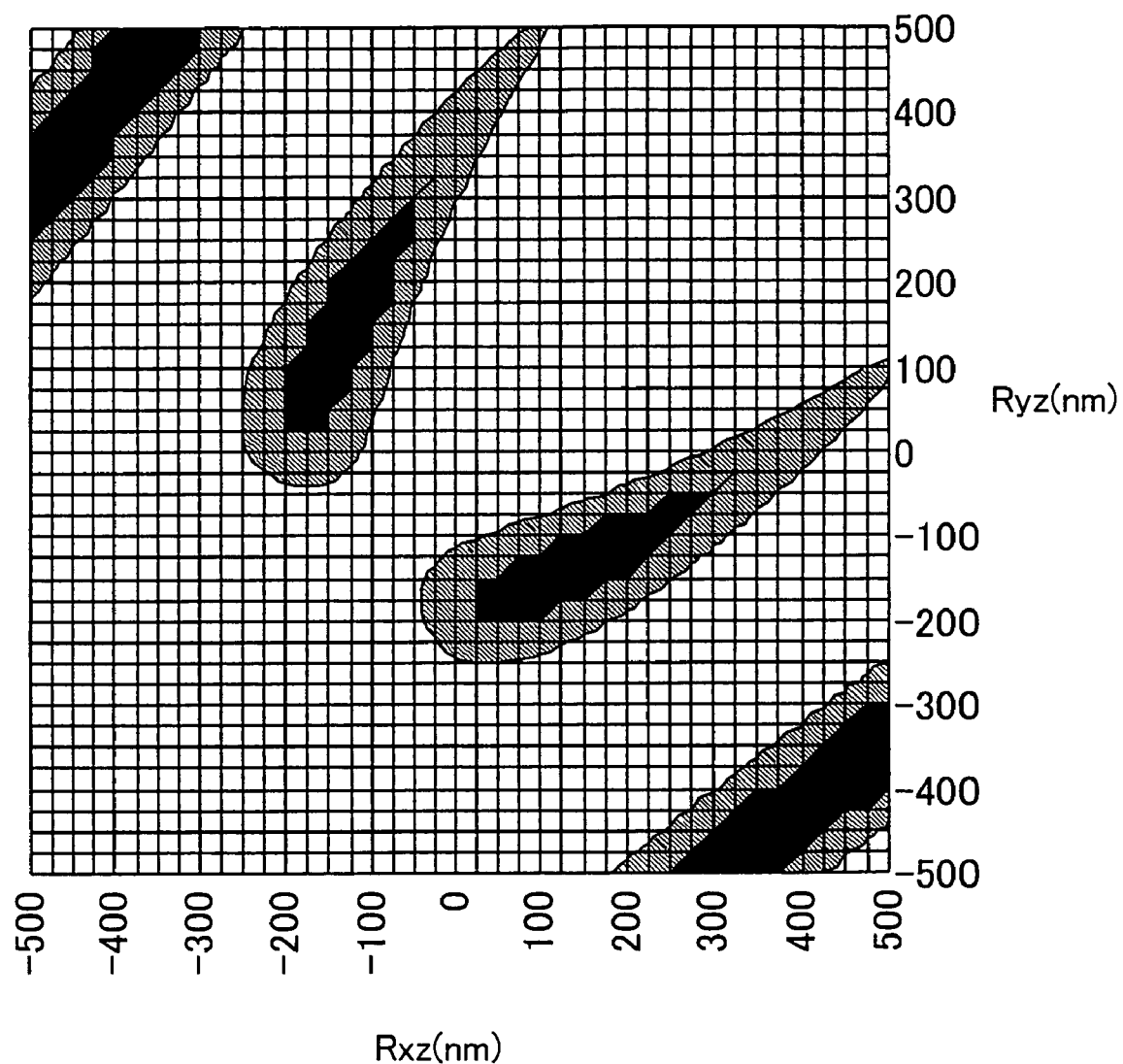
FIG. 23 is a diagram illustrating a relation between (i) retardation of the retardation plate having biaxial optical anisotropy and (ii) contrast of the display element.

The phase retardation plate 21 (phase retardation film) has a thickness d1 of 100 μm, and an observing wavelength is 550 nm. FIG. 23 shows the results.

FIG. 23 shows the contrast when a horizontal axis is Rxz and a vertical axis is Ryz. In FIG. 23, the contrast is 20 or more in black regions, 10 or more in gray regions (hatched regions), and below 10 in colorless regions (no mark regions) even though the contrast is improved.

In order to use the display element without having any practical problems, it is preferable that the contrast be 10 or more. In order that the contrast is regarded as having been adequately improved, the contrast needs to be 20 or more.

Here, a point where the contrast is maximal is $(Rxz, Ryz)=(140 \text{ nm}, -140 \text{ nm})$, and $(Rxz, Ryz)=(-140 \text{ nm}, 140 \text{ nm})$.

Note that, around $(Rxz, Ryz)=(400 \text{ nm}, -400 \text{ nm})$ and $(Rxz, Ryz)=(-400 \text{ nm}, 400 \text{ nm})$, there are regions where the contrast is improved. However, in this case, coloring due to wavelength dispersion of the phase retardation plate 21 is observed greatly, which do not occur in the former case.

Figure 24:
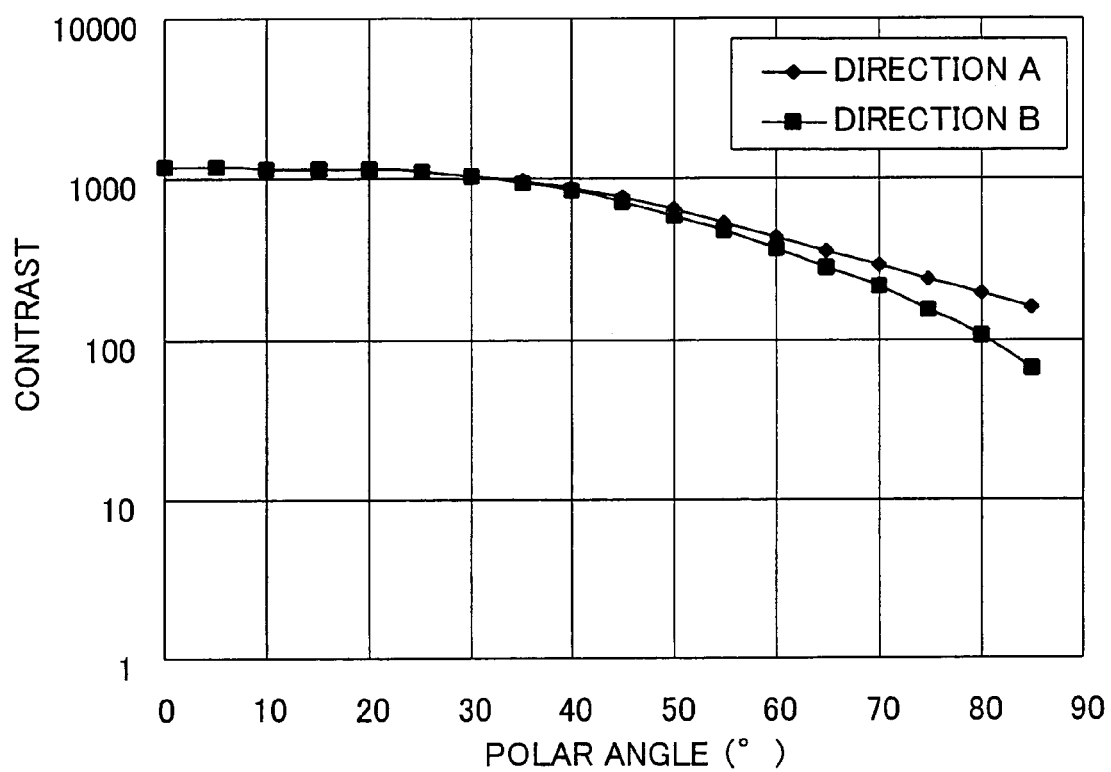
FIG. 24 is a graph illustrating the relation in the display element between the polar angle and the contrast in the condition where the contrast is maximal as shown in FIG. 23.

FIG. 24 shows results obtained by measuring the contrast in the directions A and B, at a polar angle between 0° C. and 85° C., and at the point where the contrast is maximal. By using the phase retardation plate 21 having the above-mentioned main refractive index and retardation, the contrast in the direction B is improved greatly as compared with a case where the phase retardation plate 21 is not provided, and the contrast in the direction A and the contrast in the direction B are almost the same. When such display elements are applied to the display devices such as TVs and PC monitors, there are no practical problems in terms of the viewing angle.

There are two optimal points, and the value of Rxz in one optimal point is the value of Ryz in the other optimal point, and the value of Ryz in one optimal point is the value of Rxz in the other optimal point. Therefore, even if the phase retardation plate 21 is rotated 90° C., the similar properties can be obtained.

Regions where the value of the contrast is 10 or more are shown by the following equations.

$$Rxz \geq 0,$$

$$Ryz \leq (225/500)Rxz - 125,$$

$$Ryz \geq (175/275)Rxz - 300,$$

$$Ryz \geq (500/500)Rxz - 400,$$

$$Ryz \geq -225,$$

or $$Ryz \geq 0,$$

$$Rxz \leq (225/500)Ryz - 125,$$

$$Rxz \geq (175/275)Ryz - 300,$$

$$Rxz \geq (500/500)Ryz - 400,$$

$$Rxz \geq -225.$$

Where the phase retardation plate 21 satisfies the above equations (that is, when the phase retardation plate satisfying the above equations is used as the phase retardation plate 21), it is possible to obtain the contrast of 10 or more. Note that, in other ranges of the phase retardation plate 21, there are ranges where the contrast is improved. However, a coloring phenomenon due to the wavelength dispersion is greatly observed in those ranges. When the phase retardation plate 21 satisfies the above equations, it is possible to prevent the coloring due to the wavelength dispersion.

Moreover, regions where the value of the contrast is 20 or more are shown by the following equations.

$$Rxz \geq 25,$$

$$Ryz \leq (125/250)Rxz - 175,$$

$$-200 \leq Ryz \leq -50,$$

$$Ryz \geq (250/300)Rxz - 300,$$

or $$Ryz \geq 25,$$

$$Rxz \leq (125/250)Ryz - 175,$$

$$-200 \leq Rxz \leq -50,$$

$$Rxz \geq (250/300)Ryz - 300.$$

When the phase retardation plate 21 satisfies the above equations, it is possible to obtain the contrast of 20 or more. Note that, in other ranges of the phase retardation plate 21, there are ranges where the contrast is improved. However, a coloring phenomenon due to the wavelength dispersion is greatly observed in those ranges. When the phase retardation plate 21 satisfies the above equations, it is possible to prevent the coloring due to the wavelength dispersion.

A contrast maximal point is about (Rxz=-Ryz). Moreover, (Rxz-Ryz) is about ½ of the observing wavelength λ (Rxz-Ryz≈½λ), that is, (Rxz-Ryz) is ½ of wavelength of transmitting light. When the phase retardation plate 21 satisfies the above equations, it is possible to obtain the maximal contrast.

A single phase retardation plate 21 is used in the present embodiment. However, similar effects can be obtained even when the phase retardation plate is divided into two, and those two phase retardation plates are respectively provided between the substrate 1 and the polarizing plate 6 (that is, between the pixel substrate 11 and the polarizing plate 6), and between the substrate 2 and the polarizing plate 7 (that is, the counter substrate 12 and the polarizing plate 7).

Figure 25:
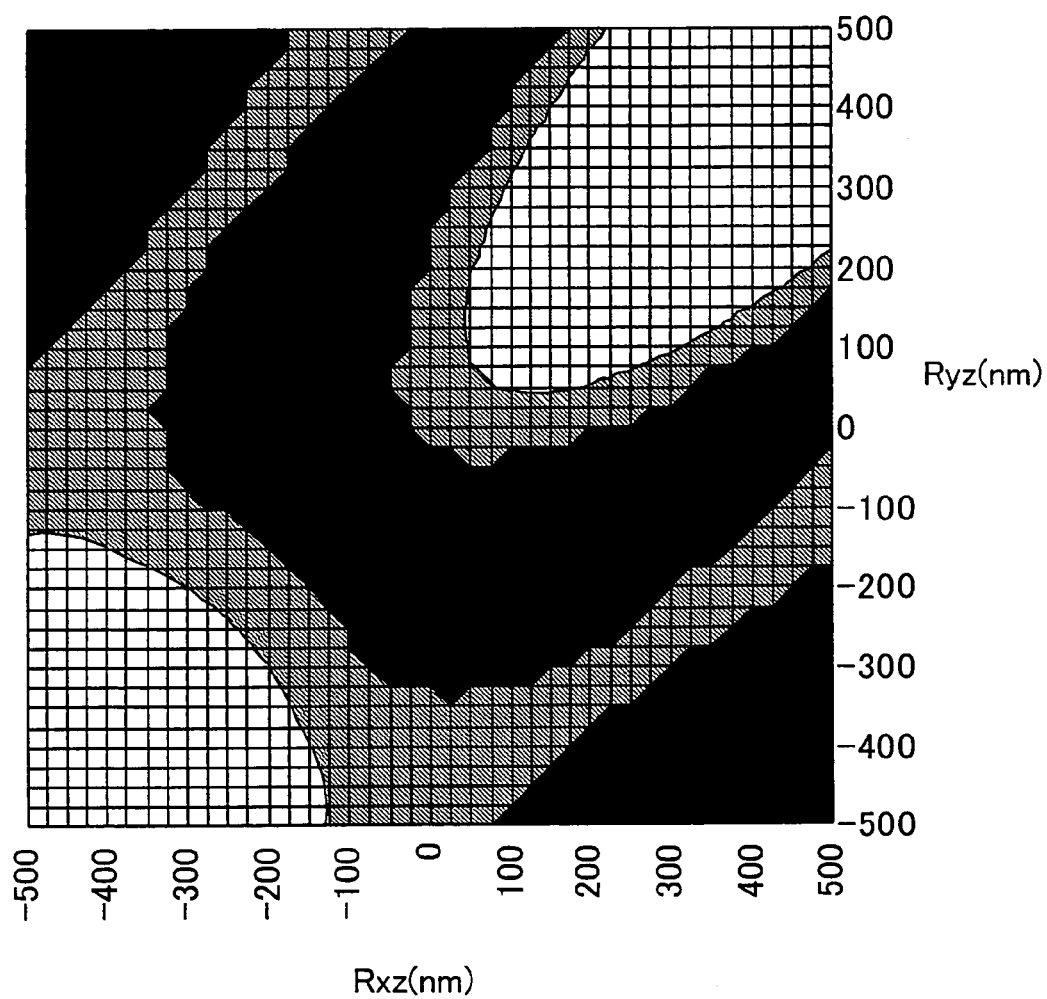
FIG. 25 is another diagram illustrating the relation between (i) the retardation of the retardation plate having biaxial optical anisotropy and (ii) the contrast of the display element.

FIG. 25 shows a contrast value (C2/C1) obtained by dividing the contrast value (hereinafter referred to as contrast C2), in the direction B at a polar angle of 60° C. in a case where the phase retardation plate 21 is provided, by the contrast value (hereinafter referred to as contrast C1), in the direction B at a polar angle of 60° C. in a case where the phase retardation plate 21 is not provided. In FIG. 25, a horizontal axis is Rxz and a vertical axis is Ryz. (C2/C1) is more than 2 in black regions, and (C2/C1) is more than 1 in gray regions (hatched regions), and (C2/C1) is 1 or less in colorless regions (no mark regions). Therefore, the gray regions or the black regions in FIG. 25 are regions where the contrast can be improved by providing the phase retardation plate 21 having the biaxial anisotropy between the substrate 2 and the polarizing plate 7 such that a positional relationship between the main refractive index direction and the polarizing plate absorption axis is the relationship mentioned above. Thus, it is possible to improve the contrast by providing the phase retardation plate 21 having the biaxial anisotropy between the substrate 2 and the polarizing plate 7 such that a positional relationship between the main refractive index direction and the polarizing plate absorption axis is the relationship mentioned above.

As described above, the display element according to the present embodiment includes a medium provided between a pair of substrates, at least one of the substrates being transparent, an electric field (external field) being applied to the medium in order to carry out a display, wherein the medium varies in terms of magnitude of optical anisotropy in response to application of the electric field, and a phase retardation plate, improving contrast at a diagonal view angle, which is provided between at least one of the substrates and the polarizing plate.

That is, according to the present embodiment, the phase retardation plate having the biaxial anisotropy is provided between at least one of the substrates and the polarizing plate. When the main refractive indices in an in-plane direction of the phase retardation plate are nx1 and ny1, and when the main refractive index in the normal direction is nz1, an ny1 direction is parallel to or orthogonal to the absorption axis of the polarizing plate disposed via the phase retardation plate on the phase retardation plate in a back side with respect to the substrate. Especially, when the phase retardation plate has the main refractive index and the retardation which satisfies the above-mentioned relational equations, it is possible to improve the contrast of the oblique viewing angle, especially the contrast of the oblique viewing angle of about 45° with respect to the polarizing plate absorption axis, and it is possible to improve the viewing angle property of the display element.

In the present embodiment, the transmission-type display element is mainly explained as an example, but the present invention is not limited to this, and it is possible to apply a reflection-type display element.

Figure 26:
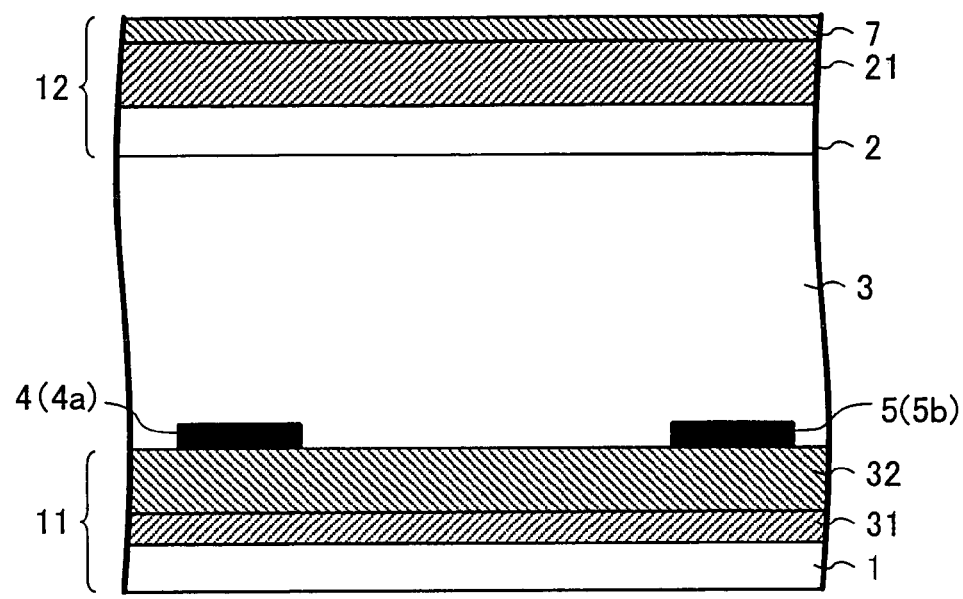
FIG. 26 is a cross sectional view schematically illustrating one example of structures of important members of a reflective type display element according to the present embodiment.

FIG. 26 schematically illustrates one example of an arrangement of the reflection-type display element of the present embodiment, and the present technology is applied to this arrangement.

In the reflection-type display element, a pixel substrate 11 is structured such that, for example, a reflection layer 31 is provided on a substrate 1 such as glass substrate, and comb-shaped electrodes 4 and 5 such as ITO are provided on the reflection layer 31 via an insulating layer 32. Note that, other arrangements are the same as the above-mentioned. As the insulating layer 32, organic films such as acrylic resin and inorganic films such as silicon nitride and silicon dioxide can be applied. As the reflection layer 31, thin films made of aluminum, silver, or the like can be applied. In the above arrangement, because the reflection layer 31 can reflect light incoming through another substrate 2 which is a transparent substrate such as glass substrate, the display element functions as the reflection-type display element.

As mentioned above, when applying the present technology to the reflection-type display element, the retardation (Rxz, etc) value of the phase retardation plate 21 is preferably half the value in case of the transmission-type display element because light goes through the phase retardation plate 21 twice.

When the display element of the present embodiment is used as the reflection-type display element, not only transparent electrode materials (such as ITO which is used when the display element is used as the transmission-type display electrode) but also various materials (which are conventionally well-known as electrode materials such as metal electrode materials (aluminum, etc)) can be used for the comb-shaped electrodes 4 and 5. The line width of the comb-shaped electrodes 4 and 5 and the distance between the electrodes (electrode interval) are not especially limited. It is possible to set up arbitrarily, for example, according to a gap between the substrate 1 and the substrate 2.

Furthermore, the present embodiment explained, as an example, a case where glass substrates are used as the substrates 1 and 2. However, the present technology is not limited to this, and the substrates 1 and 2 may be of any kind as long as at least one of the substrates 1 and 2 is a transparent substrate. For example, it is possible to use various substrates which are conventionally well-known.

The substrates 1 and 2 are not limited to substrates which are conventionally used, but may be a film-type substrate, or a substrate having flexibility. As long as at least one of the substrates is transparent, and the medium A can be kept (sandwiched) between the substrates, that is, the medium A can be kept (sandwiched) inside, it is possible to use variety of materials according to the kind of the medium A, the state of the phase, and the like.

Moreover, the present embodiment explained, as a concrete example, a case where the medium A is made of a material which is optically isotropic when no electric field is applied and is optically anisotropic when a voltage is applied. However, the present invention is not limited to this. As mentioned above, for example, the medium A may be such a material that anisotropy disappears by applying a voltage and the optical isotropy is expressed.

The following description deals with a concrete example. The medium A used in the concrete example is such a material that anisotropy disappears by applying a voltage and the optical isotropy is expressed.

In the present concrete example, the substrates 1 and 2 are transparent, and are glass substrates. The transparent comb-shaped electrodes 4 and 5 made of ITO and the alignment film made of polyimide are formed on the substrate 1 so as to be positioned in a counter surface which faces the substrate 2 (faces a counter surface of the substrate 2). Moreover, the medium A is injected and sealed between the substrates 1 and 2. The medium A is 4'-n-alkoxy-3'-nitrobiphenyl-4-carboxylic acid (ANBC-22), which is a transparent dielectric material. Plastic beads are scattered onto the counter surfaces of the substrates 1 and 2 in advance, so that a thickness of the medium layer 3 in the display element is adjusted to be 4 μm.

As mentioned above, the polarizing plate 6 is provided on an outer surface of the substrate 1 (rear surface with respect to the counter surface of the substrate 1) and the polarizing plate 7 is provided on an outer surface of the substrate 2 (rear surface with respect to the counter surface of the substrate 2). The absorption axis 6a of the polarizing plate 6 is orthogonal to the absorptions axis 7a of the polarizing plate 7. Moreover, the absorption axis 6a is at an angle of about 45° with respect to a direction in which the comb-teeth portion 4a of the comb-shaped electrode 4 extends, and the absorption axis 7a is at an angle of about 45° with respect to a direction in which the comb-teeth portion 5a of the comb-shaped electrode 5 extends.

The display element thus obtained is kept at about a smectic C phase/cubic phase transition temperature (at a temperature which is lower than the phase transition temperature, and is higher than a temperature about 10K lower than the phase transition temperature) by using an outer heating device (heating means). When an electric field (alternating electric current of about 50V (greater than 0 up to several hundred kHz)) is applied to the display element, the transmissivity can be changed. That is, when an electric field is applied to the display element in the smectic C phase (bright state) which is optically anisotropic when no voltage is applied, the smectic C phase can be changed into a cubic phase (dark state) which is isotropic.

Moreover, as will be mentioned in the Embodiment 2, almost the same result can be obtained even in a case where electrodes are provided on the substrates 1 and 2, and an electric field in a normal direction of the substrate surface is generated. That is, almost the same result can be obtained not only in a case where an electric field direction is a substrate surface horizontal direction but also in a case where an electric field direction is the normal direction of the substrate surface.

Thus, the medium A used in the display element of the present embodiment may be a medium which has the optical anisotropy when no voltage is applied, and the medium in which the optical anisotropy is disappeared by applying a voltage and the optical isotropy is expressed.

Moreover, the medium A may have positive dielectric anisotropy, or may have negative dielectric anisotropy. When a medium having the positive dielectric anisotropy is used as the medium A, it is necessary to drive the display element by the electric field substantially parallel to the substrates 1 and 2. When a medium having the negative dielectric anisotropy is used as the medium A, the present invention is not limited to the above. For example, it is possible to drive the display element by the electric field which is oblique with respect to the substrates 1 and 2. It is also possible to drive the display element by the electric field perpendicular to the substrates 1 and 2. In these cases, the shape of the electrode, the material, and arrangement position may be appropriately changed. Note that, when an electric field perpendicular to the substrates 1 and 2 is applied by using a transparent electrode, there is an advantage in terms of open area ratio.

Furthermore, the present embodiment explained a case where the electric field is generated in the in-plane direction of the substrate, that is, the electric field parallel to the substrates 1 and 2 (the pixel substrate 11 and the counter substrate 12) is generated. However, the present invention is not limited to this. For example, as mentioned in Document 1, the display may be carried out by applying an electric field in the normal direction of the substrate surface, that is, by applying an electric field perpendicular to the substrates 1 and 2. Note that, even in these cases, a change of the optical anisotropy by the electric field application is basically the same as the change of the optical anisotropy by the electric field application in a case where the display is carried out by applying an electric field substantially parallel to the substrates 1 and 2. Therefore, it is possible to apply the present technology to these cases.

Figure 27:
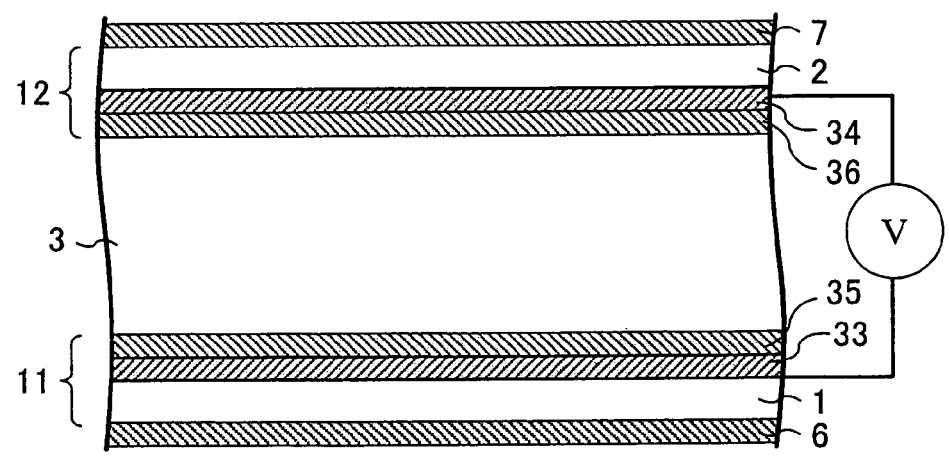
FIG. 27 is a cross sectional view schematically illustrating the structures of the important members of that display element according to the present embodiment which adopts such a display mode that displaying is performed by an electric field applied in a normal direction with respect to surfaces of substrates.
Figure 28:
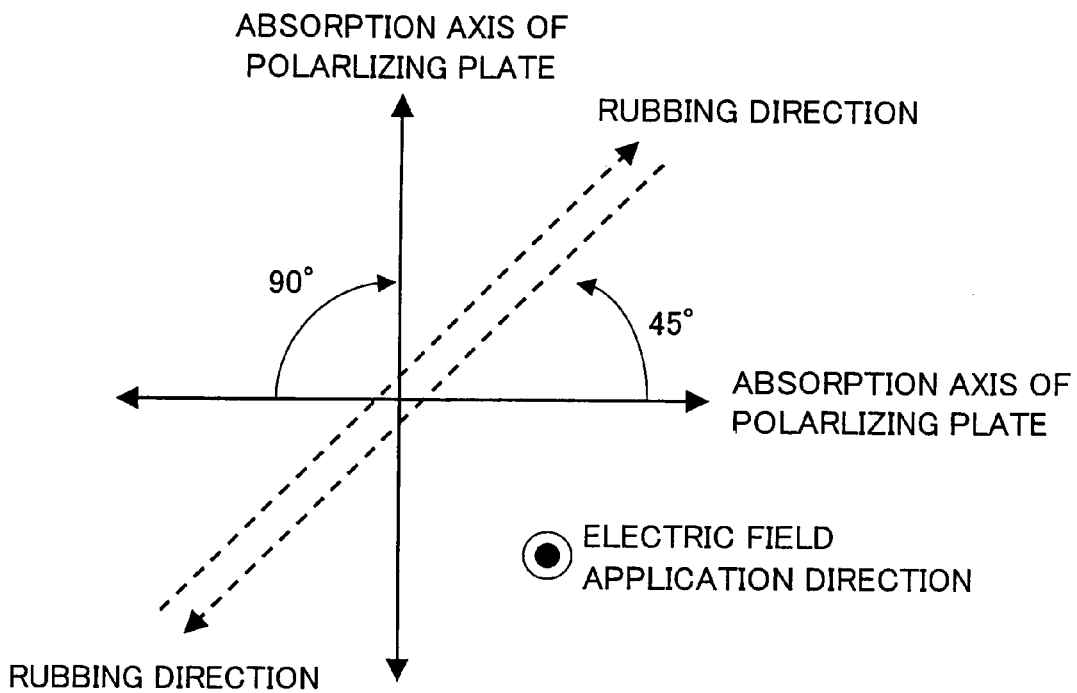
FIG. 28 is an explanatory diagram illustrating a relation between each of rubbing directions of an alignment film and each of absorption axes of retardation plates.

With reference to FIGS. 27 and 28, the following description explains a case where the electric field in the normal direction of the substrate surface is applied.

FIG. 27 is a cross-sectional view schematically illustrating an arrangement of important parts of the display element of the present embodiment using a display mode in which the electric field in the normal direction of the substrate surface is applied.

As illustrated in FIG. 27, the display element of the present embodiment using the above display mode is structured such that, instead of the comb-shaped electrodes 4 and 5, transparent electrodes 33 and 34 are respectively provided on the counter surfaces of the substrates 1 and 2.

In such a display element, the medium A injected and sealed between the substrates 1 and 2 is in the isotropic phase, and is optically isotropic when no electric field is applied to the transparent electrodes 33 and 34, so that the black display is carried out.

In contrast, when an electric field is applied to the transparent electrodes 33 and 34, the long-axis direction of each molecule of the medium A is aligned in a direction perpendicular to the electric field formed between the transparent electrodes 33 and 34, so that the double refractive phenomenon is expressed. Thanks to the double refractive phenomenon, it is possible to modulate the transmissivity of the display element according to the voltage between the transparent electrodes 33 and 34.

Also in the display element having the above-mentioned arrangement, like the Embodiment 1, at a temperature which is enough higher than the phase transition temperature (transition point), a high voltage is required in modulating the transmissivity of the display element. However, at a temperature which is just above the transition point, it is possible to adequately modulate the transmissivity of the display element with a voltage between 0V and 100V.

In addition, the display element illustrated in FIG. 27 is structured such that alignment films 35 and 36 are respectively provided on the transparent electrodes 33 and 34.

In the present embodiment, the substrates 1 and 2 are transparent, and are glass substrates. The transparent electrodes 33 and 34 made of ITO and the alignment films 35 and 36 made of polyimide are formed on counter surfaces of the substrates 1 and 2, respectively. Moreover, the medium A is injected and sealed between the substrates 1 and 2. The medium A is a transparent dielectric liquid which is a composition made by mixing 30 wt % of each of the compound shown by the structural formula (21), 40 wt % of the compound shown by the structural formula (22), and 30 wt % of the compound shown by the structural formula (23). It is confirmed that the dielectric liquid is in a negative type nematic liquid crystal phase at a temperature below 113° C., and is in the isotropic phase at a temperature of 113° C. or higher. Moreover, plastic beads are scattered onto the counter surfaces of the substrates 1 and 2 in advance, so that a thickness of the medium layer 3 in the display element is adjusted to be 5 µm.

A rubbing treatment is carried out with respect to the alignment films 35 and 36 in advance. Respective rubbing directions are antiparallel as illustrated in FIG. 14, and each of the direction is at an angle of 45° with respect to each of the polarizing plate absorption axes. Moreover, as illustrated in FIG. 13, the polarizing plates 6 and 7 are respectively provided on outer surfaces of substrates 1 and 2. The display element thus obtained is kept at a temperature which is just above the nematic phase/isotropic phase transition temperature by the outer heating device (heating means). When an electric field is applied to the display element, the transmissivity can be changed.

Embodiment 4

The following description explains another embodiment of the present technology with reference to the attached drawings. Note that, the present embodiment mainly explains points different from points described in the Embodiments 1 to 3. The same reference numerals are used for the members having the same functions as the members used in the Embodiments 1 to 3, and further explanations thereof are omitted.

The Embodiment 3 explained a case where the phase retardation plate having biaxial optical anisotropy is provided between at least one of the substrates and the polarizing plate. The present embodiment explains a case where the phase retardation plate having uniaxial optical anisotropy is provided between at least one of the substrates and the polarizing plate.

Figure 29:
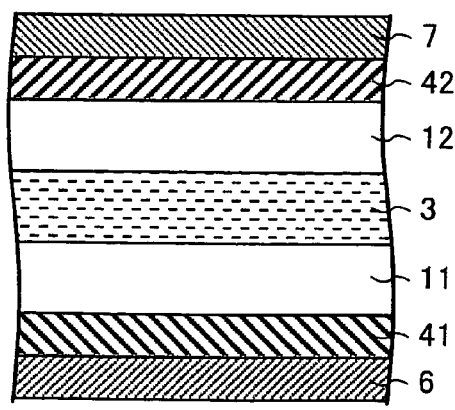
FIG. 29 is a cross sectional view schematically illustrating one example of structures of important members of a display element according to another example embodiment.

FIG. 29 is a cross-sectional view schematically illustrating one example of an arrangement of important parts of the display element of the present embodiment. The display element illustrated in FIG. 18 is structured such that, instead of the phase retardation plate 21 having the biaxial optical anisotropy, a phase retardation plate 42 (first phase retardation plate) having the uniaxial optical anisotropy is provided between a counter substrate 12 and a polarizing plate 7, and a phase retardation plate 41 having the uniaxial optical anisotropy is provided between a pixel substrate 11 and a polarizing plate 6. Note that, the display element of the present embodiment is structured in the same way as that of the Embodiment 1 except for the phase retardation plates 42 and 41.

Moreover, also in the present embodiment, the polarizing plates 6 and 7 are respectively provided on the substrates 1 and 2. The absorption axis 6a (polarizing plate absorption axis direction) of the polarizing plate 6 is orthogonal to the absorptions axis 7a (polarizing plate absorption axis direction) of the polarizing plate 7. Moreover, the absorption axis 6a is at an angle of about 45° with respect to a direction in which the comb-teeth portion 4a of the comb-shaped electrode 4 extends, and the absorption axis 7a is at an angle of about 45° with respect to a direction in which the comb-teeth portion 5a of the comb-shaped electrode 5 extends. On this account, the absorption axes 6a and 7a of the polarizing plates 6 and 7 are at an angle of about 45° with respect to an electric field application direction of the comb-shaped electrodes 4 and 5.

In the present embodiment, when the main refractive indices in the in-plane direction of the phase retardation plate 42 are nx2 and ny2, and the main refractive index in the normal direction is nz2, and the main refractive indices in the in-plane direction of the phase retardation plate 41 are nx3 and ny3, and the main refractive index in the normal direction is nz3, the phase retardation plate 42 is structured such that the phase retardation plate 42 satisfies nx2>ny2=nz2, and a direction of ny2 is parallel to the absorption axis 7a of the polarizing plate 7 disposed via the phase retardation plate 42 in a back side with respect to the substrate 2. Moreover, the phase retardation plate 41 is structured such that the phase retardation plate 41 satisfies nx3=ny3<nz3, and directions of nx3 and ny3 are parallel to or orthogonal to the absorption axis 6a of the polarizing plate 6 disposed via the phase retardation plate 41 in a back side with respect to the substrate 1.

In the following description, contrast in the direction B at a polar angle of 60° C. is measured by variously changing retardations (Re, Rth) of the phase retardation plates 42 and 41. Note that, Re and Rth are shown as follows.

$$Re(\text{nm}) = d2 \times (nx2 - ny2)$$

$$Rth(\text{nm}) = d3 \times (nz3 - ny3)$$

Figure 30:
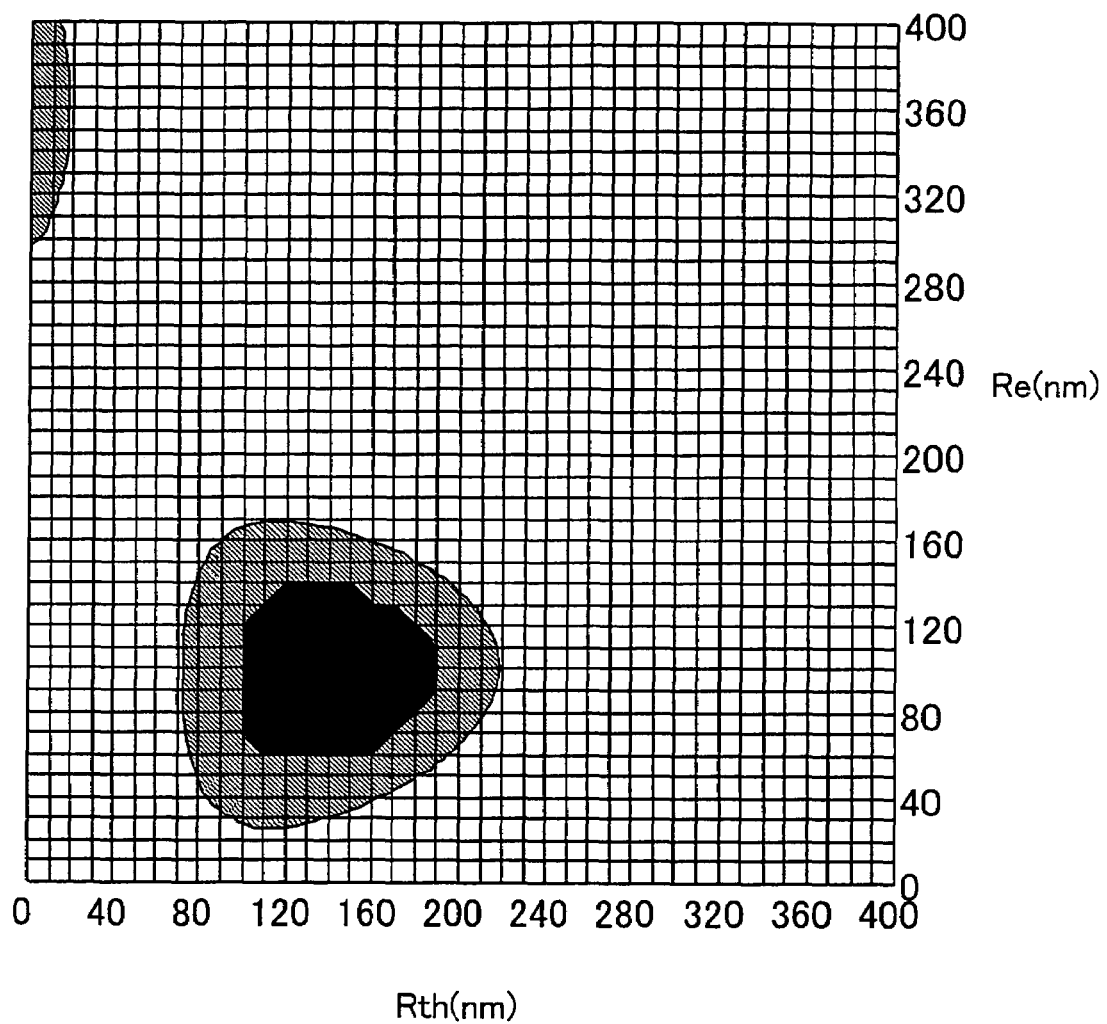
FIG. 30 is a diagram illustrating a relation between (i) retardation of a retardation plate having uniaxial optical anisotropy and (ii) contrast of the display element.

The phase retardation plate 42 has a thickness d2 of 100 μm, and the phase retardation plate 41 also has a thickness d3 of 100 μm, and an observing wavelength is 550 nm. FIG. 30 shows results.

FIG. 30 shows the contrast when a horizontal axis is Rth and a vertical axis is Re. In FIG. 30, the contrast is 20 or more in black regions, 10 or more in gray regions (hatched regions), and below 10 in colorless regions (no mark regions) even when the contrast is improved.

In order to use the display element without any practical problems, it is preferable that the contrast be 10 or more. In order that the contrast is regarded as having been adequately improved, the contrast needs to be 20 or more.

Here, a point where the contrast is maximal is $$(Rth, Re) = (140 \text{ nm}, 100 \text{ nm}).$$

Figure 31:
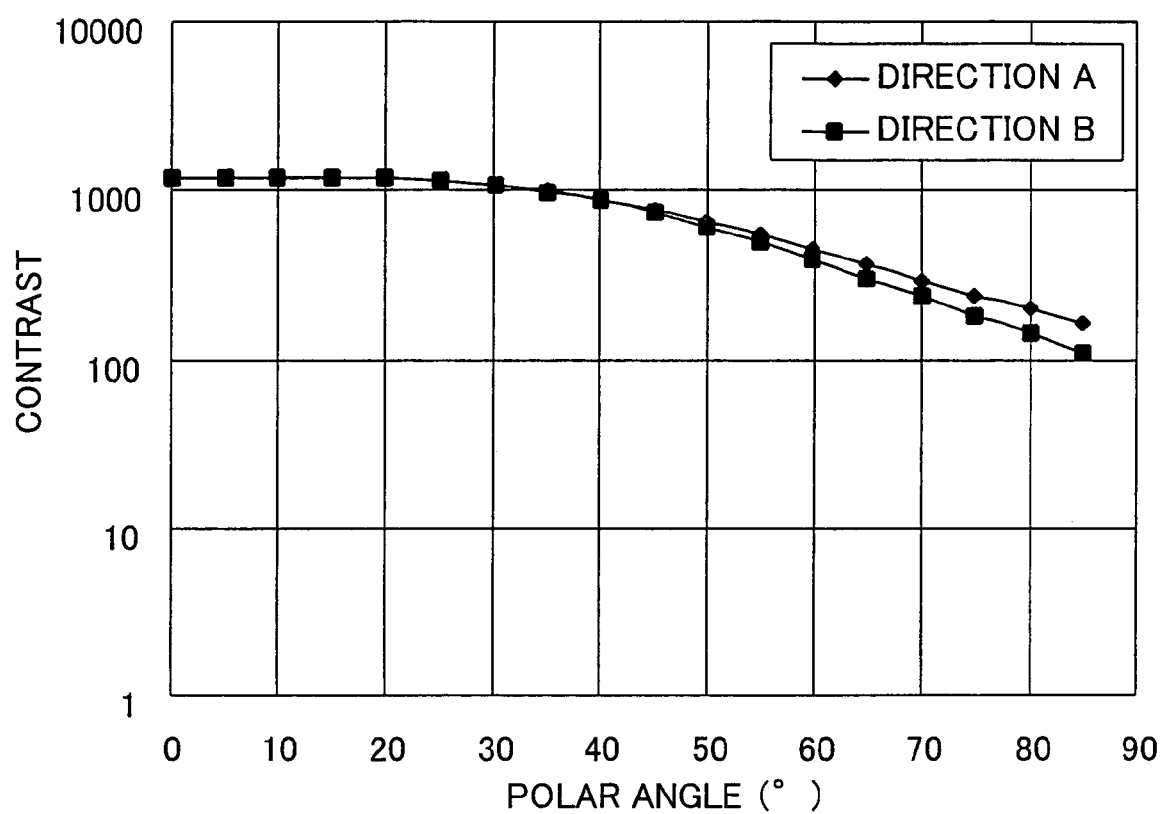
FIG. 31 is a graph illustrating a relation between a polar angle and the contrast of the display element, in the condition where the contrast is maximal which is shown in FIG. 30.

FIG. 31 shows results obtained by measuring the contrast in the directions A and B, at a polar angle between 0° C. and 85° C., and at the point where the contrast is maximal. By using the phase retardation plates 42 and 41 each having the above-mentioned main refractive index and retardation, the contrast in the direction B is improved greatly as compared with a case where the phase retardation plates 42 and 41 are not provided, and the contrast in the direction A and the contrast in the direction B are almost the same. When such a display element is applied to the display devices such as TVs and PC monitors, there are no practical problems in terms of the viewing angle. Moreover, when the phase retardation plates 42 and 41 satisfy the above, it is possible to prevent the coloring due to the wavelength dispersion.

A region where the contrast is almost 10 or more is shown by the following equation.

$$(Rth-140)^2 + (Re-100)^2 \leq 65^2$$

That is, the region is such a circle that the center is (Rth, Re)=(140 nm, 100 nm), and the radius is 65 nm. When the phase retardation plates 42 and 41 satisfy the above equation (that is, when the phase retardation plates satisfying the above relational equation are used as the phase retardation plates 42 and 41), it is possible to obtain the contrast of 10 or more. Note that, in other ranges of the phase retardation plates 42 and 41, there are ranges where the contrast is improved. However, a coloring phenomenon due to the wavelength dispersion is greatly observed in those ranges. When the phase retardation plates 42 and 41 satisfy the above equation, it is possible to prevent the coloring due to the wavelength dispersion.

Moreover, a region where the contrast is almost 20 or more is shown by the following equation.

$$(Rth-140)^2 + (Re-100)^2 \leq 40^2$$

That is, the region is such a circle that the center is (Rth, Re)=(140 nm, 100 nm), and the radius is 40 nm. When the phase retardation plates 42 and 41 satisfy the above equation, it is possible to obtain the contrast of 20 or more. Note that, in other ranges of the phase retardation plates 42 and 41, there are ranges where the contrast is improved. However, a coloring phenomenon due to the wavelength dispersion is greatly observed in those ranges. When the phase retardation plates 42 and 41 satisfy the above equation, it is possible to prevent the coloring due to the wavelength dispersion.

Figure 32:
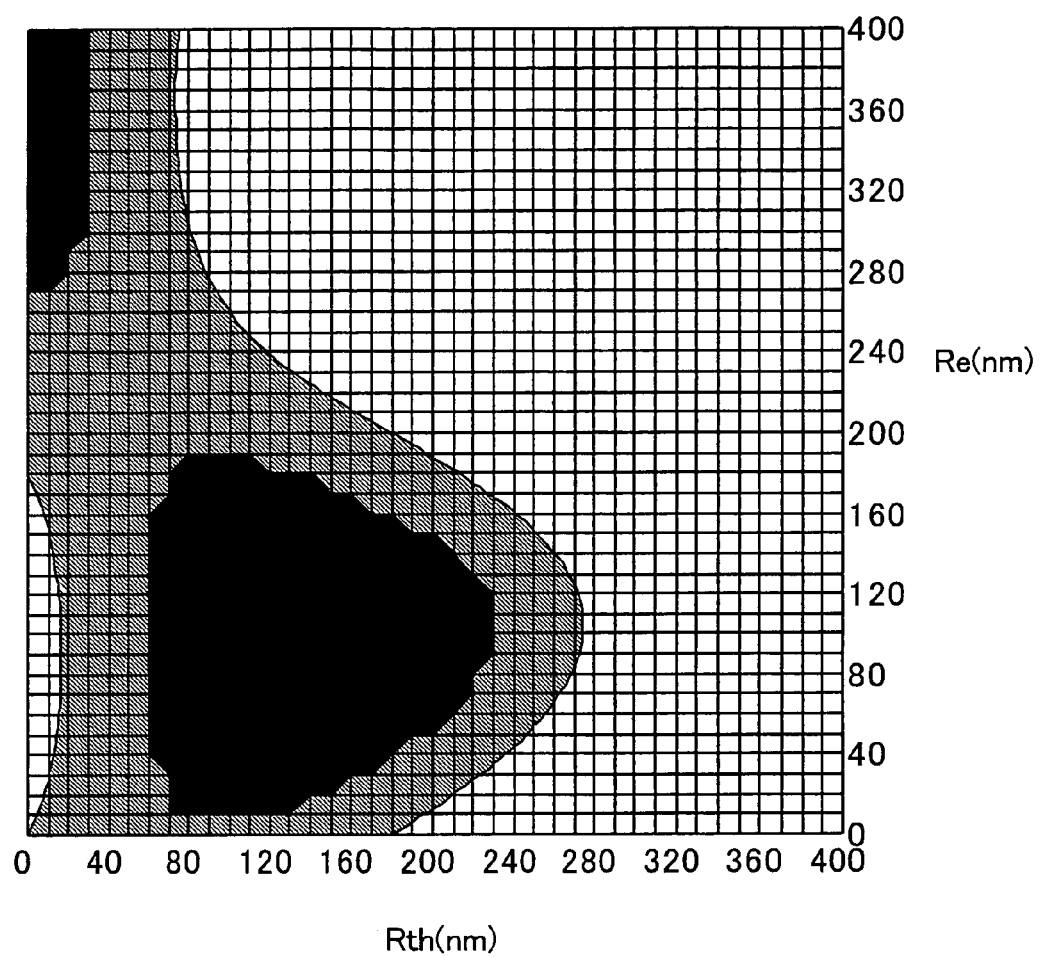
FIG. 32 is another diagram illustrating the relation between (i) the retardation of a retardation plate having uniaxial optical anisotropy and (ii) the contrast of the display element.

FIG. 32 shows a contrast value (C4/C3) obtained by dividing the contrast value (hereinafter referred to as contrast C4), in the direction B at a polar angle of 60° C. in a case where the phase retardation plates 42 and 41 are provided, by the contrast value (hereinafter referred to as contrast C3), in the direction B at a polar angle of 60° C. in a case where the phase retardation plates 42 and 41 are not provided. In FIG. 32, a horizontal axis is Rth and a vertical axis is Re. (C4/C3) is more than 2 in black regions, more than 1 in gray regions (hatched regions), and 1 or less in colorless regions (no mark regions). The gray regions or the black regions in FIG. 32 are regions where the contrast can be improved by respectively providing the phase retardation plates 42 and 41 having the uniaxial anisotropy between (i) the substrates 1 and 2 and (ii) the polarizing plates 6 and 7 such that a positional relationship between the main refractive index direction and the polarizing plate absorption axis is the relationship mentioned above. Therefore, it is possible to improve the contrast by respectively providing the phase retardation plates 42 and 41 having the biaxial anisotropy between (i) the substrates 1 and 2 and (ii) the polarizing plates 6 and 7 such that a positional relationship between the main refractive index direction and the polarizing plate absorption axis is the relationship mentioned above.

As described above, the display element according to the present embodiment includes a medium provided between a pair of substrates, at least one of the substrates being transparent, an electric field (external field) being applied to the medium in order to carry out a display, wherein the medium varies in terms of magnitude of optical anisotropy in response to application of the electric field, and a phase retardation plate, improving contrast at a diagonal view angle, which is provided between at least one of the substrates and the polarizing plate.

That is, according to the present embodiment, the first and second phase retardation plates having the uniaxial anisotropy are provided between at least one of the substrates and the polarizing plate. When the main refractive indices in an in-plane direction of the first phase retardation plate are nx2 and ny2, and the main refractive index of the normal direction is nz2, and the main refractive indices in the in-plane direction of the second phase retardation plate are nx3 and ny3, and the main refractive index in the normal direction is nz3, the first phase retardation plate satisfies nx2>ny2=nz2, and an ny2 direction is parallel to or orthogonal to the absorption axis of the polarizing plate disposed via the first phase retardation plate in a back side with respect to the substrate, and the second phase retardation plate satisfies nx3=ny3<nz3, and an ny3 direction is parallel to or orthogonal to the absorption axis of the polarizing plate disposed via the second phase retardation plate in a back side with respect to the substrate. Especially, when the phase retardation plate has the main refractive index and the retardation which satisfy the above-mentioned relational equation, it is possible to improve the contrast of the oblique viewing angle, especially the contrast of the oblique viewing angle of about 45° with respect to the polarizing plate absorption axis, and it is possible to improve the viewing angle property of the display element.

The present embodiment explained a case where, as illustrated in FIG. 29, the phase retardation plate 42 (first phase retardation plate) having the uniaxial optical anisotropy is provided between the counter substrate 12 and the polarizing plate 7 instead of providing the phase retardation plate 21 having the biaxial optical anisotropy, and the phase retardation plate 41 (second phase retardation plate) having the uniaxial optical anisotropy is provided between the pixel substrate 11 and the polarizing plate 6. However, the present embodiment is not limited to this, but the display element of the present embodiment may be structured such that at least one of the first and second phase retardation plates (the phase retardation plates 42 and 41) is provided between at least one of the substrates 1 and 2 (the pixel substrate 11 and the counter substrate 12) and the polarizing plate (the polarizing plate 6 or 7).

Figure 33:
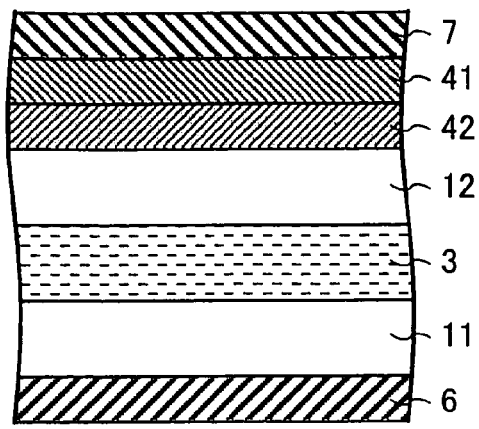
FIG. 33(a) through FIG. 33(d) are cross sectional views illustrating examples of structures of important members of a display element according to another example embodiment, respectively.
Figure 33:
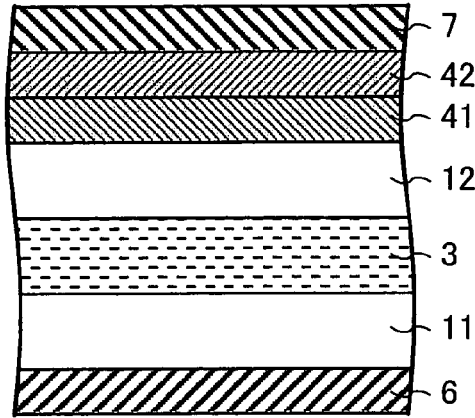
Figure 33:
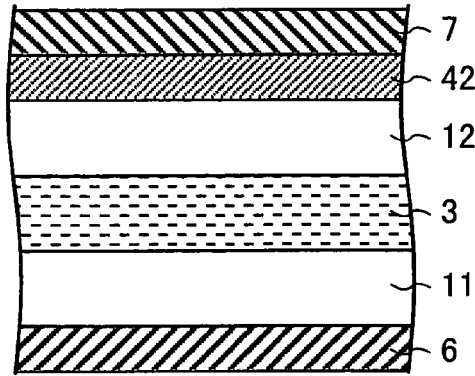
Figure 33:
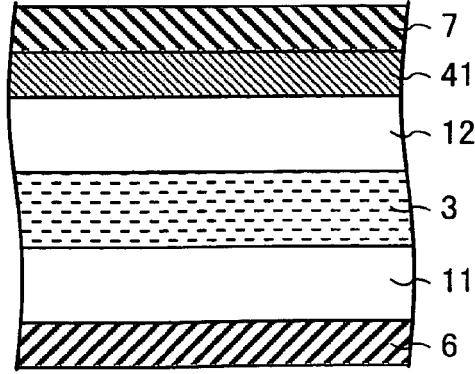

For example, such a display element may be structured such that, as illustrated in FIG. 33(a), the counter substrate 12, the phase retardation plate 42, the phase retardation plate 41, and the polarizing plate 7 are stacked in this order, or may be structured such that, as illustrated in FIG. 33(b), the counter substrate 12, the phase retardation plate 41, the phase retardation plate 42, and the polarizing plate 7 are stacked in this order. Moreover, such a display element may be structured such that, as illustrated in FIG. 33(c), only the phase retardation plate 42 is provided between the counter substrate 12 and the polarizing plate 7, or may be structured such that, as illustrated in FIG. 33(d), only the phase retardation plate 41 is provided between the counter substrate 12 and the polarizing plate 7.

That is, at least one of the phase retardation plates 42 and 41 needs to be provided. Moreover, at least one phase retardation plate needs to be provided on the substrate on which the polarizing plate is provided (that is, at least one phase retardation plate is provided between a polarizing plate and a substrate in a case where the polarizing plate is provided on the outer side of only one substrate, and at least one phase retardation plate is provided between at least one substrate and a polarizing plate in a case where two polarizing plates are respectively provided on the outer sides of two substrates).

Especially when both phase retardation plates 41 and 42 are applied in combination, the remarkably-improved contrast can be obtained. However, even when any one of the phase retardation plates 41 and 42 is applied, the contrast can be improved as compared with a conventional case when no phase retardation plate is provided. Note that, which arrangement of the above arrangements is adopted may be appropriately selected in consideration for balance between cost and performance.

When a slow phase axis (an in-plane direction of a larger main refractive index) of the first phase retardation plate (phase retardation plate 42) is parallel to or orthogonal to the absorption axis 7a of the adjacent polarizing plate 7, the contrast is improved. More preferably, when the slow phase axis of the first phase retardation plate is orthogonal to the absorption axis 7a of the adjacent polarizing plate 7, the contrast is improved.

Embodiment 5

The following description explains still another embodiment of the present technology with reference to the attached drawings. Note that, the present embodiment mainly explains points different from the Embodiments 1 to 4. The same reference numerals are used for the members having the same functions as the members used in the Embodiments 1 to 4, and further explanations thereof are omitted.

Figure 34:
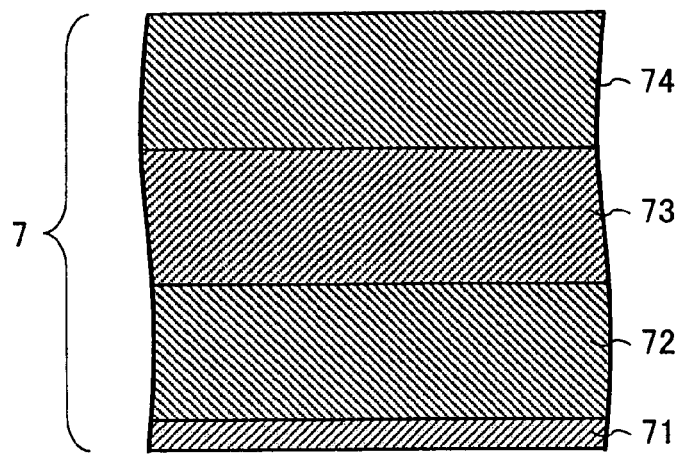
FIG. 34 is a cross, sectional view schematically illustrating important members of the display element according to another embodiment of the present invention.
Figure 35:
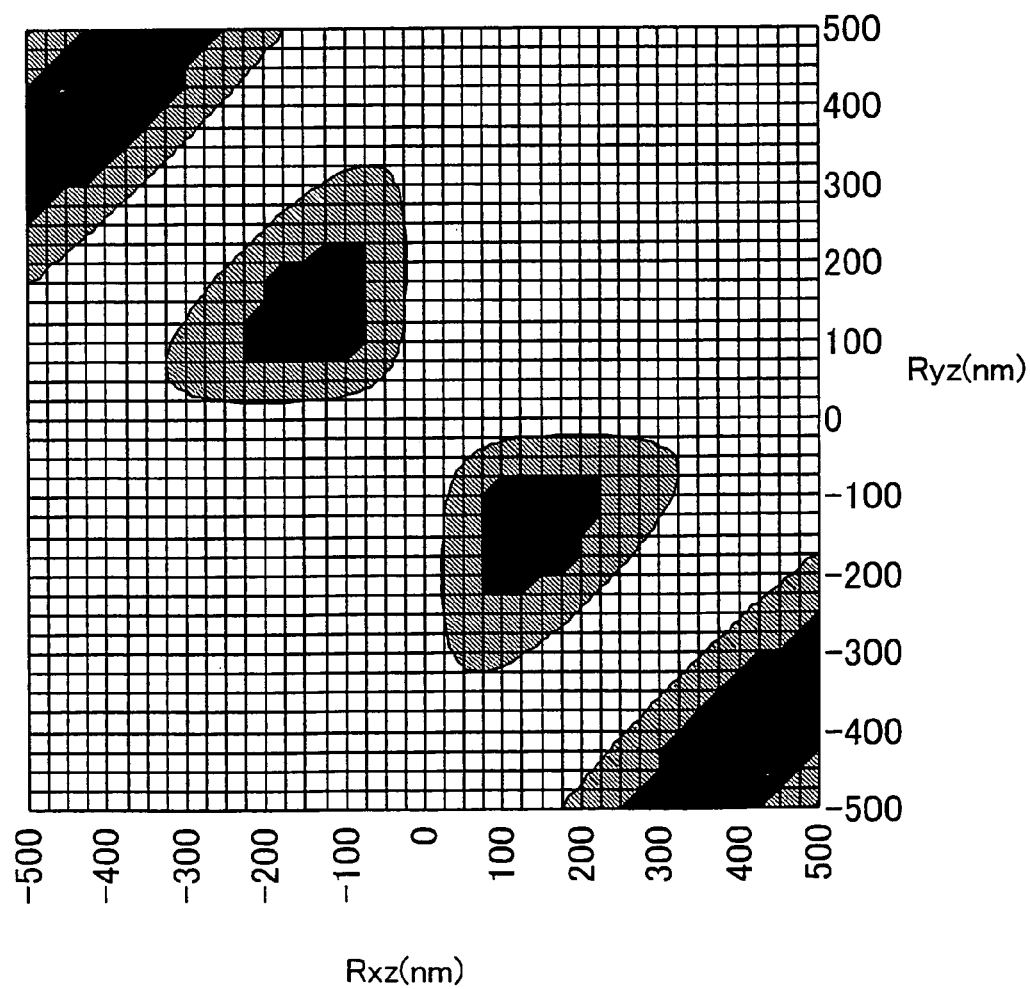
FIG. 35 is still another diagram illustrating a relation between (i) the retardation of the retardation plate having uniaxial optical anisotropy and (ii) the contrast of the display element.

FIG. 34 is a cross-sectional view schematically illustrating an arrangement of important parts of the polarizing plate 7 provided in the display element of the present embodiment.

As illustrated in FIG. 34, the polarizing plate 7 is structured such that an adhesive layer 71, a base material film 72, a polarizing layer 73, and a surface protection layer 74 are stacked in this order on and above the substrate 2 (see FIG. 1). The adhesive layer 71 is provided on a back surface of the base material film 72 so that the polarizing plate 7 and the substrate 2 adhere to each other. The polarizing layer 73 allows polarized light in a specific direction to transmit therethrough. The surface protection layer 74 is formed so as to protect a surface of the polarizing layer 73.

Moreover, the base material film 72 is generally made of triacetylcellulose (TAC). In addition, generally-used polarizing plates are used as the polarizing plates 6 and 7 described in the Embodiments 1 and 2, and a base material film of each of the polarizing plates 6 and 7 is made of TAC.

However, TAC itself is optically anisotropic. Therefore, the base material films of the polarizing plates 6 and 7 are optically anisotropic. Although in-plane retardation is almost 0, retardation of a thickness direction is 45 nm.

In the arrangements of the Embodiments 3 and 4, an influence of the base material film when TAC is removed from the polarizing plates 6 and 7, that is, an influence of retardation of the polarizing plates 6 and 7 is examined in the present embodiment.

First, as a result of the examination, it was found that: when using the phase retardation plate 21 having the biaxial optical anisotropy descried in the Embodiment 1, (Rxz, Ryz) which causes the maximal contrast is almost unchanged. Note that, there are some changes around the maximal contrast point. The contrast is different when shifted from the maximal contrast point. A contour shape changes from an ellipse shape to a triangle shape.

On this account, regions where the value of the contrast is almost 10 or more are shown by the following equations.

$Rxz^2 + Ryz^2 \leq 300^2$, $Rxz \geq 50$, $Ryz \leq -50$, or $Rxz^2 + Ryz^2 \leq 300^2$, $Ryz \geq 50$, $Rxz \leq -50$.

Moreover, regions where the value of the contrast is almost 20 or more are shown by the following equations.

$$Rxz^2+Ryz^2 \leq -250^2,$$

$$Rxz \geq 75,$$

$$Ryz \leq -75,$$

or $$Rxz^2+Ryz^2 \leq 250^2,$$

$$Ryz \geq 75,$$

$$Rxz \leq -75.$$

In the above cases, when the phase retardation plate 21 satisfies the above equations, it is possible to prevent the coloring due to the wavelength dispersion.

Even when the influence of retardation of the polarizing plates 6 and 7 are removed, there are two optimal points like the Embodiment 1. The value of Rxz in one optimal point is the value of Ryz in the other optimal point, and the value of Ryz in one optimal point is the value of Rxz in the other optimal point. Therefore, even when the phase retardation plate 21 is rotated 90° C., the similar properties can be obtained.

Figure 36:
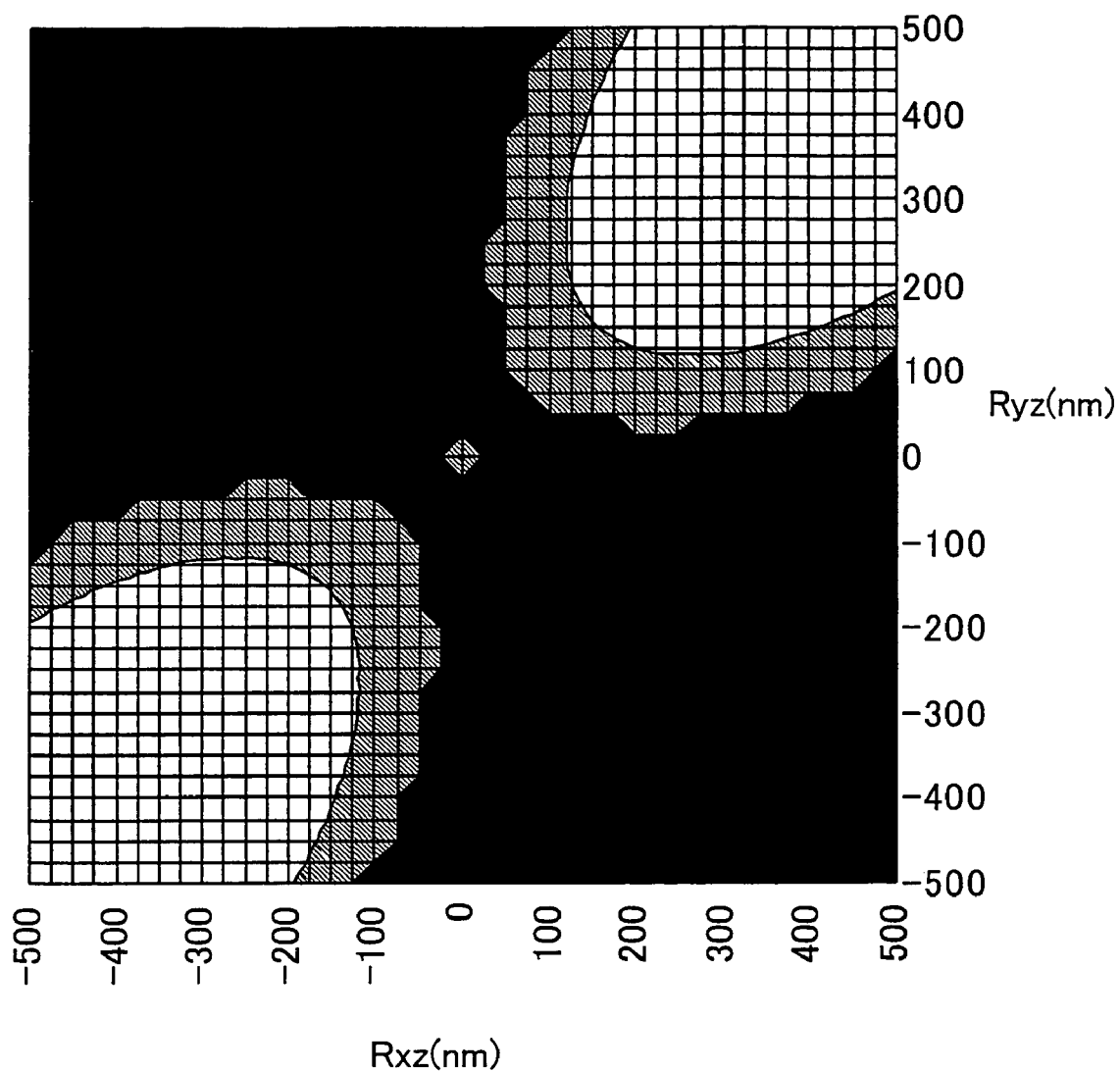
FIG. 36 is yet another diagram illustrating a relation between (i) the retardation of the retardation plate having uniaxial optical anisotropy and (ii) the contrast of the display element.
Figure 37:
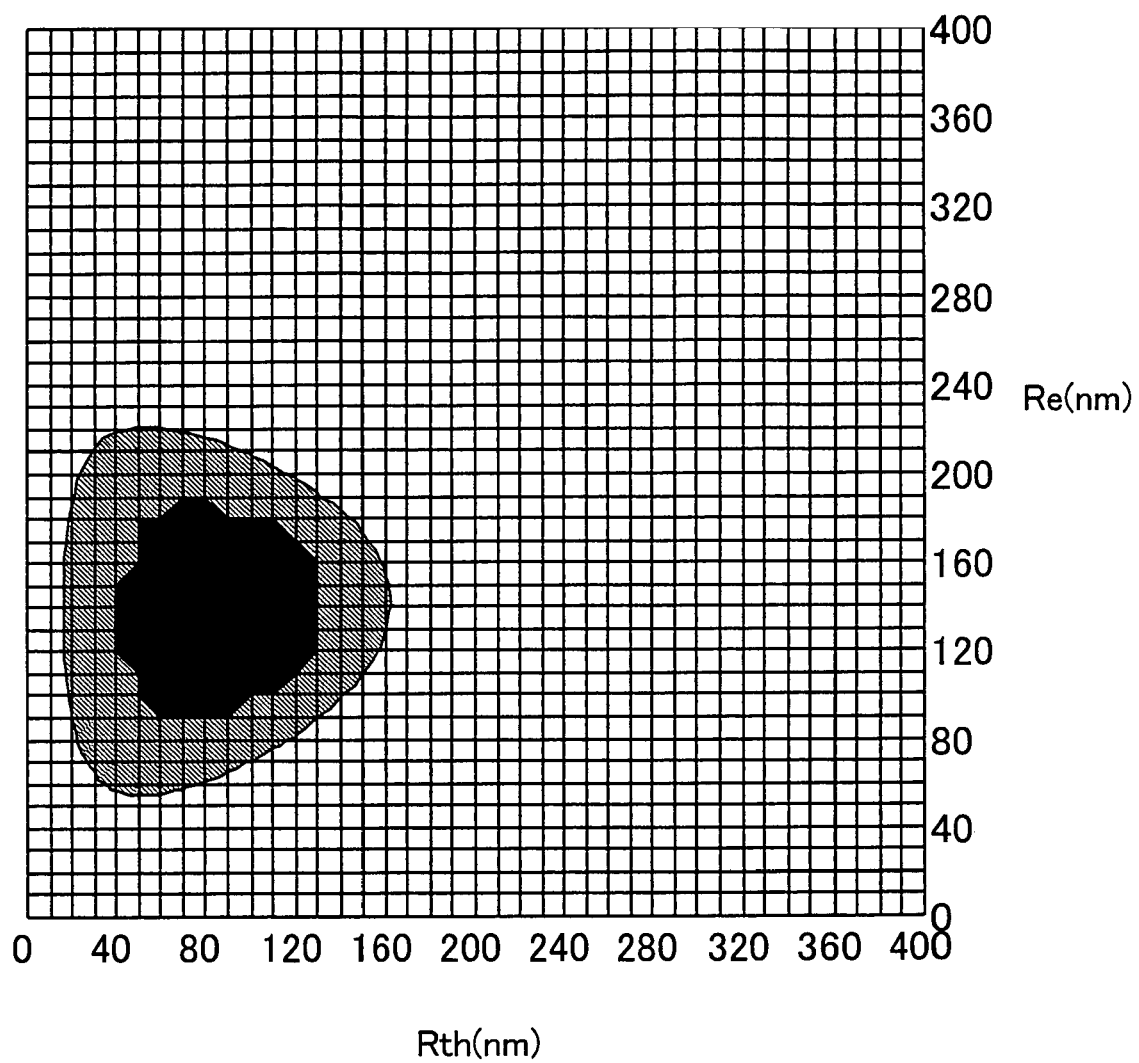
FIG. 37 is still another diagram illustrating the relation between (i) the retardation of the retardation plate having biaxial optical anisotropy and (ii) the contrast of the display element.

FIG. 36 shows a contrast value (C6/C5) obtained by dividing the contrast value (hereinafter referred to as contrast C6), in the direction B at a polar angle of 60° C. in a case where the phase retardation plate 21 is provided, by the contrast value (hereinafter referred to as contrast C5), the direction B at a polar angle of 60° C. in a case where the phase retardation plate 21 is not provided. In FIG. 36, a horizontal axis is Rxz and a vertical axis is Ryz. (C6/C5) is more than 2 in black regions, more than 1 in gray regions (hatched regions), and 1 or less in colorless regions (no mark regions). The gray regions or the black regions in FIG. 36 are regions where the contrast can be improved by respectively providing the phase retardation plate 21 having the biaxial anisotropy between (i) the substrates 1 and 2 and (2) the polarizing plates 6 and 7 such that a positional relationship between the main refractive index direction and the polarizing plate absorption axis is the relationship mentioned above, when the influence of retardation of the polarizing plates 6 and 7 are removed. Therefore, it is possible to improve the contrast by providing the phase retardation plate 21 having the biaxial anisotropy between (i) the substrates 1 and 2 and (ii) the polarizing plates 6 and 7 such that a positional relationship between the main refractive index direction and the polarizing plate absorption axis is the relationship mentioned above.

Furthermore, a single phase retardation plate 21 is used in the present embodiment. However, similar effects can be obtained even when the phase retardation plate is divided into two, and those two phase retardation plates are respectively provided between the substrate 1 and the polarizing plate 6; and between the substrate 2 and the polarizing plate 7.

In contrast, when using the phase retardation plates 42 and 41 having the uniaxial optical anisotropy descried in the Embodiment 4, a point where the contrast is maximal changes.

As described above, the point where the contrast is maximal when an influence of retardation of the polarizing plates 6 and 7 is removed is (Rth, Re)=(90 nm, 140 nm).

Therefore, in order to optimize the contrast of the oblique viewing angle in an arrangement of the Embodiment 4, the retardation of the base material film (retardation of the polarizing plates 6 and 7) needs to be considered.

A region where the contrast is almost 10 or more is shown by the following equation.

$$(Rth\text{-}90)^2+(Re\text{-}140)^2 \leq 65^2$$

That is, the region is such a circle that the center is (Rth, Re)=(90 nm, 140 nm), and the radius is 65 nm.

Moreover, a region where the contrast is almost 20 or more is shown by the following equation.

$$(Rth\text{-}90)^2+(Re\text{-}140)^2 \leq 40^2$$

That is, the region is such a circle that the center is (Rth, Re)=(140 nm, 100 nm), and the radius is 40 nm. Note that, in the above cases, when the phase retardation plates 42 and 41 satisfy the above equation, it is possible to prevent the coloring due to the wavelength dispersion.

Retardation in the normal direction of the polarizing plates 6 and 7, that is, retardation of TAC is defined as Rtac. According to the above, when Rtac=45 nm, the point where the contrast is maximal is (Re, Rth)=(100 nm, 140 nm). When Rtac=0 nm, the point where the contrast is maximal is (Re, Rth)=(140 nm, 90 nm). When the retardation of TAC (Rtac) varies, as illustrated in FIGS. 27(*a*) and 27(*b*), it is preferable that new (Re, Rth) which can be extrapolated or interpolated by the above two points be applied.

Moreover, practical effects (the viewing angle can be judged to be obviously improved as compared with the viewing angle of conventional examples) can be obtained in a range of about ±50% of line graphs of FIGS. 27(*a*) and 27(*b*). Furthermore, remarkable effects (regions where the effects are saturated in a subjective evaluation level) can be obtained in a range of about ±25% of the line graphs.

That is, first, a thickness of the phase retardation plate 42 (first retardation plate) is d2(nm), and a thickness of the phase retardation plate 41 (second phase retardation plate) is d3 (nm), and retardations of the phase retardation plates 42 and 41 are respectively Re (nm)=d2×(nx2−ny2) and Rth (nm)=d3×(nz3−ny3), and retardation in the normal direction of the polarizing plates 6 and 7 is Rtac. In this case, in a range of about ±50% of the line graphs of FIGS. 27(*a*) and 27(*b*), Re exists in a range surrounded by two straight lines, one straight line including two points (Rtac, Re)=(45, 100×1.5) and (Rtac, Re)=(0, 140×1.5), and another line including two points (Rtac, Re)=(45, 100×1.5) and (Rtac, Re)=(0, 140×0.5). Moreover, Rth exists in a range surrounded by two straight lines, one straight line including two points (Rtac, Rth)=(45, 140×1.5) and (Rtac, Rth)=(0, 90×1.5), and another line including two points (Rtac, Rth)=(45, 140×0.5) and (Rtac, Rth)=(0, 90×0.5).

Figure 38:
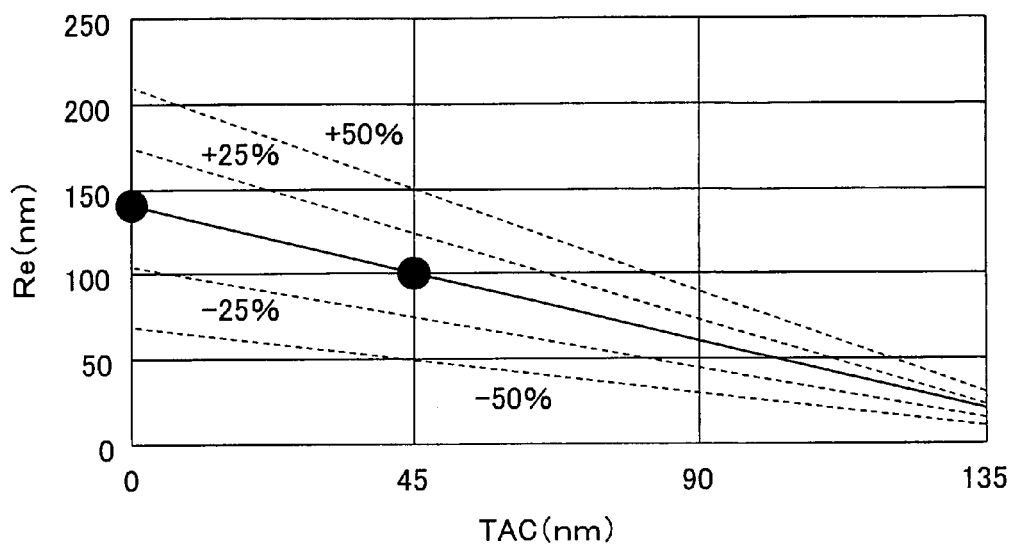
FIG. 38(a) and FIG. 38(b) are graphs each illustrating a relation between (i) retardation, in a normal direction, of a polarizing plate allowing an improvement of a viewing angle and (ii) retardation of a retardation plate.
Figure 38:
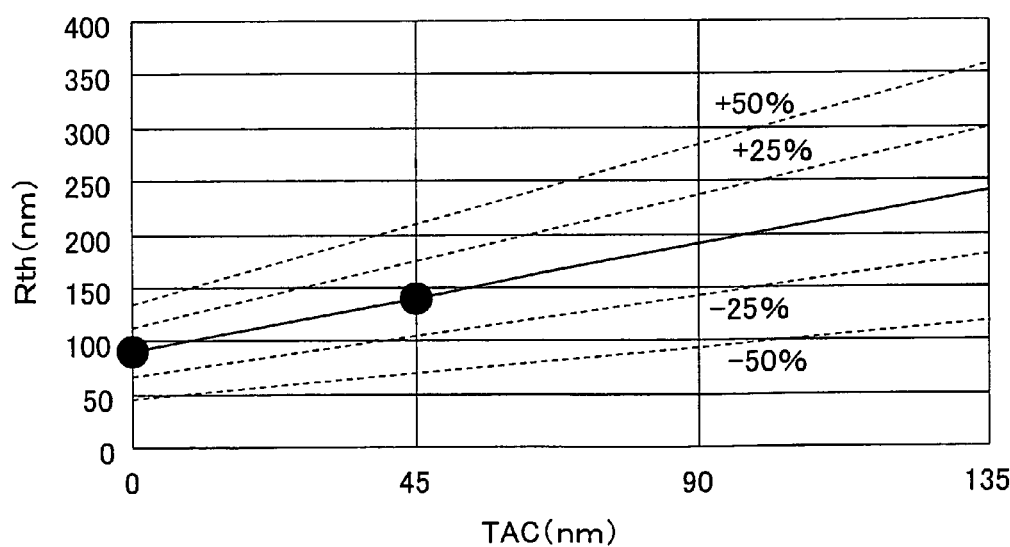

A thickness of the phase retardation plate 42 is d2 (nm), and a thickness of the phase retardation plate 41 is d3 (nm), and retardations of the phase retardation plates 42 and 41 are respectively Re (nm)=d2×(nx2−ny2) and Rth (nm)=d3×(ny3−nz3), and retardation in the normal direction of the polarizing plates 6 and 7 is Rtac. In this case, in a range of about ±25% of the line graphs of FIGS. 38(*a*) and 38(*b*), Re exists in a range surrounded by two straight lines, one straight line including two points (Rtac, Re)=(45, 100×1.25) and (Rtac, Re)=(0, 140×1.25), and another line including two points (Rtac, Rth)=(45, 140×1.25) and (Rtac, Rth)=(0, 90×1.25). Moreover, Rth exists in a range surrounded by two straight lines, one straight line including two points (Rtac, Re)=(45, 100×0.75) and (Rtac, Re)=(0, 140×0.75), and another line including two points (Rtac, Rth)=(45, 140×0.75) and (Rtac, Rth)=(0, 90×0.75).

The above ranges (range of ±50% and range of ±25%) are interpolated by the straight lines obtained by two points of Re and Rth.

Figure 39:
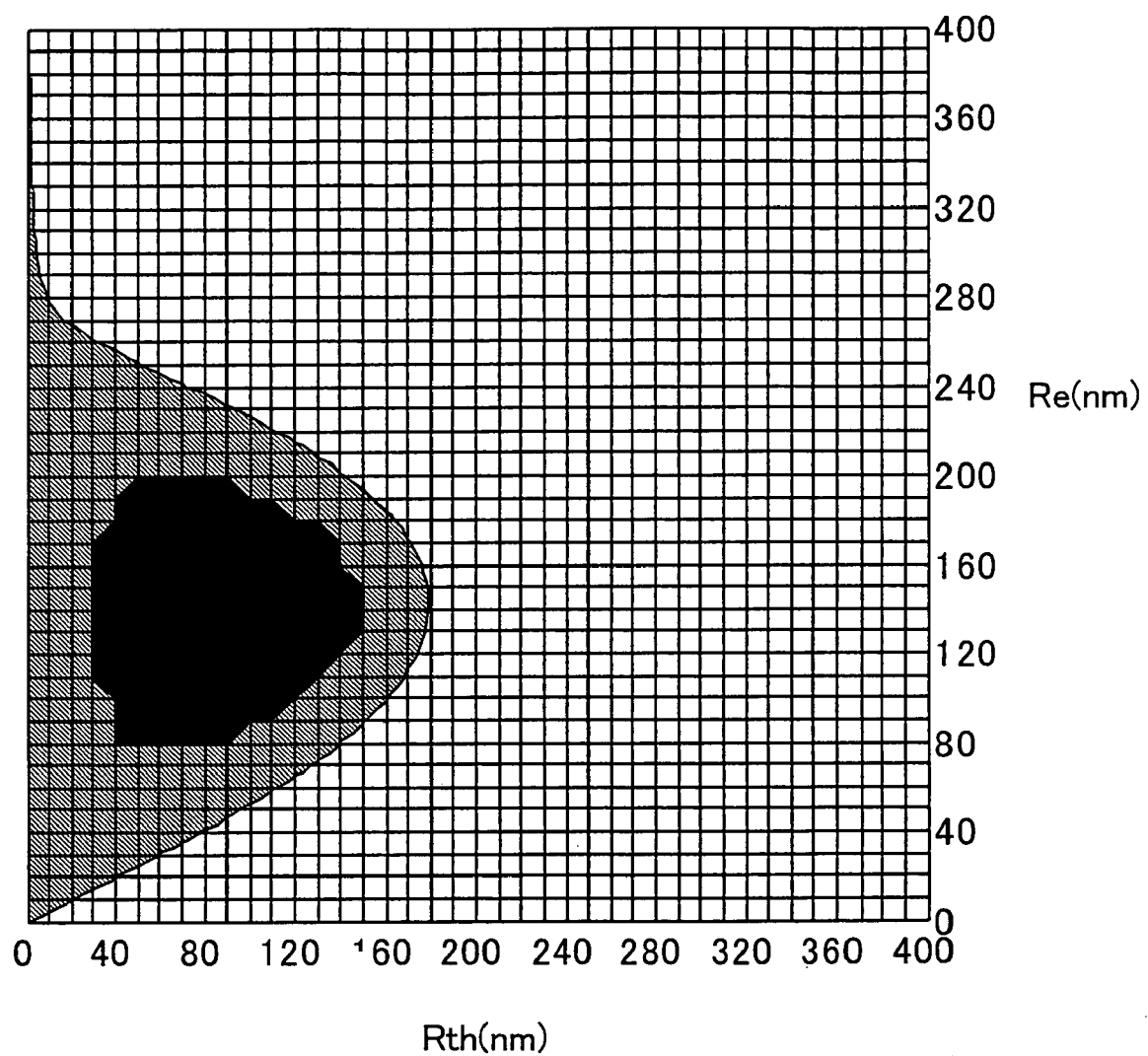
FIG. 39 is yet another diagram illustrating the relation between (i) the retardation of the retardation plate having biaxial optical anisotropy and (ii) the contrast of the display element.

FIG. 39 shows a contrast value (C8/C7) obtained by dividing the contrast value (hereinafter referred to as contrast C8), in the direction B at a polar angle of 60° C,. when the phase retardation plates 42 and 41 are provided, by the contrast value (hereinafter referred to as contrast C7), in the direction B at a polar angle of 60° C. when the phase retardation plates 42 and 41 are not provided, in case where the influence of retardation of the polarizing plates 6 and 7 is removed. In FIG. 39, a horizontal axis is Rth and a vertical axis is Re. (C8/C7) is more than 2 in black regions, more than 1 in gray regions (hatched regions), and 1 or less in colorless regions (no mark regions). The gray regions or the black regions in FIG. 39 are regions where the contrast can be improved by respectively providing the phase retardation plates 42 and 41 having the uniaxial anisotropy between (i) the substrates 1 and 2 and (ii) the polarizing plates 6 and 7 such that a positional relationship between the main refractive index direction and the polarizing plate absorption axis is the relationship mentioned above, when the influence of retardation of the polarizing plates 6 and 7 are removed. Therefore, it is possible to improve the contrast by respectively providing the phase retardation plates 42 and 41 having the uniaxial anisotropy between (i) the substrates 1 and 2 and (ii) the polarizing plates 6 and 7 such that a positional relationship between the main refractive index direction and the polarizing plate absorption axis is the relationship mentioned above.

Embodiment 6

One example embodiment will be described below with reference to the attached drawings.

6-1. Structure and Display Principle of a Display Element

Figure 40:
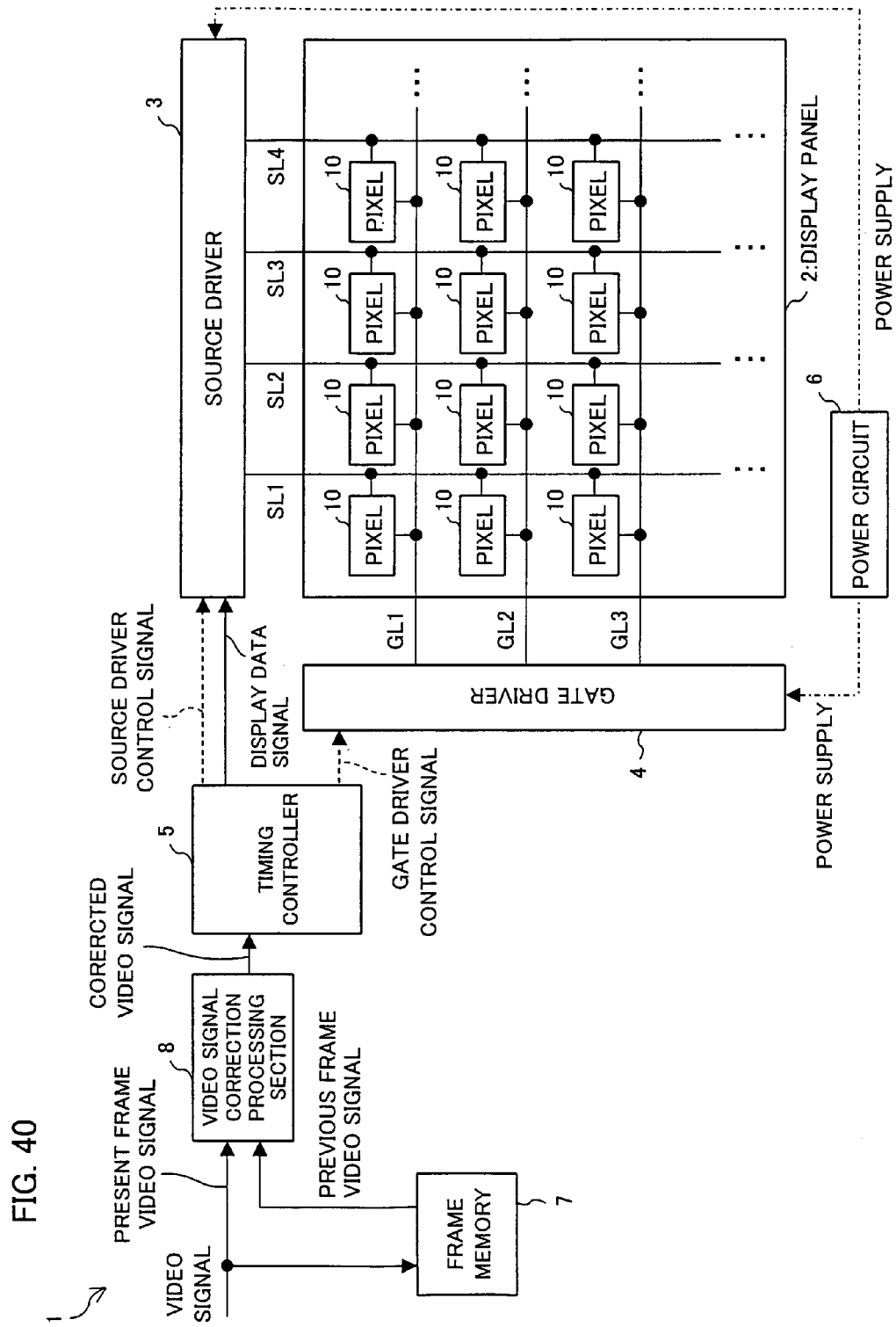
FIG. 40 is a block diagram illustrating a structure of a display device using a display element according to one example embodiment.

Firstly explained is a structure of a display device using a display element of the present embodiment. As shown in FIG. 40, a display device 100 of the present embodiment includes: (i) a display panel 102 in which pixels each having the display element arranged as described later are provided in a matrix manner; (ii) a source driver 103 for driving data signal lines SL1 through SLn of the display panel 102; (iii) a gate driver 104 for driving gate signal lines SL1 through GLm; (iv) a controller 105; and (v) a power circuit 106 for supplying, to the source driver 103 and the gate driver 104, voltages for displaying an image on the display panel 102.

The display device 100 further includes a frame memory 107 and a video signal correction processing section 108. The frame memory 107 stores a video signal, corresponding to one frame, which is sent from an external apparatus. The video signal correction processing section 108 corrects the present frame video signal in accordance with (i) the video signal (present frame video signal; present video signal), corresponding to the present frame, which is inputted from an external apparatus, and (ii) a video signal (previous frame video signal; previous video signal) corresponding to a frame which occurs previous to the present frame by a single frame, and sends the corrected video signal to the controller 105. Note that the term "frame" indicates a unit at which the video signal sent from the external apparatus is transmitted. Note also that how the video signal correction processing section 108 carries out the video signal correction processing is described later.

The controller 105 sends to the source driver 103 (i) a digitalized display data signal (such as R, G, and B video signals that correspond to red, green, and blue, respectively) and (ii) a source driver control signal for controlling an operation of the source driver 103. Further, the controller 105 sends to the gate driver 104 a gate driver control signal for controlling an operation of the gate driver 104. The source driver control signal may be a horizontal synchronization signal, a start pulse signal, a clock signal for the source driver, and the like. The gate driver control signal may be a vertical synchronization signal, a clock signal for the gate driver, and the like. Further, the controller 105 determines display data, which is to be sent to the source driver 103, in accordance with the corrected video signal sent from the video signal correction processing section 108.

The display panel 102 includes: a plurality of the data signal lines SL1 through SLn; and a plurality of the gate signal lines GL1 through GLm which intersect with the data signal lines SL1 through SLn, respectively. In each of the intersections of the data signal lines and the gate signal lines, a pixel 10 is provided. The pixel 10 includes: the display element 120 arranged as described later; and a switching element 121, as shown in FIG. 14.

The switching element 121 is an FET (field effect transistor) arranged so that its gate is connected to a gate signal line GLj and its drain is connected to a data signal line Sli. Further, a source thereof is connected to the display element 120. The other end of the display element 120 is connected to a common electrode line shared by all the pixels. In the pixel 10, when the gate signal line GLj is selected, the switching element 121 becomes electrically continuous, thereby applying, to the display element 120 by the source driver 103 via the data line SLi, a signal voltage determined according to the display data signal sent from the controller 105. During a period that the switching element 120 is OFF after the selection period of the gate signal line GLj, it is ideal that the display element 120 keeps a voltage that corresponds to the voltage at the moment of the disconnection of the switching element 121.

Here, the display element 120 has transmittance or reflective index which varies according to the signal voltage applied by the switching element 121. Therefore, the gate signal line GLj is selected and the signal voltage that corresponds to the display data signal for the pixel 10 is applied from the source driver 103 to the data signal line SLi, so that it is possible to vary a display state of the pixel 10 according to the video data.

An arrangement of the display element 120 is the same as illustrated in FIG. 1(a) and FIG. 1(b) in the Embodiment 1. That is, as shown in FIG. 1(a), the display element 120 includes: (i) two glass substrates 1 and 2 so provided that they face each other; and (ii) polarizing plates 6 and 7 provided on respective outer sides of the glass substrates 1 and 2. Further, in the display element 120, a medium A is injected and sealed between the glass substrates 1 and 2. The medium A is a medium whose intrinsic anisotropy or orientational order varies according to electric field application. Note that the medium A is set to have a thickness of, for example, approximately 10 μm, and is in the nematic phase at a temperature less than 33.3° C., and is in the isotropic phase at a temperature of 33.3° C. or higher. It is possible to use a material shown in the formula 2 of the Embodiment 1 as the medium A. Other materials for the medium A are concretely exemplified later.

On the glass substrate 1, two electrodes 4 and 5 are so provided as to face each other. Specifically, as shown in FIG. 2, each of the electrodes 4 and 5 has a comb-like shape, and the electrodes 4 and 5 are provided in such a manner that each comb tooth of one of the electrodes 4 and 5 is sandwiched between comb teeth of the other electrode of the electrodes 4 and 5. Note that a width of each of the electrodes 4 and 5 is 5 μm, and a distance between them is 5 μm.

As shown in FIG. 2, the polarizing plates 6 and 7 provided on the respective glass substrates 1 and 2 are so provided that their absorption axes are orthogonal to each other, and that an angle between each of the absorption axes of the polarizing plate 6 and 7 and each of directions in which the electrodes 4 and 5 extend is approximately 45°. Therefore, the absorption axis of the polarizing plate 6 forms an angle of 45° with respect to a direction of an electric field applied by the electrodes 4, and the absorption axis of the polarizing plate 7 forms an angle of 45° with respect to a direction of an electric field applied by the electrodes 5.

When an electric field is applied between the electrodes 4 and 5 provided in the foregoing manner, an electric field substantially parallel to the substrate 1 is applied to the medium A as shown in FIG. 1(*b*). Further, by applying an electric field between the electrodes 4 and 5 while keeping a temperature of the display element 120 thus arranged in the vicinity of a nematic phase/isotropic phase transition temperature of the medium A (specifically, keeping at a temperature slightly higher—for example, 0.1 K higher—than the phase transition temperature) with the use of a heating apparatus, the transmittance of the display element 120 can be varied.

The following description explains a principle of the image displaying performed by the display element 120 of the present embodiment with reference to FIG. 3(*a*). As shown in FIG. 3(*a*), when no electric field is applied between the electrodes 4 and 5, the medium A interposed between the substrates 1 and 2 is in the isotropic phase, and is also optically isotropic. Therefore, the display element 120 carries out black display at the moment.

In contrast, when an electric field is applied between the electrodes 4 and 5, molecules of the medium A are aligned in such a manner that longitudinal sides of the molecules are along a field effect between the electrodes 4 and 5 as shown in FIG. 3(*b*). This causes a double refraction phenomenon. Due to the double refraction phenomenon, the transmittance of the display element 120 can be modulated according to the voltage between the electrodes 4 and 5 as shown in FIG. 3(*c*).

In cases where the temperature of the display element 120 is greatly different from the phase transition temperature of the medium A, a larger voltage is required in modulating the transmittance of the display element 120. On the contrary, in cases where the temperature of the display element 120 is substantially the same as the phase transition temperature of the medium A, voltage application of 0V through approximately 100V is sufficient to modulate the transmittance of the display element 120.

6-2. An Example of Other Structure of the Display Element

In the present display element, the medium A may be: 4'-n-alkoxy-3'-nitrobiphenyl-4-carboxylic acids (ANBC-22), which is a transparent dielectric material.

The substrates l and 2 were glass substrates, and a distance therebetween was set to be 4 μm by dispersing beads in advance. In other words, a thickness of the medium A was set to be 4 μm.

Further, the electrodes 4 and 5 were transparent electrodes made of ITO (indium tin oxide). On respective inner sides (counter faces) of the substrates 1 and 2, alignment films made of polyimide were provided after being subjected to a rubbing processing. It is preferable to set a rubbing direction to be such a direction that the display element is in a light state when the medium A is in the smectic C phase. It is typically preferable that the rubbing direction form an angle of 45° with respect to each axis of the polarizing plates. Note that, an alignment film on the side of the substrate 1 is formed so as to cover the electrodes 4 and 5.

As shown in FIG. 2, the polarizing plates 6 and 7 were provided on respective outer sides (rear faces with respect to the counter faces) of the substrates 1 and 2 in such a manner that their absorption axes were orthogonal to each other, and that each of the absorption axes forms an angle of 45° with respect to such a direction that each of the comb tooth portions of the electrodes 4 and 5 extended, respectively.

When the display element thus obtained is in the vicinity of a temperature lower than a smectic C phase/cubic phase transition temperature, the medium A is in the smectic C phase. The medium A in the smectic C phase is optically anisotropic when no electric field is applied.

Thereafter, while keeping the display element at the temperature near the smectic C phase/cubic phase transition temperature (specifically, keeping at a temperature approximately 10K lower than the phase transition temperature) with the use of an external heating apparatus, an electric field (approximately 50V of alternating electric field whose frequency was larger than 0 Hz and no more than several hundred kHz) was applied. This caused a change in the transmittance of the display element. In other words, the electric field application caused a phase transition of the medium A from (i) the smectic C phase (light state) in which the medium A is optically anisotropic when no electric field is applied, to (ii) the cubic phase (dark state) in which the medium A is optically isotropic.

Displaying was successfully done when the angle formed by the absorption axis and each of the electrodes was not only at 45° but also in a range of 0° to 90°. This is because of the following reasons. That is, the light state is attained when no voltage is applied, so that the light state can be attained merely by a relation between the rubbing direction and the absorption axis of the polarizing plate. Moreover, the dark state is attained through that phase transition, of the medium, to the optically isotropic phase which is induced by an electric field caused by voltage application. Therefore, irrespective of the relation between (i) the absorption axis of the polarizing plate and (ii) the direction of the electrode, the dark state can be attained as long as the absorption axes are orthogonal to each other. Therefore, the alignment processing is not necessarily required, and displaying was successfully done even in the case where the medium A was in amorphous alignment state (random alignment state).

In the case where the electrodes were provided on the substrates 1 and 2 respectively and an electric field was generated in a normal line direction with respect to the faces of the substrates 1 and 2, substantially the same result was obtained. In other words, the electric field application in the normal line direction produced the substantially the same result as the electric field application in a horizontal direction with respect to the faces of the substrates 1 and 2 did.

As such, the medium A of the present display element may be a material which shows optical anisotropy when no voltage is applied, and which loses the optical anisotropy and shows optical isotropy in accordance with electric field application.

The medium A in the present display element may have positive dielectric anisotropy or negative dielectric anisotropy. In cases where the medium A has the positive dielectric anisotropy, an electric field substantially parallel to the substrates is required for the driving of the display element.

However, in cases where the medium A has the negative dielectric isotropy, there is no restriction described above.

For example, both the electric field which is oblique with respect to the substrates and the electric field which is perpendicular to the substrates enable the present display element to be driven. In these cases, the electrodes are provided on both of the pair of the substrates (substrates 1 and 2) in the present display element. By applying an electric field to a region between the electrodes provided on both of the substrates, the electric field can be applied to the medium A.

In any case of applying the electric field parallel, perpendicular, or oblique with respect to the faces of the substrates, it is possible to suitably change shapes, materials, numbers, and positions of the electrodes. For example, the electrodes are transparent electrodes, and the electric field is applied perpendicularly with respect to the faces of the substrates. In this case, the present display element has an advantage in an open area ratio.

Figure 41:
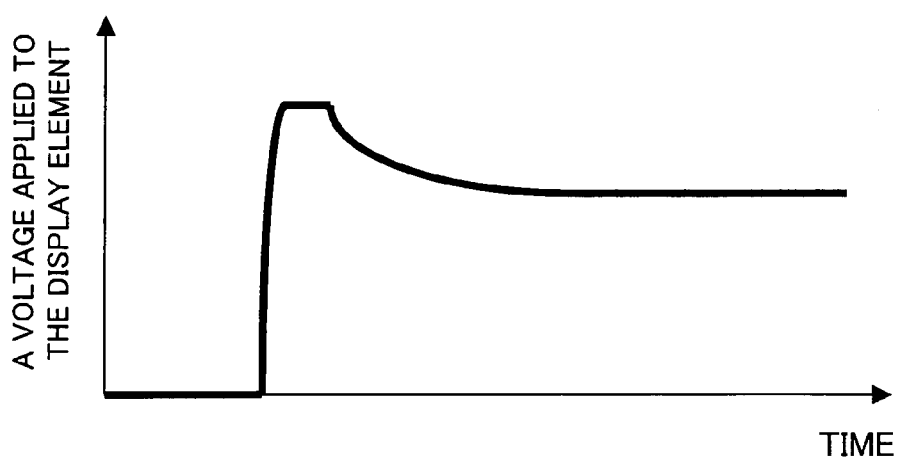
FIG. 41 is a graph illustrating a change, over time, in a voltage applied to a display element driven in accordance with a conventional driving method.

6-3. Method for Applying an Electric Field to the Display Element of the Present Embodiment Next, explanation of a method for applying an electric field to the display element of the present embodiment is made. Firstly, the present inventors studied the voltage which had been actually applied in the conventional display element so as to explore, in detail, what had caused the slow display response in the conventional display element. As a result, it was found that the applied voltage of the display element was not constantly kept at the signal voltage, and decreased as time went by, as shown in FIG. 41.

Figure 42:
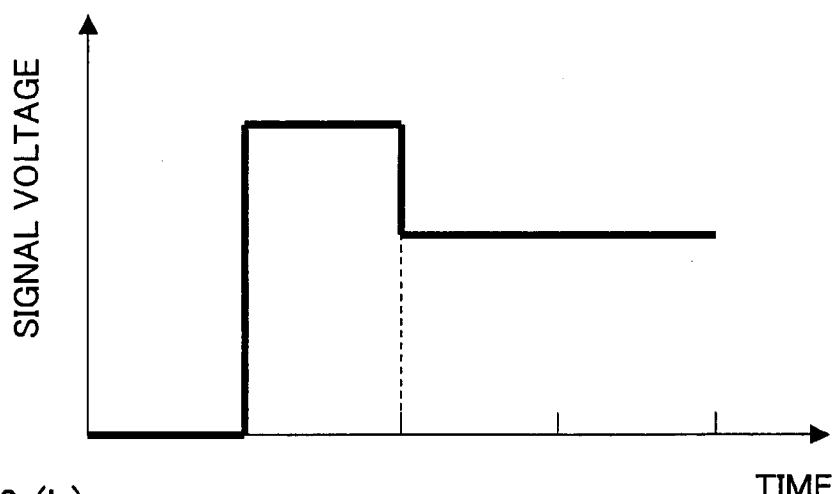
FIG. 42(a) is a graph illustrating application of a signal voltage, obtained by using a driving method of an example embodiment, during time corresponding to a first frame.
FIG. 42(b) is a graph illustrating a change, over time, in the transmittance when the signal voltage is applied to the display element as shown in FIG. 42(a).
Figure 42:
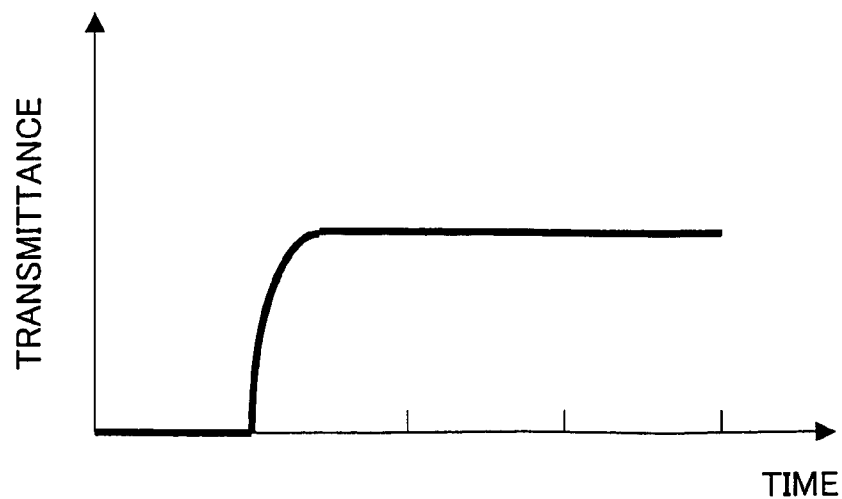
Figure 46:
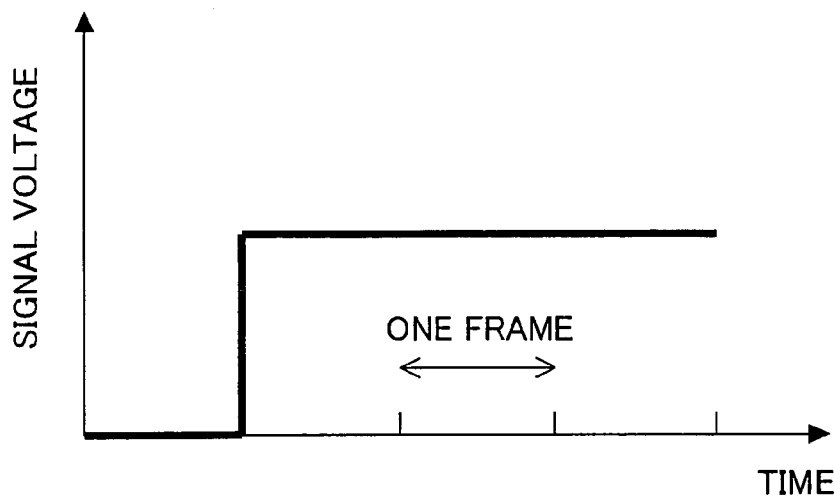
FIG. 46(a) is a graph illustrating a signal voltage applied to the display element in accordance with the conventional driving method.
FIG. 46(b) is a graph illustrating a change in transmittance when a signal voltage is applied as shown in FIG. 46(a).
Figure 46:
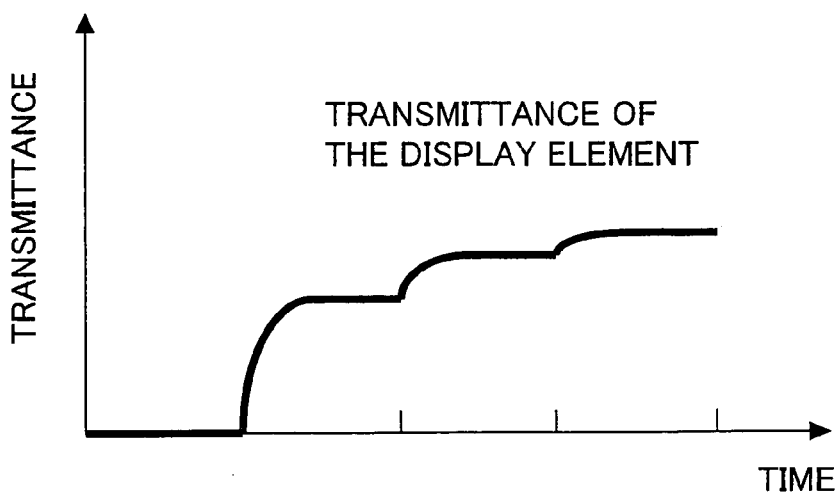

However, as shown in FIG. 42(a), when a signal voltage higher than a voltage (hereinafter, referred to as "target voltage") that should be attained was written in the display element during a time, corresponding to a first frame, in which a voltage was written in the display element, the stair-like response waveform (see FIG. 46(b)) of the transmittance was not observed, and the display element carried out displaying in high-speed response to the signal voltage. The following description explains why the high-speed response displaying was realized.

Figure 43:
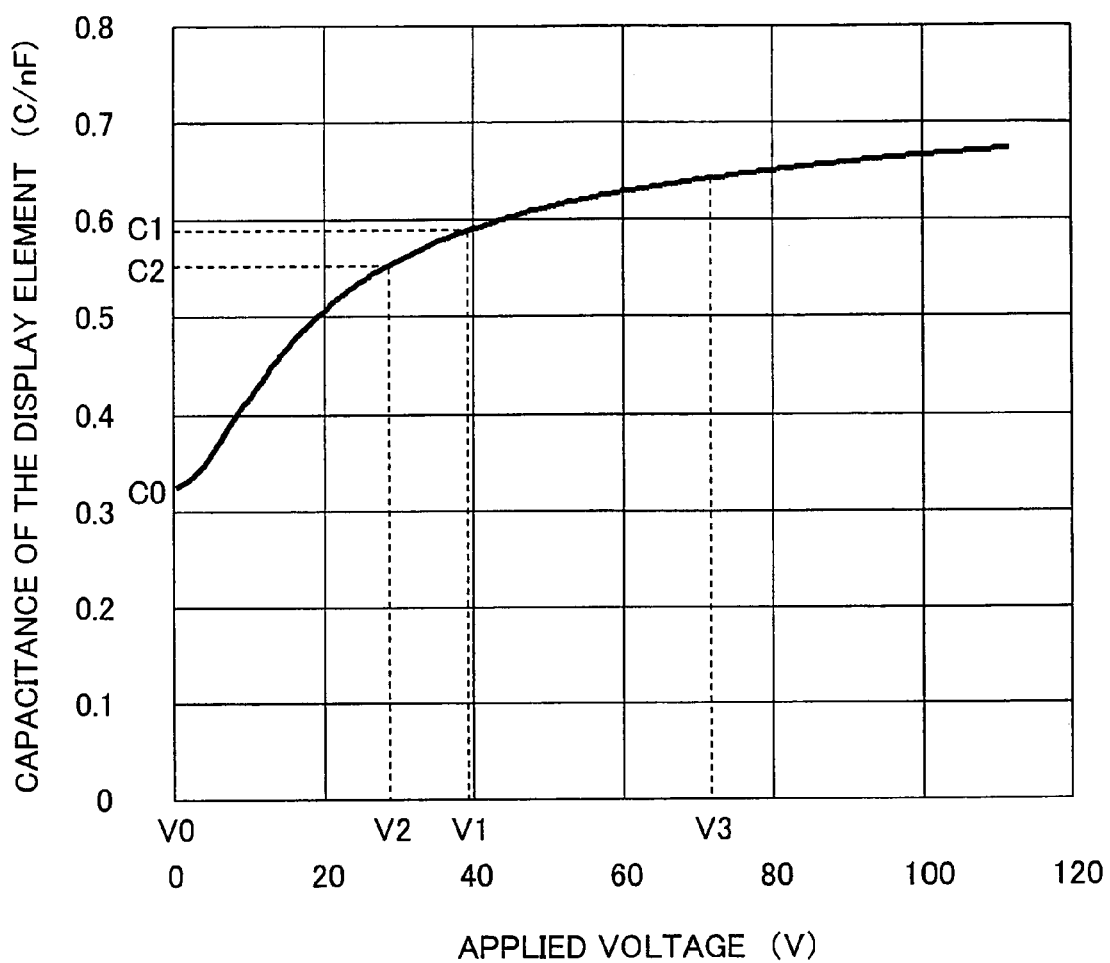
FIG. 43 is a graph illustrating a relation between an applied voltage and capacitance in the display element according to one example embodiment.
Figure 44:
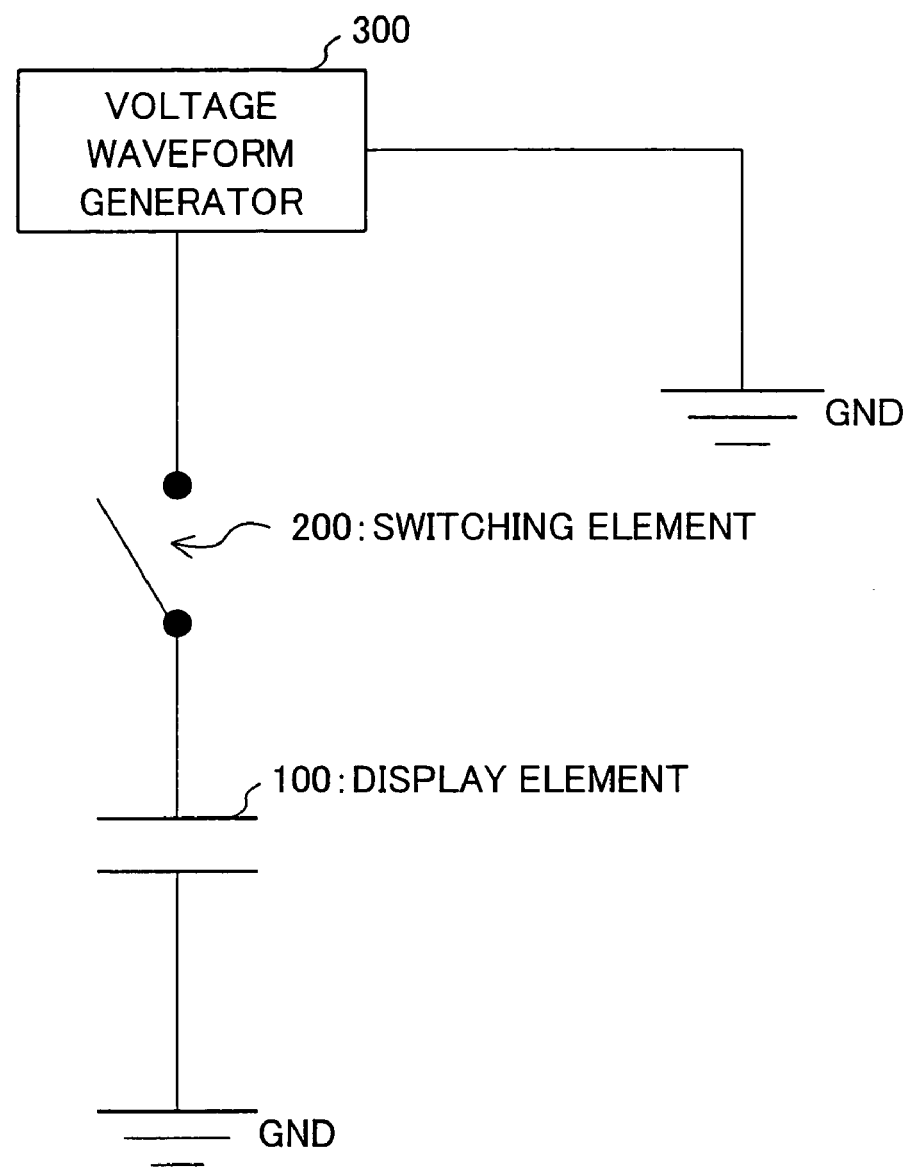
FIG. 44 is a schematic diagram illustrating a display element driven in accordance with a conventional driving method, and an arrangement on the periphery of the display element.
Figure 45:
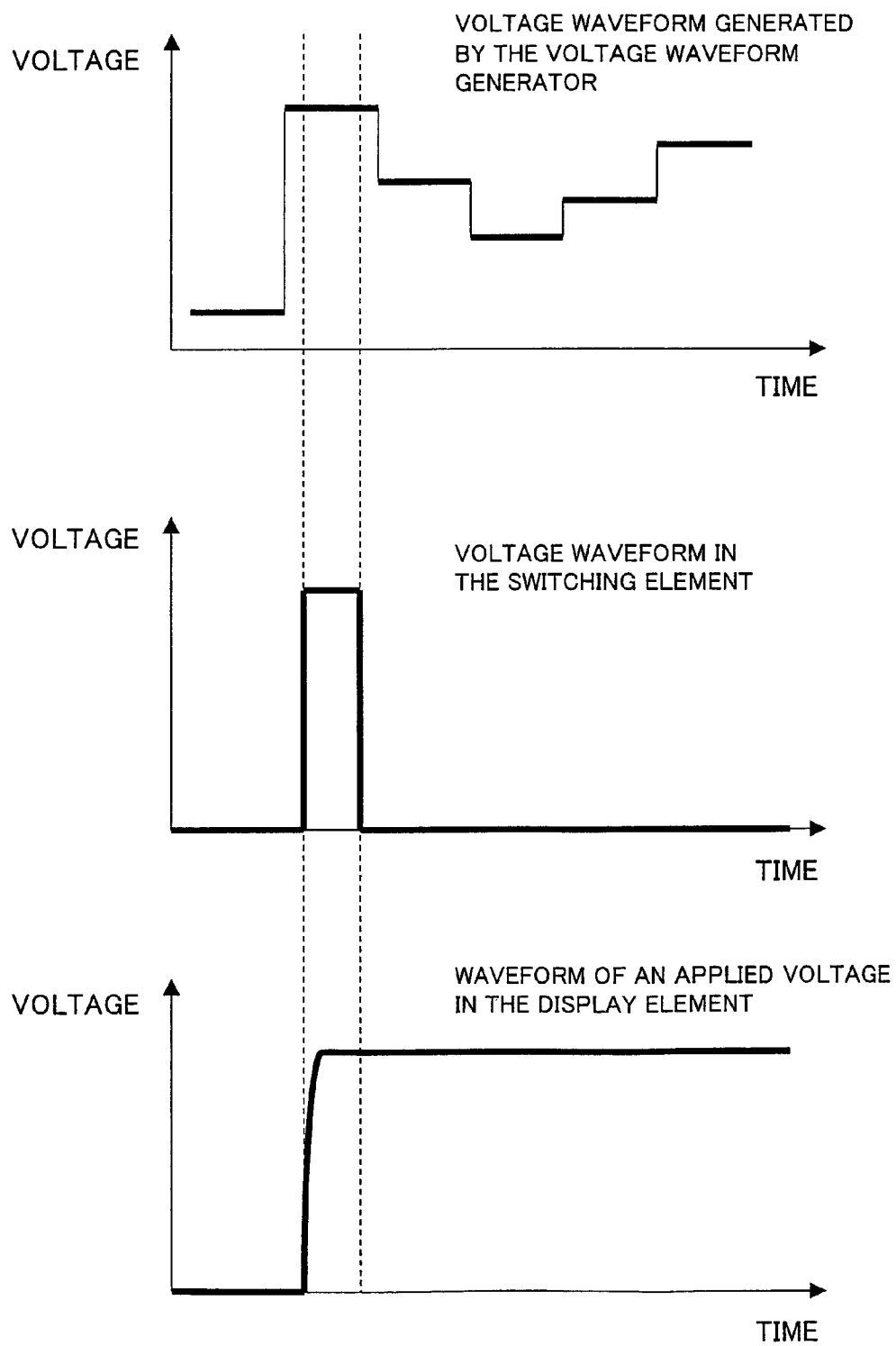
FIG. 45 is a graph explaining an ideal response of the display element to a signal voltage, and illustrating respective voltage waveforms in a voltage waveform generator, a switching element, and the display element.

FIG. 43 illustrates a relation between (i) voltage (V) in the display element of the present embodiment and (ii) capacitance (C/nF) of the display element. As shown in FIG. 8, in the display element of the present embodiment, the capacitance monotonously increases as the voltage increases. Specifically, as the voltage increases, the orientational order in the medium A becomes higher, and the alignment polarization in the medium A contributes the increase of the capacitance of the display element.

Here, the display element is caused to respond from (i) a state of: voltage of 0.0 V and capacitance of 0.325 nF, to (ii) a state of: voltage of 40.0 V and capacitance of 0.590 nF. Note that, hereinafter, 0.0 V is indicated by V0, 0.325 nF is indicated by C0, 40.0 V is indicated by V1, and 0.590 nF is indicated by C1.

That is, when the voltage of the display element is V0, the target voltage, which is a voltage that the voltage in the display element is supposed to reach by the signal voltage application, is V1. At the moment of applying a voltage V1, an electric charge Q01 charged in the display element is:

$$Q01 = C0 \cdot V1 (=13.0 (nC))$$

However, an electric charge amount Q1, which is supposed to be charged in the display element when the voltage of the display element is V1 and the capacitance thereof is C1, is:

$$Q1 = C1 \cdot V1 (=23.6 (nC))$$

Here, because C0<C1 is satisfied as shown in FIG. 43, Q01<Q1 is apparently satisfied. This indicates that the electric charge amount in the display element is insufficient.

Actually, a voltage V2 and capacitance C2 satisfying: Q01=C2·V2 exist, and the display element is charged with the voltage V2, lower than the voltage V1, in response to the input of the voltage V1. Note that, as shown in FIG. 43, C2 is 0.53 nF, and V2 is 24.5 V.

Namely, the response of the display element to the signal voltage V1 is not completed, and after such an incomplete response is repeated several times, the voltage finally reaches (saturates) V1. Therefore, in the case where the switching element for an ordinary liquid crystal is used to drive the display element of the present embodiment, the response waveform of the transmittance has the stair-like shape (see FIG. 46(b)).

However, in the case where: a voltage V3 satisfying C0·V3=C1·V1 (where V3>V1 is apparently satisfied) is written in the display element as the signal voltage that corresponds to the first frame and signal voltages applied after the signal voltage that corresponds to the first frame are V1, the voltage that the display element has during the time that corresponds to the first frame reaches the voltage V1. On this account, the response waveform of the transmittance does not have the stair-like shape. This allows realization of the display element which carries out displaying in high-speed response to the signal voltage. Note that V3 is 72.6 V as shown in the graph of FIG. 43.

In other words, a requirement for the realization of the high-speed response display is not the application of the signal voltage as large as the target voltage, but the determination of the signal voltage in consideration for the capacitance of the display element 120 at the moment of the writing of the signal voltage. This can educe the intrinsic response property of the medium A.

Next, the following description concretely explains how the signal voltage is determined in consideration for the capacitance of the display element 120.

The determination of the signal voltage in consideration for the capacitance of the display element 120 is made by the video signal correction processing section 108 (see FIG. 40). For example, the video signal correction processing section 108 includes a table made up of a memory, such as a ROM (Read Only Memory) and a SRAM (Static Random Access Memory), in which the previous frame video signal and the present video signal correspond to the corrected video signal. The video signal correction processing section 108 can determine the corrected video signal in accordance with the present frame video signal and the previous frame video signal. Based on the corrected video signal obtained through the correction by the video signal correction processing section 108 with the use of the table, the display data signal for determining the signal voltage is sent from the controller 105 to the source driver 103.

Here, how to create the table for determining the corrected video signal is explained below.

Firstly, a voltage supposed to be applied to the display element 11 during a time that corresponds to the present frame is indicated by Vi, and capacitance of the display element 11 when the voltage is Vi is indicated by Ci. Moreover, a voltage applied to the display element 120 during a time that corresponds to the previous frame is indicated by Vi-1, and capacitance of the display element 11 when the voltage is Vi-1 is indicated by Ci-1. Note that the capacitance Ci and Ci-1 are found from a voltage-capacitance curve like FIG. 43 by locating capacitance that corresponds to the voltages Vi and Vi-1, respectively. Further, the capacitance Ci-1 and the voltage Vi-1 are found in accordance with the previous frame video signal sent to the video signal correction processing section 8. Furthermore, the capacitance Ci and the voltage Vi are found in accordance with the present frame video signal sent to the video signal correction processing section 108.

In the arrangement in which the present frame video signal and the previous frame video signal are thus used to find the voltages and the capacitance, as described in the aforementioned concrete example using C0, C1, and V1, a signal voltage Vs for realizing the high-speed response display is so determined as to satisfy:

$$Vs = Vi \cdot Ci / Ci\text{-}1$$

Therefore, the table of the video signal processing section 108 stores the corrected video signal that corresponds to the present frame video signal and the previous frame video signal, and that is used for the output, by controller 105, of the display data signal for allowing writing of the signal voltage Vs.

It is ideal that, for example, a display device carrying out 256-level grayscale displaying has a 256×256 table as the table of the video signal correction processing section 108. However, a 5×5 table may be created instead. In the 5×5 table, the corrected video signal corresponds to arbitrary five points—for example, 0-level grayscale, 64-level grayscale, 128-level grayscale, 196-level grayscale, 255-level grayscale—of the 256-level grayscale, and the corrected video signal that corresponds to other grayscale which are not in the table is determined by an interpolation operation. This allows reduction of memory volume required in storing the table. Accordingly, a circuit size and manufacturing cost can be reduced.

The table is not necessarily required in the video signal correction processing by the video signal correction processing section 108. Instead, for example, an appropriate function may be used in the correction processing. In this case, there is no need to provide the memory for the table in the video signal correction processing section 108, thereby reducing the manufacturing cost of the display device. The following description explains a concrete example of the function for the video signal correction processing by the video signal correction processing section 108.

For example, it is assumed that grayscale level of the present frame is set at $\alpha$ in the present frame video signal for the purpose of generating the voltage Vi of the present frame. Also, it is assumed that grayscale level of the previous frame is set at $\beta$ in the previous frame video signal for the purpose of generating the voltage Vi-1 of the previous frame.

In this case, the video signal correction processing section 8 calculates a grayscale level $\gamma$ in accordance with the following formula:

$$\gamma = f(\alpha, \beta) = \beta + k \times (\beta - \alpha), \text{ where } f(\alpha, \beta) \text{ is the function,}$$

and the video signal correction processing section 108 sends to the controller 105 the corrected video signal so as to apply to the display element 120 a signal voltage according to the grayscale level $\gamma$. In cases where the grayscale $\gamma$ determined according to the function $f(\alpha, \beta)$ goes beyond a maximum value (for example, 255) of the grayscale that the display element is capable of displaying or goes behind a minimum value (for example, 0) thereof, it is preferable that the grayscale level $\gamma$ be set at the maximum value or the minimum value, respectively.

Note that k in the function $f(\alpha, \beta)$ is an arbitrary constant. Note also that the present inventors confirmed that, by determining the grayscale level $\gamma$ while satisfying k=½, and by outputting, from the video signal correction processing section 108, the corrected video signal that is according to the grayscale level $\gamma$, the display element 11 made a response at sufficient speed to the signal voltage, and carried out displaying. Further, k may be found by the following formula:

$$k = |\beta - \alpha| / G\text{max, where } G\text{max is the maximum value of the grayscale level that the display element 120 can display.}$$

Further, the grayscale level $\gamma$ may be determined in accordance with k thus determined, $\alpha$, and $\beta$.

The aforementioned description explains the determination of the signal voltage in the case where the previous frame video signal stored in the frame memory 107 is used for the correction processing carried out by the video signal correction processing section 108. However, the present invention is not necessarily limited to this. That is, the determination of the signal voltage can be made by using a further previous frame video signal, which is a frame video signal corresponding to a frame that occurs previous to the previous frame, and which is stored in the frame memory 107.

Specifically, in consideration for the further previous frame video signal stored in the frame memory 107, the table or the function used by the video signal correction processing section 108 in the correction processing is set. Because the corrected video signal is determined in accordance with the previous frame video signal and the further previous frame video signal, a highly accurate determination of the corrected video signal can be made. Accordingly, a more accurate corrected video signal can be determined by the video signal correction processing section 108, so that high-speed response display of the display element 11 is realized.

Instead of the previous frame video signal, data (previous frame achievement estimate data), such as the voltage and the grayscale level that the display element 120 possibly shows during the time that corresponds to the previous frame, may be stored in the frame memory 107, and may be used by the video signal correction processing section 108 in the video signal correction processing. This allows more accurate video signal correction even in the case where a response of the display element 120 to the signal voltage is not completed during the time that corresponds to the previous frame, that is, where there occurs a voltage difference between (i) the actual applied voltage of the display element 11 during the time and (ii) the voltage supposed to reach during the time. On this account, a more accurate corrected video signal can be determined by the video signal correction processing section 108, so that high-speed response display of the display element 120 is realized.

However, for the implementation of the video signal correction processing using the previous frame achievement estimate data, it is necessary to provide, in the video signal correction processing section 108, a table or a function for obtaining the corrected video signal in accordance with the previous frame achievement estimate data and the present frame video signal.

The video signal correction processing in accordance with the previous frame achievement estimate data and the present frame video signal is effective when the signal voltage Vs, which is determined to realize the high-speed response displaying, is beyond an upper limit value of a voltage (driver withstand pressure) that can be applied to the source driver 103.

Specifically, when the signal voltage Vs is beyond the driver withstand pressure, the driver withstand pressure lower than the signal voltage Vs is applied to the display element 120. In this case, the voltage that is actually applied to the display element 120 does not reach the target voltage that is supposed to reach. In such a case, a more accurate correction of the video signal is made in accordance with the corrected video signal obtained by the video signal correction processing using the frame achievement estimate data. On this account, a more accurate corrected video signal is determined so that high-speed response display of the display element 120 is realized. Then, in accordance with the corrected video signal thus determined, a signal voltage for realizing the high-speed response display can be applied again from the source driver 103.

When the signal voltage Vs is beyond the driver withstand pressure as such, substantially two-stage application of the signal voltage becomes possible. This is an advantage of the video signal correction using the previous frame achievement estimate data.

Further, the display response speed of the display element 120 is possibly greatly affected by the temperature of the medium A. This is because, as the temperature changes the property of the medium A, the capacitance of the display element is also changed. Therefore, the correction processing by the video signal correction processing section 108 may be changed according to the temperature of the medium A.

For that purpose, a temperature sensor (not shown) is provided to detect the temperature of the pixels 10, and the table or the function, used by the video signal correction processing section 108 in the video signal correction processing, is so provided as to correspond to each of a plurality of temperature ranges set in advance. The table or the function may be suitably changed according to that temperature of the medium A which is detected by the temperature sensor. Specifically, as the temperature decreases, viscosity of the medium A increases, and the table or the function is therefore changed so that a high signal voltage is applied to the display element.

Moreover, in the case of the aforementioned display element carrying out displaying while keeping a temperature in the vicinity of the nematic phase/isotropic phase transition temperature, as the temperature increases, the driving voltage tends to increase. Therefore, also in this case, it is required to change the table or the function so that a high signal voltage is applied to the display element.

Specifically, when it is assumed that the refractive index in the electric field direction is n//, and that the refractive index in a direction perpendicular to the electric field direction is $n^\perp$, a relation between the double refraction change ($\Delta n = n// - n^\perp$) and the outer electric field (i.e., electric field E (V/m)) is found by the following formula:

$\Delta n = \lambda BkE^2$, where $\lambda$ indicates wavelength of incident light in vacuum, and $Bk$ indicates a Kerr constant ($m/V2$), and $E$ indicates applied electric field intensity ($V/m$).

It is known that, as the temperature increases, the Kerr constant Bk decreases according to the function proportional to: $1/(T-T^*)$. Although driving with weak electric field is possible in the vicinity of the transition point (T*), as the temperature (T) increases, the electric field intensity required in the driving drastically increases. For this reason, the temperature adjustment by the table or the function is very effective.

Therefore, the adjustment by the table or the function in consideration for the viscosity and the temperature dependency of the Kerr constant is significantly effective in terms of securing the temperature ranges for the implementation of the display element 120.

Thus, it is possible to output an accurate corrected video signal according to the temperature of the medium A from the video signal processing section 108. On this account, irrespective of the temperature of the display element 120, a displaying in high-speed response to the signal voltage can be carried out by the display element 120.

In the display element of the present embodiment, the electric field is generated in the direction parallel to the substrates, however, a way of generating the electric field is not limited to this. For example, in the case where an electric field perpendicular to the substrates is applied for the sake of displaying like the electric field generating method described in Japanese Laid-Open Patent Application Tokukai 2001-249363 (published on Sep. 14, 2001), the high-speed response displaying can be also realized in the display element of the present embodiment.

6-4. Difference Between the Conventional Liquid Crystal Display Element and the Display Element of the Present Embodiment The display element of the present embodiment is greatly different in displaying principle from the conventional liquid crystal display element. The following description explains the difference.

In the conventional liquid crystal display element, liquid crystal molecules are aligned in a certain direction even when no electric field is applied. By applying electric fields to the electrodes of the conventional liquid crystal display element, the alignment direction of the liquid crystal molecules are varied, thereby causing the transmittance modulation. Thus, the shape of the refractive index ellipsoid is elliptic when a voltage is applied and when no electric field is applied, and its long-axis direction varies (the refractive index ellipsoid rotates). Further, the shape of the refractive index ellipsoid hardly changes when an electric field is applied and when no electric field is applied.

On the other hand, in the display element of the present embodiment, when no electric field is applied to the electrodes, the medium A is optically isotropic, that is, the molecules of the medium A have no orientational order. In this case, the shape of the refractive index ellipsoid is globular unlike the conventional liquid crystal display element. By applying electric fields to the electrodes of the display element of the present embodiment, the medium A becomes optical anisotropic, in other words, the medium A is caused to have an orientational order. That is, an electric field is applied, so that the optical anisotropy is expressed, and the shape of the refractive index ellipsoid changes into an elliptic shape.

Namely, in the conventional liquid crystal display element, the image displaying is carried out by changing an alignment direction while securing a constant orientational order. On the other hand, in the present display element, the direction of the optical anisotropy is always the same (i.e., the electric field application direction does not change), and the image displaying is carried out by modulating an orientational order parameter of the medium A. In this respect, the displaying principle of the display element of the present embodiment is different from that of the conventional liquid crystal display element.

Further, unlike the conventional liquid crystal display element, the display element of the present embodiment uses the medium exhibiting optical isotropy, so that the display element of the present embodiment does not require an alignment processing performed with respect to interfaces of the substrates. On this account, the display element of the present embodiment has advantages in manufacturing cost lower than that of the conventional liquid crystal display element, and in no displaying defect (especially, deterioration in contrast) due to the alignment processing.

However, when the display element of the present embodiment repeatedly displays static images having the same grayscale level, the medium A in alignment adheres to a vicinity of the interfaces of the substrates. When the display element then displays an image having different grayscale level, the medium A separated from the interfaces can respond at high speed to the signal voltage, but the medium A near the interfaces possibly cannot respond to the signal voltage. This causes so-called burn-in of the display image, and this is therefore undesirable.

However, in the foregoing video signal correction processing, when the grayscale of the display image is changed, the signal voltage greatly larger (or smaller) than the target voltage, which is supposed to reach, is applied to the display element for a moment. This eliminates the burn-in near the interfaces of the substrates.

6-5. Concrete Example of the Medium A

The medium A for the display element of the present embodiment is a material whose magnitude of anisotropy or orientational order varies according to electric field application as described above, but is not limited to a material exhibiting the Kerr effect. For example, the medium A may be (i) a material which is optically isotropic when no voltage is applied, and which becomes optically anisotropic by voltage application; and (ii) a material which has optical anisotropy when no voltage is applied, and which loses the optical anisotropy and obtains optical isotropy by voltage application.

It is preferable that the medium A contain a liquid crystal material. Note that the liquid crystal material may be (i) a liquid crystal material which is made of a single material showing liquid crystallinity, (ii) a liquid crystal material in which a plurality of materials are mixed so as to show liquid crystallinity, (iii) a liquid crystal material in which other non-liquid crystal material is mixed in the plurality of materials.

For example, it is possible to use, as the liquid crystal material that can be contained in the medium A, a liquid crystal material described in Japanese Laid-Open Patent Application Tokukai 2001-249363 (published on Sep. 14, 2001). Further, it is also possible to use a liquid crystal material prepared by adding a solvent to the liquid crystal material described in Japanese Laid-Open Patent Application Tokukaihei 11-183937/1999 (published on Jul. 9, 1999). Furthermore, it is also possible to use a liquid crystal material partitioned into small sections as described in the patent document 2. Moreover, it is also possible to use polymer/liquid crystal dispersal system materials described in Appl. Phys, Lett., 1996, vol. 69, pp. 1044-1046.

In any case, it is preferable that the medium A be a material which is optically isotropic when no electric field is applied, and which induce the optical modulation when an electric field is applied. Typically, it is preferable that the medium A be a material in which an orientational order of molecules or a molecule cluster is improved by electric field application.

Further, it is preferable that the medium A be a material showing the Kerr effect. The material may be, for example, PLZT (Lead Zirconium Titanate, doped with a little lanthanum; La-modified lead zirconate titanate), or the like. Further, it is preferable that the medium A contain polar molecules. For example, nitrobenzene is suitable for the medium A.

Further, the materials recited as the medium sealed in the dielectric material layer (medium layer) in the aforementioned embodiments can be used for the medium A.

6. Program of the Present Embodiment

In the aforementioned embodiment, the members constituting the video signal correction processing section 8 are realized by only hardware, however, the present invention is not limited to this. The video signal correction processing section 108 may be realized by a combination of (i) a program for realizing function(s) of all or a part of the members and (ii) hardware (computer) for executing the program. For example, the video signal correction processing section 108 may be realized by a computer, connected to the display element 11, which serves as a device driver used when driving the display element 120. In cases where the video signal correction processing section 108 is realized as a conversion board provided outside the display element 120, and where operation of a circuit for realizing the video signal correction processing section 8 can be changed by changing the program such as software program, the circuit itself may be operated as the video signal correction processing section 108 of the present embodiment by changing the operation of the circuit with the use of the software program.

In these cases, the video signal correction processing section 108 can be realized by only causing the hardware, which is capable of realizing the functions, to run the program.

The program is a program code (an execution program, intermediate code program, or source program) which is a software implementation of the aforementioned functions. This program may be used by itself or may be used in combination with other programs (OS or the like). Further, it may be so arranged that: the program is temporarily stored in a memory (ROM or the like) of the device after being read out from a storage medium, and is then read out again so as to implement the program.

The storage medium storing the program may be a storage medium which is provided separable from the hardware for implementing the program, or may be a medium which is fixedly provided on the hardware. Alternatively, the storage medium may be connected to the hardware as an external storage device.

Examples of the storage medium include tapes, such as magnetic tape and cassette tape; disks including magnetic disks, such as floppy disks (registered trademark) and hard disk, and optical disks, such as CD-ROMs, MOs, MDs, DVDs, and CD-Rs; cards, such as IC card (including memory cards) and optical cards; and semiconductor memories, such as mask ROMs, EPROMs, EEPROMs, and flash ROMs.

Further, it is possible to use a storage medium which is connected to the hardware via a network (intranet/internet or the like). In this case, the hardware downloads a program (a computer data signal (data signal sequence) of the program) via the network. That is, it may be so arranged that: the program is obtained via a transmission medium (medium for fluidly holding the program) such as the network (connected to a fixed line or a radio line). Note that it is preferable that a program for downloading is stored in the hardware (or a sending side device or a receiving side device) in advance.

In order to solve the foregoing problem, a display element of the present technology a medium provided between a pair of substrates, at least one of the substrates being transparent, an electric field being applied to the medium in order to carry out a display, wherein the medium varies in terms of magnitude of optical anisotropy in response to application of the electric field.

According to the arrangement, it is possible to vary a magnitude of optical anisotropy of the medium when an electric field is applied, from the magnitude thereof when no electric field is applied. Here, the change in the magnitude of the optical anisotropy means a change in a shape of an refractive index ellipsoid (optical indicatrix). That is, in the display element of the present technology, it is possible to realize one display state when an electric field is applied and realize another display state when no electric field is applied, so as to differentiate these display states from each other, by using the change in the shape of the refractive index ellipsoid.

On the contrary, in the conventional liquid crystal display element, the shape of the refractive index ellipsoid stays elliptic irrespective of the electric field application, but a direction of a longitudinal side of the refractive index ellipsoid is changed (rotates). In other words, the conventional liquid crystal display element realizes one display state when an electric field is applied and realizes another display state when no electric field is applied, so as to differentiate these display states from each other, by using the change (rotation) of the longitudinal side of the refractive index ellipsoid.

Because the conventional liquid crystal display element uses a change in an alignment direction of liquid crystal molecules, the response speed of the conventional liquid crystal display element is greatly influenced by intrinsic viscosity of liquid crystal. On the contrary, the aforementioned arrangement uses the change in the magnitude of the optical anisotropy in the medium so as to carry out displaying. For this reason, the response speed is not greatly influenced by the intrinsic viscosity of the liquid crystal unlike the conventional display element. Therefore, the arrangement allows realization of high-speed response. Further, the high-speed responsiveness of the present display element can be used for a field sequential color display device.

Moreover, the conventional liquid crystal display element using the electro-optic effect raises such a problem that: the driving temperature range is limited to a vicinity of a phase transition point of the liquid crystal, and therefore requires very precise temperature control. On the contrary, the arrangement allows an easy temperature control by only keeping the medium at such a temperature that the magnitude of the optical anisotropy can be varied according to electric field application.

Further, because the arrangement uses the change in the magnitude of the optical anisotropy of the medium so as to carry out displaying, it is possible to realize a viewing angle property wider than that of the conventional liquid crystal display element that carries out displaying by changing the alignment direction of the liquid crystal molecules.

The display element may be arranged so that: the medium shows optical isotropy when the electric field is not applied, and the medium shows the optical anisotropy when the electric field is applied. In this case, when no voltage is applied, the shape of the refractive index ellipsoid is globular, and when no electric field is applied, the shape thereof becomes elliptic. The display element may be arranged so that: the medium shows the optical anisotropy when the electric field is not applied, and the medium shows optical isotropy when the electric field is applied. In this case, when a voltage is applied, the shape of the refractive index ellipsoid is elliptic, and when no electric field is applied, the shape thereof becomes globular. Further, the medium may be a medium, showing the optical anisotropy when no electric field is applied, which varies in terms of magnitude of optical anisotropy under such condition that the optical anisotropy is expressed by applying the electric field. In this case, when no electric field is applied, the shape of the refractive index ellipsoid is elliptic, and when an electric field is applied, the elliptic shape thereof is so transformed that a ratio of a long axis and a short axis varies before and after an electric field is applied. (note that, the ellipsoid may be globular).

With any of the arrangements described above, it is possible to realize the display element, whose display state is different when an electric field is applied and when no electric field is applied, and which has a wide driving temperature range, a wide viewing angle property, and a high-speed response property.

The display element may be arranged so that: the medium contains an orderly structure (orientational order) smaller than an optical wavelength when an electric field is applied to the medium or when the electric field is not applied to the medium. Namely, it is preferable that the medium not be in liquid isotropic phase but in an order (orderly structure; orientational order) when the orderly structure is smaller than the optical wavelength. When the orderly structure is smaller than the optical wavelength, the medium is optically isotropic. Therefore, by using a medium whose orderly structure is smaller than optical wavelength when an electric field or no electric field is applied, the display state can be securely varied when an electric field is applied and when no electric field is applied.

The display element may be arranged so that: a selective reflection wavelength band or a helical pitch of the molecules, contained in the medium, which are aligned in a helical manner, is not more than 400 nm. The medium in which a pitch (hereinafter, referred to as "helical pitch") of molecules disposed in a helical manner is more than 400 nm possibly changes a color into a color reflecting the pitch. In other words, in the case where the helical pitch of the molecules in the medium is more than 400 nm, light having a wavelength reflecting the helical pitch is selectively reflected, thereby possibly causing the color change of the display color of the display element into the color reflecting the pitch. The phenomenon of selectively reflecting the light having the wavelength reflecting the helical pitch as such is referred to as "selective reflection."

The color change can be prevented by setting the helical pitch or selective reflection wavelength region in the medium at 400 nm or less. Specifically, because light having a wavelength of not more than 400 nm almost cannot be recognized by human's eyes, such a color change does not raise a problem.

The wavelength of the light to be selectively reflected also depends on an incident angle with respect to a helical axis that the medium has. Therefore, in case where the orderly structure that the medium has is not in one dimension but is in, for example, three dimension, the incident angle with respect to the helical axis has a distribution. This causes a distribution in a wavelength range of the light to be selectively reflected. Therefore, it is preferable that the entire selective reflection wavelength region be 400 nm or less.

Further, it is more preferable that the selective reflection wavelength region or helical pitch in the medium be 380 nm or less. This is because the CIE(Commission Internationale de l'Elairage) provides that light having a wavelength of not more than 380 nm cannot be recognized by human's eyes. Therefore, in the case where the selective reflection wavelength region or helical pitch in the medium is 380 nm or less, the color change can be securely prevented.

Further, it is further preferable that the helical pitch in the medium be 253 nm or less. The color change is also associated with an average refractive index of the dielectric medium, in addition to the helical pitch and the incident angle. The light having a color to be changed is light having a wavelength that falls within a wavelength range of: $\Delta\lambda=P\Delta n$ centering on a wavelength of: $\lambda=nP$. Here, indicated by n is the average refractive index, and indicated by P is the helical pitch, and indicated by $\Delta n$ is anisotropy of refractive index.

An varies depending on dielectric materials. For example, in case where a liquid crystal material is used for the material that is to be interposed as the dielectric material layer, the liquid crystal material has the average refractive index n of 1.5, and has $\Delta n$ of approximately 0.1. In this case, the wavelength $\lambda$ is set at 400 nm, and the helical pitch P for bringing the color, which is to be changed, out of the visible range is found by the following equation: 400/1.5=267 nm. Further, $\Delta\lambda$ is found by: 0.1×267=26.7 nm. Therefore, by setting the helical pitch at 253 nm (found by subtracting 13.4 nm (the half of 26.7 nm) from 267 nm) or less, it is possible to prevent such a color change.

Further, it is further preferable that the helical pitch in the medium be 240 nm or less. In the above case, the wavelength $\lambda$ in the relation of: $\lambda=nP$ is set at 400 nm that is the wavelength that almost cannot be recognized by human's eyes. In case of setting the wavelength $\lambda$ at 380 nm that is the wavelength that surely cannot be recognized human's eyes, the helical pitch for preventing the color change is 240 nm or less that is found in consideration for the average refractive index of the dielectric medium. Therefore, by setting the helical pitch in the medium at 240 nm or less, the color change can be securely prevented.

The display element may be arranged so that: the medium has an orderly structure which shows a cubic symmetric property. The display element may be arranged so that: the medium is made of molecules showing a cubic phase or a smectic D phase.

The display element may be arranged so that: the medium is made of liquid crystal microemulsion. The display element may be arranged so that: the medium is made of lyotropic liquid crystal showing any one of a micelle phase, a reversed micelle phase, a sponge phase, and a cubic phase.

The display element may be arranged so that: the medium is made of liquid-crystal-fine-particle dispersal system showing any one of a micelle phase, a reversed micelle phase, a sponge phase, and a cubic phase.

The display element may be arranged so that the medium is made of dendrimer.

The display element may be arranged so that the medium is made of molecules showing a cholesteric blue phase.

The display element may be arranged so that the medium is made of molecules showing a smectic blue phase.

Each of the materials described above varies in magnitude of optical anisotropy according to electric field application. Therefore, these materials can be used for the medium in the display element of the present technology.

Further, the display element according to the present technology be arranged so as to include: a pair of substrates at least one of which is transparent; a medium, sandwiched by the substrates, whose magnitude of optical anisotropy varies in response to application of a voltage; and a polarizing plate which is disposed on at least one of the substrates so as to be positioned in a rear surface with respect to a counter surface facing the medium, wherein: a phase retardation plate having biaxial optical anisotropy is provided between at least one of the substrates and the polarizing plate, and the phase retardation plate is disposed so that, in case where main refractive indices in an in-plane direction of the phase retardation plate are nx1 and ny1 and a main refractive index in a normal direction is nz1, a direction of ny1 is parallel to or orthogonal to an absorption axis of the polarizing plate disposed via the phase retardation plate in a back side with respect to the substrate.

With any of the arrangements, it is possible to apply an electric field to the medium, and is possible to vary the medium in the magnitude of the optical anisotropy.

In order to solve the foregoing problem, a display device includes any one of the aforementioned display elements.

The arrangement allows realization of the display device having a wide driving temperature range, a wide viewing angle property, and a high-speed response property.

Further, the display element according to the present invention may be arranged so as to include: a pair of substrates at least one of which is transparent; a medium, sandwiched by the substrates, whose magnitude of optical anisotropy varies in response to application of a voltage; and a polarizing plate which is disposed on at least one of the substrates so as to be positioned in a rear surface with respect to a counter surface facing the medium, wherein: a phase retardation plate having biaxial optical anisotropy is provided between at least one of the substrates and the polarizing plate, and the phase retardation plate is disposed so that, in case where main refractive indices in an in-plane direction of the phase retardation plate are nx1 and ny1 and a main refractive index in a normal direction is nz1, a direction of ny1 is parallel to or orthogonal to an absorption axis of the polarizing plate disposed via the phase retardation plate in a back side with respect to the substrate.

In the display element, the retardation plate having biaxial optical anisotropy is provided between (i) said at least one substrate of the substrates and (ii) the polarizing plate so that the main reflective index of the retardation plate and the absorption axis of the polarizing plate satisfy the aforementioned relation. This allows improvement of contrast at an oblique viewing angle as compared with the conventional display element. Therefore, with this arrangement, it is possible to provide the display element having a viewing angle property superior to that of the conventional display element.

It is preferable to arrange the display element so that: in case where the phase retardation plate has a thickness of d1 (nm), and retardation of the phase retardation plate is Rxz (nm)=d1 ×(nx1−nz1) and Ryz (nm)=d1 ×(ny1−nz1), the following formulas are satisfied:

$Rxz \geq 0$, $Ryz \leq (225/500)Rxz - 125$, $Ryz \geq (175/275)Rxz - 300$, $Ryz \geq (500/500)Rxz - 400$, $Ryz \geq -225$, or $Ryz \geq 0$, $Rxz \leq (225/500)Ryz - 125$, $Rxz \geq (175/275)Ryz - 300$, $Rxz \geq (500/500)Ryz - 400$, $Rxz \geq -225$.

By satisfying the relational formulas, it is possible to provide the display element in which the contrast at the oblique angle is more securely improved.

It is preferable to arrange the display element so that: in case where the phase retardation plate has a thickness of d1 (nm), and retardation of the phase retardation plate is Rxz (nm)=d1 ×(nx1−nz1) and Ryz (nm)=d1 ×(ny1−nz1), the following formulas are satisfied:

$Rxz \geq 25$, $Ryz \leq (125/250)Rxz - 175$, $-200 \leq Ryz \leq -50$, $Ryz \geq (250/300)Rxz - 300$, or $Ryz \geq 25$, $Rxz \leq (125/250)Ryz - 175$, $-200 \leq Rxz \leq -50$, $Rxz \geq (250/300)Ryz - 300$.

By satisfying the relational formulas, the contrast at the oblique angle in the display element can be dramatically improved. On this account, it is possible to provide the display element having a better viewing angle property.

It is preferable to arrange the display element so that: in case where the phase retardation plate has a thickness of d1 (nm), and retardation of the phase retardation plate is Rxz (nm)=d1 ×(nx1−nz1) and Ryz (nm)=d1 ×(ny1−nz1), and an observing wavelength is γ (nm), the following formulas are satisfied:

$Rxz = -Ryz$, $Rxz - Ryz \approx \frac{1}{2}\lambda$.

Further, it is preferable to arrange the display element so that: in case where the phase retardation plate has a thickness of d1 (nm), and retardation of the phase retardation plate is Rxz (nm)=d1 ×(nx1−nz1) and Ryz (nm)=d1 ×(ny1−nz1), the following formula is satisfied:

$(Rxz, Ryz) = (140, -140)$, or $(Rxz, Ryz) = (-140, 140)$.

By satisfying the relational formulas, the contrast at the oblique angle in the display element can be maximized. On this account, it is possible to provide the display element having further better viewing angle property.

It is preferable to arrange the display element so that: in case where the phase retardation plate has a thickness of d1 (nm), and retardation of the phase retardation plate is Rxz (nm)=d1 ×(nx1−nz1) and Ryz (nm)=d1 ×(ny1−nz1), the following formulas are satisfied:

$Rxz^2 + Ryz^2 \leq 300^2$, $Rxz \geq 50$, $Ryz \leq -50$, or $Rxz^2 + Ryz^2 \leq -300^2$, $Ryz \geq 50$, $Rxz \leq -50$.

By satisfying the relational formulas, the contrast at the oblique angle in the display element can be improved when there is no effect of the retardation of the polarizing plate. On this account, it is possible to provide the display element having a better viewing angle property.

It is preferable to arrange the display element so that: in case where the phase retardation plate has a thickness of d1 (nm), and retardation of the phase retardation plate is Rxz (nm)=d1 ×(nx1−nz1) and Ryz (nm)=d1 ×(ny1−nz1), the following formulas are satisfied:

$Rxz^2 + Ryz^2 \leq 250^2$, $Rxz \geq 75$, $Ryz \leq -75$, or $Rxz^2 + Ryz^2 \leq 250^2$, $Ryz \geq 75$, $Rxz \leq -75$.

By satisfying the relational formulas, the contrast at the oblique angle in the display element can be notably improved when there is no effect of the retardation of the polarizing plate. On this account, it is possible to provide the display element having a better viewing angle property.

Further, the display element according to the present technology be arranged so as to include: a pair of substrates at least one of which is transparent; a medium, sandwiched by the substrates, whose magnitude of optical anisotropy varies in response to application of a voltage; and a polarizing plate which is disposed on at least one of the substrates so as to be positioned in a rear surface with respect to a counter surface facing the medium, wherein: first and second phase retardation plates having uniaxial optical anisotropy are provided between at least one of the substrates and the polarizing plate, and the first and second phase retardation plates are disposed so that, in case where main refractive indices in an in-plane direction of the first phase retardation plate are nx2 and ny2 and a main refractive index in a normal direction is nz2 and main refractive indices in an in-plane direction of the second phase retardation plate are nx3 and ny3 and a main refractive index in a normal direction is nz3, the first phase retardation plate is provided so as to satisfy nx2≦ny2=nz2, and a direction of ny2 is parallel to an absorption axis of the polarizing plate disposed via the first phase retardation plate in a back side with respect to the substrate, and the second phase retardation plate is arranged so as to satisfy nx3=ny3<nz3, and directions of nx3 and ny3 are parallel to or orthogonal to an absorption axis of the second polarizing plate disposed via the second phase retardation plate in a back side with respect to the substrate.

In the display element, the retardation plate having biaxial optical anisotropy is provided between (i) said at least one substrate of the substrates and (ii) the polarizing plate so that the main reflective index of the retardation plate and the absorption axis of the polarizing plate satisfy the aforementioned relation. This allows improvement of contrast at an oblique viewing angle as compared with the conventional display element. Therefore, with this arrangement, it is possible to provide the display element having a viewing angle property superior to that of the conventional display element.

It is preferable to arrange the display element so that: in case where the first phase retardation plate has a thickness of d2 (nm), and the second phase retardation plate has a thickness of d3 (nm), and retardation of the first phase retardation plate is Re (nm)=d2 ×(nx2−ny2) and retardation of the second phase retardation plate is Rth (nm)=d3 ×(ny3−nz3), the following formula is satisfied:

$$(Rth\text{-}140)^2+(Re\text{-}100)^2 \leq 65^2.$$

By satisfying the relational formulas, it is possible to provide the display element in which the contrast at the oblique angle is more securely improved.

It is preferable to arrange the display element so that: in case where the first phase retardation plate has a thickness of d2 (nm), and the second phase retardation plate has a thickness of d3 (nm), and retardation of the first phase retardation plate is Re (nm)=d2 ×(nx2−ny2) and retardation of the second phase retardation plate is Rth (nm)=d3 ×(ny3−nz3), the following formula is satisfied:

$$(Rth\text{-}140)^2+(Re\text{-}100)^2 \leq 40^2.$$

By satisfying the relational formulas, the contrast at the oblique angle in the display element can be dramatically improved. On this account, it is possible to provide the display element having better viewing angle property.

It is preferable to arrange the display element so that: in case where the first phase retardation plate has a thickness of d2 (nm), and the second phase retardation plate has a thickness of d3 (nm), and retardation of the first phase retardation plate is Re (nm)=d2 ×(nx2−ny2) and retardation of the second phase retardation plate is Rth (nm)=d3 ×(ny3−nz3), the following formula is satisfied: (Rth, Re)=(140, 100).

By satisfying the relational formulas, the contrast at the oblique angle in the display element can be maximized. On this account, it is possible to provide the display element having a further better viewing angle property.

It is preferable to arrange the display element so that: in case where the first phase retardation plate has a thickness of d2 (nm), and the second phase retardation plate has a thickness of d3 (nm), and retardation of the first phase retardation plate is Re (nm)=d2 ×(nx2−ny2) and retardation of the second phase retardation plate is Rth (nm)=d3 ×(nz3−ny3), the following formula is satisfied:

$$(Rth\text{-}90)^2+(Re\text{-}140)^2 \leq 65^2.$$

By satisfying the relational formulas, the contrast at the oblique angle in the display element can be improved when there is no effect of the retardation of the polarizing plate. On this account, it is possible to provide the display element having a better viewing angle property.

It is preferable to arrange the display element so that: in case where the first phase retardation plate has a thickness of d2 (nm), and the second phase retardation plate has a thickness of d3 (nm), and retardation of the first phase retardation plate is Re (nm)=d2 ×(nx2−ny2) and retardation of the second phase retardation plate is Rth (nm)=d3 ×(nz3−ny3), the following formula is satisfied:

$$(Rth\text{-}90)^2+(Re\text{-}140)^2 \leq 40^2.$$

By satisfying the relational formulas, the contrast at the oblique angle in the display element can be notably improved when there is no effect of the retardation of the polarizing plate. On this account, it is possible to provide the display element having a better viewing angle property.

It is preferable to arrange the display element so that: in case where the first phase retardation plate has a thickness of d2 (nm), and the second phase retardation plate has a thickness of d3 (nm), and retardation of the first phase retardation plate is Re (nm)=d2 ×(nx2−ny2) and retardation of the second phase retardation plate is Rth (nm)=d3 ×(nz3−ny3), the following formula is satisfied:

(Rth, Re)=(90, 140).

By satisfying the relational formulas, the contrast at the oblique angle in the display element can be notably improved when there is no effect of the retardation of the polarizing plate. On this account, it is possible to provide the display element having a further better viewing angle property.

It is preferable to arrange the display element so that: in case where the first phase retardation plate has a thickness of d2 (nm), and the second phase retardation plate has a thickness of d3 (nm), and retardation of the first phase retardation plate is Re (nm)=d2 ×(nx2−ny2) and retardation of the second phase retardation plate is Rth (nm)=d3 ×(nz3−ny3), and retardation in a normal direction of the polarizing plate is Rtac, Re exists in a range surrounded by two straight lines, one straight line including two points (Rtac, Re)=(45, 100×1.5) and (Rtac, Re)=(0, 140×1.5), and another line including two points (Rtac, Re)=(45, 100×1.5) and (Rtac, Re)=(0, 140×0.5), and Rth exists in a range surrounded by two straight lines, one straight line including two points (Rtac, Rth)=(45, 140×1.5) and (Rtac, Rth)=(0, 90×1.5), and another line including two points (Rtac, Rth)=(45, 140×0.5) and (Rtac, Rth)=(0, 90×0.5).

By satisfying the relational formulas, the contrast at the oblique angle in the display element can be securely optimized in consideration for the effect of the retardation of the polarizing plate. On this account, it is possible to provide the display element having a further better viewing angle property.

It is preferable to arrange the display element so that: in case where the first phase retardation plate has a thickness of d2 (nm), and the second phase retardation plate has a thickness of d3 (nm), and retardation of the first phase retardation plate is Re (nm)=d2 ×(nx2−ny2) and retardation of the second phase retardation plate is Rth (nm)=d3 ×(nz3−ny3), and retardation in a normal direction of the polarizing plate is Rtac, Re exists in a range surrounded by two straight lines, one straight line including two points (Rtac, Re)=(45, 100×1.25) and (Rtac, Re)=(0, 140×1.25), and another line including two points (Rtac, Rth)=(45, 140×1.25) and (Rtac, Rth)=(0, 90×1.25), and Rth exists in a range surrounded by two straight lines, one straight line including two points (Rtac, Re)=(45, 100×0.75) and (Rtac, Re)=(0, 140×0.75), and another line including two points (Rtac, Rth)=(45, 140×0.75) and (Rtac, Rth)=(0, 90×0.75).

By satisfying the relational formulas, the contrast at the oblique angle in the display element can be securely optimized in consideration for the effect of the retardation of the polarizing plate. On this account, it is possible to provide the display element having a further better viewing angle property.

The display element may be arranged so that: the medium is optically isotopic when no electric field is applied, and the medium is optically anisotropic in response to application of an electric field. In this case, the shape of the refractive index ellipsoid is globular when no electric field is applied, and changes into an elliptic shape when an electric field is applied. The medium may be made of a material which shows the optical anisotropy when no electric field is applied and shows the optical isotropy when an electric field is applied. In this case, the shape of the refractive index ellipsoid is elliptic when no electric field is applied and changes into a globular shape when a voltage is applied.

With any of the arrangements described above, it is possible to vary a shape of refractive index ellipsoid of the medium by electric field application (i.e., the shape becomes different when the electric field is applied and when no electric field is applied). That is, it is possible to carry out displaying by varying the magnitude of the optical anisotropy (orientational order parameter; refractive index) while keeping a constant optical anisotropic direction in the medium. Therefore, with any of the arrangements, it is possible to realize the display element having a wide viewing angle property and a high-speed responsive property.

It is preferable that the medium has an orderly structure smaller than an optical wavelength when an electric field or no electric field is applied. That is, it is preferable that the medium has not isotropy in liquid form but an order (orientational order) smaller than an optical wavelength.

In the case where the orientational order (orderly structure) is smaller than the wavelength of light, the medium is optically isotropic. Therefore, by using the medium having a group of orderly aligned molecules which has a diameter smaller than the wavelength of light when an electric field or no electric field is applied, display state can be securely varied when an electric field is applied and when no electric field is applied.

The display element may be arranged so that the medium is made of molecules showing a cubic phase or a smectic D phase.

The display element may be arranged so that the medium is made of liquid crystal micro emulsion.

The display element may be arranged so that the medium is made of lyotropic liquid crystal showing any one of a micelle phase, a reversed micelle phase, a sponge phase, and a cubic phase.

The display element may be arranged so that the medium is made of a crystal fine particle dispersal system showing any one of a micelle phase, a reversed micelle phase, a sponge phase, and a cubic phase.

The display element may be arranged so that the medium is made of a dendrimer.

The display element may be arranged so that the medium is made of molecules showing a cholesteric blue phase.

The display element may be arranged so that the medium is made of molecules showing a smectic blue phase.

The magnitude of the optical anisotropy of each material described above varies according to electric field application. Therefore, the materials can be used as the medium.

As described above, the display device according to the present technology includes any one of the aforementioned display elements. Therefore, it is possible to provide the display element having a viewing angle property superior to that of the conventional display element.

In order to solve the problem, a method of the present technology for driving a display element including a medium, whose magnitude of optical anisotropy varies in response to application of an electric field, which is sealed into a gap between substrates, at least one of the substrates being transparent, the method including the step of setting a signal voltage, to be inputted to the medium, in accordance with a previous video signal and a present video signal.

In order to solve the foregoing problem, a display element of the present technology includes a medium, whose magnitude of optical anisotropy varies in response to application of an electric field, which is sealed into a gap between substrates, at least one of the substrates being transparent, and the display element includes video signal correction processing section for outputting a corrected video signal so as to set the signal voltage inputted to the medium.

Because each of the conventional liquid crystal display elements uses a change in the alignment direction of liquid crystal molecules so as to carry out displaying, the response speed of the conventional liquid crystal display element is greatly influenced by intrinsic viscosity of liquid crystal. On the contrary, the display element of the arrangement uses a change in the magnitude of the optical anisotropy of the medium. Therefore, response speed of the display element of the arrangement is not greatly influenced by the intrinsic viscosity of liquid crystal, unlike the conventional liquid crystal display element. In other words, the display element of the arrangement intrinsically has a high-speed response displaying property.

Further, according to the arrangement, it is possible to determine, in accordance with the present video signal and the previous video signal, a signal voltage which is calculated so that a desired voltage to be applied in response to an input of the present video signal is applied to the medium as soon as possible.

Therefore, according to the arrangement, it is possible to apply a signal voltage which prevents the display element having a higher response property than that of the conventional liquid crystal display element from deteriorating the high response property. This allows realization of more accurate high-speed response of the display element which carries out displaying by using the change of the magnitude of the optical anisotropy of the medium.

It is preferable that the method is arranged so that the signal voltage is set in accordance with: a capacitance of the display element at a time when a present voltage is being applied to the medium by inputting the previous video signal; a voltage which should be applied to the medium by inputting the present video signal; and a capacitance of the display element at a time when the voltage which should be applied is being applied to the medium.

For example, the signal voltage is indicated by Vs, and is so determined as to satisfy:

$Vs=Vi \cdot Ci/Ci\text{-}1$, where $Ci\text{-}1$ indicates the capacitance of the display element at the moment when the voltage is applied to the medium in response to the input of the previous video signal, and Vi indicates the voltage to be applied to the medium in response to the input of the present video signal, and Ci indicates the capacitance of the display element at the moment of the application of the voltage Vi (i is an integer no less than 1).

According to the arrangement, the signal voltage is determined in consideration for the capacitance of the display element. This allows more accurate determination of the signal voltage for applying the desired voltage as soon as possible.

Alternatively, it is preferable that the method is arranged so that the signal voltage is set in accordance with a grayscale level of the display element which is set by the present video signal and a grayscale level of the display element which is set by the previous video signal.

For example, the signal voltage is determined so that the display element carries out displaying at a grayscale level γ satisfying the following formula:

$\gamma=\beta+k \times (\beta-\alpha)$, where α indicates that grayscale level of the display element which is determined by the present video signal, and β indicates that grayscale level of the display element which is determined by the previous video signal, and k is a constant larger than 0.

According to the arrangement, the determination of the signal voltage for applying the desired voltage to the display element as soon as possible is made by using the grayscale that is digital data. Therefore, the use of the digital data simplifies the determination processing as compared with the use of the analog data, that is, a value of the voltage applied to the display element.

Further, it is preferable that the method is arranged so that in case where the grayscale level γ exceeds a maximum grayscale level which allows the display element to display an image, the signal voltage is set so that the display element displays an image on the basis of the maximum grayscale level.

The arrangement prevents application, to the display element, of a voltage not less than the signal voltage for displaying the maximum grayscale. On this account, it is possible to prevent breakdown of the display element due to too much voltage application. Further, because a display element cannot intrinsically display at a certain grayscale level or higher, the arrangement can render an appropriate grayscale level to the display element.

Further, it is also preferable that the method is arranged so that in case where the grayscale level γ is lower than a minimum grayscale level which allows the display element to display an image, the signal voltage is set so that the display element displays an image on the basis of the minimum grayscale level.

Because a display element cannot intrinsically display at a certain grayscale level or lower, the arrangement can render an appropriate grayscale level to the display element.

Further, it is preferable that k be ½. This allows improvement of the high-speed response property of the display element of the present technology.

Further, it is preferable that k be calculated in accordance with such an expression as k=|β−α|/Gmax where the maximum grayscale level which allows the display element to display an image is Gmax. According to the arrangement, the grayscale level γ is determined by adding (i) the correction value k (β−α), which is in accordance with the value of β−α, to (ii) the grayscale level β. Therefore, the grayscale level γ thus determined is suitable for both the previous video signal and the present video signal. This allows more accurate determination of the signal voltage.

Further, it is preferable that the signal voltage is set in accordance with a further previous video signal. According to this, the signal voltage is determined in accordance with greater number of parameters. This allows determination of more appropriate signal voltage, and realization of more accurate high-speed response of the display element.

Further, in order to solve the problem, a method of the present technology driving a display element including a medium, whose magnitude of optical anisotropy varies in response to application of a voltage, which is sealed into a gap between substrates, at least one of the substrates being transparent, the method comprising the step of setting a signal voltage, to be inputted to the medium, in accordance with (i) achievement estimate data indicative of an estimated voltage which will be indicated by the display element in response to input of a previous video signal and (ii) a present video signal. The achievement estimate data is, for example, data showing a voltage applied to the display element, or data showing a grayscale level of displaying by the display element.

Because the conventional liquid crystal display element uses a change in the alignment direction of liquid crystal molecules so as to carry out displaying, its response speed is greatly influenced by the intrinsic viscosity of liquid crystal. On the contrary, the display element of the arrangement uses the change in the magnitude of the optical anisotropy of the medium. Therefore, the response speed of the display element of the arrangement is not greatly influenced by the intrinsic viscosity of the liquid crystal, unlike the conventional liquid crystal display element. In other words, the display element of the arrangement intrinsically has a high-speed response displaying property.

Further, according to the arrangement, it is possible to determine, in accordance with the present video signal and the achievement estimate data, the signal voltage which is determined so that a desired voltage to be applied in response to an input of the present video signal is applied to the medium as soon as possible.

Therefore, according to the arrangement, it is possible to apply a signal voltage which prevents the display element having a higher response property than that of the conventional liquid crystal display element from deteriorating the response property. This realizes more accurate high-speed response of the display element that carries out displaying by using the change in the magnitude of the optical anisotropy of the medium.

Particularly, the use of the achievement estimate data allows secure determination of the signal voltage even in the case where the achievement estimate data is different from actual data that the display element shows. Thus, it is possible to surely realize the high speed response of the display element.

Further, it is preferable that the method is arranged so that the signal voltage inputted to the medium is set in accordance with a temperature of the medium. In other words, because the viscosity of the medium varies depending on temperature, the signal voltage also should vary depending on a temperature of the medium. Therefore, the arrangement allows more accurate determination of the signal voltage.

The medium may be optically isotropic when no electric field is applied and may be optically anisotropic when an electric field is applied. Alternatively, the medium may be optically anisotropic when no electric field is applied and may be optically isotropic when an electric field is applied. Alternatively, the medium may be optically anisotropic when no electric field is applied and its magnitude of the optical anisotropy varies when an electric field is applied.

With any arrangement described above, it is possible to realize the display element, varying its displaying state when an electric field is applied and when no electric field is applied, which has a wide driving temperature range, a wide viewing angle property, and a high-speed response property.

Further, it is preferable that the medium have an orderly structure (orientational order) smaller than an optical wavelength when an electric field or no electric field is applied. When the orderly structure is smaller than an optical wavelength, the medium is optically isotropic. Therefore, by using the medium having the orderly structure smaller than the optical wavelength when an electric field or no electric field is applied, the display state of the display element can be securely varied when an electric field is applied and when no electric field is applied.

The medium may have an orderly structure showing cubic symmetric property.

The medium may be made of molecules showing a cubic phase or a smectic D phase.

The medium may be made of liquid crystal micro emulsion. Further, the medium may be made of lyotropic liquid crystal showing any one of a micelle phase, a reversed micelle phase, a sponge phase, and a cubic phase.

Further, the medium may be made of a crystal fine particle dispersal system showing any one of a micelle phase, a reversed micelle phase, a sponge phase, and a cubic phase.

Further, the medium may be made of a dendrimer.

The medium may be made of molecules showing a cholesteric blue phase.

The medium may be made of molecules showing a smectic blue phase.

In each of the materials described above, its magnitude of the optical anisotropy varies in response to the voltage application. Therefore, the material can be used for the medium of the display element of the present technology.

Further, the display element of the present technology may include a plurality of electrodes on at least one of the substrates, wherein an electric field is applied to the medium by applying an electric field to a region between the electrodes. Alternatively, the display element of the present technology may include electrodes on both of the substrates, wherein an electric field is applied to the medium by applying an electric field to a region between the electrodes.

With any of the arrangements described above, it is possible to apply an electric field to the medium. On this account, the magnitude of the optical anisotropy of the medium can be varied.

Further, the display element of the present technology may be arranged so as to include a medium provided between a pair of substrates, at least one of the substrates being transparent, an external field being applied to the medium in order to carry out a display, wherein the medium varies in terms of magnitude of optical anisotropy in response to application of the external field. That is, the means for varying the medium in terms of the magnitude of the optical anisotropy is not limited to the application of the electric field, and it may be so arranged that: an external field other than the electric field is applied, so that the magnitude of the anisotropy is varied when the external field is applied or when no external field is applied. For example, a magnetic field may be applied instead of applying the electric field.

Further, the display element of the present technology may be arranged so as to include a medium provided between a pair of substrates, at least one of the substrates being transparent, an external field being applied to the medium in order to carry out a display, wherein: the medium varies in terms of magnitude of optical anisotropy in response to application of the external field, and a selective reflection wavelength band or a helical pitch of molecules, contained in the medium, which are aligned in a helical manner, is not more than 400 nm. In case where a selective reflection wavelength band or a helical pitch of molecules, contained in the medium, which are aligned in a helical manner, is more than 400 nm, a displayed color sometimes reflects the helical pitch. However, when a selective reflection wavelength band or a helical pitch of molecules, contained in the medium, which are aligned in a helical manner, is not more than 400 nm, it is possible to prevent occurrence of the color reflecting the helical pitch.

In order to solve the problems, a display device of the present technology includes any one of the display elements described above.

According to the arrangement, it is possible to realize a display device having a wide driving temperature range, a wide viewing angle property, and a high-speed response property.

A program according to the present technology causes a computer to execute the method of driving the display element. Therefore, when the program is executed by the computer, it is possible to drive the display element in accordance with the driving method. This ensures realization of the high-speed response property of the display element, as in the driving method of the present technology. computer, it is possible to drive the display element in accordance with the driving method. This ensures realization of the high-speed response property of the display element, as in the driving method of the present invention.

Further, a computer data signal (data signal sequence) may be used for the program. For example, the computer data signal sent with it contained in a carrier wave is received so as to cause a computer to implement the received computer data signal, thereby driving the display device in accordance with the aforementioned driving method.

Further, the program is stored in a computer-readable storage medium, so that it is possible to keep and distribute the program easier. Moreover, by causing a computer to read the storage medium, it is possible to drive the display device in accordance with the aforementioned driving method.

The display element of the present technology has a wide driving temperature range, a wide viewing angle property, and a high-speed response property. Therefore, the display element of the present technology is widely applicable to: (i) image display devices (display device) such as a television, a monitor, and the like; (ii) OA equipments such as a word processor, a computer, and the like; and (iii) image display devices (display device) provided in information terminals such as a video camera, a digital camera, a mobile phone, and the like. Because the display element of the present technology has the wide driving temperature range, the wide viewing angle property, and the high-speed response property as described above, the display element of the present technology is also suitable for a display device that carries out a wide screen display and a video image display. Further, because the present display element has the high-speed responsiveness, the present display element is also suitable for, for example, a field sequential color display device.

Because the present technology ensures realization of an intrinsic high-speed response property of a display element using a medium whose magnitude of optical anisotropy varies according to electric field application, it is possible to securely improve display response speed of a display, including the display element, such as a display of an information terminal like a television, a word processor, a personal computer, a video camera, a digital camera, a mobile phone, and the like. Further, because of the high-speed response property, the display element of the present invention is suitable for a wide screen display and a video image display.

The present invention is not limited to the embodiments above, but may be altered within the scope of the claims. An embodiment based on a proper combination of technical means disclosed in different embodiments is encompassed in the technical scope of the present invention.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A display element, comprising a medium provided between a pair of substrates, at least one of the substrates being transparent, an electric field being applied to the medium in order to carry out a display, wherein the medium varies in terms of magnitude of optical anisotropy in response to application of the electric field;

the medium shows optical isotropy when the electric field is not applied, and the medium shows the optical anisotropy when the electric field is applied;

the medium has an orderly structure smaller than a visible wavelength when the electric field is not applied to the medium; and a selective reflection wavelength band or a helical pitch of molecules, contained in the medium, which are aligned in a helical manner, is not more than 400 nm.

2. The display element as set forth in claim 1, wherein the medium has an orderly structure which shows a cubic symmetric property.

3. The display element as set forth in claim 1, wherein the medium is made of molecules showing a cubic phase or a smectic D phase.

4. The display element as set forth in claim 1, wherein the medium is made of liquid crystal microemulsion.

5. The display element as set forth in claim 1, wherein the medium is made of lyotropic liquid crystal showing any one of a micelle phase, a reversed micelle phase, a sponge phase, and a cubic phase.

6. The display element as set forth in claim 1, wherein the medium is made of liquid-crystal-fine-particle dispersal system showing any one of a micelle phase, a reversed micelle phase, a sponge phase, and a cubic phase.

7. The display element as set forth in claim 1, wherein the medium is made of dendrimer.

8. The display element as set forth in claim 1, wherein the medium is made of molecules showing a cholesteric blue phase.

9. The display element as set forth in claim 1, wherein the medium is made of molecules showing a smectic blue phase.

10. The display element as set forth in claim 1, wherein:
at least one of the substrates includes a plurality of electrodes, and
an electric field is applied between the plurality of electrodes so as to apply the electric field to the medium.

11. The display element as set forth in claim 1, wherein:
each of both the substrates includes an electrode, and
an electric field is applied between the electrodes provided on each of both the substrates so as to apply the electric field to the medium.

12. The display element as set forth in claim 1, comprising:
a polarizing plate which is disposed on at least one of the substrates so as to be positioned in a rear surface with respect to a counter surface facing the medium; and
a phase retardation plate, having biaxial optical anisotropy, which is provided between at least one of the substrates and the polarizing plate, wherein
the phase retardation plate is disposed so that, in case where main refractive indices in an in-plane direction of the phase retardation plate are $nx1$ and $ny1$ and a main refractive index in a normal direction is $nz1$, a direction of $ny1$ is parallel to or orthogonal to an absorption axis of the polarizing plate disposed via the phase retardation plate in a back side with respect to the substrate.

13. The display element as set forth in claim 12, wherein, in case where the phase retardation plate has a thickness of $d1$ (nm), and retardation of the phase retardation plate is $Rxz$ (nm)=$d1 \times (nx1-nz1)$ and $Ryz$ (nm)=$d1 \times (ny1-nz1)$, the following formulas are satisfied:

$Rxz \geq 0$, $Ryz \leq (225/500)Rxz-125$, $Ryz \geq (175/275)Rxz-300$, $Ryz \geq (500/500)Rxz-400$, $Ryz \geq -225$, or $Ryz \geq 0$, $Rxz \leq (225/500)Ryz-125$, $Rxz \geq (175/275)Ryz-300$, $Rxz \geq (500/500)Ryz-400$, $Rxz \geq -225$.

14. The display element as set forth in claim 12, wherein, in case where the phase retardation plate has a thickness of $d1$ (nm), and retardation of the phase retardation plate is $Rxz$ (nm)=$d1 \times (nx1-nz1)$ and $Ryz$ (nm)=$d1 \times (ny1-nz1)$, the following formulas are satisfied:

$Rxz \geq 25$, $Ryz \leq (125/250)Rxz-175$, $-200 \leq Ryz \leq -50$, $Ryz \geq (250/300)Rxz-300$, or $Ryz \geq 25$, $Rxz \leq (125/250)Ryz-175$, $-200 \leq Rxz \leq -50$, $Rxz \geq (250/300)Ryz-300$.

15. The display element as set forth in claim 12, wherein, in case where the phase retardation plate has a thickness of $d1$ (nm), and retardation of the phase retardation plate is $Rxz$ (nm)=$d1 \times (nx1-nz1)$ and $Ryz$ (nm)=$d1 \times (ny1-nz1)$, and an observing wavelength is $\gamma$ (nm), the following formulas are satisfied:

$Rxz = -Ryz$, $Rxz - Ryz \approx \frac{1}{2}\lambda$.

16. The display element as set forth in claim 12, wherein, in case where the phase retardation plate has a thickness of $d1$ (nm), and retardation of the phase retardation plate is $Rxz$ (nm)=$d1 \times (nx1-nz1)$ and $Ryz$ (nm)=$d1 \times (ny1-nz1)$, the following formula is satisfied:

$(Rxz, Ryz) = (140, -140)$, or $(Rxz, Ryz) = (-140, 140)$.

17. The display element as set forth in claim 12, wherein, in case where the phase retardation plate has a thickness of $d1$ (nm), and retardation of the phase retardation plate is $Rxz$ (nm)=$d1 \times (nx1-nz1)$ and $Ryz$ (nm)=$d1 \times (ny1-nz1)$, the following formulas are satisfied:

$Rxz^2 + Ryz^2 \leq -300^2$, $Rxz \geq 50$, $Ryz \leq -50$, or $Rxz^2 + Ryz^2 \leq -300^2$, $Ryz \geq 50$, $Rxz \leq -50$.

18. The display element as set forth in claim 12, wherein, in case where the phase retardation plate has a thickness of $d1$ (nm), and retardation of the phase retardation plate is Rxz (nm)=d1×(nx1−nz1) and Ryz (nm)=d1×(ny1−nz1), the following formulas are satisfied:

$Rxz^2+Ryz^2 \leq -250^2$, $Rxz \geq 75$, $Ryz \leq -75$, or $Rxz^2+Ryz^2 \leq 250^2$, $Ryz \geq 75$, $Rxz \leq -75$.

19. The display element as set forth in claim 1, comprising:
a polarizing plate which is disposed on at least one of the substrates so as to be positioned in a rear surface with respect to a counter surface facing the medium; and
first and second phase retardation plates, having uniaxial optical anisotropy, which are provided between at least one of the substrates and the polarizing plate, wherein
the first and second phase retardation plates are disposed so that,
in case where main refractive indices in an in-plane direction of the first phase retardation plate are nx2 and ny2 and a main refractive index in a normal direction is nz2 and main refractive indices in an in-plane direction of the second phase retardation plate are nx3 and ny3 and a main refractive index in a normal direction is nz3,
the first phase retardation plate is provided so as to satisfy nx2>ny2=nz2, and a direction of ny2 is parallel to an absorption axis of the polarizing plate disposed via the first phase retardation plate in a back side with respect to the substrate, and
the second phase retardation plate is arranged so as to satisfy nx3=ny3<nz3, and a direction of ny3 are parallel to or orthogonal to an absorption axis of the second polarizing plate disposed via the second phase retardation plate in a back side with respect to the substrate.

20. The display element as set forth in claim 19, wherein, in case where the first phase retardation plate has a thickness of d2 (nm), and the second phase retardation plate has a thickness of d3 (nm), and retardation of the first phase retardation plate is Re (nm)=d2×(nx2−ny2) and retardation of the second phase retardation plate is Rth (nm)=d3×(nz3−ny3), the following formula is satisfied:

$(Rth\text{-}140)^2+(Re\text{-}100)^2 \leq -65^2$.

21. The display element as set forth in claim 19, wherein, in case where the first phase retardation plate has a thickness of d2 (nm), and the second phase retardation plate has a thickness of d3 (nm), and retardation of the first phase retardation plate is Re (nm)=d2×(nx2−ny2) and retardation of the second phase retardation plate is Rth (nm)=d3×(nz3−ny3), the following formula is satisfied:

$(Rth\text{-}140)^2+(Re\text{-}100)^2 \leq 40^2$.

22. The display element as set forth in claim 19, wherein, in case where the first phase retardation plate has a thickness of d2 (nm), and the second phase retardation plate has a thickness of d3 (nm), and retardation of the first phase retardation plate is Re (nm)=d2×(nx2−ny2) and retardation of the second phase retardation plate is Rth (nm)=d3×(nz3−ny3), the following formula is satisfied:

(Rth, Re)=(140, 100).

23. The display element as set forth in claim 19, wherein, in case where the first phase retardation plate has a thickness of d2 (nm), and the second phase retardation plate has a thickness of d3 (nm), and retardation of the first phase retardation plate is Re (nm)=d2×(nx2−ny2) and retardation of the second phase retardation plate is Rth (nm)=d3×(nz3−ny3), the following formula is satisfied:

$(Rth\text{-}90)^2+(Re\text{-}140)^2 \leq 65^2$.

24. The display element as set forth in claim 19, wherein, in case where the first phase retardation plate has a thickness of d2 (nm), and the second phase retardation plate has a thickness of d3 (nm), and retardation of the first phase retardation plate is Re (nm)=d2×(nx2−ny2) and retardation of the second phase retardation plate is Rth (nm)=d3×(nz3−ny3), the following formula is satisfied:

$(Rth\text{-}90)^2+(Re\text{-}140)^2 \leq 40^2$.

25. The display element as set forth in claim 19, wherein, in case where the first phase retardation plate has a thickness of d2 (nm), and the second phase retardation plate has a thickness of d3 (nm), and retardation of the first phase retardation plate is Re (nm)=d2×(nx2−ny2) and retardation of the second phase retardation plate is Rth (nm)=d3×(nz3−ny3), the following formula is satisfied:

(Rth, Re)=(90, 140).

26. The display element as set forth in claim 19, wherein, in case where the first phase retardation plate has a thickness of d2 (nm), and the second phase retardation plate has a thickness of d3 (nm), and retardation of the first phase retardation plate is Re (nm)=d2×(nx2−ny2) and retardation of the second phase retardation plate is Rth (nm)=d3×(nz3−ny3), and retardation in a normal direction of the polarizing plate is Rtac,
Re exists in a range surrounded by two straight lines, one straight line including two points (Rtac, Re)=(45, 100×1.5) and (Rtac, Re)=(0, 140×1.5), and another line including two points (Rtac, Re)=(45, 100×1.5) and (Rtac, Re)=(0, 140×0.5), and
Rth exists in a range surrounded by two straight lines, one straight line including two points (Rtac, Rth)=(45, 140×1.5) and (Rtac, Rth)=(0, 90×1.5), and another line including two points (Rtac, Rth)=(45, 140×0.5) and (Rtac, Rth)=(0, 90×0.5).

27. The display element as set forth in claim 19, wherein, in case where the first phase retardation plate has a thickness of d2 (nm), and the second phase retardation plate has a thickness of d3 (nm), and retardation of the first phase retardation plate is Re (nm)=d2×(nx2−ny2) and retardation of the second phase retardation plate is Rth (nm)=d3×(nz3−ny3), and retardation in a normal direction of the polarizing plate is Rtac,
Re exists in a range surrounded by two straight lines, one straight line including two points (Rtac, Re)=(45, 100×1.25) and (Rtac, Re)=(0, 140×1.25), and another line including two points (Rtac, Rth)=(45, 140×1.25) and (Rtac, Rth)=(0, 90×1.25), and
Rth exists in a range surrounded by two straight lines, one straight line including two points (Rtac, Re)=(45, 100×0.75) and (Rtac, Re)=(0, 140×0.75), and another line including two points (Rtac, Rth)=(45, 140×0.75) and (Rtac, Rth)=(0, 90×0.75).

28. The display element as set forth in claim 1, comprising a video signal correction processing section for outputting a corrected video signal so as to set a signal voltage, to be inputted to the medium, in accordance with a previous video signal and a present video signal.

29. A display device, comprising the display element including a medium provided between a pair of substrates, at least one of the substrates being transparent, an electric field being applied to the medium in order to carry out a display, wherein the medium varies in terms of magnitude of optical anisotropy in response to application of the electric field;

the medium show optical isotropy when the electric field is not applied, and the medium shows the optical anisotropy when the electric field is applied;

the medium has an orderly structure smaller than a visible wavelength when the electric field is not applied to the medium; and a selective reflection wavelength band or a helical pitch of molecules, contained in the medium, which are aligned in a helical manner, is not more than 400 nm.

30. The display device as set forth in claim 29, wherein the display element includes:

a polarizing plate which is disposed on at least one of the substrates so as to be positioned in a rear surface with respect to a counter surface facing the medium; and a phase retardation plate, having biaxial optical anisotropy, which is provided between at least one of the substrates and the polarizing plate, the phase retardation plate being disposed so that, in case where main refractive indices in an in-plane direction of the phase retardation plate are nx1 and ny1 and a main refractive index in a normal direction is nz1, a direction of ny1 is parallel to or orthogonal to an absorption axis of the polarizing plate disposed via the phase retardation plate in a back side with respect to the substrate.

31. The display device as set forth in claim 29, wherein the display element includes:

a polarizing plate which is disposed on at least one of the substrates so as to be positioned in a rear surface with respect to a counter surface facing the medium; and first and second phase retardation plates, having uniaxial optical anisotropy, which are provided between at least one of the substrates and the polarizing plate, the first and second phase retardation plates being disposed so that, in case where main refractive indices in an in-plane direction of the first phase retardation plate are nx2 and ny2 and a main refractive index in a normal direction is nz2 and main refractive indices in an in-plane direction of the second phase retardation plate are nx3 and ny3 and a main refractive index in a normal direction is nz3, the first phase retardation plate is provided so as to satisfy nx2>ny2=nz2, and a direction of ny2 is parallel to an absorption axis of the polarizing plate disposed via the first phase retardation plate in a back side with respect to the substrate, and the second phase retardation plate is arranged so as to satisfy nx3=ny3<nz3, and directions of nx3 and ny3 are parallel to or orthogonal to an absorption axis of the polarizing plate disposed via the second phase retardation plate in a back side with respect to the substrate.

32. The display device as set forth in claim 29, comprising a video signal correction processing section for outputting a corrected video signal so as to set a signal voltage, to be inputted to the medium, in accordance with a previous video signal and a present video signal.

33. A method of driving a display element including a medium, whose magnitude of optical anisotropy varies in response to application of an electric field, which is sealed into a gap between substrates, at least one of the substrates being transparent, said method comprising the step of setting a signal voltage, to be inputted to the medium, in accordance with a previous video signal and a present video signal;

the medium show optical isotropy when the electric field is not applied, and the medium shows the optical anisotropy when the electric field is applied;

the medium has an orderly structure smaller than a visible wavelength when the electric field is not applied to the medium; and a selective reflection wavelength band or a helical pitch of molecules, contained in the medium, which are aligned in a helical manner, is not more than 400 nm.

34. The method as set forth in claim 33, wherein the signal voltage is set in accordance with:

a capacitance of the display element at a time when a present voltage is being applied to the medium by inputting the previous video signal;

a voltage which should be applied to the medium by inputting the present video signal; and a capacitance of the display element at a time when the voltage which should be applied is being applied to the medium.

35. The method as set forth in claim 34, wherein the signal voltage is set to be a voltage Vs calculated in accordance with an expression $$Vs = Vi \cdot Ci/Ci\text{-}1$$

where: the capacitance of the display element at the time when the present voltage is being applied to the medium by inputting the previous video signal is set to $Ci\text{-}1$, and the voltage which should be applied to the medium by inputting the present video signal is set to $Vi$, and the capacitance of the display element at the time when the voltage $Vi$ is being applied is set to $Ci$, i being an integer of 1 or more.

36. The method as set forth in claim 33, wherein the signal voltage is set in accordance with a grayscale level of the display element which is set by the present video signal and a grayscale level of the display element which is set by the previous video signal.

37. The method as set forth in claim 36, wherein the signal voltage is set so that the display element displays an image on the basis of a grayscale level γ calculated in accordance with an expression $$\gamma = \beta + k \times (\beta - \alpha)$$

where: the grayscale level of the display element which is set by the present video signal is α, and the grayscale level of the display element which is set by the previous video signal is β, and k is an arbitrary constant which is more than 0.

38. The method as set forth in claim 37, wherein in case where the grayscale level γ exceeds a maximum grayscale level which allows the display element to display an image, the signal voltage is set so that the display element displays an image on the basis of the maximum grayscale level.

39. The method as set forth in claim 37, wherein in case where the grayscale level γ is lower than a minimum grayscale level which allows the display element to display an image, the signal voltage is set so that the display element displays an image on the basis of the minimum grayscale level.

40. The method as set forth in claim 37, wherein k is ½.

41. The method as set forth in claim 37, wherein k is calculated in accordance with such an expression as $$k = |\beta - \alpha|/G\max$$

where the maximum grayscale level which allows the display element to display an image is Gmax.

42. The method as set forth in claim 33, wherein the signal voltage is set in accordance with a further previous video signal.

43. The method as set forth in claim 33, wherein the signal voltage inputted to the medium is set in accordance with a temperature of the medium.

44. A method of driving a display element including a medium, whose magnitude of optical anisotropy varies in response to application of an electric field, which is sealed into a gap between substrates, at least one of the substrates being transparent, said method comprising the step of setting a signal voltage, to be inputted to the medium, in accordance with (i) achievement estimate data indicative of an estimated voltage which will be indicated by the display element in response to input of a previous video signal and (ii) a present video signal;

the medium shows optical isotropy when the electric field is not applied, and the medium shows the optical anisotropy when the electric field is applied;

the medium has an orderly structure smaller than a visible wavelength when the electric field is not applied to the medium; and a selective reflection wavelength band or a helical pitch of molecules, contained in the medium, which are aligned in a helical manner, is not more than 400 nm.

45. The method as set forth in claim 44, wherein the achievement estimate data indicates a voltage applied to the display element.

46. The method as set forth in claim 44, wherein the achievement estimate data indicates a grayscale level in accordance with which the display element displays an image.

47. The method as set forth in claim 44, wherein the signal voltage inputted to the medium is set in accordance with a temperature of the medium.

48. A display element, comprising a medium provided between a pair of substrates, at least one of the substrates being transparent, an external field being applied to the medium in order to carry out a display, wherein the medium varies in terms of magnitude of optical anisotropy in response to application of the external field;

the medium shows optical isotropy when the electric field is not applied, and the medium shows the optical anisotropy when the external field is applied;

the medium has an orderly structure smaller than a visible wavelength when the external field is not applied to the medium;

a selective reflection wavelength band or a helical pitch of molecules, contained in the medium, which are aligned in a helical manner, is not more than 400 nm.

49. A display element, comprising a medium provided between a pair of substrates, at least one of the substrates being transparent, an external field being applied to the medium in order to carry out a display, wherein:

the medium varies in terms of magnitude of optical anisotropy in response to application of the external field, a selective reflection wavelength band or a helical pitch of molecules, contained in the medium, which are aligned in a helical manner, is not more than 400 nm;

the medium shows optical isotropy when the external field is not applied, and the medium shows the optical anisotropy when the external field is applied;

the medium has an orderly structure smaller than a visible wavelength when the external field is not applied to the medium;

a selective reflection wavelength band or a helical pitch of molecules, contained in the medium, which are aligned in a helical manner, is not more than 400 nm.

* * * * *

UNITED STATES PATENT AND TRADEMARK OFFICE
CERTIFICATE OF CORRECTION

PATENT NO.       : 7,639,332 B2
APPLICATION NO. : 11/015771
DATED            : December 29, 2009
INVENTOR(S)      : Miyachi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1240 days.

Signed and Sealed this

Ninth Day of November, 2010

David J. Kappos
*Director of the United States Patent and Trademark Office*